US008156146B2

(12) United States Patent
Arthursson

(10) Patent No.: US 8,156,146 B2
(45) Date of Patent: *Apr. 10, 2012

(54) NETWORK FILE SYSTEM

(75) Inventor: Daniel Arthursson, Linkoeping (SE)

(73) Assignee: Xcerion Aktiebolag, Linköping (SE)

( * ) Notice: Subject to any disclaimer, the term of this patent is extended or adjusted under 35 U.S.C. 154(b) by 42 days.

This patent is subject to a terminal disclaimer.

(21) Appl. No.: 12/240,884

(22) Filed: Sep. 29, 2008

(65) Prior Publication Data
US 2009/0157627 A1 Jun. 18, 2009

Related U.S. Application Data

(60) Provisional application No. 60/976,216, filed on Sep. 28, 2007, provisional application No. 60/976,222, filed on Sep. 28, 2007, provisional application No. 60/976,246, filed on Sep. 28, 2007, provisional application No. 60/976,249, filed on Sep. 28, 2007, provisional application No. 60/976,252, filed on Sep. 28, 2007, provisional application No. 60/976,258, filed on Sep. 28, 2007, provisional application No. 60/976,266, filed on Sep. 28, 2007, provisional application No. 60/976,269, filed on Sep. 28, 2007, provisional application No. 60/976,275, filed on Sep. 28, 2007, provisional application No. 60/976,281, filed on Sep. 28, 2007, provisional application No. 60/976,283, filed on Sep. 28, 2007, provisional application No. 60/976,292, filed on Sep. 28, 2007, provisional application No. 60/976,301, filed on Sep. 28, 2007, provisional application No. 60/976,304, filed on Sep. 28, 2007, provisional application No. 60/976,308, filed on Sep. 28, 2007, provisional application No. 60/976,311, filed on Sep. 28, 2007, provisional application No. 60/976,312, filed on Sep. 28, 2007, provisional application No. 60/976,320, filed on Sep. 28, 2007, provisional application No. 60/976,325, filed on Sep. 28, 2007, provisional application No. 60/976,327, filed on Sep. 28, 2007, provisional application No. 60/976,339, filed on Sep. 28, 2007.

(51) Int. Cl.
G06F 7/00 (2006.01)
G06F 17/30 (2006.01)
(52) U.S. Cl. .......................................... 707/783; 726/30
(58) Field of Classification Search ........................ None
See application file for complete search history.

(56) References Cited

U.S. PATENT DOCUMENTS 5,392,400 A 2/1995 Berkowitz
(Continued)

FOREIGN PATENT DOCUMENTS

JP 2004192053 A 7/2004
(Continued)

OTHER PUBLICATIONS

"Implementation of HPFS386 Drive Level Access Control Lists", Sep. 1993, IBM Technical Disclosure Bulletin, vol. 36, Issue 9A, pp. 417-418.*

(Continued)

Primary Examiner — Pierre Vital
Assistant Examiner — Augustine Obisesan
(74) Attorney, Agent, or Firm — Christensen O'Connor Johnson Kindness PLLC

(57) ABSTRACT

Generally described, the present invention is directed to a network operating system that provides more effective ways of leveraging the connectivity of computer networks. In one embodiment, an XML virtual machine is implemented that accepts high-level application code written in an XML programming language as input. Functionality is provided to interpret or translate the application code written in an XML programming language into code that is suitable for execution across computer platforms. Moreover, the XML virtual machine supports the Model View Controller (MVC) design paradigm that facilitates true data abstraction from applications to a common data model. Multi-instance applications, with each instance potentially supporting multiple views, may be created and executed.

5 Claims, 62 Drawing Sheets

U.S. PATENT DOCUMENTS

| | | |
|---|---|---|
| 5,553,242 A | 9/1996 | Russell |
| 5,608,903 A * | 3/1997 | Prasad et al. .................. 707/10 |
| 5,701,458 A * | 12/1997 | Bsaibes et al. .................. 707/9 |
| 5,778,222 A * | 7/1998 | Herrick et al. .................. 707/9 |
| 5,872,971 A | 2/1999 | Knapman |
| 5,878,434 A | 3/1999 | Draper |
| 5,956,715 A * | 9/1999 | Glasser et al. .................. 707/9 |
| 5,987,471 A * | 11/1999 | Bodine et al. ............ 707/103 R |
| 5,991,771 A | 11/1999 | Falls |
| 6,104,392 A | 8/2000 | Shaw |
| 6,192,365 B1 | 2/2001 | Draper |
| 6,233,600 B1 * | 5/2001 | Salas et al. .................. 709/201 |
| 6,341,314 B1 | 1/2002 | Doganata |
| 6,389,420 B1 | 5/2002 | Vahalia |
| 6,549,916 B1 | 4/2003 | Sedlar |
| 6,553,368 B2 * | 4/2003 | Martin et al. .................. 707/3 |
| 6,571,259 B1 | 5/2003 | Zheng |
| 6,574,674 B1 | 6/2003 | May et al. |
| 6,603,476 B1 | 8/2003 | Paolini |
| 6,633,878 B1 * | 10/2003 | Underwood .................. 707/100 |
| 6,651,096 B1 * | 11/2003 | Gai et al. .................. 709/223 |
| 6,804,677 B2 | 10/2004 | Shadmon |
| 6,834,275 B2 | 12/2004 | Kanai |
| 6,856,993 B1 | 2/2005 | Verma |
| 6,925,631 B2 | 8/2005 | Golden |
| 6,938,042 B2 | 8/2005 | Aboulhosn |
| 6,981,061 B1 | 12/2005 | Sakakura |
| 7,124,356 B1 | 10/2006 | Alsafadi |
| 7,131,116 B1 | 10/2006 | Krishna |
| 7,162,485 B2 | 1/2007 | Gottlob |
| 7,191,186 B1 | 3/2007 | Pullen |
| 7,246,104 B2 | 7/2007 | Stickler |
| 7,254,610 B1 | 8/2007 | Turner |
| 7,275,070 B2 | 9/2007 | Kataria |
| 7,383,255 B2 | 6/2008 | Desai |
| 7,424,717 B2 | 9/2008 | Blevins |
| 7,437,376 B2 | 10/2008 | Sikchi |
| 7,519,969 B2 | 4/2009 | Bent |
| 7,596,562 B2 * | 9/2009 | Lee et al. .................. 707/9 |
| 7,599,990 B1 | 10/2009 | Groves |
| 7,627,658 B2 | 12/2009 | Levett |
| 7,634,726 B2 | 12/2009 | Ims |
| 7,646,771 B2 * | 1/2010 | Guru et al. .................. 370/392 |
| 7,721,303 B2 | 5/2010 | Alves de Moura |
| 7,725,489 B2 | 5/2010 | Al-Attas |
| 7,725,590 B2 | 5/2010 | Sedukhin |
| 7,774,504 B2 | 8/2010 | Chéné |
| 7,801,896 B2 | 9/2010 | Szabo |
| 7,873,668 B2 | 1/2011 | Carlson |
| 7,945,590 B2 | 5/2011 | Davis |
| 2001/0039548 A1 | 11/2001 | Shinkai |
| 2001/0056504 A1 | 12/2001 | Kuznetsov |
| 2002/0026478 A1 | 2/2002 | Rodgers |
| 2002/0059402 A1 | 5/2002 | Belanger |
| 2002/0065848 A1 | 5/2002 | Walker |
| 2002/0078094 A1 | 6/2002 | Krishnaprasad |
| 2002/0091533 A1 | 7/2002 | Ims |
| 2002/0099719 A1 | 7/2002 | Schwitters |
| 2002/0120685 A1 | 8/2002 | Srivastava |
| 2002/0124082 A1 | 9/2002 | San Andres |
| 2002/0133484 A1 | 9/2002 | Chau |
| 2002/0156929 A1 | 10/2002 | Hekmatpour |
| 2003/0028561 A1 | 2/2003 | Gounares |
| 2003/0037181 A1 | 2/2003 | Freed |
| 2003/0041076 A1 | 2/2003 | Lucovsky |
| 2003/0069881 A1 | 4/2003 | Huttunen |
| 2003/0084019 A1 | 5/2003 | Woodmansee |
| 2003/0120978 A1 | 6/2003 | Fabbrizio |
| 2003/0131144 A1 | 7/2003 | Weaver |
| 2003/0167301 A1 | 9/2003 | Zhu |
| 2003/0184583 A1 | 10/2003 | Lim |
| 2003/0197733 A1 | 10/2003 | Beauchamp |
| 2003/0200506 A1 | 10/2003 | Abe |
| 2003/0200533 A1 | 10/2003 | Roberts |
| 2003/0217191 A1 | 11/2003 | Gao |
| 2003/0217332 A1 | 11/2003 | Smith |
| 2003/0225829 A1 | 12/2003 | Pena |
| 2003/0229690 A1 | 12/2003 | Kitani |
| 2003/0233537 A1 | 12/2003 | Wohlgemuth |
| 2004/0015858 A1 | 1/2004 | Seto |
| 2004/0046789 A1 | 3/2004 | Inanoria |
| 2004/0068728 A1 | 4/2004 | Blevins |
| 2004/0083273 A1 | 4/2004 | Madison |
| 2004/0090458 A1 | 5/2004 | Yu |
| 2004/0111396 A1 | 6/2004 | Musayev |
| 2004/0143823 A1 | 7/2004 | Wei |
| 2004/0153451 A1* | 8/2004 | Phillips et al. .................. 707/8 |
| 2004/0153536 A1 | 8/2004 | Strassner |
| 2004/0176968 A1 | 9/2004 | Syed |
| 2004/0177108 A1 | 9/2004 | Connelly |
| 2004/0187140 A1 | 9/2004 | Aigner |
| 2004/0205470 A1 | 10/2004 | Jones |
| 2004/0230911 A1 | 11/2004 | Bent |
| 2004/0255046 A1 | 12/2004 | Ringseth |
| 2004/0267700 A1 | 12/2004 | Dumais |
| 2004/0267961 A1 | 12/2004 | Dietz |
| 2005/0038796 A1 | 2/2005 | Carlson |
| 2005/0044423 A1* | 2/2005 | Mellmer et al. .............. 713/201 |
| 2005/0086297 A1 | 4/2005 | Hinks |
| 2005/0091289 A1 | 4/2005 | Shappell |
| 2005/0091340 A1 | 4/2005 | Facemire |
| 2005/0091386 A1 | 4/2005 | Kuno |
| 2005/0114487 A1 | 5/2005 | Peng |
| 2005/0132041 A1 | 6/2005 | Kundu |
| 2005/0138048 A1 | 6/2005 | Jin |
| 2005/0188051 A1 | 8/2005 | Sneh |
| 2005/0188350 A1 | 8/2005 | Bent |
| 2005/0222996 A1 | 10/2005 | Yalamanchi |
| 2005/0223006 A1* | 10/2005 | Hammeu et al. .................. 707/9 |
| 2005/0246283 A1 | 11/2005 | Gwiazda |
| 2005/0256834 A1 | 11/2005 | Millington |
| 2005/0262185 A1 | 11/2005 | Beartusk |
| 2005/0273772 A1 | 12/2005 | Matsakis |
| 2005/0289457 A1 | 12/2005 | Obasanjo |
| 2006/0004927 A1 | 1/2006 | Rehman |
| 2006/0031264 A1 | 2/2006 | Bosworth |
| 2006/0031407 A1 | 2/2006 | Dispensa |
| 2006/0053195 A1 | 3/2006 | Schneider |
| 2006/0100989 A1 | 5/2006 | Chinchwadkar |
| 2006/0112399 A1 | 5/2006 | Lessly |
| 2006/0123005 A1* | 6/2006 | Burnett et al. .................. 707/9 |
| 2006/0136509 A1 | 6/2006 | Pannala |
| 2006/0143182 A1 | 6/2006 | Meadows |
| 2006/0143239 A1 | 6/2006 | Battat |
| 2006/0173804 A1 | 8/2006 | Desai |
| 2006/0173932 A1* | 8/2006 | Cortright et al. .............. 707/204 |
| 2006/0184617 A1 | 8/2006 | Nicholas |
| 2006/0195476 A1 | 8/2006 | Nori |
| 2006/0212842 A1 | 9/2006 | Gossman |
| 2006/0225032 A1 | 10/2006 | Klerk |
| 2006/0253443 A1* | 11/2006 | Li et al. .................. 707/9 |
| 2006/0259592 A1 | 11/2006 | Angeline |
| 2006/0265719 A1 | 11/2006 | Astl |
| 2006/0277313 A1 | 12/2006 | Richer |
| 2006/0288011 A1 | 12/2006 | Gandhi |
| 2006/0294048 A1 | 12/2006 | Shukla |
| 2006/0294194 A1* | 12/2006 | Graveline et al. .............. 709/217 |
| 2007/0006065 A1 | 1/2007 | Jewsbury |
| 2007/0050338 A1 | 3/2007 | Strohm |
| 2007/0050469 A1 | 3/2007 | Gupta |
| 2007/0050705 A1 | 3/2007 | Liu |
| 2007/0061740 A1 | 3/2007 | Marini |
| 2007/0067474 A1 | 3/2007 | Angelov |
| 2007/0078938 A1* | 4/2007 | Hu et al. .................. 709/206 |
| 2007/0078943 A1 | 4/2007 | Daniels |
| 2007/0088832 A1 | 4/2007 | Tsang |
| 2007/0094312 A1* | 4/2007 | Sim-Tang .................. 707/204 |
| 2007/0100830 A1* | 5/2007 | Beedubail et al. .................. 707/9 |
| 2007/0244987 A1 | 10/2007 | Pedersen |
| 2007/0266111 A1 | 11/2007 | Schubert |
| 2007/0276804 A1 | 11/2007 | Khan |
| 2007/0282858 A1 | 12/2007 | Arner |
| 2008/0027940 A1* | 1/2008 | Canning et al. .................. 707/9 |
| 2008/0034045 A1 | 2/2008 | Bardsley |
| 2008/0091655 A1 | 4/2008 | Gokhale |
| 2008/0104095 A1 | 5/2008 | Heifets |
| 2008/0104195 A1 | 5/2008 | Hawkins |

| | | |
|---|---|---|
| 2008/0140705 A1 | 6/2008 | Luo |
| 2008/0168066 A1 | 7/2008 | Ruiz-Velasco |
| 2008/0195622 A1 | 8/2008 | Lelcuk |
| 2008/0244307 A1 | 10/2008 | Dasari |
| 2008/0263141 A1 | 10/2008 | DeMesa |
| 2008/0301685 A1 | 12/2008 | Thomas |
| 2009/0217153 A1 | 8/2009 | Oshima |

FOREIGN PATENT DOCUMENTS

| | | |
|---|---|---|
| KR | 20010064246 A | 7/2001 |

OTHER PUBLICATIONS

Bäcker et al., "DocMan: A Document Management System for Cooperation Support", Jan. 1996, IEEE Computer Society Press, pp. 1-10.*

Anciaux et al., "A Tamper-Resistant and Portable Healthcare Folder", Oct. 2007, International Journal of Telemedicine and Applications, vol. 2008, pp. 1-9.*

Lee et al., "Favorite Folders: A Configurable, Scalable File Browser", Apr. 2003, Tech Report HCIL, pp. 1-10.*

Lei et al.,"DataX: an Approach to Ubiquitous Database Access", Feb. 1999, Mobile Computing Systems and Applications, 1999., pp. 70-79.*

Evagoras Charalambous, "Generating an XML file of your website's folders/files", May 2002, XEFTERI.COM, pp. 1-6.*

Darryl Taft, "Forecast: Xcerion Clouds the OS Horizon, Fuzzes Google, Microsoft Out of Picture", Mar. 2007, eWEEK.com, pp. 1-2.*

Jeremy Reimer, "Dreaming in the "Cloud" with the XIOS web operating system", Apr. 2007, arstechnica.com, pp. 1-2.*

Cryptree: A Folder Tree Structure for Cryptographic File Systems, Grolimund et al, 25th IEEE Symposium on Reliable Distributed Systems (SRDS '06), pp. 189-198, 2006.*

Garrett, J.J., "Ajax: A New Approach to Web Applications," adaptivepath.com, Feb. 18, 2005, pp. 1-5.

Prosise, J., "Wicked Code: The SQL Site Map Provider You've Been Waiting for," MSDN Magazine [online], Feb. 2006, pp. 1-8.

Walsh, B., "AJAX and the Spring Framework With TIBCO General Interface—Step by Step," TheServerSide.conn, Jul. 2006, <http://www.theserverside.com/tt/articles/article.tss?1=Ajax and Spring [retrieved Jun. 11, 2009], 12 pages.

"Web Desktop," Wikipedia, The Free Encyclopedia, Mar. 4, 2010, <http://en.wikipedia.org/wiki/Web_desktop>, pp. 1-5.

Deutsch, A., and V. Tannen, "Reformulation of XML Queries and Constraints," 9th International Conference on Database Theory (ICDT), Siena, Italy, Jan. 8-10, 2003, pp. 225-241.

Deutsch, A., and V. Tannen, "XML Queries and Constraints, Containment and Reformulation," Theoretical Computer Science 366(1):57-87, May 25, 2005.

Notice of Allowance dated Aug. 15, 2011, from U.S. Appl. No. 12/240,786, filed Sep. 29, 2008.

Extended European Search Report mailed Nov. 10, 2011, issued in European Application No. EP 08 84 1903, filed Oct. 22, 2008, 6 pages.

Bourges-Waldegg, D., et al., "The Fluid Computing Middleware: Bringing Application Fluidity to the Mobile Internet," IEEE/IPSJ International Symposium on Applications and the Internet (SAINT 2005), Trento, Italy, Jan. 31-Feb. 4, 2005, pp. 54-63.

Leita, C., "Creating Collaborative Applications Using the Fluid Computing Middleware," IBM Zurich Research Laboratory, Jun. 27, 2005, 42 pages.

Lli, Q., et al., "XVM: A Bridge Between XML Data and Its Behavior," 13th International Conference on World Wide Web (WWW 2004), New York, May 17-22, 2004, 10 pages.

* cited by examiner

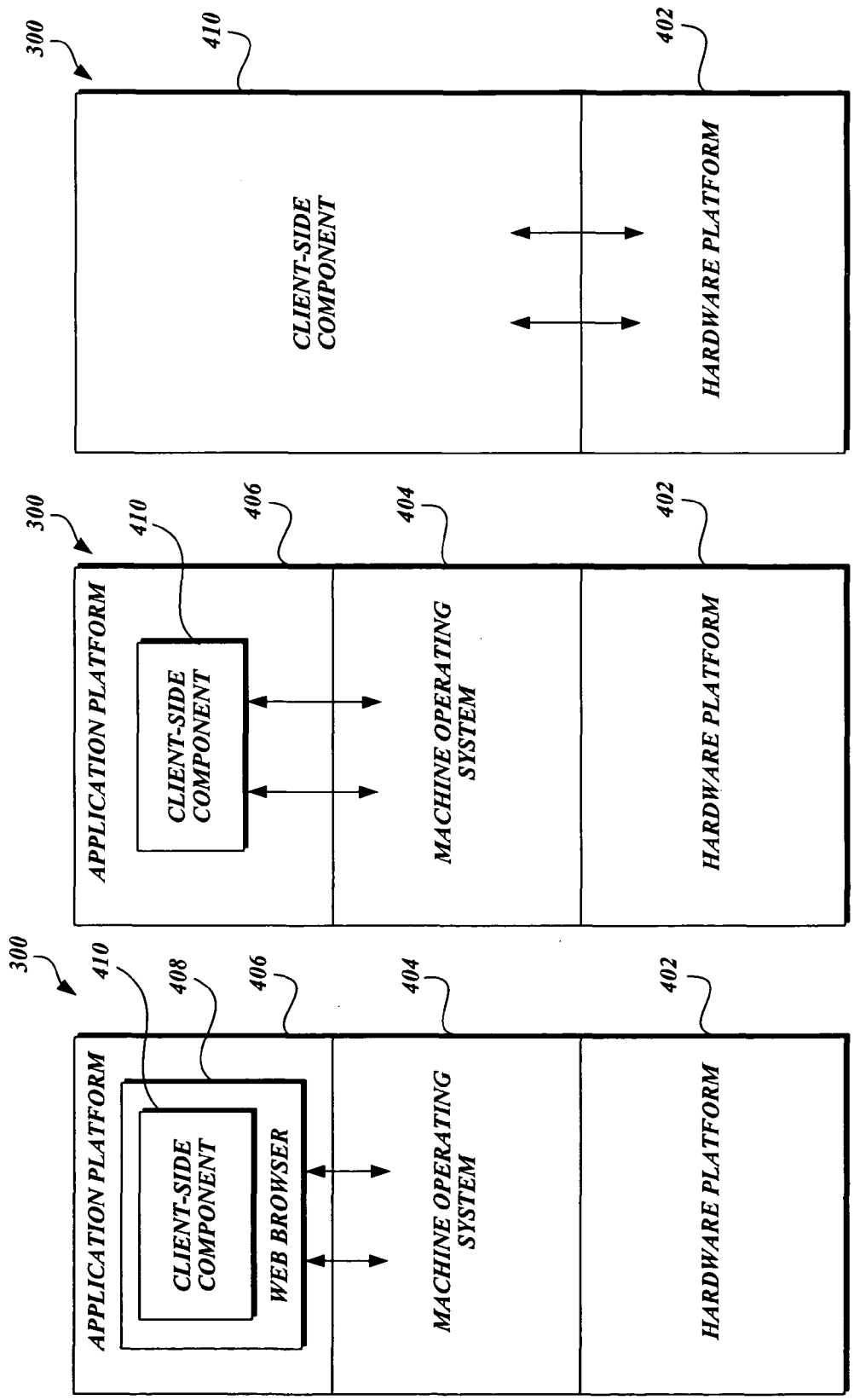

MyTasks.xml

```xml
<process name="MyTasks Application" description="" author=
"Application Designer" created="" revised="">
    <trigger view="MyTasks" component="button1" event="Select"
        step="2"/>

<step nr="1" name="Initialize Application">
        <operation name="open" value="apps/mytasks_gui.xml">
        </operation>
        <operation name="action" value="#MyTasks">
            <component name="button2" action="hide" value="">
            </component>
        </operation>
        </operation name="bind" value="data/tasks.xml">
            <component view="MyTasks" name="input3" select=
                "/tasks/task/@description"/></component>
        </operation>
    </step>

<step nr="2" name="Press Button">
        <operation name="decision" value="MyTasks#input4">
            <when test="text() = ''" step="3"/>
            <otherwise step="4"/>
        </operation>
    </step>

<step nr="3" name="Add Task">
        <operation name="change" value="data/tasks.xml">
            <store type="replaceText" select="{#MyTasks#input4}"
                value="/tasks/task/@description"></store>
        </operation>
    </step>

<step nr="4" name="Show Button">
        <operation name="action" value="#MyTasks">
            <component name="button2" action="show" value="">
            </component>
        </operation>
```

*Fig.6A*

MyTasks_gui.xml

```xml
<view name="MyTasks" title="" author="Application Designer"
created="" revised="" height="500" width="600" opacity="100"
icon="icons/applications/16x16/document_new.png" mode="" look=""
position="">
   <toolbar name="toolBar3" position="top" dragable="true" tree-
   expanded="true">
      <buttonbox name="buttonBox1" text="Button" icon="icons/
        objects/24x24/brush1.png">
      </buttonbox>
   <toolbar>
<panel type="flow" look="back" padding="5" height="100%"
width="100%" tree-expanded="true">
   <tabstrip name="tabstrip4" width="100%" height="100%" tree-
   expanded="true">
      <panel name="tab1" type="flow" selected="true" title="Tab 1"
        padding="5" height="100%" width="100%" icon="icons/objects/
        16x16/brush1.png" tree-expanded="true">
      <button name="button1" text="ADD TASK" width="100"
         default="true">
      </button>
      <button name="button2" text="ENTER VALID TASK" width="100">
      </button>
      <input name="input4" width="140" height="20">
      </input>
      <input name="input3" width="240" height="80">
      </input>
   </panel>
   <panel name="tab2" type="flow" title="Tab 2" padding="5"
     height="100%" width="100%" icon="icons/objects/16x16/
     brush1.png">
   </panel>
   <panel name="tab3" type="flow" title="Tab 3" padding="5"
     height="100%" width="100%" icon="icons/objects/16x16/
     brush1.png">
   </panel>
  </tabstrip>
</panel>
```

*Fig. 6B*

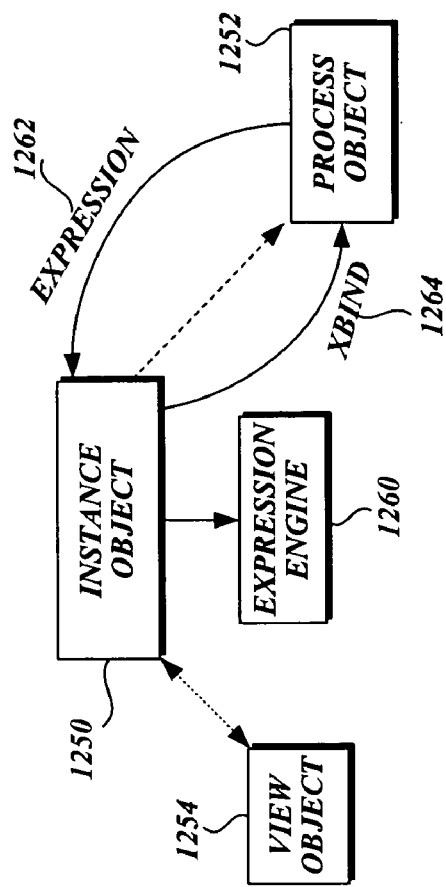
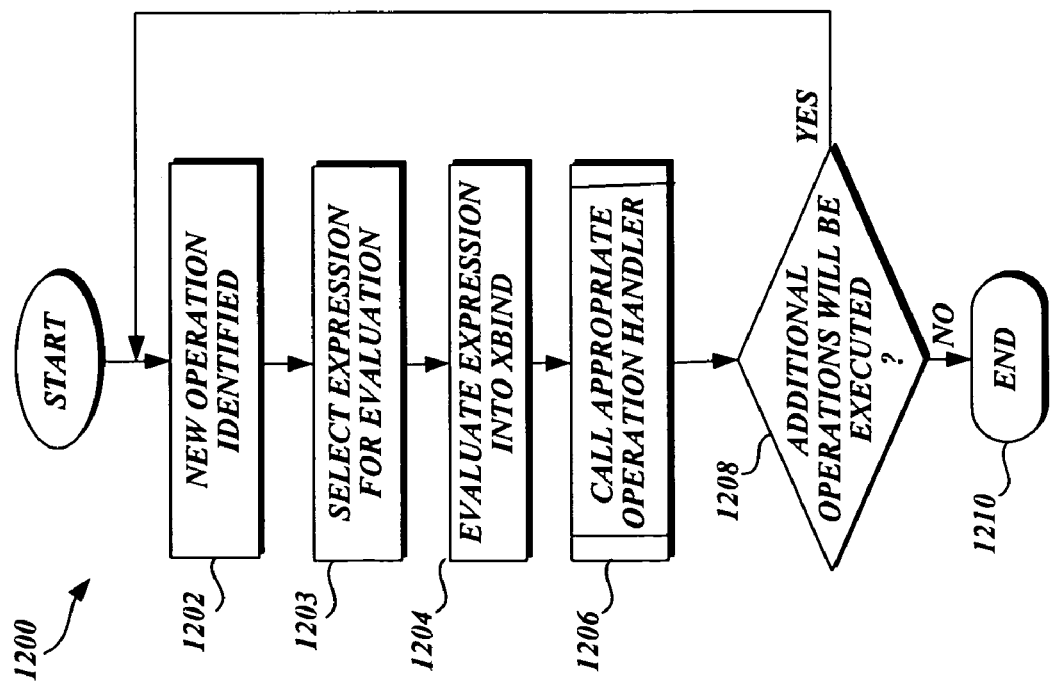
*Fig.12B.*
*Fig.12A.*

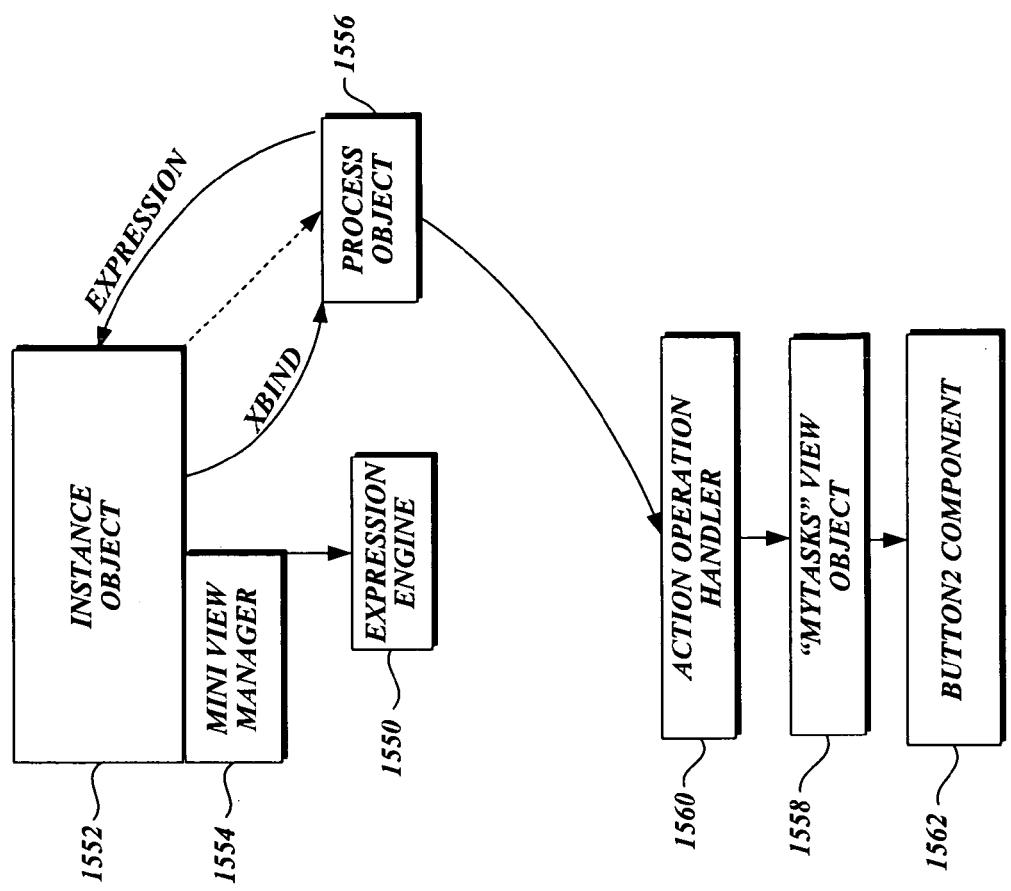

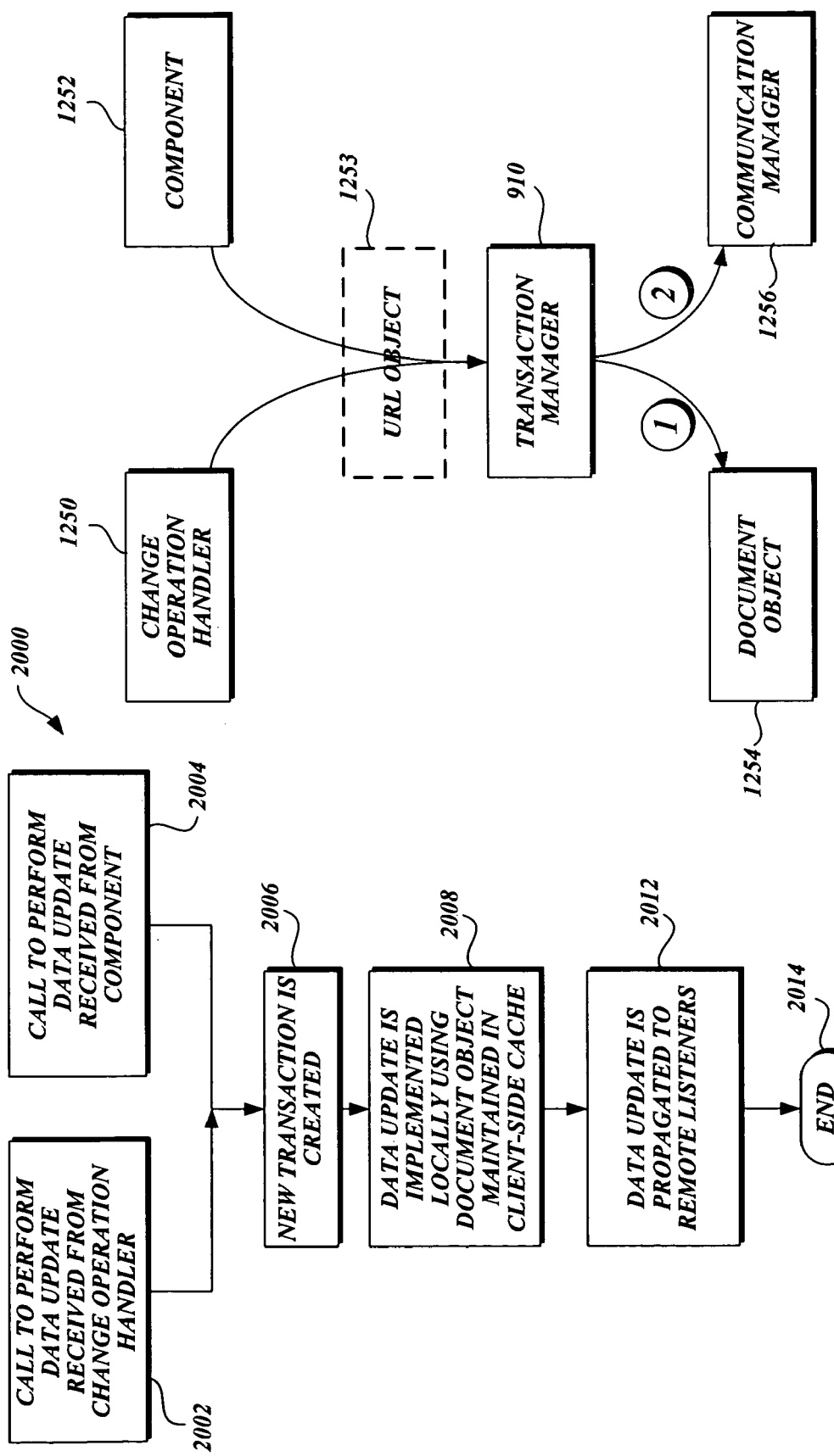

2842     2840

```
1  <?xml version="1.0" encoding="UTF-8"?>
2  <!DOCTYPE folder PUBLIC
3          "-//iCloud//DTD Folder 1.0//EN"
4          "http://www.icloud.com/DTDs/FolderList-1.0.dtd">
5
6  <folder name="RESEARCH" id="573" type="files">
7          <folder name="PERSONAL" id="308" type="files"/>
8          <folder name="WORK" id="1732" type="files">
9                  <folder name="BROWSERS" id="9823" type="system" />
10                 <folder name="VIDEO ENCODING" id="238" type="files" />
11         </folder>
12         <folder name="LETTERS" id="12412" type="documents" />
13         <folder
14                 name="EMAIL"
15                 xmlns:xlink="http://www.w3.org/1999/xlink"
16                 xlink:type="simple"
17                 xlink:href="http://os.icloud.com/folder?id=213948"
18                 xlink:title="EMAIL" />
19 </folder>
20
```

*Fig.28E.*

Class of 1992 Reunion

Schedule of Events

① 6/21/2008 – Dinner at Morton's 9:00pm

② 6/22/2008 – Volleyball Game at High School 1:00pm

③ 6/22/2008 – Formal Social at Reunion Hall

Map to Reunion Events

ZOOM IN +
ZOOM OUT –

Countdown to Reunion

| DAYS | HOURS | MINUTES | SECONDS |
|------|-------|---------|---------|
| 003 | 17 | 12 | 43.0 |

Chat

Who's Online
- Melissa Stewart
- James Oglie
- Brian Mathes

*What's up Ducks?*  Send

Photo Album

Friends  Search

Browse  Add

*Fig. 43.*

NETWORK FILE SYSTEM

CROSS-REFERENCES TO RELATED APPLICATIONS

This application claims the benefit of the following: Provisional Application No. 60/976,216, filed Sep. 28, 2007; Provisional Application No. 60/976,222, filed Sep. 28, 2007; Provisional Application No. 60/976,246, filed Sep. 28, 2007; Provisional Application No. 60/976,249, filed Sep. 28, 2007; Provisional Application No. 60/976,252, filed Sep. 28, 2007; Provisional Application No. 60/976,258, filed Sep. 28, 2007; Provisional Application No. 60/976,266, filed Sep. 28, 2007; Provisional Application No. 60/976,269, filed Sep. 28, 2007; Provisional Application No. 60/976,275, filed Sep. 28, 2007; Provisional Application No. 60/976,281, filed Sep. 28, 2007; Provisional Application No. 60/976,283, filed Sep. 28, 2007; Provisional Application No. 60/976,292, filed Sep. 28, 2007; Provisional Application No. 60/976,301, filed Sep. 28, 2007; Provisional Application No. 60/976,304, filed Sep. 28, 2007; Provisional Application No. 60/976,308, filed Sep. 28, 2007; Provisional Application No. 60/976,311, filed Sep. 28, 2007; Provisional Application No. 60/976,312, filed Sep. 28, 2007; Provisional Application No. 60/976,320, filed Sep. 28, 2007; Provisional Application No. 60/976,325, filed Sep. 28, 2007; Provisional Application No. 60/976,327, filed Sep. 28, 2007; and Provisional Application No. 60/976,339, filed Sep. 28, 2007, all of which are incorporated herein by reference.

BACKGROUND

Computer networks configured to exchange data according to common protocols, such as the Internet Protocol ("IP"), are increasingly used to perform a variety of tasks between remote systems and users. The connectivity available from computer networks has led organizations and others to seek solutions that facilitate participation in collaborative processes. In this regard, many existing Web sites, network portals, and distributed applications allow users to share data and collaborate in various ways. To further support collaboration, resources are increasingly being made available as a service of the network. Generally described, a service refers to software and hardware that are made accessible from the network separate from any underlying technologies. Accordingly, a network service is frequently described as being "loosely coupled" to the operating system, programming languages, and hardware components on which the service is implemented. As a result, network services may be combined to create distributed applications even though different underlying technologies are utilized.

The term "cloud" computing is frequently used to describe the trend toward an increasing number of services being made available from the network. As network bandwidth and connectivity increases, the applications and economic incentives of cloud computing will only continue to expand. However, existing systems utilize machine-centric operating systems to manage communications over the network and facilitate collaboration. In this regard, the core design of machine-centric operating systems was established prior to the development of computer networks, such as the Internet. As a result, existing systems are unable to provide a generalized collaboration environment where network communications are readily integrated into applications and other aspects of the user experience. Instead, developing applications that facilitate sharing and participation in collaborative processes remains arduous and ultimately too difficult or expensive for most users and/or organizations. Therefore, a need exists for a network operating system that provides more effective ways of leveraging the connectivity of computer networks.

SUMMARY

Generally described, the present invention is directed to a network operating system that provides more effective ways of leveraging the connectivity of computer networks. In one embodiment, an XML virtual machine is implemented that accepts high-level application code written in an XML programming language as input. Functionality is provided to interpret or translate the application code written in an XML programming language into code that is suitable for execution across computer platforms. Moreover, the XML virtual machine supports the Model View Controller (MVC) design paradigm that facilitates true data abstraction from applications to a common data model. Multi-instance applications, with each instance potentially supporting multiple views, may be created and executed.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 4A-C are block diagrams of exemplary platform environments in which the present invention may be implemented;

FIGS. 6A-B depict exemplary process and UI XML documents associated with an application suitable to illustrate aspects of the present invention;

FIGS. 12A-B depict an exemplary flow diagram that illustrates an execute method configured to cause operations in a process step to be executed;

FIGS. 15A-B illustrate an action handling routine that implements functionality in accordance with one embodiment of the present invention;

FIGS. 20A-C are diagrams depicting a data update routine that implements logic for modifying the contents of the data model in accordance with one embodiment of the present invention;

FIG. 28E illustrates an excerpt of an exemplary file that is suitable for illustrating aspects of the present invention;

FIG. 43 depicts the user interface of an exemplary application suitable for illustrating additional aspects of the present invention.

DETAILED DESCRIPTION

Generally described, aspects of the present invention are directed to a network operating system that facilitates the development of Internet-scale cloud computing. In an actual embodiment, the network operating system described herein utilizes the XML (eXtensible Markup Language) as a general-purpose language to represent data. Accordingly, the examples provided below may describe functionality of the network operating system with reference to XML structured data and documents. In this regard, many benefits and synergies are achieved by using XML in this context. However, those skilled in the art and others will recognize that the invention may be implemented using other underlying technologies, or combinations of technologies, than described herein without departing from the scope of the claimed subject matter. Moreover, the illustrative examples and descriptions provided below are not intended to be exhaustive or to limit the invention to the precise forms disclosed. Similarly, any steps described below may be interchangeable with other steps or combinations of steps in order to achieve the same result.

Figure 1:
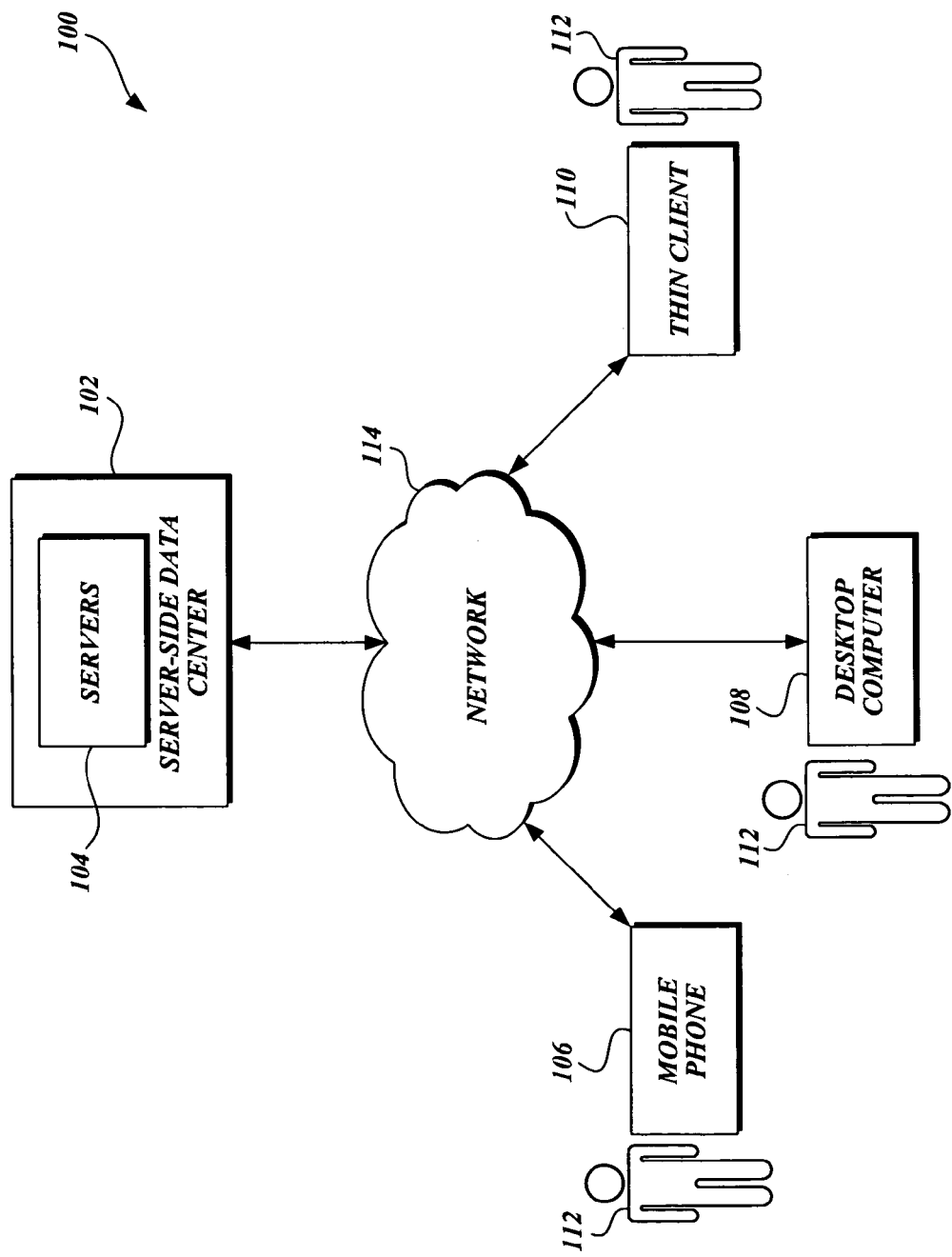
FIG. 1 is an exemplary pictorial depiction of a networking environment that includes a server-side data center and a plurality of client computers suitable for illustrating aspects of the present invention.

Referring to FIG. 1, the following is intended to provide an overview of a networking environment 100 that may be used to implement aspects of the present invention. As illustrated in FIG. 1, the networking environment 100 includes the server-side data center 102 that is associated with the servers 104. The networking environment 100 also includes a plurality of client computing devices associated with the user 112 including the mobile phone 106, the desktop computer 108, and the thin client 110. In this regard, the server-side data center 102 is configured to communicate with the mobile phone 106, the desktop computer 108, and the thin client 110 via the network 114, which may be implemented as a local area network ("LAN"), wireless network, wide area network ("WAN"), such as the Internet, and the like. As known to those skilled in the art and others, the computing devices illustrated in FIG. 1 may be configured to exchange files, commands, and other types of data over the network 114. However, since protocols for network communication, such as TCP/IP, are well known to those skilled in the art, those protocols will not be described here.

In existing systems, application programs that are available on one type of computing device may be incompatible with other types of devices. This incompatibility creates a variety of problems. For example, on a general-purpose desktop computer a user may employ a particular application to access e-mail messages. On the other hand, in order to access e-mail on a limited resource device, such as a mobile phone, another program with different features and interfaces may be required. This incompatibility is not conducive to providing a common user experience and minimizing the amount of knowledge and skill required by users. Moreover, excessive development time is spent creating applications for different types of devices even though many applications implement similar or identical functionality.

Aspects of the invention may be applied in a number of different contexts of which the following is only an example. In one embodiment, a user's applications and data are accessible from any type of computing device that is enabled for the network operating system. As illustrated in FIG. 1, the user 112 may connect to the network 114 from the mobile phone 106, desktop computer 108, or thin client 110. In response, the server-side data center 102 delivers network operating system services to the appropriate device. More specifically, a client-side component of the network operating system and user applications may be delivered and built each time the user connects to the network. Applications execute locally at the appropriate client computing device and not on the servers 104. User data may be cached on a client computing device, but will persist to storage maintained by the server-side data center 102. Accordingly, communications between the client computing devices 106-110 and the server-side data center 102 are principally performed to obtain documents and update data. In instances when a client goes off-line, the client-side component of the network operating system causes data updates to be cached locally. These updates may be transmitted to the server-side data center 102 and synchronized with any other changes when a network connection is re-established.

In one embodiment, the network operating system may provide a common experience across each of a user's computing devices. In this regard, a common desktop application is delivered and built on disparate types of computing devices. From the common desktop, all of a user's application programs and data may be accessed. For example, a single e-mail program enabled for the network operating system may be accessed by the user 112 from any of the client computing devices 106-110. Since user data is available from the server-side data center 102 and applications are delivered as a service, the same applications (e.g., email program) and data (e.g., e-mail messages) are available regardless of which computing device is being used.

The services provided by the network operating system to a client computing device may be customized depending on user preferences and other variables. In this regard, configuration data is maintained that defines how or whether certain network operating system services will be provided. For example, a user may establish preferences to have different sets of application programs or data available depending on the computing device being used. By way of another example, a user may connect to the network 114 from any number of access points including an insecure wireless connection. In this instance, security attributes may be established so that certain services and/or data are inaccessible because of the insecure nature of the network connection. As will be appreciated by those skilled in the art and others, the examples provided above represent only some of the ways in which the network operating system services may be customized using the present invention.

For the sake of convenience, FIG. 1 illustrates the server-side data center 102, server computers 104, mobile phone 106, desktop computer 108, and thin client 110, that are usable in the networking environment 100 in which complementary tasks may be performed by remote computing devices linked together through the network 114. However, the invention may be practiced using other types of client computing devices such as, but not limited to laptop computers, tablet computers, personal digital assistants (PDAs), hybrid/embedded devices, set-top boxes, media centers, and the like. Moreover, those skilled in the art and others will recognize that the invention may be implemented in different network configurations and the example depicted in FIG. 1 should be construed as exemplary.

Figure 2:
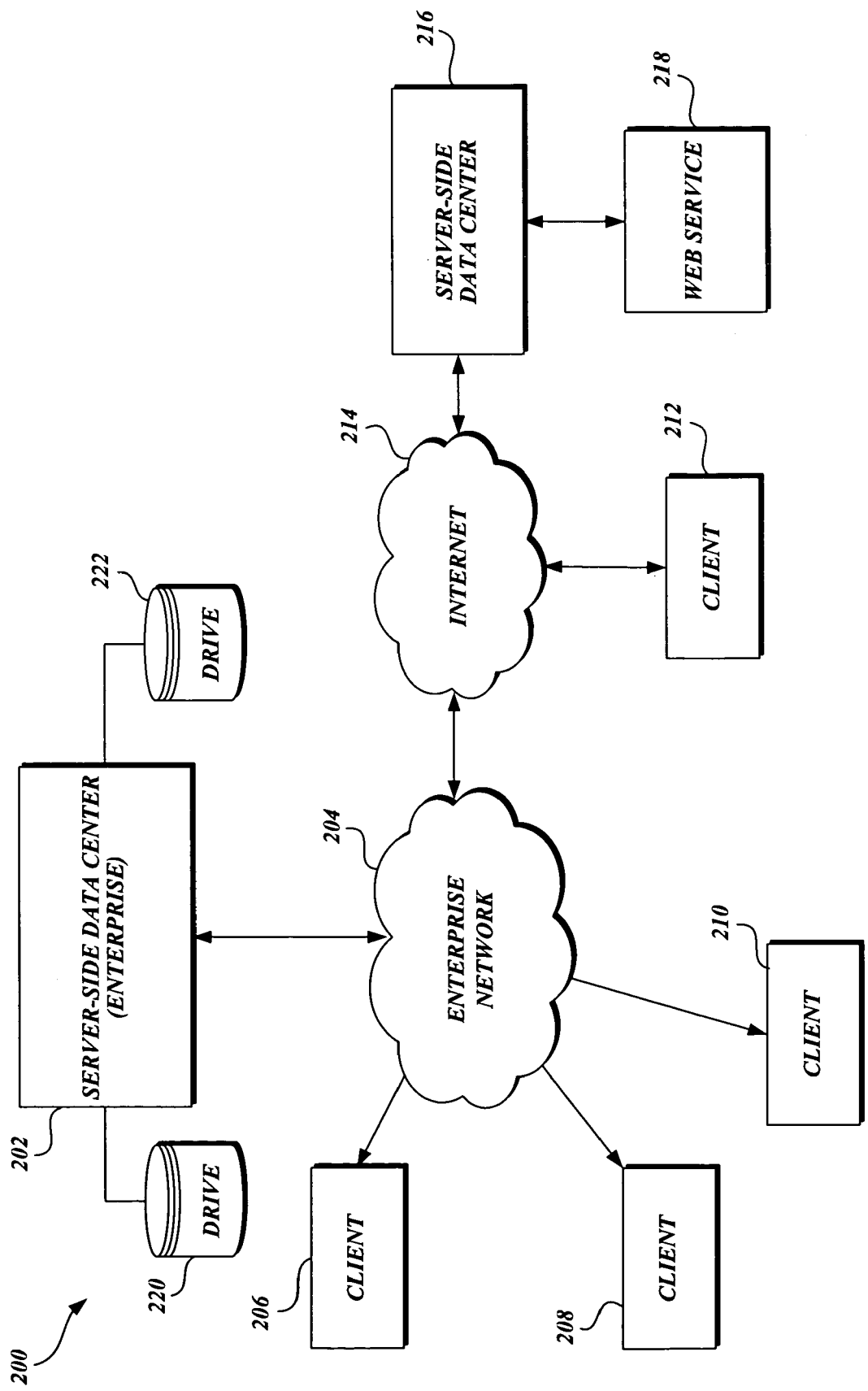
FIG. 2 is an exemplary pictorial depiction of a networking environment that includes a server-side data center and a plurality of client computers suitable for illustrating aspects of the present invention.

Now with reference to FIG. 2, another networking environment 200 that may be used to illustrate additional aspects of invention will be described. As depicted in FIG. 2, the server-side data center 202 may be coupled to a private network such as the enterprise network 204. In this instance, additional network operating system services are provided to the clients 206, 208, and 210 directly over the enterprise network 204. However the network operating system is still provided and managed from the server-side data center 216, the enterprise server-side data center 202 is only providing additional services. Moreover, the same additional services may be provided to clients outside the enterprise network 204. In this example, the server-side data center 202 provides network services to the client 212 over the Internet 214. Similar to the description provided above, the clients 206-212 may be any computing device (mobile phone, desktop computer, thin client, etc.) enabled for the network operating system. In yet another embodiment, the networked operating system may be provided directly by the enterprise server-side data center 202 together with its additional services and may or may not (depending on security configurations) allow access to the external server-side data center 216 outside the enterprise network 204.

The network operating system is configured to facilitate the participation in collaborative processes. One aspect of the present invention is an XML file system that serves as a network repository capable of storing any type of data including XML documents, executables, binaries, multimedia, etc. The XML file system may be implemented at the server-side data center 202 or 216 to manage physical storage and data access. In addition to conventional file system functions, the XML file system allows various types of collaboration spaces to be defined. In an exemplary embodiment, the types of collaboration spaces supported include communities, groups, friends, as well as subsets within existing collaboration spaces (e.g., sub-communities, sub-groups, etc.). A root folder in the XML file system serves as a repository for each community, group, or other collaboration space that is created. Moreover, folders and files may be created in the XML file system that are associated with individual users. In another embodiment, collaboration between different users may be dynamically enabled without users sharing a collaboration space in the XML file system. As described in further detail below, messaging services are provided that allow users to generate and accept requests to establish a collaboration session in real-time. As such, users may establish new relationships through dynamically created collaboration sessions even though an existing collaboration space is not defined.

A login prompt may be used to obtain user credentials when a client-side component of the network operating system begins executing. To facilitate transparent access, each folder associated with the user may be mapped from the XML file system as a virtual drive on the client. For example, if a user is a member of a particular group, the group folder will appear as a virtual drive on the client. In one embodiment, a folder in the XML file system includes XML structured data that defines the shared resources of a collaboration space. These shared resources may include, but are not limited to, applications, data documents, access and security settings, user lists, statistics, calendar, and the like. The XML file system may also in one embodiment act as a repository and database substitute for one or more applications executing on the networked operating system environment. As described in further detail below, data maintained in the collaborative and distributed database may be automatically synchronized through transaction management provided by the present invention. By building applications utilizing this type of collaborative and distributed database, applications inherit the characteristics of the database and may readily share data.

Since the XML file system follows an application programming interface (API), other embodiments of the server-side data center 202 are possible. In the regard, other XML web services may be provided from the XML file system are desirable in cases where abstractions on top of legacy applications and databases within the enterprise is needed to be able to provide a new application or integrate multiple applications executing on the networked operating system environment. The customized implementations of the XML file system may choose the level of functionality to support. For example, the support for synchronizing transactions may be omitted in one level of support.

In addition to managing data access, the XML file system provides an integrated framework for creating and customizing associations between users in a way that facilitates collaboration by synchronizing data and coordinating transactional control of data updates. For example, an application along with any associated user data may be shared by a group of users (e.g., friends). Both the functionality of the shared application and associated user data may be represented in XML documents maintained in the group or user folder, along with other resources. The XML file system provides a way for each user to access the shared application and associated user data. In this way, the shared application may be delivered and built on multiple clients with each group member manipulating data from the same group or user folder.

As mentioned previously, clients outside the enterprise network 204 (i.e., client 212) may obtain services from the server-side data center 202. By way of example, an employee or other user may be provided with access to enterprise resources when outside the enterprise network 204. Accordingly, the client 212 may be a home computer, mobile phone, etc. that accesses the server-side data center 202 over the Internet 214. In this regard, those skilled in the art and others recognize that the networking environment 200 may include additional networks than those illustrated in FIG. 2 and the exemplary configuration in FIG. 2 may be reconfigured in many ways to deliver both the network operating system and additional XML file systems in other ways. For example, the network access point for the client 212 may originate from a local area network, wireless network, wide area network, etc. which may also be true for the server-side data centers 202 and 216.

In another embodiment, clients may obtain different types of services from the enterprise server-side data center 202 depending on one or more variables. Instead of providing the same network services to each client, network services may be configured depending on the location of the client's network access point. For example, clients 206-210 that connect directly to the enterprise network 204 may be provided with additional customized services specific to the enterprise. Outside the enterprise network 204, external services may be delivered to the client 212 (such as a customer, supplier, employee, or other user related to the enterprise) from the server-side data center 202. To facilitate the secure delivery of customized network services, resources may be allocated by the server-side data center 202 for managing different types of clients. In the embodiment depicted in FIG. 2, the server-side data center 202 includes the hard drive 220 that is allocated to provide customized services to the clients 206-210 inside the network. On the other hand, the hard drive 222 may be allocated to provide the more generalized services to clients outside the enterprise network, such as client 212. In still other embodiments, the services that are provided to a client may depend on other variables such as the user credentials, settings information, type of client, and the like.

In one aspect, the network operating system provides a more generalized framework for facilitating real-time "business-to-business" collaboration. A collaboration space may be created that allows different enterprises to access resources from a common data store. In the example depicted in FIG. 2, the client 212 may be associated with a partner enterprise to the enterprise that maintains the server-side data center 202. In this regard, the clients illustrated in FIG. 2 may be operated by users or software agents that interact with the server-side data center 202. When operated by software agents, aspects of the invention are effectively creating an EDI (Electronic Data Interchange) relationship in which users associated with the enterprise or individually automatically share resources utilizing the XML file system. EDI services may also be provided by the publicly available server-data center 216, depending on security requirements. A group folder may be created in the XML file system that stores the shared resources of the partnership and/or defines the business rules of the EDI. Similar to the description provided above, the group folder may be mapped as a virtual drive on the client 212, thereby providing transparent access to shared resources outside the enterprise network 204. Significantly, the shared application may be delivered as XML structured data from the server-side data center 202 to the clients 206-212. Each of the clients 206-212 builds and executes the application locally, reporting data updates back to the shared folder or each users private folders in the XML file system. In one embodiment, the server-side data center 202 is configured to manage data update coordination so that multiple clients may access and update the same documents simultaneously. This coordination may also be performed by the server-side data center 216 if the data is stored in its XML file system.

In one aspect, the network operating system allows the clients 206-212 transparent access to external network services. Using an Application Programming Interface (API), a communicator may be created that abstracts the data handling functions for interacting with any (internal or external) network service. By way of example, developers can create communicators that access network servers hosting XML Web services, REST services, XML resources, RSS or Atom feeds, text, csv text, HTML (Hypertext Markup Language) based Web sites, among others. Referring to FIG. 2, an instance of a communicator or "channel" may be instantiated by the client 212 in order to interact with the Web service 218.

In this example, network operating system services are accessible on a public network (i.e., the Internet 214) to the client 212 using the server-side data center 216 as a proxy. Moreover, the Web service 218 is accessible to the clients 206-210 using a communicator even though network operating services are being provided from a private network (e.g., the enterprise network 204). In this instance, the server-side data center 216 serves as the proxy that manages communications between the clients 206-210 and the Web service 218. Accordingly, clients may use communicators to abstract data handling functions when accessing network services. This aspect of the invention simplifies application development since developers are not required to repetitively write code for managing communications between a client and network service.

While FIG. 2 illustrates an enterprise network 204, those skilled in the art and others will recognize that this is merely exemplary. Instead, the present invention may facilitate data synchronization and collaboration in other types of network environments. Accordingly, the description provided with reference to FIG. 2 is equally applicable to local area networks maintained by homes and small business as well as wide area networks such as the Internet. Moreover, the examples provided above are made with reference to a server-side data center 202 that provides distinct network services to each client 206-212. However, the server-side data center 202 may be configured to provide network services that complement the resources or services of another device or network. For example, a small business may maintain a network drive for all clients connected to a local area network. The server-side data center 202 may provide data storage services to complement the public network drive at the server-side data center 216 by providing additional storage or allowing backup in the event that a public network device experiences a failure. By way of another example, a home network may utilize a media center computer to provide each local client access to digital media. To complement the storage of the media center computer, a virtual drive may be provided by the server-side data center 202 to all devices connected to the home network. In this regard the virtual drive may be configured to allocate the actual storage of data between the media center computer and the server-side data center 202 based on user preferences or other configuration variables.

Figure 3:
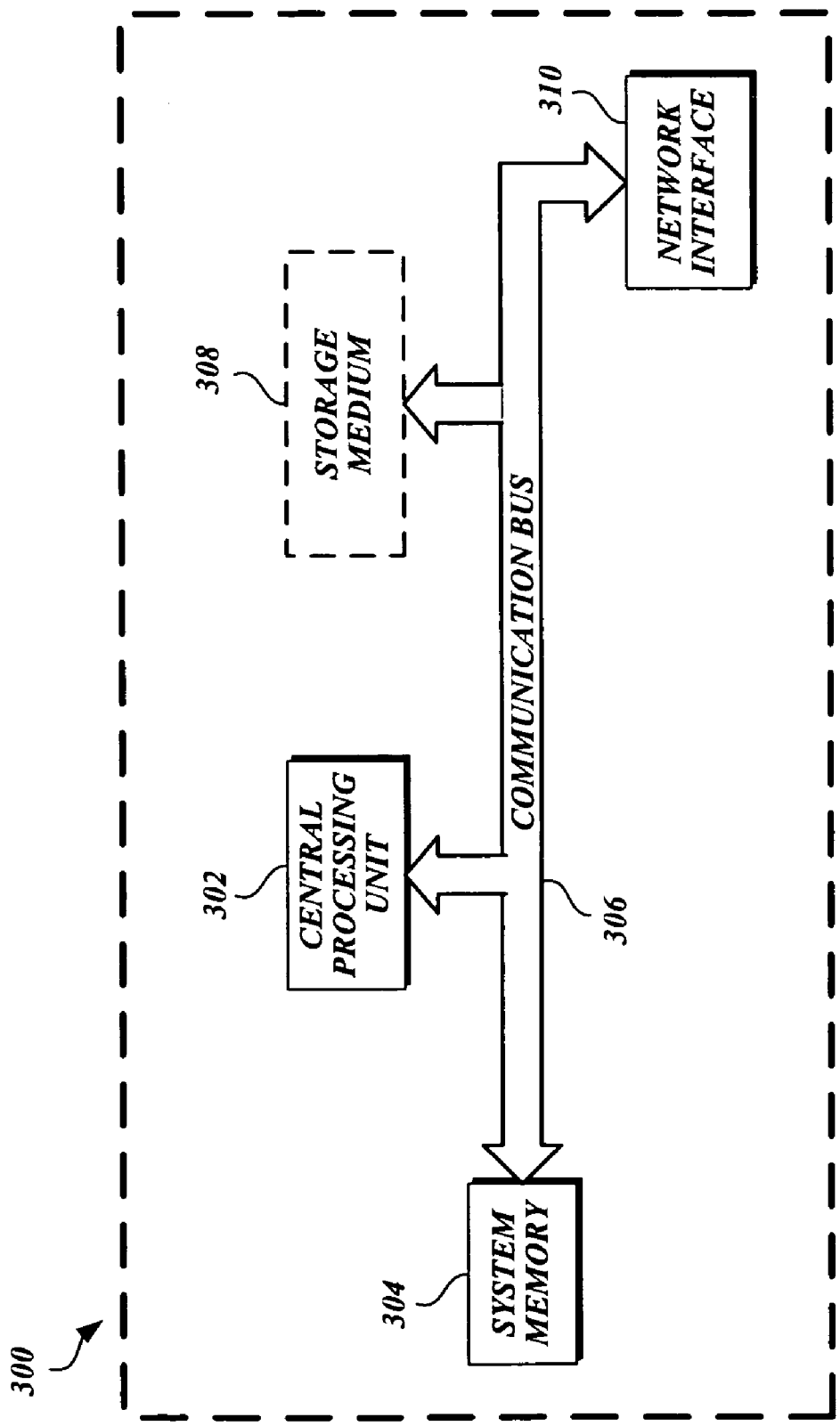
FIG. 3 is a block diagram depicting an exemplary hardware architecture of a computing device suitable for implementing aspects of the present invention.

Now with reference to FIG. 3, an exemplary hardware architecture of a computing device 300 will be described. While FIG. 3 is described with reference to a computing device that is implemented as a client on the network, the description below is applicable to servers and other devices that may be used to implement the present invention. Moreover, those skilled in the art and others will recognize that the computing device 300 may be any one of any number of currently available or yet to be developed devices. In its most basic configuration, the computing device 300 includes at least one central processing unit ("CPU") 302 and a system memory 304 connected by a communication bus 306. Depending on the exact configuration and type of device, the system memory 304 may be volatile or nonvolatile memory, such as read only memory ("ROM"), random access memory ("RAM"), EEPROM, flash memory, or similar memory technology. Those skilled in the art and others will recognize that system memory 304 typically stores data and/or program modules that are immediately accessible to and/or currently being operated on by the CPU 302. In this regard, the CPU 302 serves as the computational center of the computing device 300 by supporting the execution of instructions.

As further illustrated in FIG. 3, the computing device 300 includes a network interface 310 comprising one or more components for communicating with other devices over the network. As described in further detail below, the present invention may access basic services that utilize the network interface 310 to perform communications using common network protocols. In the exemplary embodiment depicted in FIG. 3, the computing device 300 also includes a storage medium 308. However, as described in further detail below with reference to FIG. 4A, network operating system services may be accessed using a computing device that does not include means for persisting data to a local storage medium. Therefore, the storage medium 308 depicted in FIG. 3 is represented with a dashed line to indicate that the storage medium 308 is optional. In any event, the storage medium 308 may be volatile or nonvolatile, removable or nonremovable, implemented using any technology capable of storing information such as, but not limited to, a hard drive, solid state drive, CD-ROM, DVD, or other disk storage, magnetic cassettes, magnetic tape, magnetic disk storage, and the like.

As used herein, the term "computer readable media" includes volatile and non-volatile and removable and non-removable media implemented in any method or technology capable of storing information, such as computer-readable instructions, data structures, program modules, or other data. In this regard, the system memory 304 and storage medium 308 depicted in FIG. 3 are merely examples of computer readable media.

Suitable implementations of computing devices that include a CPU 302, system memory 304, communication bus 306, storage medium 308, and network interface 310 are known and commercially available. For ease of illustration and because it is not important for an understanding of the claimed subject matter, FIG. 3 does not show some of the typical components of many computing devices. In this regard, the computing device 300 will typically include input devices, such as a keyboard, mouse, microphone, touch input device, etc. Similarly, the computing device 300 may also include output devices such as a display, speakers, printer, etc. Since all these devices are well known in the art, they are not described here.

Now with reference to FIGS. 4A-4C, exemplary platform environments in which the present invention may be implemented will be described. In this regard, FIGS. 4A-4C illustrate the hierarchical relationships between platform layers of the computing device 300 (FIG. 3). More specifically, the platform layers of the computing device 300 illustrated in FIGS. 4A-B include a hardware platform 402 on the bottom layer, a machine operating system 404 in the middle layer, and an application platform 406 on the top layer. Of course, those skilled in the art will appreciate that the platform layers of the computing device 300 depicted in FIGS. 4A-4C are merely exemplary.

Since an exemplary hardware platform 402 of the computing device 300 is described above with reference to FIG. 3, additional description of these components will not be provided here. However, as illustrated in FIGS. 4A-4B, the computing device 300 may include a machine operating system 404. In this regard, the machine operating system 404 may be from any of the family of general-purpose operating systems configured to utilize generic hardware such as Microsoft® operating systems, Apple® operating systems, UNIX® operating systems, Linux® operating system, Nokia® Symbian, Google® Android, etc. Also, the machine operating system 404 may be an operating system configured for specialized computing devices that use non-generic hardware such as thin clients, mobile phones, mainframes, supercomputers, and the like. Moreover, the machine operating system 404 may be an operating system designed to satisfy certain configuration parameters such as real-time operating systems, embedded operating systems, etc.

One purpose of machine operating systems is to abstract the details of accessing and otherwise utilizing hardware resources. Accordingly, machine operating systems almost all perform basic system tasks, such as managing I/O (input and output) with hardware components, memory management, task scheduling, etc. In this regard, machine operating systems typically offer services to application programs through an API. Providing services through an API relieves application developers from having to manage the implementation details of accessing or otherwise utilizing an underlying computer platform. Significantly, aspects of the present invention use the machine operating system 404 only for basic services that are available from all modern computer platforms. In this regard, services may be utilized for interfacing with networking hardware and establishing a network connection to communicate using TCP/IP protocols.

In the embodiment depicted in FIG. 4A, the computing device 300 includes a Web browser 408 that operates at the top layer of the application platform 406. As mentioned previously, a client-side component 410 of the network operating system may be delivered and built on the computing device 300. In the embodiment depicted in FIG. 4A, the client-side component 410 is configured to operate within the context of the Web browser 408. In this regard, the Web browser 408 may be any number of browser applications configured to communicate with remote devices using TCP/IP network communication protocols including, but not limited to, Mozilla Firefox®, Microsoft's Internet Explorer®, and the like.

In the embodiment depicted in FIG. 4A, the client-side component 410 does not directly interact with the machine operating system 404. Instead, basic services used by the client-side component 410 are accessed from the Web browser 408. Those skilled in the art and others will recognize that HTTP is a higher-level protocol than TCP/IP that, among other things, allows network resources to be requested/received using a Uniform Resource Locator ("URL"). Typically, Web browsers generate HTTP requests in order to obtain Web pages formatted in a markup language such as the Hypertext Markup Language (HTML), eXtensible Markup Language (XML) or formatted using JSON ("Java Script Object Notation") and/or JavaScript. In one embodiment, the Web browser 408 is used by the client-side component 410 of the network operating system to perform network communications using HTTP and for rendering graphical elements that are represented in HTML among other graphical representation technologies available from Web browsers.

In the embodiment depicted in FIG. 4B, the client-side component 410 of the network operating system directly accesses the services of the machine operating system 404 without using a Web browser. Aspects of the present invention allow applications to be delivered and built on disparate types of computing devices. However, Web browsers are typically configured to display graphical elements according to a pre-determined page size and/or layout. Thus, a general-purpose Web browser may not be well-suited for rendering graphical elements on every type of computing device in which the present invention may be implemented. For example, using a Web browser to render graphical elements on a small form factor computing device may be problematic. In this regard, the pre-determined page size and/or layout anticipated by the Web browser may be too large or otherwise inappropriate given the available form factor. As illustrated in FIG. 4B, the client-side component 410 of the network operating system may be implemented as a stand-alone application, or even as a machine operating system. In this instance, the client-side component 410 is configured to perform graphical rendering in a way that is appropriate given the form factor of the computing device 300 without using a Web browser. Moreover, in this embodiment, basic services for performing network communications are obtained directly from the machine operating system 404 or built into the client-side component 410.

In the embodiment depicted in FIG. 4C, the computing device 300 does not include a traditional machine operating system. Instead, basic services for interacting with the hardware platform 402 are built into the client-side component 410. In this embodiment, the client-side component 410 implements basic system tasks for performing memory management, task scheduling, and the like. By building these types of basic machine services into the client-side component 410, aspects of the present invention may be readily customized and deployed for use with particular hardware platforms. In other words, the client-side component 410 may be configured to be independent from the services offered by providers of machine operating systems.

As mentioned above, the client-side component 410 may be delivered as a network service and built each time a user connects to the network. As illustrated in FIGS. 4A-4C, the client-side component 410 is suitable for being implemented as a stand-alone application, a machine operating system, or within the context of a Web browser. In all of these embodiments, the server-side data center 202 or 216 may provide application logic to the client-side component 410 as a service of the network. Accordingly, a limited resource computing device that does not have a storage medium (e.g., hard drive, CD-ROM, DVD, etc.) may be used to access network operating system services provided by the present invention. In this regard, the client-side component 410 and other network operating system data may be cached in system memory (ROM, RAM, etc.) without persisting to a local storage medium. As such, applications enabled for the network operating system do not need to be "installed" on the computing device 300 as applications may be delivered as a service.

Figure 5A:
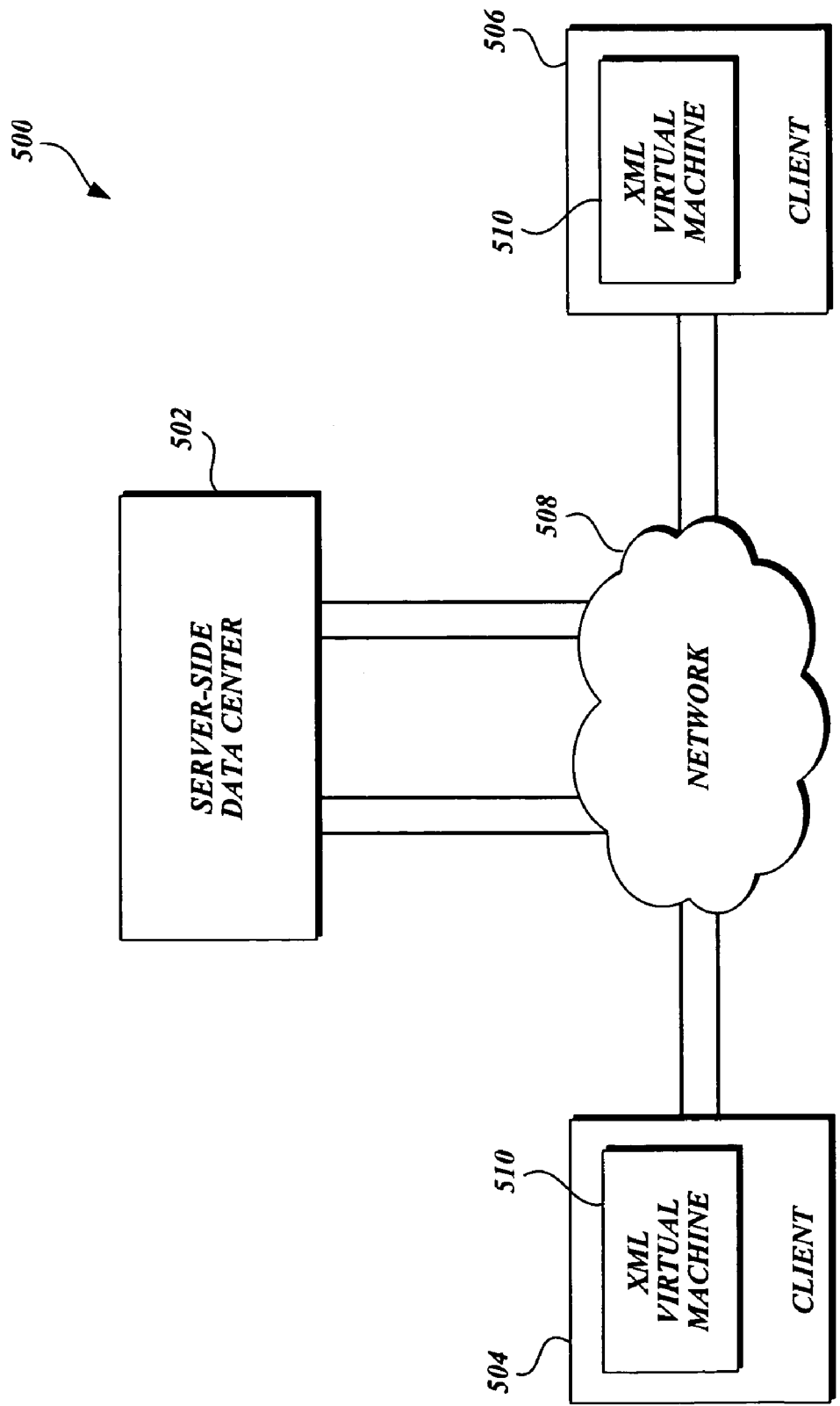
FIGS. 5A-B are exemplary block diagrams of a networking environment that includes a server-side data center and a plurality of client computers suitable for illustrating aspects of the present invention.
Figure 5B:
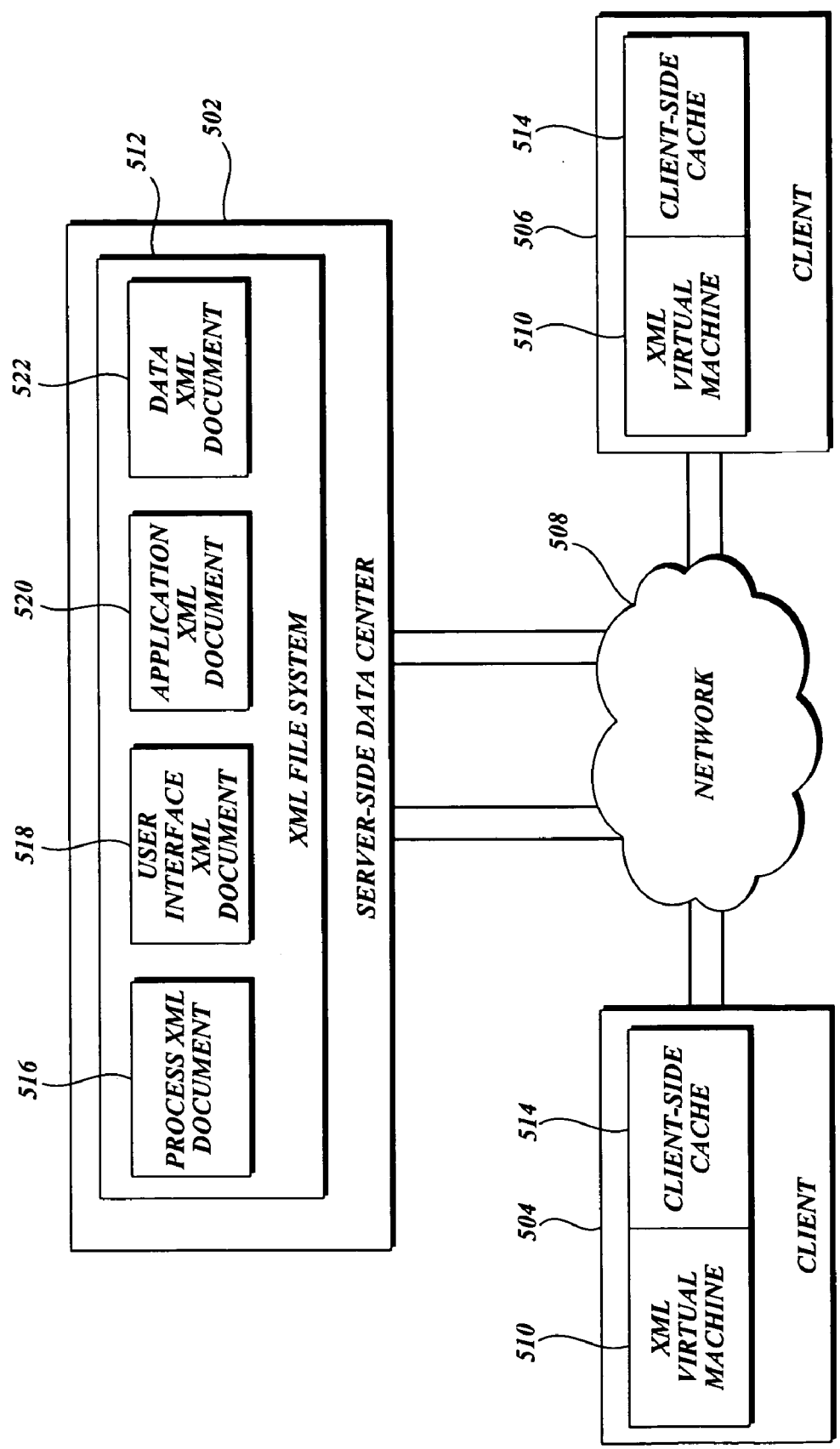

Now with reference to FIGS. 5A-5B, a description of how a common data model may be used to deliver network operating system services in accordance with the present invention is provided. The network operating system supports the Model View Controller (MVC) design paradigm by separating application components into different layers, namely, a model, view, and controller. In an actual embodiment, XML documents are the "model" or common data format in which information is represented in the network operating system environment. Utilizing a common data model (e.g., the XML document) in this context results in many benefits, as will be clear in the description that follows.

The networking environment 500 depicted in FIGS. 5A-5B includes the server-side data center 502 that is communicatively connected to each of the clients 504 and 506 via the network 508. As described above, the client-side component of the network operating system may be dynamically delivered to each of the clients 504 and 506 from the server-side data center 502 or be locally installed on either of the clients 504 and 506. In either instance, the client-side component of the network operating system provides an XML virtual machine 510 that interprets or causes XML structured applications to be executed on the clients 504 and 506. When delivered as a service, aspects of the present invention cause the network operating system to "boot" by delivering a process XML document from the server-side data center 502. In this regard, the process XML document provides the logic that describes a startup-sequence for the clients 504 and 506. As described in further detail below, this process XML document will be executed within the XML virtual machine 510. The startup-sequence typically instantiates and manipulates a set of objects within the XML virtual machine 510 so that other applications may be executed.

As mentioned above, XML may serve as the "model" or common format in which application logic and other data is represented in the network operating system environment, but other models, data formats, and structuring of data may also be utilized to implement the invention. In one embodiment, XML programming languages that allow applications to be designed at a very high level of abstraction are provided. Those skilled in the art and others will recognize that XML is a highly structured, transferable, and transformable language. As such, representing application logic at a high abstraction level as XML structured data is memory efficient and results in compact applications. Specifically, a platform is provided for executing an application's logic represented in one or more well-formed XML documents. Application functionality is separated according to the MVC design paradigm thereby eliminating repetitive tasks performed by traditional systems. Accordingly, transmission of application code from the server-side data center 502 to the clients 504 and 506 consumes a small amount of bandwidth when compared to existing systems. Moreover, execution of the application logic using the present invention, either eliminates or greatly reduces the bandwidth consumed, since application logic is executed using the XML virtual machine 510. Interactions that would have otherwise been handled by performing a server "round-trip" is handled directly on the clients 504 or 506 without having to request or otherwise rely on network communications with the server-side data center 502.

One aspect of the present invention is an XML virtual machine 510 that provides the clients 504 and 506 a platform and application programming interface (API) for executing and developing applications. In this regard, high-level application code written in an XML programming language is accepted as input and executed locally on the clients 504 and 506 by the XML virtual machine 510. Functionality is provided to interpret or translate the high-level application code into interpretable code, byte code, or other lower-level language that is suitable for execution on any platform. In this regard, the XML virtual machine 510 abstracts the underlying computer platform and network resources so that applications may be executed in the same way on any type of computing device. Accordingly, the XML virtual machine 510 is completely platform and hardware independent and can be implemented using any number of currently available, or yet to be developed, programming technologies, such as, but not limited to, Microsoft .NET®, Java, C, C++, HTML, JavaScript, AJAX, Adobe® Flash, Microsoft® SilverLight, and the like.

Now with reference to FIG. 5B, additional aspects of how the common data model is used to provide network operating system services will be described. The networking environment 500 illustrated in FIG. 5B includes the same components described above with reference to FIG. 5A. In addition, an XML file system 512 that provides storage and other network services is depicted on the server-side data center 502. Accordingly, data maintained in the XML file system 512 may be accessed by the clients 504 and 506 when network operating system services are being provided. In one aspect, the present invention implements a client-side cache 514 for managing the storage of documents and other runtime data on the clients 504 and 506. As illustrated in FIG. 5B, data stored in the client-side cache 514 is readily accessible to the XML virtual machine 510. In one embodiment, the client-side cache 514 enables the XML virtual machine 510 to continue executing applications even if the network connection is temporarily unavailable or if a client 504 or 506 goes offline. By way of example, applications executing on the clients 504 and 506 may continue to operate offline when a user is on a bus, train or airplane and other instances when a network connection is unavailable. As described in further detail below, data changes performed on the clients 504 or 506 will be synchronized to the XML file system 512 residing on the server-side data center 512 when the network connection is re-established.

As mentioned previously, the present invention provides programming languages that allow developers to create applications at a very high level of abstraction. In an actual embodiment, these programming languages include a process XML language, a user interface ("UI") XML language, and an application package XML language. Application code written in these programming languages is suitable to be represented as XML structured data and stored in XML documents. In the example illustrated in FIG. 5B, the process XML document 516, user interface XML document 518, and application package XML document 520 contain application code written in these programming languages, respectively. Accordingly, an application may be defined in one or more XML documents maintained at the server-side data center 502. Moreover, an application will typically utilize data documents such as the data XML document 522 also maintained at the server-side data center 502. These XML documents 516-522 may be accessed by the clients 504 and 506 on demand so that applications may be executed using the XML virtual machine 510.

In one embodiment, the UI XML language is used to define an application's "view" in the MVC design paradigm. In this regard, markup languages were originally developed to describe the layout of Web pages in a way that allowed the pages to be rendered by a Web browser. The structured nature of markup languages allowed the appearance of Web pages to be modified without affecting the implementation of the Web browser or other related technologies. In this regard, the UI XML language defines the appearance and behavior of an application user interface in accordance with a schema that complies with XML syntax. Using the UI XML language, developers may create applications with the same graphical elements (i.e., menus, toolbars, drop-down boxes, and the like) that exist in common desktop applications. Since the user interface logic does not depend or describe its implementation in a way that is specific to a particular client, the UI XML language is suitable for developing user interfaces that work across different platforms. Moreover, user interfaces and behavior described in the UI XML language describe these elements in accordance with the XML syntax at a higher-level of abstraction in accordance with the MVC design paradigm. Accordingly, user interfaces and behavior described in the UI XML language may be readily transformed or otherwise modified without impacting other systems. This ability to transform the UI XML language allows an application's functionality to be customized based on one or more variables. For example, a transform may be defined to reduce or eliminate certain aspects of application functionality depending on the type of device being utilized. By way of another example, a transform may be defined on the UI XML language to remove or restrict certain functionality depending on user access credentials or for localizing applications for different languages and/or markets.

In one embodiment, the process XML language is used to define the "controller" component of an application in the MVC design paradigm. In this regard, the process XML language allows developers to describe the logic of an application in a set of process steps. Each process step contains one or more operations that are approximately equivalent to instructions and/or method calls in a traditional programming languages. In the MVC design paradigm, the process XML language is used as the controller or glue between the user interface ("View") logic and the XML data ("Model"). Accordingly, aspects of the invention enable application logic to be described using the process XML language at a higher abstraction level than traditional programming languages. In this regard, the user interface logic ("View") is completely separated from the process XML logic ("Controller"). As a result, the data handling functions that comprise the majority of application code in existing systems is automatically handled by the present invention. Specifically, using the process XML language, intelligent data bindings may be defined between the view logic and the data model. When executing applications, the I/O (input and output) or data, both to the data model cached locally and to the remote file system and any remote listeners is automatically handled by the network operating system. Since developers do not provide data handling logic, the applications created using the process XML language are frequently developed more quickly and include less application code than traditional applications. As described in further detail below, the process XML language provides other advantages for creating and distributing applications in a networking environment, than described with reference to FIG. 5A.

In addition to the languages described above, an application package XML language is also provided. The application package XML language allows developers to describe the resources utilized by an application. In this regard, the UI and process XML documents that define an application's functionality may be identified in an application package. Logic in the application package allows developers to package and distribute an application's resources to clients in a controlled and secure manner. Moreover, the use of an application package allows multiple instances of the application to be created in a way that enables the XML virtual machine 510 to ensure intra-application security.

In one aspect, the present invention provides improved methods for distributing applications and software updates in a networking environment. Using existing systems, an application is typically distributed in an executable format that, when executed, "installs" the application on a computing device. An executable typically represents application logic as machine instructions that are specific to a particular computing platform. As such, an executable is a memory-intensive representation of an application that consumes a relatively large amount of bandwidth when distributed in a networking environment. Accordingly, complex and resource-intensive systems are required to distribute and install applications using executables.

Improved methods for distributing applications and software updates over the network are integrated into the network operating system. An application enabled for the network operating system is not "installed" on a client computing device using an executable. Instead, the present invention allows application logic to be represented entirely in XML structured data. When a client establishes a network connection, an application as represented in one or more XML documents, may be obtained automatically from a service provider, which may provide the XML documents from a local/private server or any Web server on the Internet. Accordingly, an integrated framework is provided for distributing applications to clients over the network. In addition, updates such as "patches" and more recent versions of an application may also propagate automatically to clients. In this regard, since application logic is represented in XML documents that are distributed automatically as a network service, any modifications to the XML documents will also propagate to clients as a network service. In the network operating system environment application logic may be synchronized across the network the same was as any other data. Since the XML virtual machine 510 and XML file system 512 are configured to synchronize data and coordinate changes through transaction handling, changes to applications may be performed in real-time and in a collaborative manner. For example, an application maintained in a shared folder may be opened and executed on the client 504. Concurrently, a user associated with the client 506 could modify the application logic and have the changes automatically propagated to the client 504. The changes to application logic would be implemented in real-time and therefore be readily observed on the client 504 as the changes occur.

As described above with reference to FIGS. 5A-5B, an XML representation of an application is distributed by a service provider and executed on the client using the XML virtual machine. As a result, clients may continue to execute applications "off-line" without requiring runtime processing from the server-side. In this instance, XML documents representing one or more applications are cached in memory on the client. The XML virtual machine may access these cached XML documents to continue executing applications without having a network connection. Moreover, data updates that occur off-line are also cached and transmitted to the server-side when a network connection is re-established.

Significantly, the present invention provides network operating system services without requiring virtualization of computer resources. In this regard, a number of technologies for virtualizing computer resources are being used to provide network services, such as "cloud" storage. Generally described, these virtualization technologies abstract computer resources that are typically associated with a server away from underlying platforms. The abstracted resources are typically encapsulated in a platform independent interface suitable to be accessed from the network. In this regard, the computer resources that may be abstracted include applications, hardware, desktops, machine operating systems, and the like. However, complex systems are required to abstract and encapsulate computer resources in this way. For example, a virtualization layer that simulates a servers underlying hardware and has at least some impact on performance may be required. Moreover, these virtualization technologies promote a server-centric model that shifts the location where resources are implemented and executed to the server-side. The increased processing and other demands placed on servers may not scale when network services are provided to an ever-increasing number of users. Accordingly, using virtualization technologies to implement a network service may require a consolidated data center in which an oversupply of servers are needed to ensure that the service is available on demand. Moreover, virtualization technologies consume more bandwidth and result in a slower user experience since application logic is executed on a remote server and not directly on the client. This will also result in applications being unavailable when the network connection goes down or the client goes "off-line."

Implementing a network service without virtualizing computer resources provides numerous advantages. In this regard, a more-scalable architecture is provided that allows network services to be accessed by an ever-increasing number of users. By using the XML virtual machine to execute applications on the client-side, processing and other resources from clients are more fully utilized. This implementation provides a more-scalable architecture because a natural correspondence exists between the number of users accessing a network service, bandwidth usage, processing power, and other resources that are available from the client-side to execute application logic. In addition to being more-scalable, executing applications on the client using the XML virtual machine allows application functionality to be readily accessed by users while "off-line." When the client goes "off-line," applications and user data represented in one or more XML documents may be stored in a client-side cache. Accordingly, all of an application's logic is available and may be executed using data in the cache, regardless of whether an active network connection exists. However, an application may not access network resources while "off-line" and may need to reestablish a network connection to implement all of the application's functionality. In contrast, the "off-line" functionality provided when a network service is implemented using virtualization technologies is more limited. In this regard, some existing network services implement an "off-line" mode where users may continue to interact with an application used to access a network service. However, to provide this functionality, an executable or other lower-level representation of an application is distributed and installed on the client. When the user is "off-line," this lower-level representation of the application is executed locally. However, installing applications on the client to provide this "off-line" functionality may not be feasible or convenient. For example, a limited resource computing device may not have sufficient storage to "install" an executable or other lower-level representation of an application. More generally, the functionality available on a client without an active network connection is limited to those applications that have been installed locally. However, a client may not have sufficient computing resources (storage, memory, bandwidth, etc.) to install each desired application using an executable or other low-level representation of the application.

In one aspect, the present invention implements improved methods for accessing network services over mobile, wireless, or unstable networks. Those skilled in the art will recognize that mobile or wireless networks are less reliable and bandwidth-constrained when compared to wired networks. Providing programming languages that represent application logic as XML structured data and an XML virtual machine 510 configured to automatically perform repetitive data handling functions results in highly compact and memory efficient applications. In this regard, applications are able to share the functionality of the XML virtual machine 510 and reuse objects when implementing application logic. As a result, distributing applications enabled for the network operating system consumes a fraction of the bandwidth when compared to existing application distribution systems. Moreover, the present invention allows XML representations of applications to be maintained in a client-side cache and executed locally using the XML virtual machine 510. Since application logic and data may be cached locally, a continuous network connection may not be necessary. Instead, the present invention is well-suited to providing access to network services over wireless networks in which network connectivity may be intermittent. Moreover, since applications are executed locally, more reliable network services with a certain guarantee of service may be provided. For example, the present invention is also well-suited for providing enterprise class applications as a service of the network such as the Internet. In this regard, those skilled in the art and others will recognize that enterprise class applications may need to be accessible within the enterprise even if the network connection is temporarily unavailable or the quality of the Internet connection affects access to the network. The invention described herein solves this problem.

Client-Side Component of the Network Operating System

Those skilled in the art and others will recognize that XML is an extensible language that provides a foundation for the creation of additional languages. An XML document has a hierarchical tree structure, where the root of the tree identifies the document and other nodes in the document are descendents of the root. Nodes of the tree may contain document content, as well as data that defines the structure of the content. In addition to the syntax imposed by XML, elements and their associated attributes may be defined to establish other semantic constraints on the structure and content of an XML document. In one embodiment, the present invention implements schemas or vocabularies that apply additional semantic constraints over those imposed by XML. Using the XML languages provided by the present invention, developers represent an application's logic semantically in accordance with the MVC design paradigm.

The MVC design paradigm was originally implemented in the Smalltalk programming language and has since been used in other engineering contexts. Those skilled in the art and others will recognize that the MVC design paradigm is merely descriptive of a general architectural paradigm for separating functionality into layers. As such, the MVC design paradigm is implemented in various contexts to eliminate dependencies and support platform independence. By way of example, existing systems used to store HTML data, gather dynamic Web page content, and render a Web page are frequently described as adhering to the MVC design paradigm. Moreover, development environments used to create Web applications may separate functionality into layers according to the MVC design paradigm. In this context, the graphical user interface of the Web application is separated from a data model to support more modular application development. However, these existing systems implement functionality and utilize an underlying data model that is more domain-specific than the present invention.

Unlike existing systems, aspects of the present invention allow any type of application to be created in accordance with the MVC design paradigm. In other words, separation of the user interface from logic and the underlying data model is not limited to Web applications, Web pages, and the like. Multi-instance applications, with each instance potentially supporting multiple views, may be created and executed in the network operating system environment. Moreover, these application instances each manipulate data from a common data model. Since developers do not have to provide program logic for setting and accessing data from the data model and managing synchronization and data exchange between the user interface ("View") and data model, application development is greatly simplified.

Now with reference to FIGS. 6A-B, exemplary process and UI XML documents that may be used to illustrate aspects of the present invention will be described. FIG. 6A depicts an exemplary process XML document 600 ("MyTasks.xml") that provides a semantic description of the controller logic for a "MyTasks" application. As illustrated in FIG. 6A, the MyTasks.xml document 600 includes a trigger 602 defined in the "<trigger>" XML element. This trigger 602 maintains a set of attributes including the view, component, event, and step attributes. Moreover, application logic written in the process XML language may define a sequence of process steps. In this example, the MyTasks.xml document 600 includes a plurality of process steps 604-610 delineated by the "<step>" XML elements. As depicted in FIG. 6A, two attributes are associated with each of the process steps 604-610 including a number attribute ("id") and a name attribute. Within each process step, at least one operation is defined. By way of example, the process step 604 associated with the name attribute "Initialize Application" includes three operations 612-616 that are delineated by the "<operation>" XML elements.

FIG. 6B depicts an excerpt from a UI XML document ("MyTasks_gui.xml") that provides a semantic description of exemplary "view" logic for the MyTasks application. As illustrated in FIG. 6B, the MyTasks_gui.xml document 650 includes two button components 652 and 654 delineated by the "<button>" XML elements. Each button element maintains a set of attributes including the name, text, and width attributes. Moreover, the MyTasks_gui.xml document 650 includes two input components 656 and 658 delineated by the "<input>" XML elements. In this example, the input components 656 and 658 maintain a set of attributes that include the name, width, and height attributes.

Upon launching an application, aspects of the invention that serve as the XML virtual machine may begin interpreting the MyTasks.xml document 600. In one embodiment, application logic is interpreted one statement at a time, rather than being compiled in its entirety before execution. However, application code written in the XML languages provided by the present invention may be compiled into executable code or byte code in alternative embodiments. In this example, the MyTasks.xml document 600 defines a trigger 602 that identifies a process step 606 in the application that will be executed in response to activation of the trigger. Initially, when the XML virtual machine begins interpreting the MyTasks.xml document 600 in an illustrative embodiment, the trigger 602 is registered so that flow may be directed to the appropriate process step 606 in response to the activation of the trigger.

In the MyTasks.xml document 600 depicted in FIG. 6A, the application defines a default process step 604 with the name attribute "Initialize Application" where flow of control is directed once any triggers in the application have been registered. The operation 612 with the name attribute "open" and the value attribute "apps/mytasks_gui.xml" is the first operation in the Initialize Application process step 604 that will be executed. Execution of the Open operation 612 will cause the view of the application as represented in the MyTasks_gui.xml document 650 to be interpreted and rendered on a computer display. In this example, the application's view includes the components 652-658 defined semantically in the MyTasks_gui.xml document 650. Once the MyTasks_gui.xml document 650 has been opened, execution will proceed to the operation 614 with the name attribute "action" and the value attribute "#MyTasks." Generally described, execution of the Action operation 614 will cause the button component 654 to be hidden from view once the MyTasks_gui.xml document 650 has been opened.

Figure 7A:
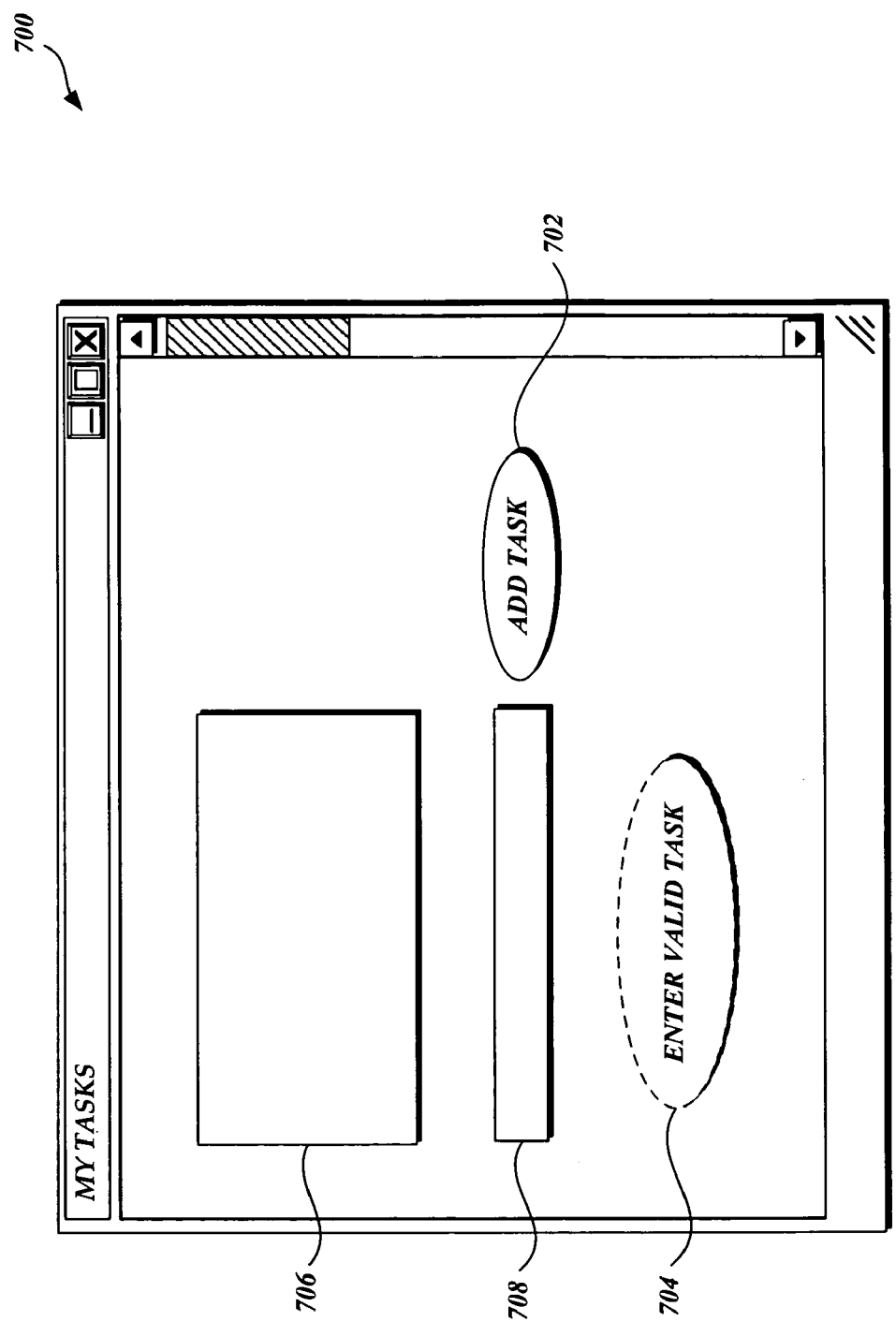
FIGS. 7A-C depict an exemplary graphical display that visually depicts graphical elements of the application described semantically in FIGS. 6A-B.
Figure 7B:
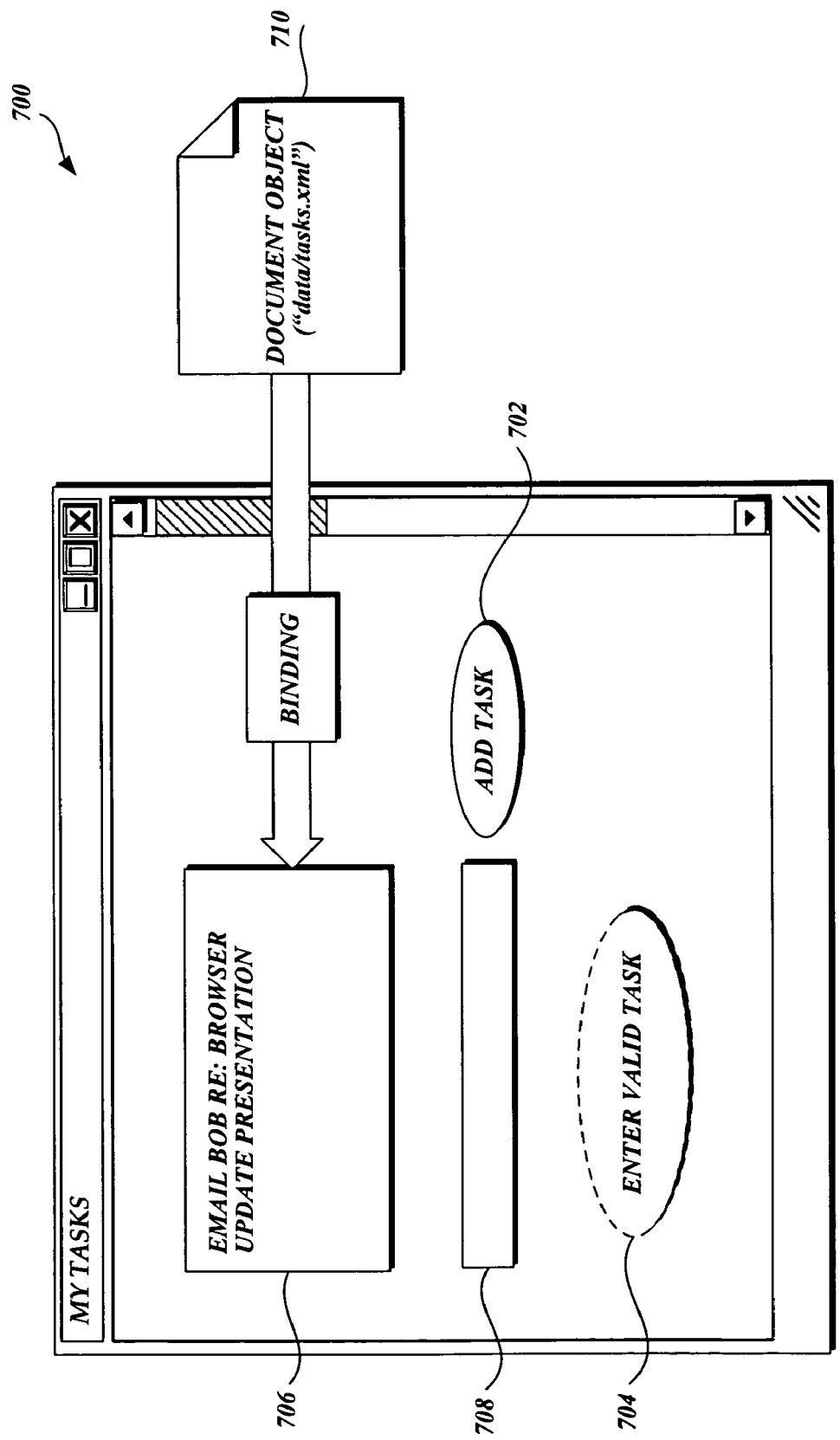
Figure 7C:
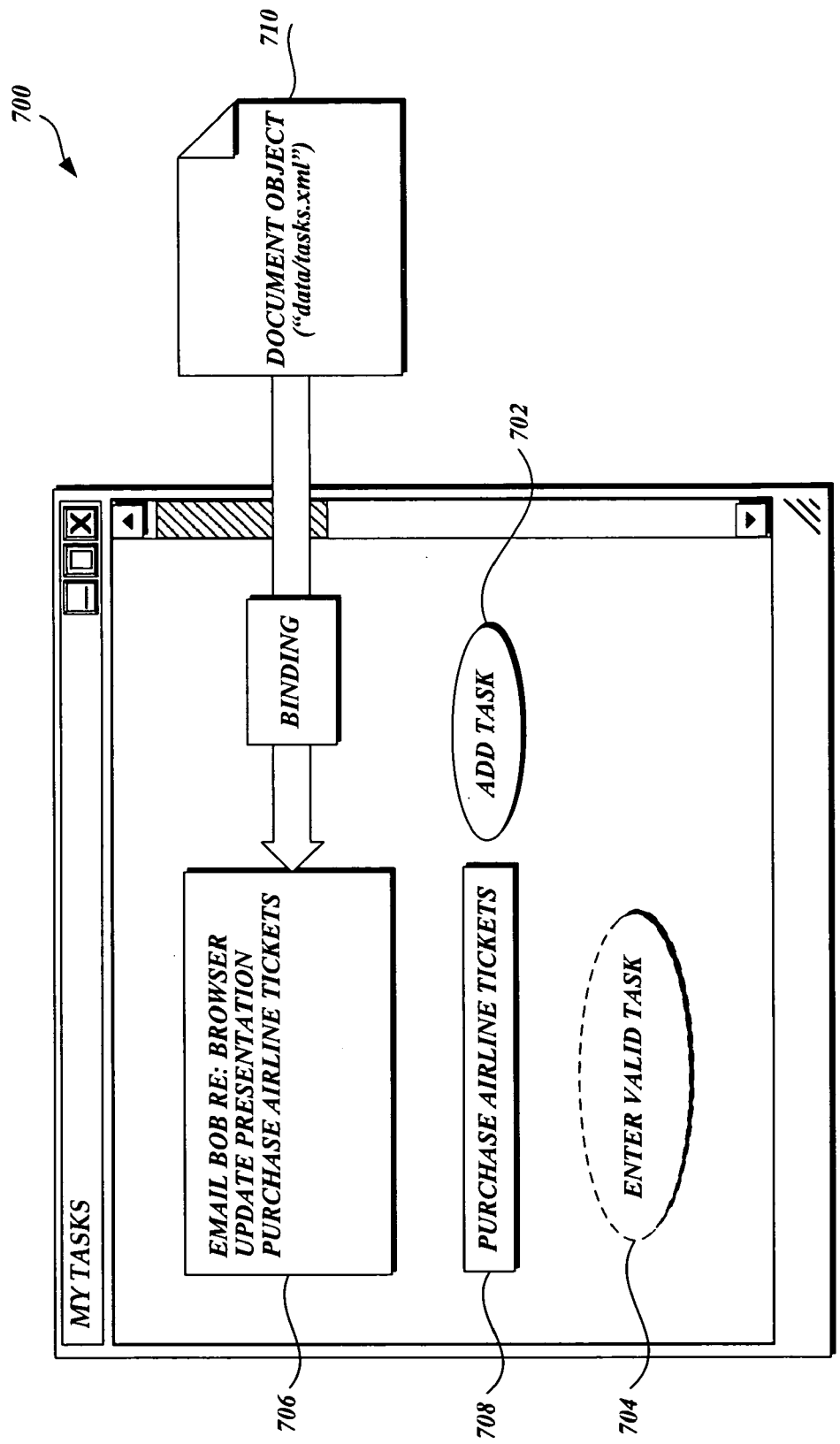

With reference now to FIGS. 7A-C, an exemplary graphical display 700 associated with the MyTasks application will be described. Specifically, the graphical display 700 depicted in FIG. 7A includes the Button1 component 702 and the Button2 component 704 that correspond to the button components 652-654 described semantically in the MyTasks_gui.xml document 650. Moreover, the graphical display 700 includes the Input3 component 706 and Input4 component 708 that correspond to the semantic description of the input components 656-658, respectively. In this regard, the graphical display 700 in FIG. 7A represents a visual depiction of the MyTasks_gui.xml document 650. As mentioned above, the process logic in the MyTasks.xml document 600 causes the Button2 component 704 to be hidden when the MyTasks application is launched. Accordingly, the Button2 component 704 is depicted in FIG. 7A with a dashed line to indicate that the Button2 component 704 is not initially visible to the user subsequent to execution of the Action operation 614.

Generally described, the exemplary MyTasks application is configured to display a list of task descriptions that are stored in a "data/tasks.xml" document. More specifically, task descriptions will be displayed in the Input3 component 706 by default when the application is launched. In one aspect, a user may modify the task list by directly interacting with the Input3 component 706 and changing entries of task descriptions. In another aspect, the user may input a new task description into the Input4 component 708 and activate the trigger 602 by selecting the Button1 component 702. If valid input is received, the new task description is added to the "data/tasks.xml" document and automatically displayed by the Input3 component 706. Conversely, if the user merely selects the Button1 component 702 without providing any input into the Input4 component 708, the Button2 component 704 is displayed with text requesting that the user provide a valid task description.

With reference again to FIG. 6A, the operation 616 with the name attribute "bind" and the value attribute "data/tasks.xml" is the next operation in the Initialize Application process step 604 that will be executed. Generally described, execution of the Bind operation 616 will cause the Input3 component 706 to become a data binding component that displays a list of task descriptions. Specifically, the logic provided in the Bind operation 616 and its associated component element 618, binds the Input3 component 706 to a list of task descriptions represented in the "data/tasks.xml" document. In this example, a task is defined within the "data/tasks.xml" document as an element that maintains an associated description attribute. The logic provided by the component element 618 selects the "/tasks/task/@description" attribute of the task element for display in the Input3 component 706. As depicted in FIG. 6A, the Bind operation 616 is the last operation in the Initialize Application process step 604 that is executed.

With reference now to FIG. 7B, the state of the graphical display 700 subsequent to execution of the Bind operation 616 will be described. In this regard, FIG. 7B depicts the same button and input components 702-708 described above with reference to FIG. 7A. However, after execution of the Bind operation 616, a set of task descriptions is displayed by the Input3 component 706. Specifically, the Input3 component 706 is bound to description attributes of task elements defined in the "data/tasks.xml" document. Accordingly, after the Bind operation 616 is executed, the values assigned to these task descriptions, as represented in the data model (e.g., document object 710), are displayed in the Input3 component 706.

Upon execution of the Initialize Application process step 604, execution of application logic represented in the MyTasks.xml document 600 does not resume until the activation of a trigger. In this example, the MyTasks application defines a trigger 602 that directs the flow of execution to process step "2" when the Button1 component 702 experiences a "select" event. Accordingly, the trigger 602 directs the flow of execution to the process step 606 entitled "Press Button" in response to the Button1 component 702 being selected. In this example, the operation 620 with the name attribute "decision" and the value attribute "#MyTasks#input4" is the operation in the Press Button process step 606 that will be executed. Generally described, the decision operation 620 performs a test to determine whether any text was entered into the Input4 component 708 when the Button1 component 702 was selected. The logic within the "<when>" XML element 622 directs the flow of execution to process step 608 if text was entered into the Input4 component 708 when the Button1 component 702 was selected. Conversely, the decision operation 620 causes the flow of execution to proceed to process step 610 if text was not entered in the Input4 component 708 upon the occurrence of the trigger.

In the example when text is entered into Input4 component 708, the flow of execution proceeds to the "Add Task" process step 608. Accordingly, the operation 624 with the name attribute "change" and the value attribute "data/tasks.xml" is the next operation that would be executed. The change operation 624 will cause a new task element with the appropriate description attribute to be added to the "data/tasks.xml" document. In this regard, the "<store>" XML element 626 within the change operation 624 provides logic that causes the text entered in the Input4 component 708 to be stored in the description attribute of the new task.

With reference now to FIG. 7C, the state of the graphical display 700 subsequent to the entry of a new task and the selection of the Button1 component 702 is depicted. Accordingly, FIG. 7C includes the same components 702-708 as described above with reference to FIGS. 7A-B. In this example, the user entered the text "purchase airline tickets" into the text area provided by the Input4 component 708. The change operation 624 described above would add the value of this task description to the "data/tasks.xml" document utilizing the corresponding document object 710. Since the Input3 component 706 is bound to a selection of description attributes affected by the change operation 624, the list of tasks displayed by the Input3 component 706 is updated automatically in the document object 710. In other words, developers do not have to provide application code for handling the synchronization and exchange of data between the Input3 component 706 and the data model.

In one aspect, the user may input a new task description into the Input4 component 708 and update the task list by selecting the Button1 component 702. Moreover, a user may modify the task descriptions by directly interacting with entries that are displayed in the Input3 component 706. By way of example, the user may delete the "update presentation" task description currently being displayed by the Input3 component 706. Since a data binding is defined, the deletion would automatically propagate to the "data/tasks.xml" document. In this regard, one or more components and/or local or remote applications may be data listeners to the task descriptions represented in the "data/tasks.xml" document. Each of the local data listeners would be notified and updated by the document object 710 in response to the "update presentation" task being deleted. Significantly, the deletion of the task would propagate to the underlying data model and then to any data listeners over the network without a developer being required to provide application code for handling the data update.

With reference again to FIG. 6A, if text is not entered into Input4 component 708 when the Button1 component 702 is selected, the flow of execution proceeds to the "Show Button" process step 610. Accordingly, the operation 628 with the name attribute "action" and the value attribute "#MyTasks" is the next operation that would be executed. Generally described, execution of this Action operation 628 will cause the Button2 component 704 that was initially hidden (FIG. 7A) to be displayed. As represented in the MyTasks_gui.xml document 650, the Button2 component 704 would display a text string requesting that the user provide a valid task description.

As will be appreciated by those skilled in the art and others, the MyTasks application described with reference to FIGS. 6A-7C is a highly simplified example of one application that may be used illustrate aspects of the present invention. Additional applications may be created and executed in the network operating system environment. Accordingly, the examples and description made with reference to the MyTasks application herein should be construed as exemplary.

Programming languages used to develop modern applications (C++, Java™, Python™, etc.) have user interface components created and maintained in the process logic of the application. In other words, a developer explicitly provides the logic to create and set data on user interface components. Moreover, developers provide code in the application's process logic to listen for events and otherwise monitor data changes that affect the application's user interface. These event listeners cause data changes to be persisted between the user interface of an application and a domain-specific data structure. However, the input/output between an application's user interface to the data structure is not standardized. Accordingly, presentation of data on the application's user interface is tightly coupled to how the data is represented in the data structure. As a result, modifications to the user interface or the data structure may affect other aspects of the application.

The network operating system provides an automated communication path between the user interface and an underlying data model to support execution of applications that adhere to the MVC design paradigm. In this regard, developers may define a binding between a user interface component (sometimes referred to as a control or widget in other programming environment languages) and the underlying data model. Data updates to the underlying data model and coordination of data changes that affect components are managed by the present invention, thereby simplifying application development. As the description of the MyTasks application illustrates, if data represented in an underlying data document changes, any data bound components listening for changes are automatically updated. More specifically, the bind operation 616 in the MyTasks application provides the application logic for binding the Input3 component 706 to a set of data represented in the data model. Accordingly, the deletion of the "update presentation" task from the underlying data XML document is automatically propagated to listening components, including applications and components that are listening to the same document over the network. Moreover, data bindings facilitate exchange and synchronization of data between user interface components both locally and among remote clients over the network. By way of example, the change operation 624 in the MyTasks application provides the application logic that updates the underlying data document with text entered into the Input4 component 708. In this regard, the Input3 component 706 is listening for changes to the underlying data document. The visual display of the Input3 component 706 is updated when text is entered into the Input4 component 708 and the trigger 602 is activated. In this example, the combination of data binding and the change operation 624 enables the synchronized exchange of data between user interface components.

Figures 8A, 8B:
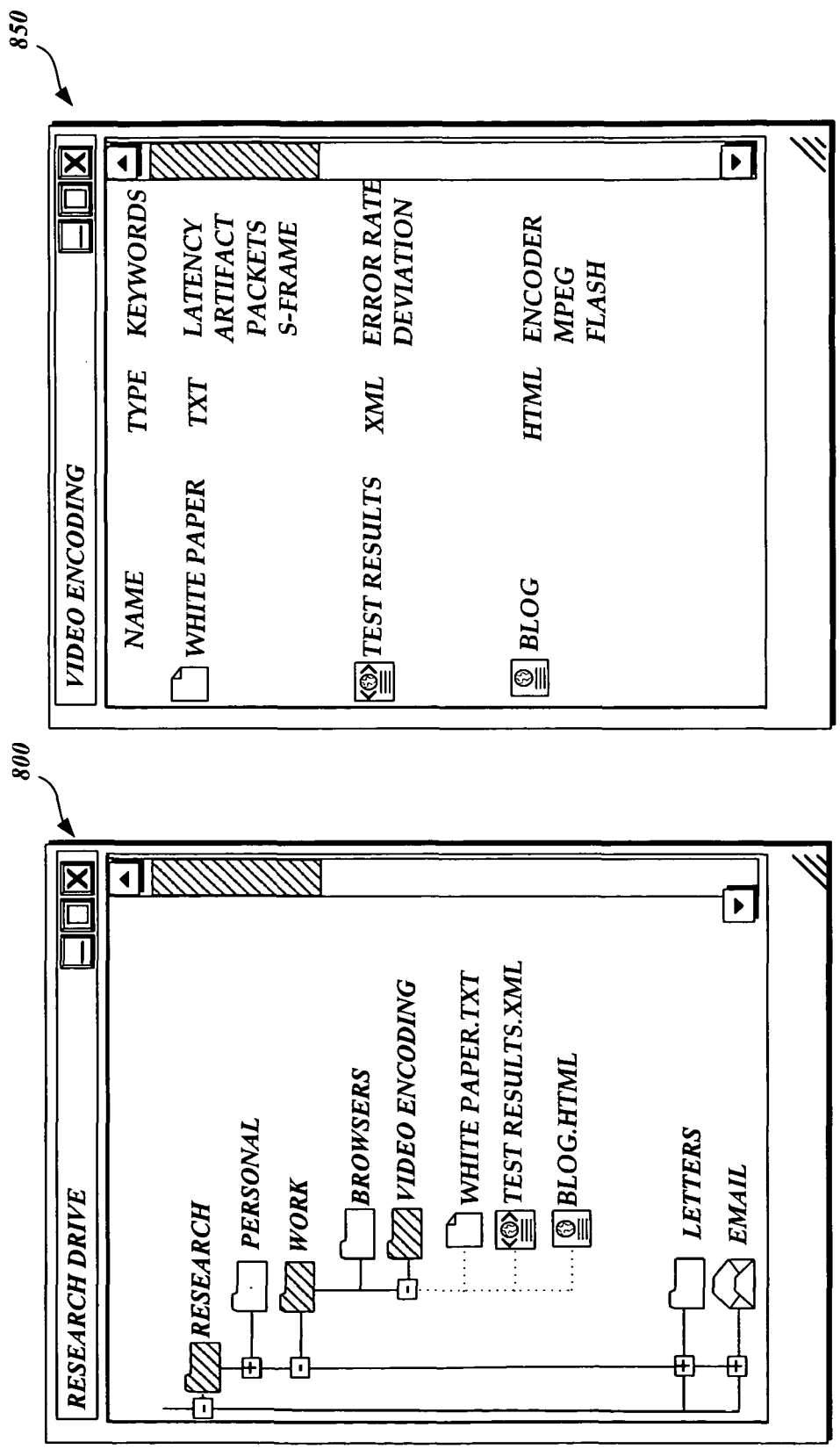
FIGS. 8A-B are pictorial depictions of components suitable to illustrate aspects of the invention.

As described above, a binding provides an automated communication path between a user interface component and the underlying data model. In one aspect, the present invention allows binding to be shared and/or transferred between user interface components. This aspect of the present invention is represented in FIGS. 8A-B, which depict components 800 and 850 that are configured to display different visual representations of a user's file system folders. Specifically, FIG. 8A depicts a component 800 that is configured to display the user's folders in a tree structure. If the user generates input requesting that the folders be displayed as a list, the data binding of the component 800 to the underlying data may be transferred to the component 850, which will also transfer the state of the component 800. This example illustrates that the present invention eliminates dependencies between the representation and processing of data from the configuration of the data model. Moreover, the transfer and sharing of data bindings not only provides an automated communication path between application layers in accordance with the MVC design paradigm, but also provides an enhanced platform for developing applications.

The present invention provides a set of user interface components (i.e., buttons, input boxes, drop-down boxes, display panels, and the like). To facilitate application development, a standard framework allows applications to be built from related user interface components. In this regard, user interface components may inherit properties from a parent component utilizing the UI XML language and therefore be combined to express more complex user interface elements. As a result, an application may include a set of related components organized in a hierarchical structure in which each component is aware of a related component. Alternatively, a single user interface component may be defined that represents the entire view of an application. In addition, a component API (Application Programming Interface) is provided that allows developers to create new user interface components for use with the present invention.

In one aspect, the present invention supports the development of process-oriented applications using the process XML language. In this regard, each process step in the MyTasks.xml document 600 represents part of the process execution flow. Operations within a process step may define a state change in the application being executed. Communications between processes are supported through the controlled access to data that describes the runtime state of an application and through the utilization of messaging ports. Developers may reference views, components, and other runtime variables with expressions that utilize globally-named objects. In this regard, an expression language or common way of referencing and manipulating objects is provided. Generally described, the expression and process XML languages collectively abstract the complexities of executing multi-instance applications. Instead, developers may create an application as though the application would only exist in a single instance of execution. As the MyTasks.xml document 600 illustrates (FIG. 6A), expressions are structured to be compatible with XML syntax and may be delimited or tagged for use within other programming languages. When an expression is evaluated, the XML virtual machine performs the work of identifying, merging, and otherwise manipulating the requested data in accordance with the received expression. As a result, globally-named objects may be utilized by developers in application code even though multiple runtime instances of the application are being executed.

The present invention provides a client-side component that is implemented in a plurality of "classes" from which "objects" may be instantiated. In other words, the client-side component may be implemented using a programming language such as JavaScript that utilizes object-oriented programming features. Alternatively, the invention may be implemented using non-object oriented languages such as the C programming language or any other language in which structures may be represented as objects. As will be understood by those skilled in the art, objects created from a class typically include methods that encapsulate or hide the algorithms that implement the object's functionality. Instead of exposing these implementation details, objects provide interfaces by which other modules may access their functionality as an abstraction. Accordingly, functionality that implements the XML virtual machine in accordance with one embodiment of the present invention occurs in the context of objects that utilize object-orientation and inheritance.

As mentioned previously, the client-side component serves as an XML virtual machine that executes applications written in languages that adhere to the XML syntax. In an actual embodiment, the XML virtual machine is configured to execute application code described semantically in a process modeling language (e.g., the process XML language), user interface modeling language (e.g., the UI XML language) and an application package modeling language (e.g., the application package XML language). Significantly, the XML virtual machine may be extended to understand additional XML languages or XML-based applications to provide functionality not described herein. Moreover, it should be well understood that instead of executing programming logic using the XML languages described herein, other embodiments are possible. For example, a JavaScript API or libraries could be used to build applications implement the same functionality. Accordingly, the utilization of XML-based languages is merely exemplary and the present invention could be implemented using traditional programming languages.

At any given time, an application being interpreted by the XML virtual machine may be understood as being in a particular state of execution. The process XML language allows developers to define the conditions for transitioning between states. Among other things, the XML virtual machine implements functionality for managing the state transitions by (1) defining a set of runtime variables/objects that describe the state of an executing application; (2) implementing logic that drives when a transition in the application state will occur, and (3) providing low-level constructs that implement the appropriate change in the application state.

Now with reference to FIG. 9, aspects of the client-side component and the classes and objects that implement the XML virtual machine will be described. The client-side component includes a plurality of "managers" or objects that will typically be instantiated at start-up of the client-side component of the network operating system and remain active throughout a user session. As mentioned previously, objects provided by the client-side component in accordance with an illustrative embodiment utilize object orientation and inheritance. In this regard, a system context object 902 may be instantiated that serves as a placeholder where managers and other objects are embedded at runtime. Accordingly, the system context object 902 may be used to instantiate the managers depicted in FIG. 9 including the application manager 904, process manager 906, view manager 908, transaction manager 910, document manager 912, and event manager 914.

Each manager typically performs a specific task that is exposed through the interface accessible from the system context object 902. Accordingly, other objects implemented by the present invention may call and utilize a manager's functionality to perform the desired task. For example, the process manager 906 may be called to instantiate a process object in preparation of executing an application's process code. In another aspect, managers allow the controlled instantiation and communication between objects that provides the foundation for intra-application and intra-process security. While the description herein may be provided with reference to particular managers and the associated objects that a manager holds, those skilled in the art and others will recognize that the encapsulation of functionality into a particular type of manager is exemplary. In other embodiments, the functionality described herein with relation to particular managers and their corresponding objects may be performed without being encapsulated or may be encapsulated in a different way than described. Moreover, object-oriented programming languages and features described herein are merely illustrative, as other tools may be utilized without departing from the scope of the claimed subject matter.

Figure 9:
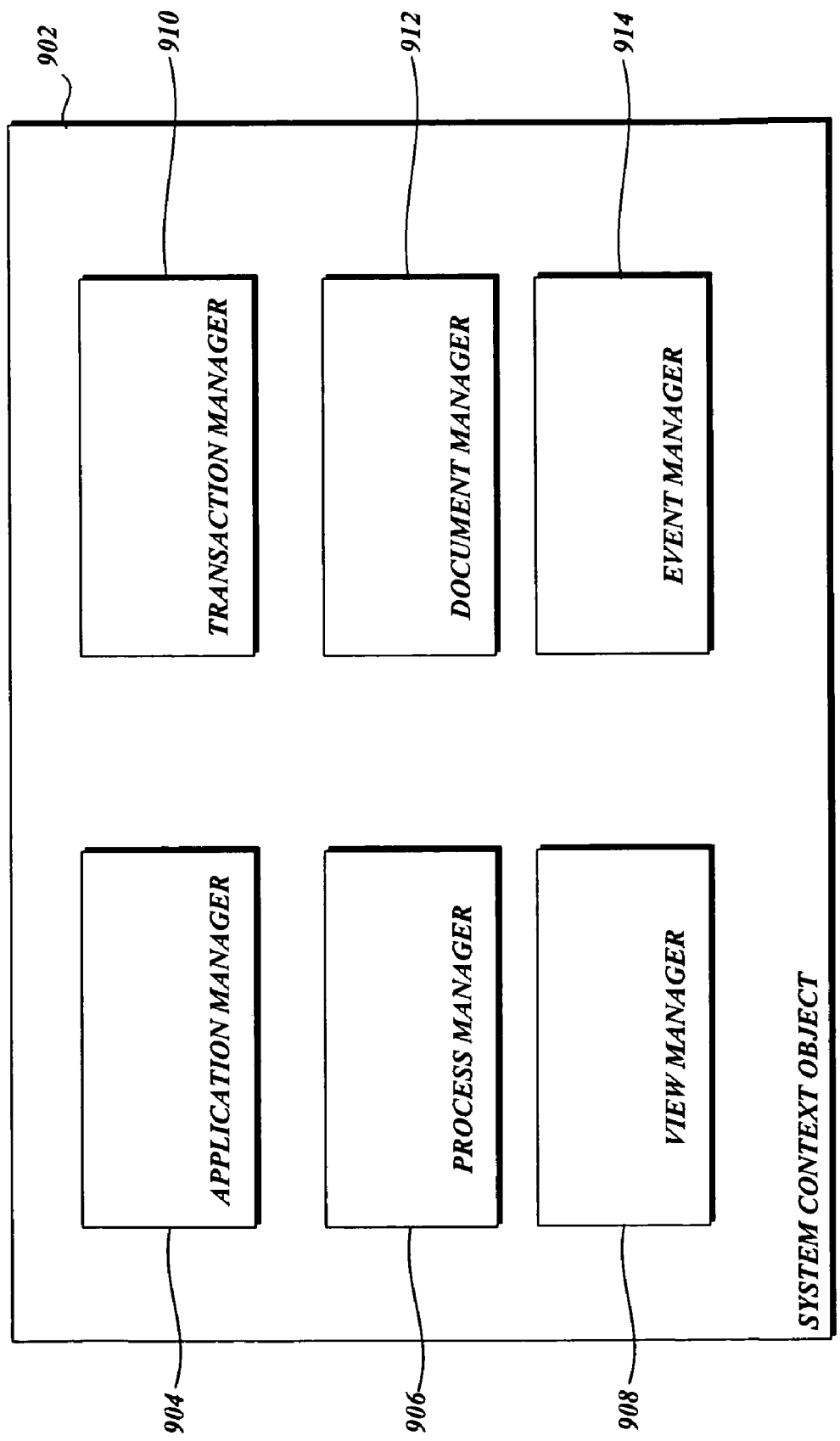
FIG. 9 is a block diagram with exemplary managers configured to implement aspects of the present invention.

As depicted in FIG. 9, the client-side component includes an application manager 904 that provides logic for managing the lifecycle of an application. In this regard, functions are exposed by the application manager 904 for creating, opening, and terminating applications. An application may be represented internally as an application object that "registers" with the application manager 904. When an application is scheduled for execution, the application manager 904 may be called to create a corresponding application object. Accordingly, the application manager 904 creates and holds references to all active applications in the system.

As mentioned previously, attributes of one or more applications may be described semantically by developers in an application package using the application package XML language. The attributes described in the application package include references to resources and system settings that are utilized by a particular application to execute. Resources identified in the application package will typically include the XML documents that provide the semantic description of an application's view and process logic. In one aspect, the application manager 904 is configured to extract information from the appropriate application package and obtain the identified resources when an application is scheduled to execute. Alternatively, any XML data resource, including UI and process XML documents, may be directly embedded into an application package. In another aspect, functionality that allows applications to continue executing when the client goes "offline" is implemented by the application manager 904. In this regard, the appropriate application package may be referenced by the application manager 904 to identify the resources utilized by a corresponding application. Then, any resources that have not yet been cached locally are identified and obtained from the appropriate service provider.

The process manager 906 depicted in FIG. 9 is responsible for creating and holding internal process objects that are used to execute process steps in an application. As mentioned above, application logic written in the process XML language may define a sequence of process steps that each include one or more operations. A process object created and held by the process manager 906 is responsible for looping through and causing one or more low-level constructs or operation handlers to be called. Unlike traditional platforms, the conceptual foundation of the network operating system is based on process-oriented operations that model low-level constructs. Higher-level constructs that, for example, model workflows, product lifecycle management, user collaboration, and the like, are constructed from these low-level constructs. By way of example, the set of operation handlers provided by the present invention that models low-level constructs includes, but is not limited to, an open operation handler, bind operation handler, change operation handler, decision operation handler, and the like. Moreover, an operation API is provided that allows developers to define additional operation handlers. In this way, the XML virtual machine may be extended to support and execute additional low-level constructs. On the other hand, the operations that may be used in an application are limited to those operations either created in accordance with the operation APIs or provided by the present invention. As a result, the ability of users to create malware or otherwise implement malicious functionality is severely restricted since only a limited and well-defined set of operations are available to execute application logic. On one hand, since there are only a limited number of ways to manipulate an XML document, a relatively small number of operations need to be provided. Since XML is a very general language, any application or domain may be described utilizing the language. Accordingly, the process XML language and its corresponding operations provided by the present invention is capable of describing any type of process logic and may be used to describe any type of application.

In accordance with one embodiment, an instance object is provided by the present invention that tracks the "runtime state" of an executing application or instance. Those skilled in the art and others will recognize that the runtime state of an executing application constantly evolves as logic is executed. An instance object tracks and otherwise manages the runtime state of an executing application and supplies context to other objects used to implement the XML virtual machine. Accordingly, instance objects couple operational meaning to the execution of processes and their associated operations. As a result, even though the runtime state of an application instance is constantly changing, operation handlers are provided with data that accounts for these changes. In this way, the present invention supports dynamic execution of application logic using process objects that are stateless. In other words, even though multiple instances of an application may exist, only a single version of the application code is necessary, thereby saving memory.

As depicted in FIG. 9, the client-side component includes a view manager 908 that is responsible for tracking the "views" or user interfaces associated with an executing application. Methods are provided by the view manager 908 for creating an internal view object which is used to render and update an application's user interface. In accordance with the MVC design paradigm, the user interface of an application may be described semantically using the UI XML language. Accordingly, the relationships between components and other graphical attributes of the application's complete user interface may be represented in a UI XML document. View objects instantiated and held by the view manager 908 are utilized in rendering user interfaces that are described semantically in a UI XML document. In one embodiment, the rendering of the user interface may be performed through a series of XML transformations. However, those skilled in the art and others will recognize that a user interface may be rendered without performing XML transformations and the description provided above should be construed as exemplary. In any event, the view manager 908 is configured to create view objects and holds reference to all active views in the system.

As depicted in FIG. 9, the client-side component includes a document manager 912 that is responsible for instantiating and holding reference to document objects. As mentioned previously, XML documents are the data model that serves as a common data source in the network operating system environment. Even application logic, system settings, application states, and the like are represented in XML documents. In one aspect, the document manager 912 is responsible for causing documents to be loaded or cached in memory on a client computer. Accordingly, the document manager 912 may interact with other managers, such as the communication manager (described below), to obtain documents. Documents may be obtained from a remote network location using a communication channel or a channel can be established to access documents maintained on a local hard drive or other non-volatile memory on a client computer. In another aspect, the document manager 912 serves as a client-side cache tracking each document that is loaded into memory on a client computer. When a document is obtained locally, an internal document object that provides a structured object-oriented representation of the document may be instantiated. In this regard, the document manager 912 holds references to all document objects in the system and exposes methods for creating, retrieving, saving, and renaming XML documents, among others.

The event manager 914 visually depicted in FIG. 9 serves as a trigger event bus allowing aspects of the XML virtual machine to execute application logic in response to the activation of a trigger. On one hand, a process object may utilize a notifier object to register a trigger as a listener with the event manager 914. Other objects within the system such as component objects often register themselves directly as listeners to the event manager 914. Among other things, the notifier object receives and stores data that identifies the process step in an application that will be executed in response to the trigger being activated. Moreover, data provided by a notifier object associates the trigger with an originating object (i.e., often a view or component object) where the trigger activation will originate. On the other hand, the event manager 914 allows objects (i.e., view or component objects) to push or otherwise notify registered listeners when a trigger is activated. In this example, the component object will notify and pass data to the event manager 914. In response, the event manager 914 will perform a look-up to identify listeners for the activated event. Then, the appropriate notifier or other listening objects may be alerted and provided with data that allows application execution to proceed to the appropriate process step. As described in further detail below, separate application instances may each use the same set of triggers and notifier objects. Providing an event manager 914 and associated systems that are configured to re-use the same resources in this way both increases performance and minimizes the memory used.

As used herein, a "trigger" refers to the occurrence of a defined triggering event that will cause application code to be executed. Accordingly, in the exemplary process XML document 600 described above with reference to FIG. 6A, the activation of a trigger 602 causes a particular process step defined in the application code to be executed. In contrast to existing systems, triggers implemented by the present invention are not normally activated upon the occurrence of a data update. In other words, other than specifying operations such as a data binding, developers are not required to provide logic for managing input and output from an application user interface to the data model. Instead, data updates are managed by the present invention by a separate data update notification event bus and do not correspond to the activation of a trigger. As described in further detail below, aspects of the present invention provides a separate event bus implemented in the document object that automatically handles propagation of data update events to components and other objects.

The transaction manager 910 also depicted in FIG. 9 provides an interface for creating and propagating transactions used to update the contents of an XML document. Accordingly, when a change to the data model will be performed, this will result in a transaction. In this regard, a transaction represents a relative change and may be represented as an XML data fragment that contains data used to implement or reverse a change to the data model. For example, in the MyTasks application described above with reference to FIG. 6A, the change operation 624 that adds a task to an underlying data XML document may result in the creation of a transaction. The data update reflected in a transaction may be persisted to the data model as well as to any remote listeners. In one embodiment, the transaction manager 910 includes identification and time stamping data when a transaction is created that may be used to "rollback" the data update represented in the transaction as well as identify the order in which transactions are generated.

Now with reference to FIG. 10A, an application initiation routine 1000 will be described that performs processing to open an application package. The application initiation routine 1000 may be performed in response to a user generating a command to launch an application. As mentioned previously, aspects of the present invention may provide a desktop environment in which users launch applications through the selection of a menu item, icon, and the like. In response to receiving this type of command, a data type recognizer within the system context object 902 may be passed a URL that identifies the location of a document associated with an application package, XML document, or binary file. As described in further detail below, the data type recognizer is utilized in numerous ways to identify and associate actions with particular types of documents. In any event, the application initiation routine 1000 may be performed when the data type recognizer determines that a document that corresponds to an application package (e.g., application package XML document) is being opened.

Figure 10A:
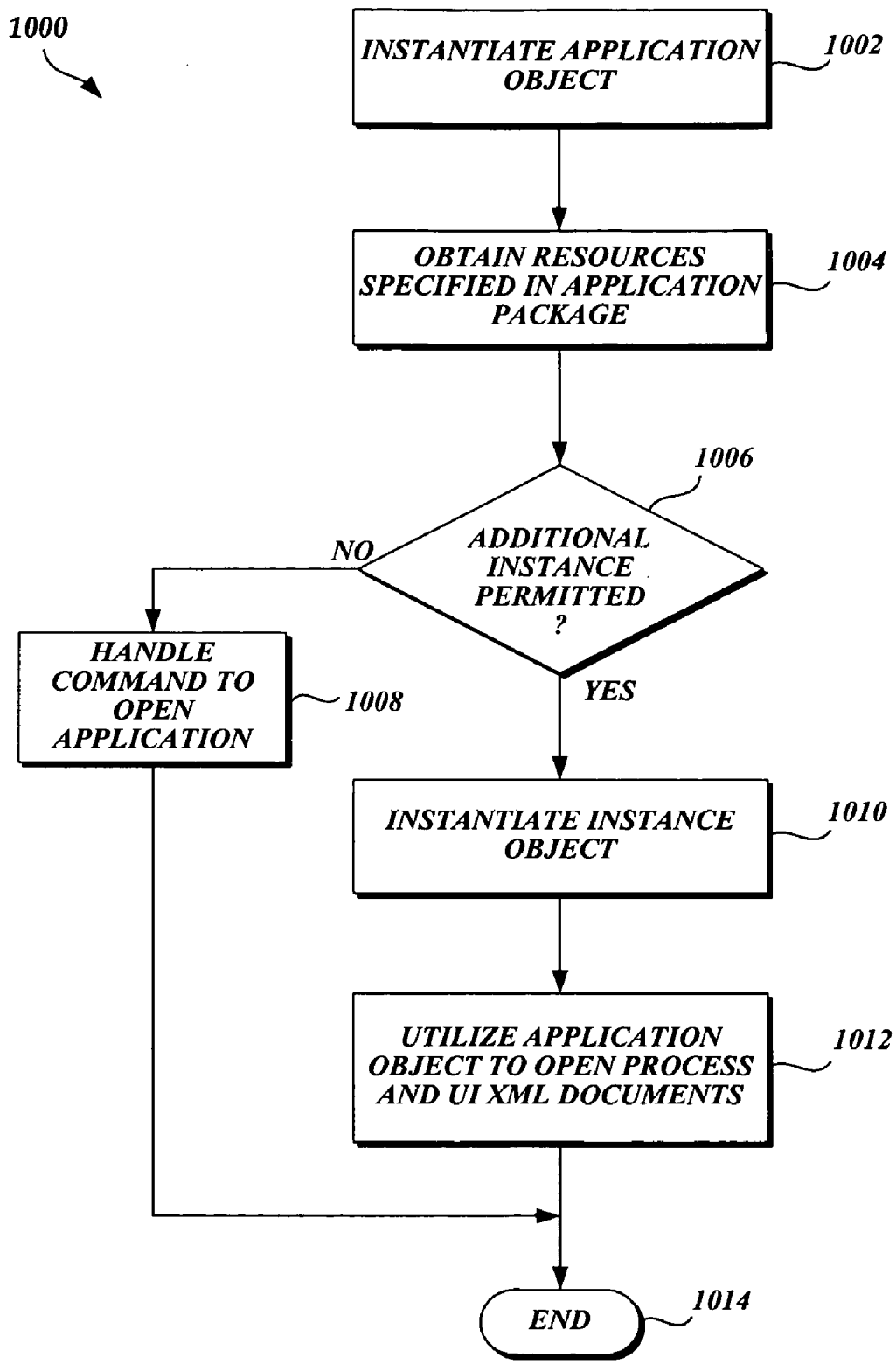
FIGS. 10A-C are diagrams illustrating an exemplary application initiation routine that performs processing to open an application package in accordance with one embodiment of the present invention.

In the application initiation routine 1000 depicted in FIG. 10A, the application manager 904 is utilized to instantiate an application object at block 1002. Multiple application objects that each represent a different application may be instantiated and held by the application manager 904. On this iteration through the application initiation routine 1000, a first application object may be instantiated that, for example, represents a word processing program. On a different iteration through the application initiation routine 1000, a second application object that represents a different program (e.g., an e-mail program) may be instantiated. By controlling the instantiation and access to application objects, process logic associated with one application is unable to access the internal objects (e.g., view objects, instance object, process object, etc.) that are associated with a different application. Accordingly, when executing the process logic of the word processing program, a view object associated with the e-mail application package is inaccessible. As described in further detail below, the use of the application manager 904 to instantiate and hold application objects is part of a larger framework provided by the present invention that insures both intra-application and intra-process security.

At block 1004, the resources of an application being opened as specified in a corresponding application package are obtained. Logic in an application package formed in accordance with the present invention provides the overall blueprint of the resources and settings of an application. Accordingly, an application package XML document may identify process and UI XML documents associated with an application, as well as other application resources such as images, data documents, XSLT documents, among others. Resources utilized by an application, including the application package XML document itself, may be cached in memory on the client or obtained from a service provider utilizing a communication channel (described below). In addition to resource and settings management, the application package XML language allows developers to configure application packages in more advanced ways. By way of example only, conditional logic in an application package XML document may be used to implement a more faulttolerant network service in which resources can be obtained from a failover network location. In the event that a primary network location is unavailable, the application package can identify alternative network locations where the resources may be obtained. However, this is just one example of the way the present invention allows developers to configure an application package using the package XML language.

As further illustrated in FIG. 10A, at decision block 1006, the application initiation routine 1000 determines whether additional runtime instance(s) of the application is permitted. The application package XML language allows developers to establish configurations to limit the number of application instances that may be created. Accordingly, the determination made at block 1006 may be dependent on configurations defined in an application package XML document. If the determination is made, at block 1006, that an additional instance is not permitted, then the application initiation routine 1000 proceeds to block 1008 where the command to launch an application that does not allow an additional instance is handled. In this regard, handling the command at block 1008 may include refreshing an existing runtime instance of the application. In addition or alternatively, handling the command may include informing the user through a dialogue that an additional instance of the application is not permitted. Then, upon handling the command, the application initiation routine 1000 proceeds to block 1014, where it terminates.

On the other hand, if a determination is made at block 1006 that an additional instance of the application is permitted, the application initiation routine 1000 proceeds to block 1010. At block 1010, an instance object is instantiated that tracks and manages the runtime state of the application being launched. When process and view objects are created, aspects of the present invention associate these objects with their corresponding instance. The instance object instantiated at block 1010 maintains structures for tracking process and view objects, aliases, and other runtime variables. Accordingly, process and view objects associated with this application instance will be known to the instance object. Through the controlled instantiation and referencing of objects, a localized relationship hierarchy may be established that delimits the boundary of an application instance. As described in further detail below, this framework associates process and view objects with a corresponding instance and delimits access to these objects from outside the localized relationship hierarchy.

The context provided by the instance object instantiated at block 1010 allows functionality to be implemented relative to an application's runtime state. In one aspect, the instance object instantiates and holds a local expression engine for evaluating expressions encountered in application code being interpreted. A process object may utilize a corresponding instance object and a local expression engine that the instance holds to evaluate expressions. Moreover, the instance object instantiated at block 1010 may be supplied when executing operations in order to couple operational meaning to the execution of process logic.

As further illustrated in FIG. 10A, at block 1012, the application object instantiated at block 1002 is utilized to open and initiate execution of an application's process and view logic. Routines for opening and initiating execution of logic in process and UI XML documents are described below and will not be provided here. Significantly, each time an application associated with an application package is launched, a new instance object will be supplied to track the runtime state of the application. For example, an application object that represents a word processing program will supply a different instance object each time an instance of the word processing application is launched. By utilizing the application object in this way, aspects of the present invention are able to control access to objects that are associated with an executing application. Then, the application initiation routine 1000 proceeds to block 1014, where it terminates.

Figure 10B:
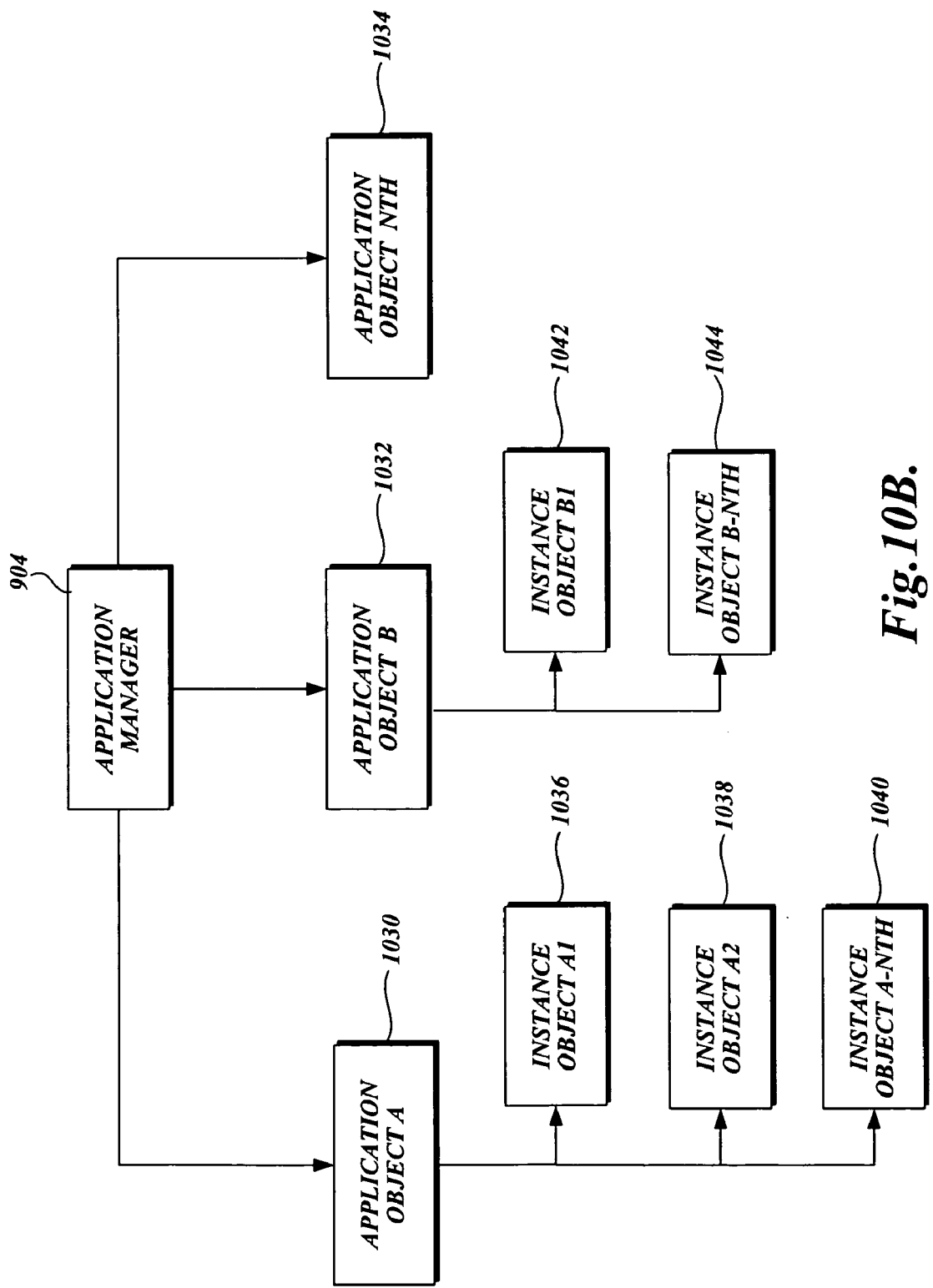

Now with reference to FIG. 10B, the utilization of application objects to encapsulate applications and provide intra-application security will be described in additional detail. When an application from an application package is launched, the application manager 904 instantiates an application object that provides an encapsulated representation of the application. As illustrated in FIG. 10B, the application manager 904 may instantiate the Application Object A 1030, Application Object B 1032, and Application Object Nth 1034. In one embodiment, an application object is utilized to instantiate and hold one or more instance objects. In the example depicted in FIG. 10B, the Application Object A 1030 may instantiate and hold the Instance Object A1 1036, Instance Object A2 1038, and Instance Object A-Nth 1040. Similarly, the Application Object B 1032 may instantiate and hold the Instance Object B1 1042 and the Instance Object B-Nth 1044. In this regard, a unidirectional solid arrow between objects depicted in FIG. 10B indicates that the source object where the arrow originates holds the destination object identified by the arrow pointer. Accordingly, the solid arrow from the application manager 904 to the application objects 1030-1034 indicates that these objects are held by application manager 904. From the illustration in FIG. 10B, the relationship between the application manager 904, application objects 1030-1034, and their corresponding instance objects 1036-1044 is apparent.

The relationship between objects depicted in FIG. 10B illustrate how the present invention is able to ensure intra-application security. Access to application objects is controlled by the application manager 904 which exposes methods for creating, opening, and terminating applications. When an application object is instantiated, the application manager 904 isolates the application object into a separate memory space. By preventing application objects from sharing a memory space, code from one application may not be injected into or otherwise affect the memory space allocated to a different application. Moreover, an application object provides an encapsulated representation of an application in which internal data associated with the application may be hidden. All of the functionality of the application and access to internal data is controlled through the creation of exposed methods. By isolating and encapsulating applications in this way, the internal objects (e.g., view objects, instance object, process object, etc.) associated with one application are rendered inaccessible to a different application. Accordingly, when executing code utilizing the Application Object A 1030, internal objects associated with the Application Object B 1032 may not be accessed. Even though the internal data of an application may not be accessed, data may be shared utilizing the underlying data model. Accordingly, if a user has sufficient access rights, a document may be shared by multiple applications. In other words, the intra-application security framework provided by the present invention does not prevent the authorized sharing of data between applications using the underlying data model.

Figure 10C:
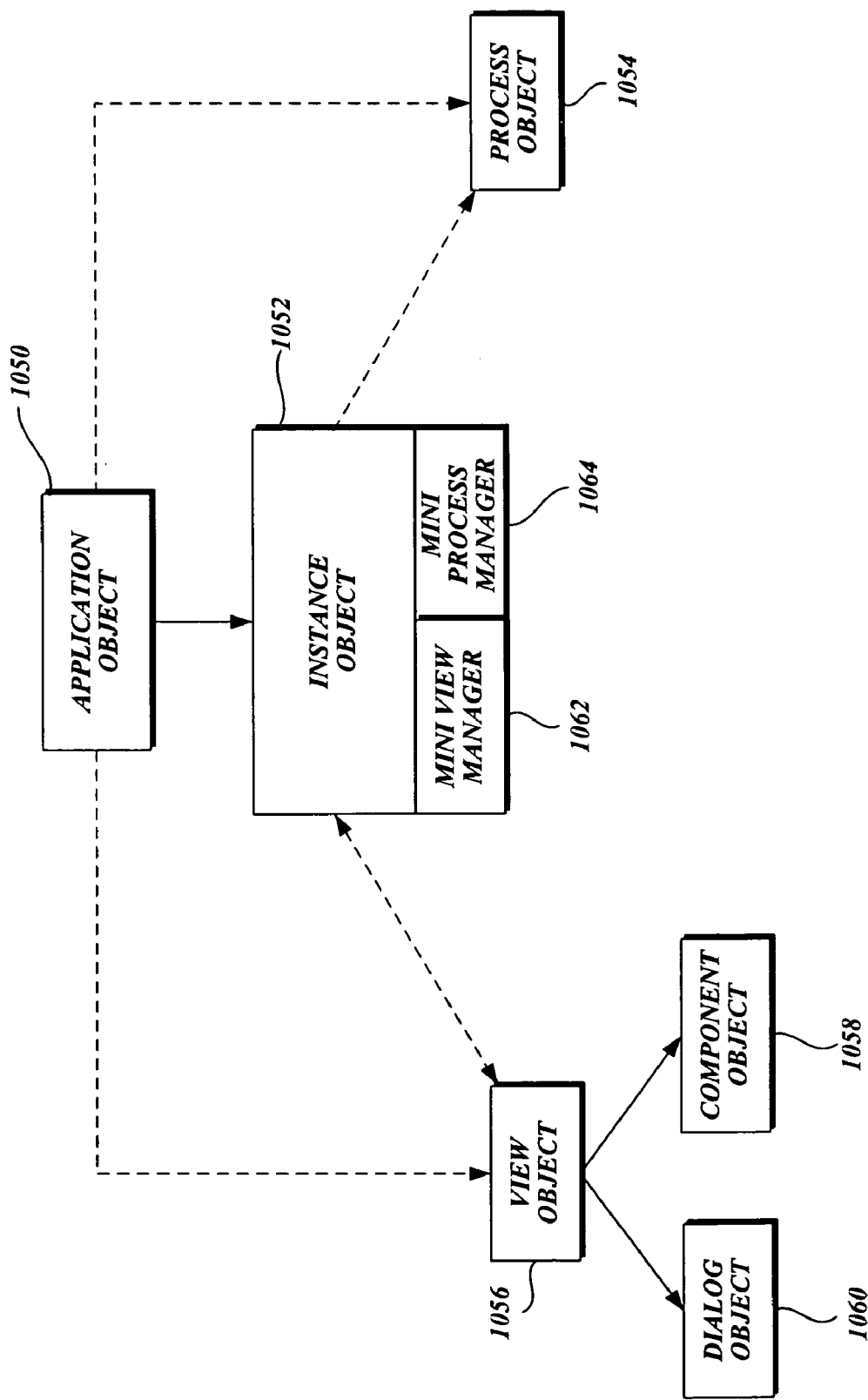

Now with reference to FIG. 10C, the utilization of instance objects to implement a localized relationship hierarchy will be described in additional detail. By defining a localized relationship hierarchy, aspects of the present invention allow multi-instance applications to be securely executed. The illustration in FIG. 10C includes the application object 1050 and instance object 1052. In addition, FIG. 10C depicts a process object 1054, view object 1056, component object 1058, and a dialog object 1060 that are instantiated when an application's process and UI XML documents are opened. In one embodiment, the application object 1050 supplies the instance object 1052 when initiating execution of an application. The dashed unidirectional arrows originating from the application object 1050 to the view object 1056 and process object 1054 indicate that these objects were created within the localized relationship hierarchy that is specific to the supplied instance object 1052. In this regard, the instance object 1052 maintains a MiniView manager 1062 and a MiniProcess manager 1064. When an application's process XML document is opened, the instance object 1052 is provided with a reference to the resulting process object 1054 that is tracked using the MiniProcess manager 1064. Similarly, the view object 1056 that results when an application view is opened is supplied to the instance object 1052 and held by the MiniView manager 1062. Accordingly, the updates to the MiniProcess manager 1064 and MiniView manager 1062 allow the instance object 1052 to track and identify objects that are associated with a particular application instance.

Throughout the code that describes the logic of an application, developers may utilize globally-named objects to define the application's logic. These globally-named objects may be referenced in accordance with an expression language provided by the present invention. However, global names assigned to objects in application code may reference runtime objects that belong to different instances. For example, the following expression may be used in application code to reference the view object 1056: "#MyTasks." In addition, the following expression may be used to reference a component object (e.g., Button) that is created within the context of the aforementioned view object 1056: "#MyTasks#button1." To avoid ambiguity and enforce security, aspects of the present invention implement functionality that allows globally-named objects encountered in application code to be evaluated relative to the appropriate instance. In this regard, the evaluation of globally-named objects is performed without creating duplicate process or UI XML documents. Instead, an application's process and UI documents are shared and used to build the runtime objects for multiple application instances. As will be clear in the description that follows, the implementation of a localized relationship hierarchy provides a basis for identifying and/or supplying the appropriate instance when expressions are evaluated and accessing the appropriate view object within the instance.

In the example depicted in FIG. 10C, a bidirectional arrow is depicted between the instance object 1052 and the view object 1056. On one hand, the bidirectional arrow indicates that the instance object 1052 is aware that the view object 1056 is associated with this particular application instance. Upon being instantiated, the view object 1056 may be supplied to the instance object 1052 and held by the MiniView manager 1062. On the other hand, an identifier for the instance object 1052 is supplied when an application view is created so that the view object 1056 is aware of its associated instance. As a result, the appropriate instance may be identified when input is received that will cause a data update or application logic to be executed. For example, the component object 1058 may be instantiated when the view object 1056 is used to open an application view. Since the component object 1058 is created within the context of an application view, it may communicate with the view object 1056. As a result, the component object 1058 may identify the appropriate instance object 1052 when, for example, a user provides input that will cause application code to be executed.

In the example depicted in FIG. 10C, a unidirectional arrow is depicted between the instance object 1052 and the process object 1054. In one embodiment, the process steps in an application are executed using the process object 1052. Through the utilization and updating of the MiniProcess manager 1064, the instance object 1052 is aware of its associated process object 1054. However, process objects provided by the present invention are stateless between execution of process steps. As a result, process objects are supplied with the context from a single instance object 1052. In other words, the process object 1052 is not aware of an associated instance object 1052 between execution of process steps. However, the process object 1054 may utilize the services of an expression engine (described below) that is held by a supplied instance object 1052. The localized relationship hierarchy depicted in FIG. 10C and the associated description illustrates how the present invention is able to ensure intra-process security while still supporting multi-instance applications. When iterating through the operations in a process step, the process object 1054 may only be supplied context from one instance object 1052. This framework in which relationships are established, so that the process object 1054 is supplied context from a single instance object 1052, allows a strict separation between objects associated with different instances. Accordingly, when executing application code, the process object 1054 is not able to access objects that are in the localized relationship hierarchy of a different instance.

Aspects of the present invention are able to create sub-instances within a localized relationship hierarchy established by a parent instance. In this embodiment, the sub-instance and its resulting sub-view object and sub-process objects are created within a localized relationship hierarchy of the parent instance. The localized relationship hierarchy delineated by the sub-instance is visible to objects created within the relationship hierarchy of the parent instance. However, runtime objects that are created within the sub-instance are not aware of objects associated with the parent instance or other sub-instances. This ability to nest sub-instances within a parent instance offers great flexibility to application developers in building more modular code as well as the ability to utilize different scopes.

Now with reference to FIG. 11, a process initiation routine 1100 for opening and initiating execution of logic defined in an application's process code will be described. The process initiation routine 1100 may be performed when a call to open a document that contains process logic is generated. In one embodiment, calls to open a file may be issued to the data type recognizer that receives a URL from a calling object. The URL passed to the data type recognizer may correspond to any type of document including, but not limited to, an application package XML document, process XML document, or UI XML document. When opening a document that contains process logic, the data type recognizer may cause particular actions to be performed that facilitate application execution. In the exemplary embodiment depicted in FIG. 11, the data type recognizer determines that the supplied document is a process XML document and causes actions that are specific to this file type to be performed.

Figure 11:
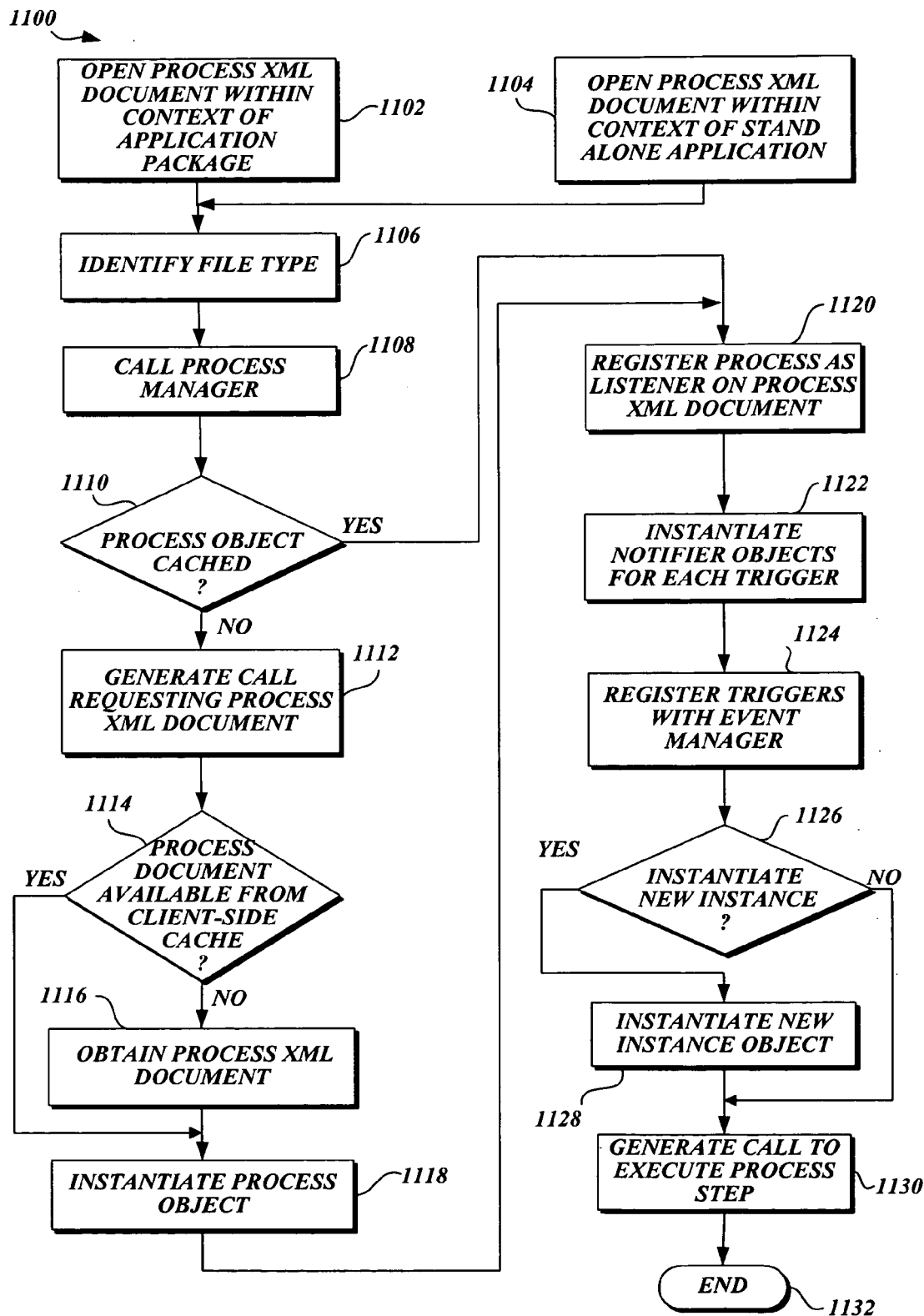
FIG. 11 is an exemplary flow diagram that illustrates a routine for opening and initiating execution of logic defined in an application's process code.

The process initiation routine 1100 depicted in FIG. 11 illustrates two exemplary circumstances in which a process XML document may be opened. However, the examples provided below should be construed as exemplary as process XML documents may be opened in other circumstances without departing from the scope of the claimed subject matter. As illustrated in FIG. 11, the process initiation routine 1100 begins either at block 1102 or block 1104. In an exemplary embodiment, the routine 1100 begins at block 1102 where the data type recognizer receives a call to open a process XML document that is associated with an application package. In this embodiment, an application object supplies a previously created instance object in the call received at block 1102. As described in further detail below, the process initiation routine 1100 will instantiate a process object in anticipation of executing process steps defined in the process XML document. A reference to this process object may later be provided to the corresponding instance that is supplied in the call received at block 1102.

In an alternative embodiment, the process initiation routine 1100 begins at block 1104 where the data type recognizer receives a call to open a process XML document that represents a stand-alone application. Applications are not required to be associated with an application package. In this embodiment, the data type recognizer does not receive a supplied instance at block 1104 in the call to open the process XML document. Applications that are configured to be stand-alone in this way do not support multiple instances of execution and allow applications to share at least some memory space.

At block 1106, processing is performed by the data type recognizer to identify the file-type of the document that will be opened. In this example, the analysis performed by the data type recognizer will determine that the document associated with the received call is a process XML document. As mentioned previously, the data type recognizer may associate actions with a particular file type. Upon encountering a request to open a process XML document, the data type recognizer is configured to call the process manager 906, at block 1108, indicating that request to open a process XML document has been received.

At decision block 1110, logic within the process manager 906 determines whether a process object for this process XML document is cached in memory. In one aspect, the process initiation routine 1100 is responsible for instantiating a new process object when an application is initially launched. Once instantiated, logic is implemented by the process initiation routine 1100 that enables the newly instantiated process object to execute a process step. Since the process object is stateless, it may be reused. As such, the same process object may be used to execute application code from the same instance of an application package or other processes embedded in the process XML document. Accordingly, the process object instantiated when an application is launched may be cached in memory by the process manager 906. If the process manager 906 previously instantiated a process object for this application that is still in memory, the result of the test performed at block 1110 is "yes," and the process initiation routine 1100 proceeds to block 1120, described in further detail below. Conversely, if a determination is made that a new process object will be instantiated, the process initiation routine 1100 proceeds to block 1112. Before the new process object is instantiated, the process XML document being opened should be available locally. To this end, the process manager 904 generates a call that is routed through the document manager 912 to obtain the appropriate process XML document at block 1112.

At block 1114, a determination is made regarding whether the process XML document being requested by the process manager 904 is loaded into memory of the client computing device. As mentioned previously, the document manager 912 serves as a client-side cache, tracking each document that is loaded in memory on the client. If a determination is made that the process XML document being opened is referenced in the client-side cache maintained by the document manager 912, then the process initiation routine 1100 proceeds to block 1118, described in further detail below. Conversely, if the requested process XML document is not loaded in the client-side cache, the process initiation routine 1100 proceeds to block 1116, where the document manager 912 causes the requested process XML document to be obtained from a service provider. More specifically, at block 1116, the document manager 912 utilizes the communication manager (described below) to request that the appropriate process XML document be obtained from a network location identified by a supplied URL.

Once the process XML document is available from the client-side cache, a new process object is instantiated at block 1118. Specifically, logic within the process manager 904 is utilized to instantiate a new process object in anticipation of executing application code. Then, the new process object is registered at block 1120 as a listener on its corresponding process XML document. As described in further detail below, by registering as a listener on a document in the data model, an object may be notified and take certain action when a specified data update to the document is performed.

At block 1122, notifier objects are instantiated for each trigger in the application. Specifically, parsing may be performed to identify the trigger elements defined in the process XML document being opened. By way of example, the MyTasks application defines a trigger 602 (FIG. 6A) that would result in a notifier object being instantiated at block 1122. Triggers may be defined as elements in a process XML document with each trigger including the view, component, event, and step attributes. The value assigned to the view and component attributes identifies the application view and/or component where the trigger will be activated. Similarly, the value assigned to the event attribute identifies the type of event that will activate the trigger. Moreover, the value assigned to the step attribute identifies the process step in the application's process code where execution will be directed in response to the trigger. For each trigger in an application, logic within the process manager 906 instantiates a notifier object and caches data in the notifier object that may be subsequently used to execute a particular process step.

As further illustrated in FIG. 11, each trigger defined in an application is registered with the event manager 914 at block 1124. In one embodiment, the event manager 914 maintains an internal hash data structure that associates a set of trigger data with listening notifier objects. Accordingly, triggers may be registered by updating the hash data structure maintained by the event manager 914. As described in further detail below, the event manager 914 notifies the appropriate listening objects and notifier objects when an event that matches a registered event for a component and event type occurs.

As further illustrated at FIG. 11, a determination is made at block 1126 regarding whether a new instance will be instantiated. When opening a process XML document, the instance may be supplied. Specifically, the application initiation routine 1000 described above may instantiate and supply the instance when opening a process XML document. Also, instances may be supplied in other circumstances in order to support modular application development and for different processes to share context. In these embodiments, a new instance will not be instantiated, and the process initiation routine 1100 proceeds to block 1130, described in further detail below. Conversely, if an instance object was not supplied, the process initiation routine 1100 proceeds to block 1128, where an instance object is instantiated. Specifically, logic within the process manager 906 generates a call to instantiate the new instance object at block 1128.

At block 1130, a call to execute a process step defined in a process XML document is generated. In an actual embodiment, a process object is configured to cause a process step to be executed based on two received parameters: (1) a supplied instance representing the runtime state of an application; and (2) the identifier of the process step that will be executed. In this regard, the instance that is supplied to the process object may be created within the context of an application package or a stand-alone application. In either embodiment, the process initiation routine 1100 is configured to provide a process object with parameters that allow the process object to be re-used for multiple instances in executing each process step defined in the process XML document. Then, the process initiation routine 1100 proceeds to block 1132, where it terminates.

When a process step will be executed, flow of control is directed to an execute method encoded within a process object. Generally described, the execute method loops through and causes each operation defined in a process step to be executed. In other words, the execute method is the interface to the process operations developed in accordance with the process operation API. As such, the execute method could be called by the process initiation routine 1100 in order to execute process step "1" defined in the MyTasks application. In response, the execute method would perform processing that causes the Open, Bind, and Action operations 612-616 within this process step 604 to be executed.

Now, with reference to FIGS. 12A-B, an execute method 1200 will be described that is configured to cause operations in a process step to be executed. As illustrated in FIG. 12A, the execute method 1200 begins at block 1202 where a new operation within a process step is identified. In one embodiment, operations within a process step are typically identified and executed sequentially. Upon encountering a new operation, an expression provided in the value attribute of the operation is selected for evaluation at block 1203. For example, in the MyTasks application described above, the MyTasks document 600 (FIG. 6A) defines an Initialize Application process step 604. Within this process step 604, the first operation is an Open operation 612 having a value attribute "apps/mytasks_gui.xml." On this iteration through the execute method 1200, the expression "apps/mytasks_gui.xml" would be selected for evaluation at block 1203.

The descriptions made with reference to FIG. 12 provides examples in which operations within a process step are executed sequentially. However, aspects of the present invention support asynchronous execution of operations so that each operation in a process step may not be executed sequentially. For example, if a first operation requested a resource that is only available from a remote network location, other operations (that are not dependent on the results of the first operation) may be executed while the resource is obtained asynchronously.

As further illustrated in FIG. 12A, the expression selected for evaluation at block 1203 is evaluated into an XBind at block 1204. As used herein, an XBind is a data type that comprises a URL, base path (e.g., an XPath expression that references an XML fragment within the document identified by the specified URL), and a selection (e.g., a plurality of XPath expressions). In the exemplary Open operation 612 defined in the MyTasks application, the "apps/mytasks_gui.xml" expression would be evaluated into the following XBind, at block 1204:

URL=apps/mytasks_gui.xml
Base path=/
Selection=

The URL of this XBind references the UI XML document that provides the semantic description of the application's user interface. While the examples provided herein utilize a URL as the format for identifying resources this should be construed as exemplary. Any system that is capable of uniquely identifying a resource may be implemented in conjunction with the present invention. As described in further detail below, the network operating system provides protocols and abstractions for accessing an XML file system, databases, and XML web services using URLs. However, it is contemplated that other protocols could be used to identify resource locations other than URLs. The base path of the above XBind is "/" which references the root element of the UI XML document identified in the URL. When opening an application view, the base path could reference a fragment within a UI XML document. In this instance, the semantic description of the view logic is not associated with the root node of the UI XML document. Accordingly, the XBind for this variation would include a base path referencing the node that corresponds to the view logic. The selection for this exemplary XBind is "null" as it does not contain data. Once the expression has been evaluated, the execute method 1200 proceeds to block 1206, described in further detail below.

With reference now to FIG. 12B, an interchange that occurs when an expression is evaluated will be described. The illustration in FIG. 12B includes a set of objects that include the instance object 1250, the process object 1252, and the view object 1254. Similar to the description provided above with reference to FIG. 10C, the dashed arrows depicted in FIG. 12B indicate that the process and view objects 1252-1254 were previously associated with the localized relationship hierarchy that is specific to the instance object 1250. Within the execute method 1200, the process object 1252 may utilize the instance object 1250 to evaluate an encountered expression. Since the instance object 1250 is supplied when execution of a process step is initiated, the process object 1252 may utilize the instance object 1250 within the process step in order to have the expression evaluated by the expression engine 1260.

In one embodiment, the present invention implements an expression engine 1260 configured to evaluate expressions within the context provided by the instance. Specifically, functionality encapsulated in the expression engine 1260 may be used within the context of the instance object 1250 to evaluate the expression 1262 into the XBind 1264, XML formatted data, or plain text. Once evaluated, the XBind 1264 identified by the expression engine 1260 may be passed from the instance object 1250 to the process object 1252. By utilizing the instance object 1250 to instantiate and hold the local expression engine 1260, evaluation of expressions is readily performed relative to the context supplied by the instance or any sub-instance. Among other things, utilizing a local expression engine 1260 in this way allows instance and scope handling to be performed within a multiple chained scope depth. Accordingly, expressions may be evaluated differently, depending on the application instance that is executing, and developers are not required to account for the complexity of managing multiple instances or scopes. Additional descriptions of the functionalities implemented within the expression engine 1260 and the types of expressions that may be evaluated by the present invention will be described in further detail below. In this regard, the expression engine 1260 may be used to evaluate multiple expressions defined within an operation. Each of these expressions within the operation is evaluated before an operation handler is called, as described in further detail below.

With reference again to FIG. 12A, the execute method 1200 initiates execution of the appropriate operation handler at block 1206. As mentioned previously, a plurality of operation handlers are provided by the present invention. Each operation handler implements functionality specific to the type of operation that may be encountered. Accordingly, if the current operation is an open operation, then the execute method 1200 calls an open operation handler at block 1206. However, other operation handlers are implemented (Bind, Decision, Action, Change, etc.) that may be called within the execute method 1200. Accordingly, the execute method 1200 is configured to pass arguments that are appropriate for the particular operation handler being called using a well-defined process operation APIs, which will be discussed in the examples below. However, each operation handler is supplied with at least instance and process objects and an evaluated XBind when called.

At decision block 1208, the execute method 1200 determines whether additional operations in a process step will be executed. Accordingly, if all of the operations in the current process step were not previously executed, the execute method 1200 proceeds back to block 1202, and blocks 1202-1208 repeat until each operation has been executed. Significantly, a process step may include a statement that directs the flow of application execution. For example, a "call" statement may be defined as a statement in a process step that directs the flow of execution to a different process step once all of the operations in the current process step have been executed. More generally, a "call" operation is provided that allows developers to direct the flow of execution between operations of one process step to a different process step. When a "call" operation is defined, flow proceeds to the new process step and, upon completion, returns to a location within the originating process step. In an actual embodiment, asynchronous calls, time delay calls and time repeated interval calls may be generated using the "call" operation. Then, once all of the operations have been executed, the execute method 1200 proceeds to block 1210, where it terminates.

As mentioned above, the execute method 1200 initiates execution of particular operation handlers when interpreting application logic. With continuing reference to the MyTasks application described above, the functionality implemented by particular operation handlers will be described. Since an operation handler implements a state change, all data that an operation handler utilizes is supplied. Moreover, aspects of the present invention are configured so that operation handlers do not return data. As such, operation handlers may be implemented as stand-alone functions that are supplied with everything used to execute without returning data. Accordingly, process operations in an application may be executed locally. However, since operation handlers are stand-alone functions, they may be provided as a Web service, from a server-side data center.

Now with reference to FIG. 13, an exemplary open handling routine 1300 that utilizes an open operation handler will be described. In the exemplary MyTasks application described above (FIG. 6A), the application defines an Open operation 612 having a value attribute that may be evaluated to an XBind within the execute method 1200 (FIG. 12A). Accordingly, an open operation handler may be called to execute the open operation 612. In one embodiment, arguments may be passed in the call to the open operation handler that include a previously evaluated XBind and the appropriate instance and process objects.

Figure 13:
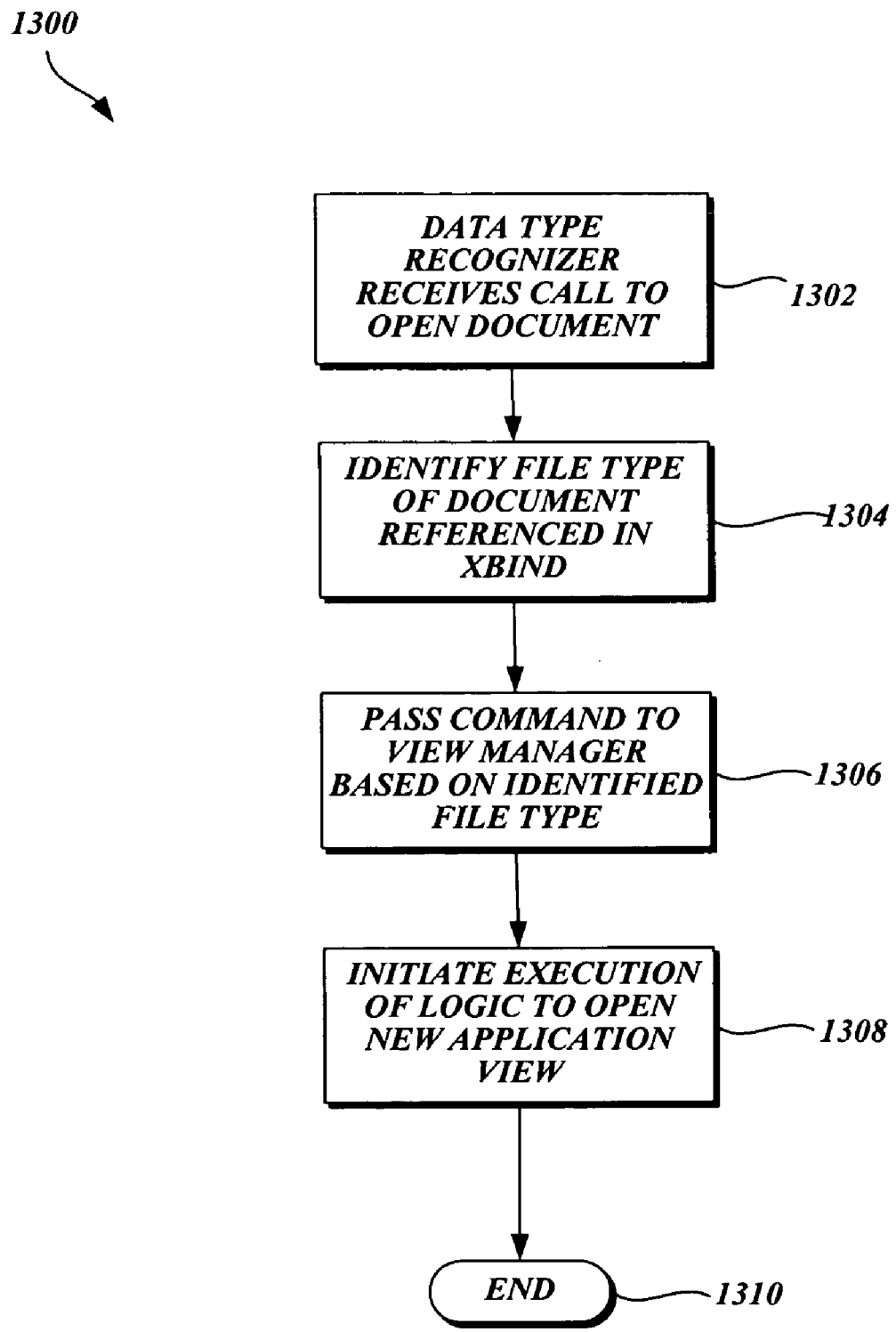
FIG. 13 is a diagram of an open handling routine that opens an XML document in accordance with one embodiment of the present invention.

As illustrated in FIG. 13, at block 1302, the data type recognizer is called within the open operation handler to open a document. As mentioned above, a previously evaluated XBind may point to a document or fragment (node) within a document that is being opened. Among other things, the open operation handler passes this previously evaluated XBind that identifies the document being opened in the call to the data type recognizer. Upon receiving the call, the data type recognizer performs processing at block 1304 to identify the file type of the document referenced in the received XBind. In the exemplary MyTasks application, the XBind passed to the data type recognizer references the document entitled "MyTasks_gui.xml." In this example, the data type recognizer would identify the file type as being an UI XML document. As mentioned previously, logic is provided within the data type recognizer that associates actions with particular file types. An exemplary set of actions initiated when the data type recognizer is utilized to open a UI XML document are described below.

At block 1306 of the open handling routine 1300, the data type recognizer passes a command to the view manager 908 indicating that a request to open an UI XML document has been received. Specifically, the view manager 908 is called to create a view object that will be used to render a new user interface or application view. As mentioned previously, the user interface of an application may be described semantically in an UI XML document (e.g., "MyTasks_gui.xml"). In this regard, multiple view objects may be associated with each application instance. Accordingly, in the call to the view manager 908, the identifier of the appropriate instance and the UI XML document that describes the new view may be supplied by the data type recognizer.

As further illustrated in FIG. 13 at block 1308, execution of logic that provides the semantic description of a new application view is initiated. As mentioned previously, the view manager 908 is responsible for instantiating a view object and performing tasks that allow an application view described in a UI XML document to be rendered. To render a new application view, component and dialog objects are instantiated utilizing a view object. As described in further detail below with reference to FIG. 23, these objects provided by the present invention implement functionality that allow graphical elements described semantically in a UI XML document to be rendered on a computer display. Then, the open handling routine 1300 proceeds to block 1310, where it terminates.

Figure 14A:
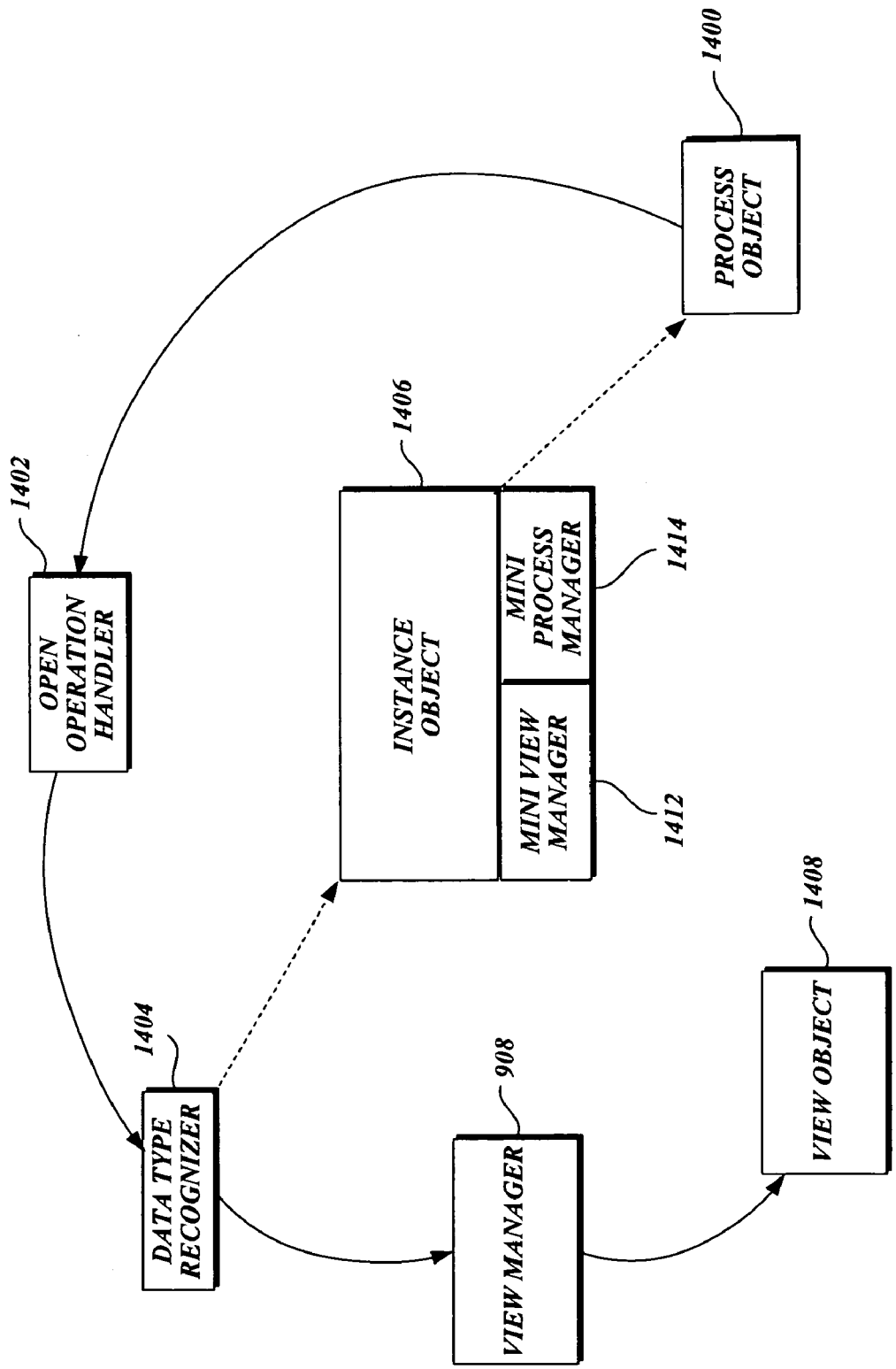
FIGS. 14A-14B are diagrams depicting the interactions between objects that are suitable for illustrating aspects of the present invention.
Figure 14B:
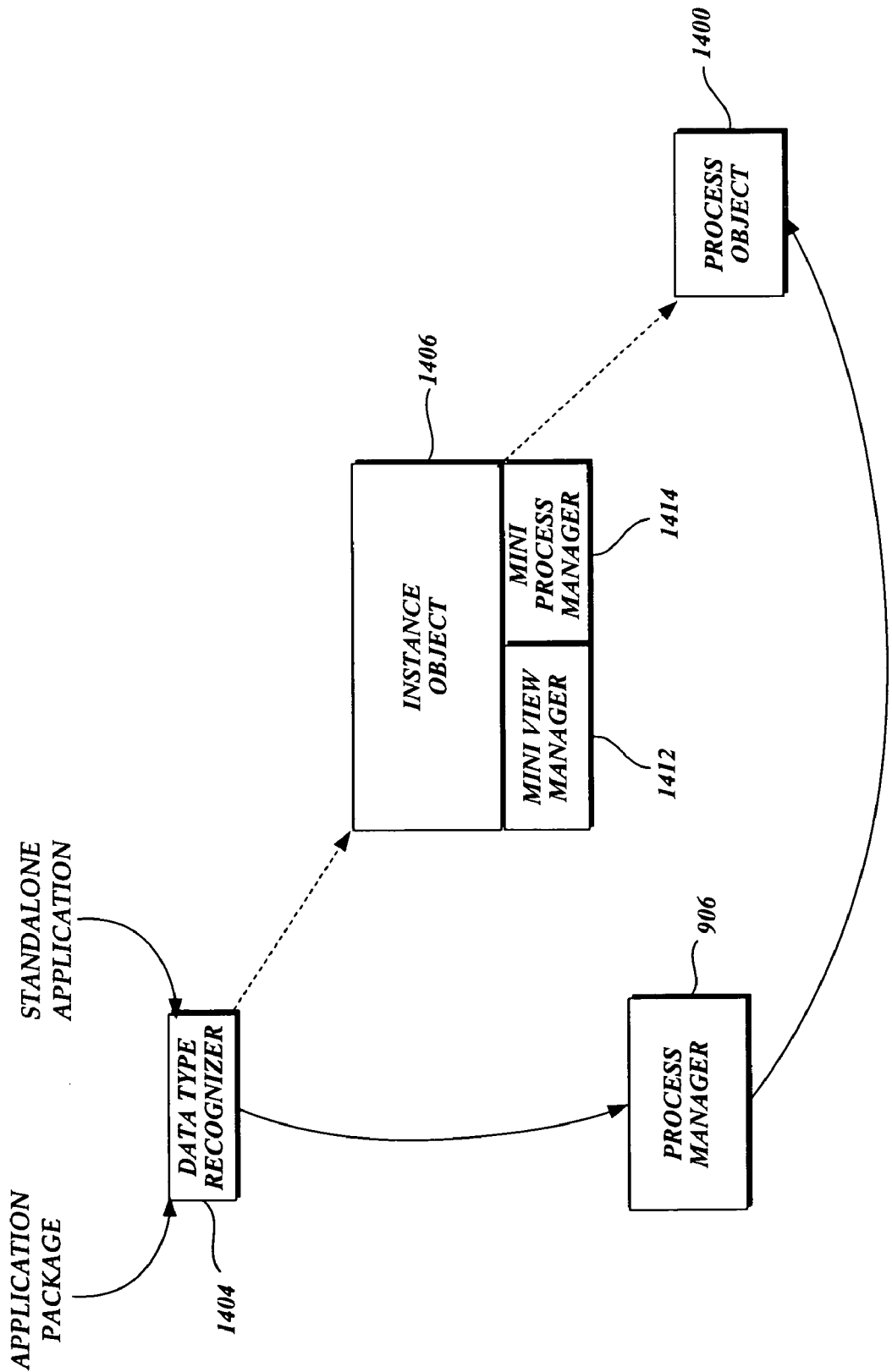

Now with reference to FIGS. 14A-14B, the utilization of a data type recognizer in opening process and UI XML documents will be described in additional detail. The illustration in FIG. 14A depicts the process object 1400, open operation handler 1402, data type recognizer 1404, instance object 1406, view manager 908, and the view object 1408 that interact when an UI XML document is opened. Accordingly, the block diagram depicted in FIG. 14A may correspond to the objects that are utilized by the open operation handling routine 1300 described above with reference to FIG. 13. The opening of an application view may be initiated by the process object 1400, which calls the open operation handler 1402 to open a particular document identified by an evaluated XBind. Upon receiving the call, the open operation handler 1402 utilizes the data-type recognizer 1404 to identify a file type and cause the appropriate actions to be performed. In the embodiment when a UI XML document is passed from the open operation handler 1402 to the data type recognizer 1404, actions are defined that facilitate opening and initiating execution of an application's view logic. Moreover, the data type recognizer 1404 is utilized to associate the resulting view object 1408 with the appropriate instance object 1406.

In the example depicted in FIG. 14A, the view manager 908 is called by the data type recognizer 1404 when a call to open a UI XML document is received. In order to open and execute logic in an UI XML document, the view manager 908 instantiates and supplies the view object 1408 an identifier of the instance object 1406 and an XBind referencing the appropriate UI XML document. By passing data in this way, the view object 1408 becomes aware of its associated instance.

Once the view object 1408 is instantiated, execution of logic that provides the semantic description of the new application view is initiated utilizing functionality that is similar to the process initiation routine 1100 (FIG. 11) described above. Specifically, the view manager 908 may cause the appropriate UI XML to be loaded into the client-side cache. Then, the view object 1408 may be instantiated and used to render an application's user interface components and dialogs. However, unlike processes, multiple view objects may be instantiated and associated with the same instance.

In an actual embodiment, aspects of the present invention support lazy loading and/or rendering of an applications' UI logic. To this end, XLinks implemented in accordance with a standard defined by the World Wide Web Consortium may be utilized to perform lazy loading and/or rendering of one or more UI XML documents. Those skilled in the art and others will recognize that an XLink may be included in an XML document that describes a link between different XML resources. Unlike traditional HTML-based hyperlinks that provide meaning to users in linking Web pages, XLinks are more readily interpreted by software systems and computers. Significantly, XLinks may contain logic that defines the conditions that will activate the XLink as well as the actions to be taken upon the activation. As a result, XLinks are well-suited for performing on-demand and/or lazy rendering of an applications UI logic. Instead of loading all of an applications' UI logic when an the application is launched, XLinks may be defined for linking to the appropriate XML resource on demand. For example, in the exemplary MyTasks application described above, the Button2 component 704 is "hidden" after all of the applications' user interface logic is loaded and rendered. Equivalent functionality and improved performance may be achieved by using an XLink to load and/or render the UI logic of the Button2 component 704 when needed. In this example, the user interface logic associated with the Button2 component 704 in the MyTasks_gui.xml document 650 may include an XLink that references a local or remote resource (e.g., another UI XML document) that defines the relevant user interface logic. When dictated by application logic, this XLink may be used to load and/or render the UI logic corresponding to the Button2 component 704.

Once the open operation handler 1402 completes, the resulting view object 1408 is returned to the data type recognizer 1404. Then, the data type recognizer 1404 associates the view object 1408 with the appropriate instance. Specifically, when a new application view is created, the data type recognizer 1404 passes the resulting view object 1408 to the instance object 1406. In response, the MiniView manager 1412 is updated, thereby associating the view object 1408 with a corresponding instance. A more complex name is assigned to the view object 1408 within the View manager 908 than is allocated to the same object by the MiniView manager 1412. Specifically, the name assigned to the view object 1408 within the View manager 908 includes the identifier of the corresponding instance object 1406. As described in further detail below, by implementing a system for naming objects in this way, the same view may be differentiated between multiple application instances. By controlling the passing of data in this way, aspects of the present invention implement localized relationship hierarchies that delimit the bounds of an application instance.

Now with reference to FIG. 14B, the utilization of the data type recognizer 1404 in opening a process XML document will be described in additional detail. Similar to FIG. 14A, the illustration in FIG. 14B depicts the process object 1400, data type recognizer 1404, instance object 1406, as well as the process manager 906. Accordingly, the block diagram depicted in FIG. 14B may correspond to the objects utilized by the process initialization routine 1100 (FIG. 11). When a process XML document is opened, the data type recognizer 1404 is utilized either in the context of an application package or stand-alone application to identify the file type of the document. In this example, the data type recognizer 1404 defines actions that facilitate opening and initiating execution of logic described in the process XML document. Specifically, flow of execution proceeds from the data type recognizer 1404 to the process manager 906 which instantiates the process object 1400. Once a process XML document has been opened, a reference to the resulting process object 1400 may be returned to the data type recognizer 1404. Then, the data type recognizer 1404 supplies the instance object 1406 with a reference to the resulting process object 1400. In response, the MiniProcess manager 1414 is updated, thereby associating the process object 1400 with a corresponding instance.

With reference to FIGS. 15A-B, an action operation that provides an example regarding the use of the MiniView manager in facilitating process execution will be described. Once the Open operation 612 in the MyTasks application has been executed, flow of execution proceeds to the Action operation 614 (FIG. 6A). In this regard, an action handling routine 1500 will be described with reference to FIGS. 15A-B which illustrates both the logic as well as the interactions between objects involved in implementing the routine 1500.

As illustrated in FIG. 15A, the expression represented in the value attribute of the Action operation 614 is evaluated into an XBind, at block 1502. In the exemplary MyTasks application, the Action operation 614 contains a value attribute of "#MyTasks" which would be evaluated into an XBind at block 1502. With specific reference now to FIG. 15B, functionality encapsulated in the expression engine 1550 may be used by the instance object 1552 to evaluate the "#MyTasks" expression into an XBind. In this example, the expression engine 1550 is configured to perform a lookup in the MiniView manager 1554 for the view object that is named "MyTasks." When a new application view is created, the resulting view object is passed to a corresponding instance which updates the MiniView manager 1554 accordingly. In this regard, the MyTasks view object is assigned a straightforward name within the MiniView manager 1554 held by the instance than the more complex identifier used for the views in the global View Manager 908. The more complex name is not needed within the instance, since the complex name is used to differentiate the views belonging to different instances and applications. This information is something the instance and its MiniView Manager 1554 already knows, since the MiniView Manager 1554 holds its own views. By providing this architecture, the expression engine 1550, with the assistance of the MiniView Manager 1554, is able to differentiate between views that are associated with different instances and applications. Therefore, in the exemplary MyTasks application, the MiniView manager 1554 would include a view object named "MyTasks." The view object would also include a reference for the instance in which this view object is associated. In evaluating the "#MyTasks" expression, the expression engine 1550 would identify the MyTasks view object 1558 as the source or "emitter" of the operation. Specifically, the MyTasks view object 1558 associated with the instance object 1552 is identified as the emitter and not a "MyTasks" view object associated with a different instance. Since the expression engine 1550 evaluates expressions relative to the instance, the correct MyTasks view object 1558 that was the source of the event is identified utilizing the MiniView manager 1554.

In this example, the XBind returned to the process object 1556 would include the URL referencing the MyTasks_gui.xml document 650 and the MyTasks view object 1558. An indicator would be included with the XBind that the MyTasks view object 1558 is the emitter or source of the operation being executed. In cases when the lookup in the MiniView manager 1554 does not identify a match to the object referenced in the expression, the expression engine 1550 is configured to perform a lookup in the view manager 908 to obtain the relevant view object.

At block 1504 of the routine 1500, the process object 1556 initiates execution of the action operation handler 1560. In the exemplary MyTasks application, the XBind previously evaluated using the expression engine 1550 and the emitting MyTasks view object 1558 are passed by the process object 1556 to the Action operation handler 1560. Then, at block 1506, the action operation handler 1560 causes the method, as specified in the applications process logic, to be performed. In this example, the Action operation 614 in the MyTasks application defines the following "<component>" XML element that identifies the method and target of the action to be performed:

<component name="button2" action="hide" value=" "></component>

By defining this element, the application code is directing that the component named "button2" be hidden. In one aspect, view objects are encoded with generic methods for performing state manipulations on their associated user interface components including, but not limited to, enable, disable, hide, and show methods, etc. Since the MyTasks view object 1558 is passed to the action operation handler 1560, these generic methods may be called directly on the object 1558. In this example, the action operation handler calls the "hide" method on the MyTasks view object 1558 and identifies the Button2 component 1562 as the target component that will be hidden. Then, the action handling routine 1500 proceeds to block 1508, where it terminates.

Figure 16:
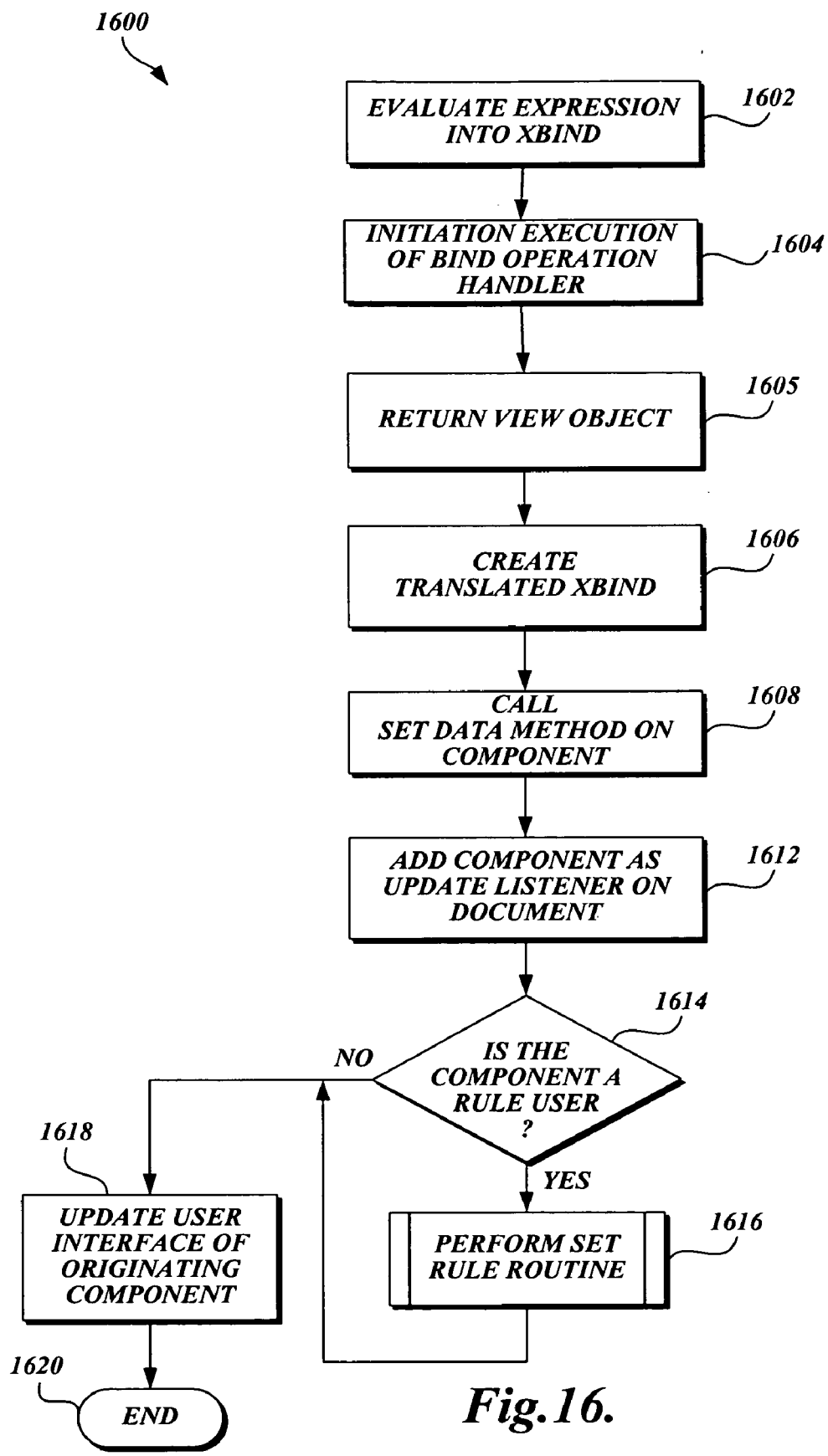
FIG. 16 is a diagram of a bind handling routine that binds an object to the data model in accordance with one embodiment of the present invention.

Now with reference to FIG. 16, the implementation of a bind operation handler will be described in additional detail. Once the Open and Action operations 612-614 in the MyTasks application has been executed, flow of execution proceeds to the Bind operation 616 (FIG. 6A). As illustrated in FIG. 16, the expression represented in the value attribute of the Bind operation 616 is evaluated into an XBind and returned to the appropriate process object, at block 1602. Similar to the description provided above, the process object utilizes an expression engine that is local to the instance to evaluate the provided expression. In the exemplary Bind operation 616, the "data/tasks.xml" expression would be evaluated into the following XBind, at block 1602:

URL=data/tasks.xml
    Base path=/
    Selection=

The URL of this XBind references the data document that stores task descriptions. Moreover, the base path references the root node of the data document corresponding to the URL and the selection aspect of this exemplary XBind is null.

At block 1604 of the bind handling routine 1600, the process object being utilized to execute the current process step initiates execution of a bind operation handler. In the call, the bind operation handler receives a previously evaluated XBind and the appropriate process and instance objects. As mentioned previously, developers are able to create operation handlers in accordance with the process operation APIs that define function call parameters and the XML semantic structure that may exist within the body of the operation. In this example, the Bind operation 616 (FIG. 6A) defines the following "<component>" XML element 618:

<component view="MyTasks" name="input3" select="/tasks/task/@description">

Accordingly, the bind operation handler (called at block 1604) is responsible for interpreting this logic to bind a particular component to a fragment within an XML document. More generally, each operation handler is responsible for interpreting the logic defined in the child elements of the operation element. In this regard, the process operation APIs allow developers to define the XML syntax in the body of the operation so that the logic executed within an operation handler may be configured as needed.

At block 1605, the view object corresponding to the component that will be bound to the underlying XML document is identified and returned to the bind operation handler. In this example, the component element 618 interpreted by the bind operation handler identifies the "Input3" component as being created within the context of the "MyTasks" view object. Since the appropriate instance object is supplied to the bind operation handler, the correct view object may readily be identified. Specifically, a lookup in the MiniView manager 1554 of the instance is performed and the "MyTasks" view object is returned directly to the bind operation handler.

As illustrated in FIG. 16, a translated XBind is created within the bind operation handler at block 1606. The XBind that is passed into the bind operation handler identifies a document ("data/tasks.xml") that stores content utilized by the MyTasks application. However, only a subset of the data in the identified XML document will be bound to the Input3 component. Accordingly, the binding performed by the bind operation 616 in this example is configured to narrow the binding of the Input3 component to a fragment of the data in the "data/tasks.xml" document identified by an XPath expression. Specifically, the select attribute in the component element 618 includes an XPath expression that qualifies the expression in the value attribute of the bind operation 616. In this example, the XPath expression identifies the appropriate fragment within the XML document that is used to qualify the incoming XBind to the bind operation handler and create the following translated XBind:

URL=data/tasks.xml
    Base path=/tasks/task/@description
    Selection=

The aforementioned translated XBind could be written in shorthand notation as "data/tasks.xml#/tasks/task/@description." In this regard, the URL of the translated XBind references the XML document in the data model that stores the relevant task descriptions. Within the XML document identified by the URL, the base path references the task element and its corresponding description attribute. As described in further detail below, an XBind may also include a "Selection" that provides additional features in referencing fragments in the data model.

At block 1608 of the bind handling routine 1600, the set data function provided by the appropriate user interface component is called. In this example, the Input3 component is the subject of the Bind operation 616 and will be bound to a list of task descriptions. The component APIs may be used to define certain methods for setting data on a particular component. In one embodiment, the Input3 component may include a set data method that is called at block 1608. Significantly, the appropriate component may be identified based on the view object and the reference to the component name received at block 1604 when the bind operation handler was called.

When called, the set data method will typically perform administrative functions and error handling to ensure that a component is not already bound to an XML document in the data model. Then, at block 1612, the Input3 component that is the subject of the bind operation 616 is added as an update listener to the "data/tasks.xml" document. As mentioned previously, the present invention provides a structured object-oriented representation of the XML document in the form of a document object. In one embodiment, document objects serve as a wrapper to DOM ("Document Object Model") objects utilized by a Web browser and an XML parser. In this regard, enhanced features are encoded within the document object provided by the invention that includes the ability to add any objects that exist within the network operating system environment as listeners for updates made to the data model. By way of example only, the objects that may be data update listeners includes, but is not limited to, processes, views, components, communication channels, etc. At block 1612, a call is made to add the Input3 component as an update listener to the object that corresponds to the "data/tasks.xml" document. In this regard, each document object maintains a list of listeners that will be notified in response to a data update. By issuing the call to add update listeners at block 1612, the Input3 component will become one of potentially many data update listeners on the same document object.

At decision block 1614, a determination is made regarding whether the component being added as an update listener to a document utilizes rules. In one aspect, the present invention supports functionality that allows rules to be associated with a data binding component. In this regard, a rule handler may be included in the data model that defines how components and other objects will interpret their data binding. As described in further detail below, rules allow generic components to interpret, learn, and take appropriate action depending on the content in the data model. Accordingly, any XML semantics or languages having different elements, attributes, and hierarchies may understand and/or be bound to the same type of generic component. In other words, components that use rules do not need to be created specifically for a certain data model. Instead, rules enable a generic set of components to be used with any type of underlying data and therefore facilitates true data abstraction in the MVC design paradigm. The component does not need to understand the structure of the underlying data model and may use rules to interpret content to achieve the desired functionality. When establishing a binding with a component that utilizes rules, functionality is implemented for setting and/or updating a rule handler so that rules may be applied. In the call to add a component as an update listener, a flag may be included to indicate whether the component is a rule user. Accordingly, if the received flag indicates that the component is not a rule user, the result of the test performed at block 1614 is "no" and the bind handling routine 1600 proceeds to block 1618, described in further detail below. Conversely, if the received flag indicates that the component is a rule user, the result of the test is "yes" and the bind handling routine proceeds to block 1616. At block 1616, a set rule routine 1600 is performed that applies and merges rules of a data binding component to a rule handler maintained in the data model. In this regard, the logic implemented by the set rule routine is described in further detail below with reference to FIG. 21.

At block 1618 of the bind handling routine 1600, a call is generated to update the user interface of the component that is the subject of the bind operation. Methods defined in accordance with the component APIs may be used in performing an update of a user interface. Specifically, the component APIs have developers provide logic that is used to implement an "Update( )" method for a component. In this regard, logic that may be implemented within the "Update( )" method is described in further detail below with reference to FIG. 22. In this example, the "Update( )" method associated with the Input3 component will result in task descriptions maintained in the data model being displayed. Then, the bind handling routine 1600 proceeds to block 1620, where it terminates. Once the Bind operation 616 completes execution, the new data binding component will be notified of updates effecting the data model ("data/tasks.xml").

In the exemplary MyTasks application (FIG. 6A), the Bind operation 616 is the last operation in the Initialize Application process step 604 that is executed. Upon execution of the Bind operation 616, processing of the MyTasks application remains idle until the occurrence of a trigger. In this regard, a trigger activation routine 1700 is described below with reference to FIG. 17. However, prior to discussing the utilization of triggers, a description of functionality implemented by the expression engine provided by the present invention will be described in additional detail.

In existing platforms, developers are provided with the same programming tools for both querying data and defining an application's computational logic. In this regard, programming languages that are imperative in nature will eventually cause all of an application's logic to be represented as a sequence of ordered statements. While the ordered nature of imperative programming tools is well-suited for implementing computational logic, the data querying capabilities of imperative languages are less robust. Instead, non-imperative language programming tools would be better-suited for querying or otherwise accessing data. To this end, an expression language is provided that allows developers to utilize non-imperative programming tools when performing I/O. In this regard, expressions are structured to be compatible with XML syntax and delimited for use within the XML-based programming languages provided by the present invention. Specific examples are provided herein of how the process XML language is readily able to utilize expressions. However, these examples should be construed as exemplary, as expressions may be incorporated for use in other XML languages and also evaluated and used directly from program code within objects.

Implementing a development platform configured to execute applications that adhere to the MVC design paradigm provides challenges with regard to accessing data that may evolve at runtime. In one embodiment, XBinds provide a standardized means for referencing in-memory objects, documents, data subsets, etc. As mentioned previously, an XBind is a three-dimensional data type comprised of an URL, base path (e.g., an XPath expression that may reference a fragment within an XML document or the entire XML document), and a selection (e.g., a plurality of XPath expressions). As will be clear from the examples described below, the XBind data type provides a standardized way for objects that may evolve at runtime to communicate their state. As such, XBinds allow different parts of a loosely coupled system to efficiently communicate their state information in a standardized way. In this regard, XBinds provide a simple and straightforward way of binding data to user interface components. Through the use of the selections, the state of a component is capable of being described in an XBind which may be provided as input into other systems. More generally, each object within the network operating system environment can be queried at any time for an XBind that describes the object's state. Accordingly, an XBind describing the state of an object, (e.g. component) may be set on a different object to "clone" or transfer the components' state. In another aspect, the XBind associated with an object may be synchronized over the network. As a result, objects executing on remote computers may be updated using an XBind to maintain synchronized states. This is one way in which aspects of the present invention enable real-time collaboration over the network.

In one embodiment, XPath evaluations may be applied by the expression engine. Those skilled in the art and others will recognize that XPath is a standard of the World Wide Web Consortium (W3C) that provides a language for identifying and selecting data at a specified location in an XML document. Moreover, XPath establishes conventions for formulating expressions that evaluate particular values. For example, the XPath expression "/tasks/task/@description" is used in the MyTasks application that includes the abbreviated syntax of the "@" symbol for selecting the attribute named "description." This syntax complies with XPath conventions and is used to reference a subset of data in an XML document that fulfills a particular select or match parameter.

The expression language provided by the present invention allows developers to reference in-memory objects that may experience state changes at runtime. For example, the "#MyTasks" and "#MyTask#input3" expressions reference different view and component objects, respectively. Utilizing straightforward notation, developers are able to distinguish between references to these in-memory objects and their data bindings. For example, if a developer is accessing data bound to the "Input3" component instead of a reference to the object itself, the "{#MyTasks#input3}" expression may be used. This particular expression will evaluate to the value found within the XML document referenced in the XBind associated with the Input3 that is within the MyTasks view. Upon encountering an expression that contains curly brackets, the expression engine will convert one or more XML nodes bound to the identified object into text or XML. In this regard, view and component objects provided by the present invention are aware of their data bindings and can always be queried for their XBind. By evaluating expressions relative to an instance, the expression engine is able to identify the appropriate object and a corresponding data binding in evaluating these types of expressions. Accordingly, the expression language allows developers to reference both in-memory objects and their data bindings using the same straightforward notation. Moreover, expressions may reference external resources identified by a URL that will be obtained automatically using a communication channel.

Unlike existing systems which utilize XPath for navigation and selection of data within documents, aspects of the present invention allow in-memory objects and their associated data to be referenced using XPath conventions. Assuming a component named "Input1" exists within an application view called "MyView," the following would be a valid expression that is evaluated by the present invention:

{#MyView#input1#@name}

After a reference to a XML document, variable, or in-memory object, XPath conventions are applied after the last "#" character in the expression relative to the components XBind. When a relative XPath expression is encountered, the base path or selection within the component will be merged with the supplied XPath as described with reference to the bind handling routine 1600 (FIG. 16). In the exemplary expression provided above, the last "#" denotes that XPath expression (e.g., "@name") is relative so that this XPath expression will be merged with the components' XBind. However, XPath expressions evaluated by the present invention may also be absolute. In evaluating an absolute XPath expression denoted with the "/" starting character, aspects of the present invention will ignore any base path or selection of the components' XBind. Aspects of the present invention utilize XPath conventions in other ways than those described above. Additional examples of the use of XPath conventions, as well as other types of expressions that may be evaluated by the present invention, may be found in the commonly assigned U.S. Provisional Patent Application No. 60/976,339, entitled "Network-Based Operating System," filed Sep. 28, 2007, the content of which is expressly incorporated herein by reference.

In one embodiment, properties of an in-memory object may be accessed utilizing the expression language. These properties may be accessed regardless of their data type according to the following syntax:

MyView.id
MyView#input1.name

Methods for performing actions on an in-memory object may also be called utilizing the expression language. In this regard, in-memory objects provided by the present invention may be encoded with methods. Utilizing the expression language, methods may be called directly on these objects. For example, the following are types of expressions evaluated by the present invention that would call a method on an object.

MyView#maximize( )
MyView#input1.clear( )

Moreover, higher-order expressions that accept other expressions as arguments are evaluated by the present invention. In other words, the expression language supports recursive evaluation of expressions consistent with non-imperative programming techniques as the following example illustrates:

MyView#{#MyView#input1.getName( )}

In this example, the name of the Input1 component is evaluated first in the inner expression using the getName( ) method. The recursively evaluated expression identifying the component name is then provided as a parameter of the outer expression. This is just one example of the way in which non-imperative programming tools are integrated and used in conjunction with the XML programming languages provided by the present invention.

Within the network operating system environment, process steps and associated operations may be performed in response to the occurrence of a trigger. In other words, the execution of process steps may be event driven. Accordingly, when the MyTasks.xml document 600 is opened, the trigger 602 is registered so that flow may be directed to the appropriate process step when the trigger is activated. A trigger activation routine 1700 will be described with reference to FIGS. 17A-B which illustrate both the flow and interactions between objects utilized to implement the routine 1700. As mentioned previously, the MyTasks.xml document 600 defines the following trigger 602.

<trigger view="MyTasks" component="button1" event="select" step="2">

Figure 17:
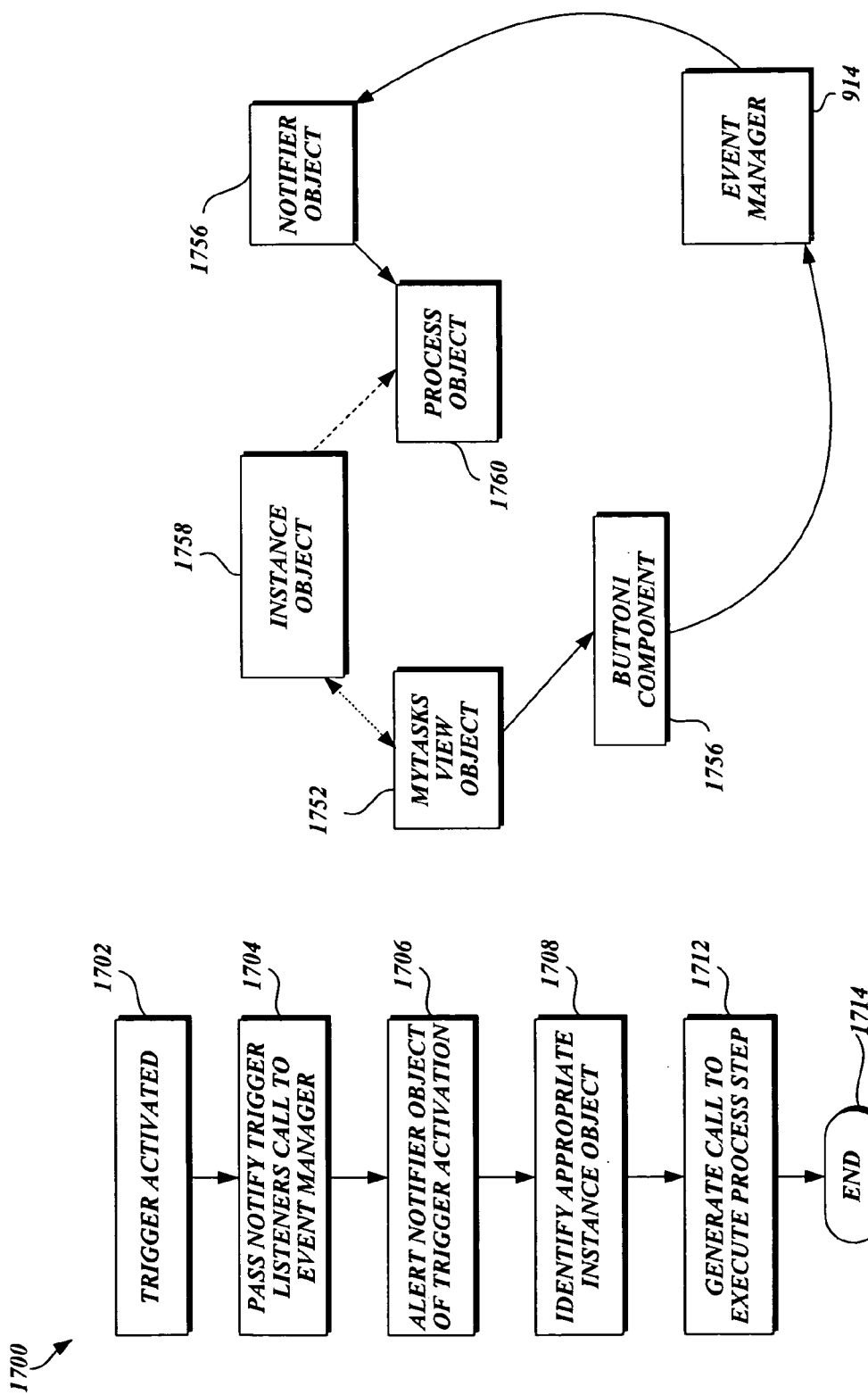
FIGS. 17A-B are diagrams depicting a trigger activation routine that causes application code to be executed in response to a trigger being activated in accordance with one embodiment of the present invention.

The trigger activation routine 1700 depicted in FIG. 17 assumes that a user selected the Button1 component identified within this trigger element, thereby activating the trigger 602 at block 1702.

In response to the trigger being activated, the component object where the trigger occurred passes a notify listeners call to the event manager 914, at block 1704. In the call, the appropriate component object provides a set of event data and directs the event manager 914 to notify all event listeners that registered a notifier object or other object matching the supplied data. With specific reference to FIG. 17B, the Button1 component object 1750 associated with the MyTasks view object 1752 would pass a notify listeners call to the event manager 914 at block 1704. In the call, an expression identifying the component where the trigger event originated (e.g., "#MyTasks#button1") as well as the event type (e.g., "select") is supplied.

At block 1706, the event manager 914 alerts one or more listening objects to the activation of the event. Specifically, the event manager 914 performs a lookup in which the event data passed from the Button1 component object 1750 is matched to data previously provided when the event listener was registered. In this regard, the process initiation routine 1100 (FIG. 11) provides a description of how objects may register an event listener in the event manager 914. In one embodiment, each trigger encountered in a process XML document will cause a corresponding notifier object as an event listener to be pre-cached in memory when an application is initially launched. The notifier object is pre-cached in memory upon the initial launch of the application in anticipation that one or more application instances will cause the trigger to be activated. The pre-cached notifier object is associated with a view name, component name, and event type, which collectively serve as a unique key in performing the lookup at block 1706. In other words, only when a component within a specified view experiences the type of event identified in the trigger will a corresponding notifier object be notified of the event activation. As such, only a single notifier object will register in the event manager 914 for a trigger defined in a process XML document regardless of the number of application instances that are executing. Even though multiple instances of an application exist, this architecture allows the same notifier object to be reused by each of the application instances. Additionally, this architecture allows the event manager 914 to more efficiently iterate and notify listeners since only a single trigger registers an event listener in the form of a notifier object that is then shared by multiple applications instances. In other words, the performance of the lookup performed at block 914 is not dependent on the number of application instances that are executing.

At block 1708 of the trigger activation routine 1700, the appropriate instance that is associated with the activated event (trigger) is identified. When alerted of the occurrence of an event, arguments are passed to the event manager 914 that are used to identify the appropriate listening object and the affected instance. In this example, the expression identifying the Button1 component object 1750 is supplied to the event manager 914 and may be utilized to identify the appropriate instance through accessing the components view object that holds a reference to the instance it belongs to. As mentioned previously, when opening an application view, a reference to the instance is supplied to the resulting view object. Accordingly, the MyTasks view object 1754 is aware of its associated instance object 1758. Since component objects are created within the context of a view, the Button1 component object 1750 may utilize the MyTasks view object 1754 to identify the appropriate instance, at block 1708. Once the appropriate instance is known, the instance object 1758 is supplied to the execute method in the process object.

The architecture depicted in FIG. 17B and the description provided above illustrates how the present invention is able to support stateless execution of process steps in a system that supports event-driven execution of application logic. As mentioned previously, a single process XML document is utilized to execute multiple applications instances. In this regard, a process object may be repetitively re-used by different application instances thereby providing an efficient platform for executing applications. Even though only a single notifier object 1756 is pre-cached for each trigger in an application, the present invention allows the appropriate instance to be supplied to the process object 1700. In this regard, the notifier object 1756 is activated when an event matching a unique key comprising the view, component, and event type is received by the event manager 914. Moreover, the event manager 914 is able to identify and provide the appropriate instance object 1758 to the notifier object 1758 utilizing the supplied component, view or event listening object. At block 1712 of the trigger activation routine 1700, a call to execute a process step in an application is generated. As mentioned previously, the process step that will be executed is cached in the notifier object 1756 or known by the event listening object. Accordingly, once the appropriate instance is supplied, the notifier object 1756 may call the execute method (FIG. 12) at block 1712 supplying (1) the instance object 1758 that represents the current runtime state of the application, and (2) the process step (e.g., "2") in the application's process logic that will be executed. Then, the trigger activation routine 1700 proceeds to block 1714, where it terminates. Other event listening objects may also call a process object step or directly execute its own custom code.

Figure 18:
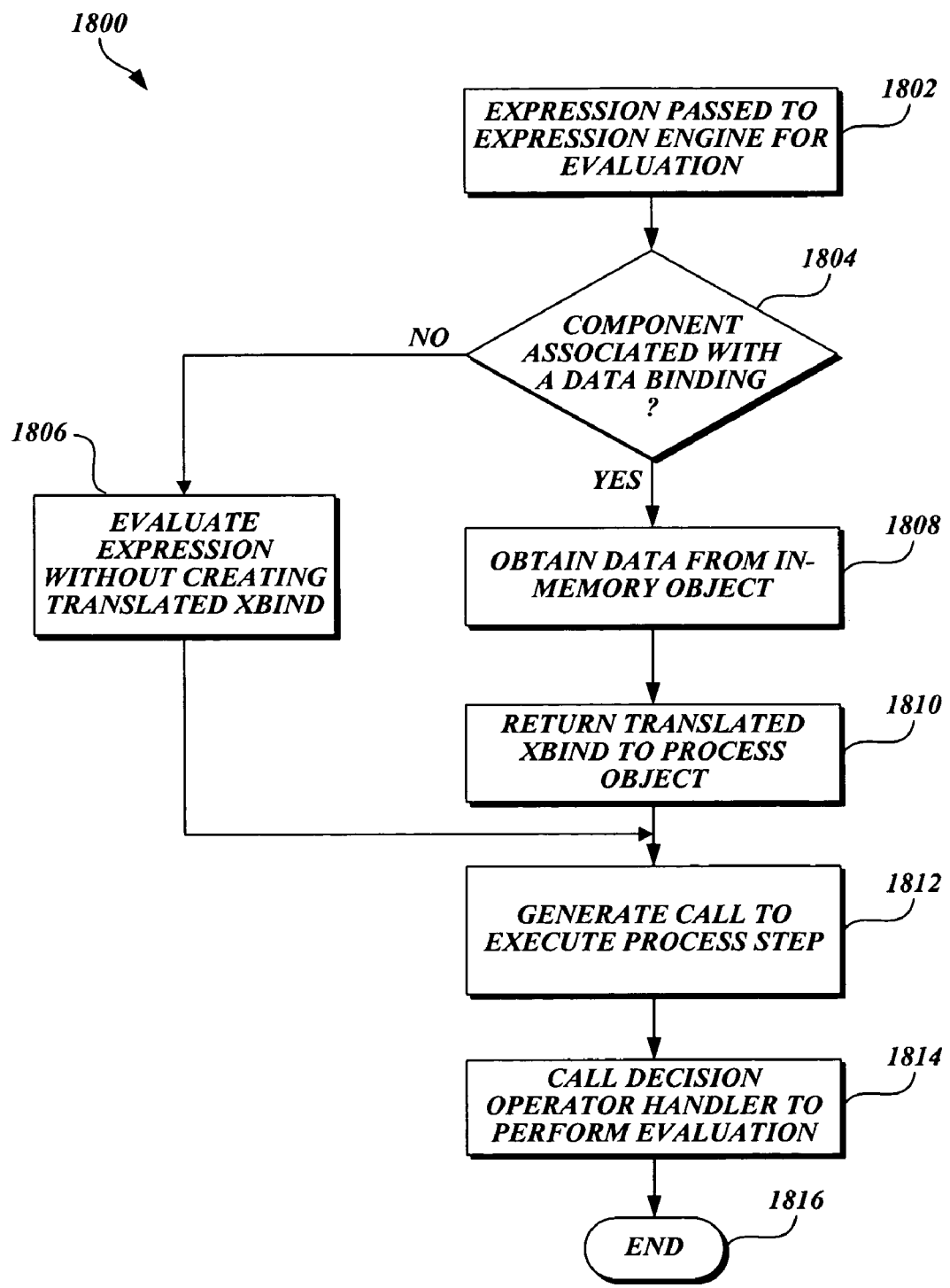
FIG. 18 is a diagram of a decision handling routine configured to perform an evaluation directing the flow of application execution based on the evaluation.

When the trigger in the MyTasks application is activated, flow of execution proceeds to the Decision operation 620. Generally described, the logic within the decision operation 620 performs a test to determine whether any text was entered into the Input4 component when the trigger 602 was activated. In this regard, a decision handling routine 1800 that implements the Decision operation 620 will be described with reference to FIG. 18. As illustrated in FIG. 18, the decision handling routine 1800 begins at block 1802 where an expression is passed to the expression engine for evaluation. In this example, the Decision operation 620 contains a value attribute of "#MyTasks#input4" which would be passed to the expression engine for evaluation at block 1802. As mentioned previously, developers may utilize the expression language provided by the present invention to reference in-memory objects. Specifically, the "#MyTask#input4" expression selected and passed to the expression engine for evaluation at block 1802 references a component object that may experience state changes as an application executes.

At decision block 1804, a determination is made regarding whether the expression being evaluated references a component that is associated with a data binding. In some instances, a data binding may be defined in which data input and/or displayed by the component is automatically propagated between the component and the data model. On the other hand, a component may be "atomic" or not associated with an existing data binding. When evaluating expressions that reference atomic components, the expression engine implements functionality that allows data input/output from the component or other data affecting the state of the component to be accessed within the logic of an operation handler. By implementing this functionality, the expression engine allows this data to always be accessible using XML-based expressions.

To make the determination regarding whether a component is associated with a data binding at block 1804, the expression engine may identify the component object named "Input4" using the instance. As mentioned previously, component objects provided by the present invention are aware of their data bindings. Accordingly, once the appropriate component object is identified, the expression engine may readily determine whether the component is atomic or associated with a data binding. If the result of the test performed indicates the component referenced in the expression is not associated with a data binding, then the decision handling routine 1800 proceeds to block 1808, described in further detail below. Conversely, if the result of the test performed at block 1804 indicates that the expression references a component associated with a data binding, then the decision handling routine 1800 proceeds to block 1806.

If block 1806 is reached, the component referenced in an encountered expression is associated with a data binding. In this instance, the expression is evaluated without creating a temporary XBind to account for the non-existence of a data binding. More specifically, the expression engine would evaluate the "#MyTasks#input4" expression at block 1806 and request the XBind from the Input4 component. In this example, the XBind returned by the expression engine would provide the operation handler with everything needed to execute.

In one embodiment, developers may provide XML semantic descriptions to access data and otherwise perform I/O. However, an expression may actually request data that is only available from an in-memory object implemented in a scripting language (e.g., Java Script). Accordingly, even though a component is not associated with a binding, the present invention allows expressions to operate and access data associated with the component using its corresponding in-memory object. For example, the decision operation 620 in the MyTasks application includes the following "<when>" XML element 622.

<when test="text( )=" " step="3"/>
<otherwise step="4"/>

The when element 622 includes the XPath expression "text( )" which applies XPath evaluation conventions to request text entered into the Input4 component. Since the component is atomic, the requested data is not available using an existing data binding. Instead, the present invention evaluates XML-based expressions and allows data to be accessed even though the requested data is not currently maintained in the data model. Instead, a temporary XBind is created for the object (e.g., component) that references a fragment within a system-provided state document. As described in further detail below, the system-provided state XML document may contain all of the state information of the relevant component.

At block 1808 of the decision handling routine 1800, the requested data is obtained from an in-memory object associated with an atomic component. Logic implemented within an operation handler may utilize data that involves the state of an atomic component. For example, if block 1808 of the decision handling routine 1800 is reached, the Input4 component is an atomic component that is not associated with a data binding. Accordingly, the XPath expression "text( )" within the body of the decision operation 620 requests data involving the state of the component that is not bound to a known document in the data model. To properly evaluate this type of expression, the requested data should be available from the data model. In this regard, the expression engine is able to query the Input4 component for the relevant data since the XBind requested in the expression does not exist.

In one embodiment, each time an atomic component is referenced in an expression being evaluated, a system-provided state XML document is updated with the current state of the component. As described in further detail below, a temporary XBind may then be created that points to the appropriate fragment within the system-provided state XML document where the requested data may be obtained. Alternatively, the state of every component in the system (regardless of whether the component is atomic or associated with a data binding) may constantly be propagated to a system-provided state XML document utilizing the functionality encapsulated in a State Manager. In this instance, the requested data would already be available from the data model and would be accessible using a translated XBind, as described below. Significantly, this embodiment facilitates synchronization of an application's state across multiple client computers. Moreover, by automatically propagating state information to the data model in this way, the state of an application may readily be restored if the application is closed and subsequently opened.

At block 1810, a temporary XBind for accessing data obtained from an atomic component is generated and returned to the appropriate process object. When an application includes an operation that utilizes an atomic component, data may be obtained directly from the component object and stored in the system-provided state document. A translated XBind that is temporarily used to evaluate this expression is generated that references the location in the state document where the requested data may be obtained. In evaluating the "#MyTask#input4" expression, the expression engine may generate an XBind that is similar to the following:

URL=#State
Base path=/states/state[@qid='#MyTasks#input4']
Selection=

The URL of this XBind references the system-provided state XML document allocated to store component state information. Moreover, the base path points to the node within the state document where the text entered into the Input4 component was stored, at block 1808. Once evaluated, the temporary XBind is returned from the expression engine to the appropriate process object. By storing state information and generating a temporary XBind in this way, aspects of the present invention allow developers to utilize XML-based expressions to reference components and their data regardless of whether the component is associated with a data binding. More generally, all operation handlers that access XML documents are also able to work with and reference atomic objects that are not associated with a data binding. As the examples above illustrate, references to objects (e.g., components) in expressions are evaluated into an XBind. As a result, aspects of the invention allow components to bind to each other. When this type of binding is defined, the second component effectively "clones" the first component's XBind. In other words, the second component is provided with synchronized XBinds from the first component. Data binding between components are even possible when the target of the binding is an atomic component. In this instance, the second component will be associated with an XBind that references the system provided state document describing the state of the first component. Since the first component is atomic, this will effectively create a master-slave relationship between the two components.

As further illustrated in FIG. 18, a decision operation handler is called at block 1812 to perform the evaluation defined in the decision operation 606. In this regard, parameters are passed in the call to the decision operation handler that may include a temporary XBind if the operation involves an atomic component. In one embodiment, developers are able to create operations in accordance with the operations API that define function call parameters and the XML semantic structure that may exist within the body of the operation. In the decision operation 620, elements are defined that allow the flow of program execution to be directed based on the result of an evaluated XPath expression. In this example, a string comparison is performed within the decision operation handler to determine whether text was entered into the Input4 component. Accordingly, the XPath expression (e.g., "text( )") is evaluated within the decision operation handler into text. In instances when the expression being evaluated references data from an atomic component, the temporary XBind that is translated in order to evaluate a particular expression is used to obtain the requested data. Specifically, the XBind passed to the decision operation handler may include a reference to the system-provided state document where state data previously extracted from the Input4 component is accessible.

Then, at block 1814, a call to execute the appropriate process step in the application is generated. The result of the evaluation performed within the decision operation handler determines whether to direct the flow of execution to either process step 608 or 610. When the decision operation handler is called, an XBind as well as process and instance objects are received. These received arguments allow the decision operation handler to readily initiate execution of the next appropriate process step based on the result of the evaluation. In this regard, the received arguments may be modified or directly passed by the decision operation handler. Then, the decision handling routine 1800 proceeds to block 1816, where it terminates.

As mentioned previously, the decision operation 620 causes the flow of execution to proceed to process step 610 if text was not entered in the Input4 component upon the occurrence of the trigger 602. The only operation in the process step 610 is the action operation 628 which will cause a button component to be displayed. In this regard, the action operation 628 may be executed using the action operation handler described above with reference to FIGS. 15A-B. Accordingly, additional description of the functionality implemented when program flow is directed to process step 610 will not be described in further detail here.

When text is entered in the Input4 component upon the occurrence of the trigger 602, execution of the MyTasks application proceeds to the process step 608. The operation defined within the process step 608 is a change operation 624 that will cause text input into a component to be added to an XML document. In this regard, an exemplary change handling routine 1900 that implements the data update using a change operation handler will be described with reference to FIG. 19.

Figure 19:
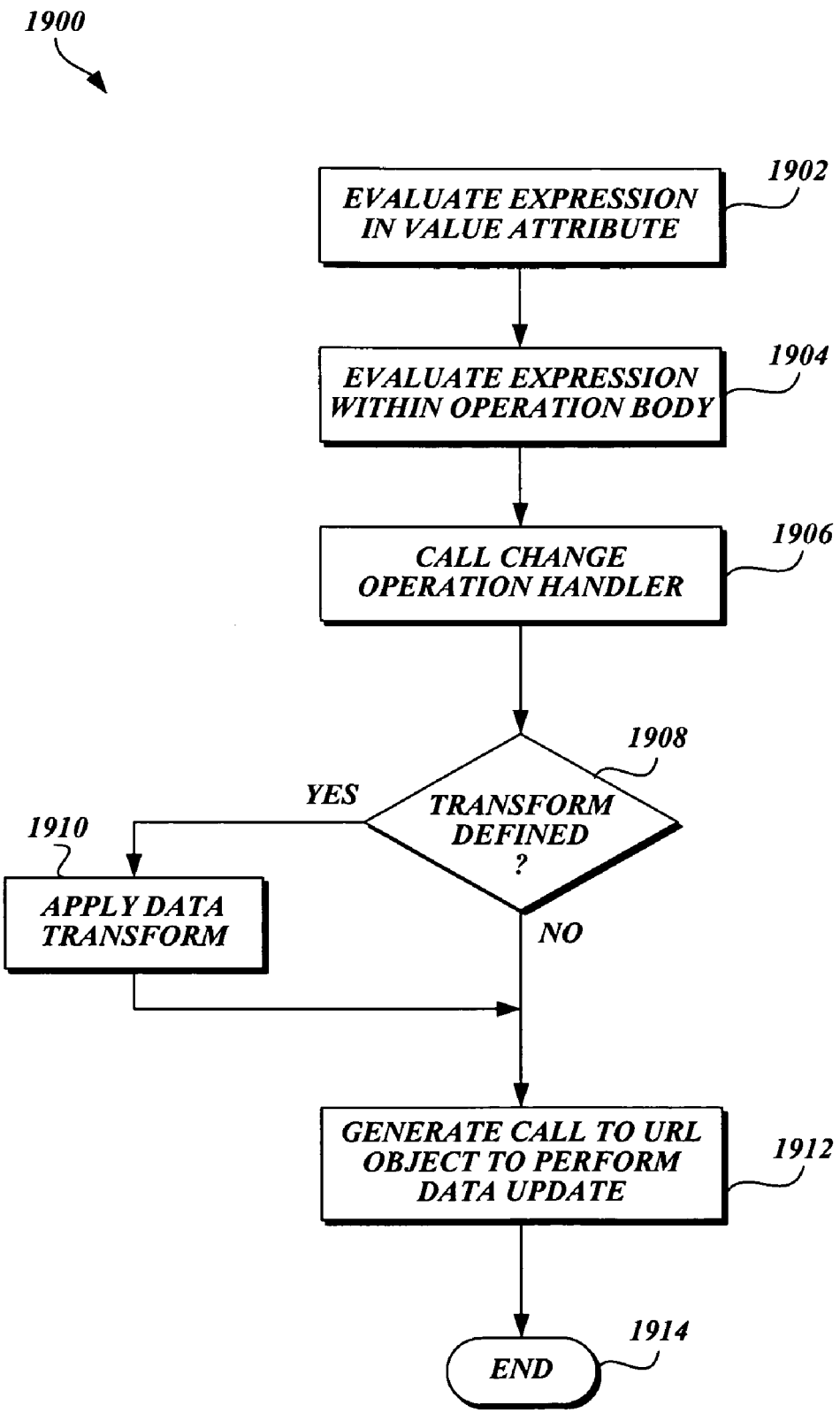
FIG. 19 is a diagram of a change handling routine that depicts the logic for implementing a change operation in accordance with one embodiment of the present invention.

As illustrated in FIG. 19, the change handling routine 1900 begins at block 1902 where an expression evaluation is performed. Specifically, the "data/tasks.xml" expression in the value attribute of the change operation 624 is evaluated into an XBind at block 1902. In this example, the XBind that results from the evaluation will consist of a URL and base path that references the root node of the "data/tasks.xml" document.

As the description above illustrates, an expression in the value attribute of an operation is evaluated into an XBind for each operation in an application. In one embodiment, expressions within the body of an operation may be evaluated within the logic implemented by an operator handler. Alternatively, expressions within the body of an operation may be evaluated before the appropriate operation handler is called. While both embodiments are supported, evaluation of expressions within the body of an operation in the logic of an operation handler is preferred since it is more efficient. In this regard, the change operation 624 includes the following "<store>" XML element 626:

```
<store type="append" select="/tasks/task/@description" value=
   "{#MyTasks#input4}"
```

The "{#MyTasks#input4}" expression within the store element 626 is evaluated into text at block 1904. As mentioned previously, the expression engine provided by the present invention allows developers to delimit expressions for evaluation using the curly bracket notation. These expressions may be defined in attributes, between elements, and other locations in application code. In this example, logic within the expression engine causes the "{#MyTasks#input4}" expression to be evaluated into text.

In general, the change operation implemented by the present invention provides developers with a raw data manipulation tool for performing all the necessary modifications to the contents of an XML document. In this regard, a plurality of data manipulation primitives are provided that are in essence consistent with the World Wide Web Consortium's DOM standard. Moreover, aspects of the invention provide additional data manipulation primitives that include the replaceText and delete children primitives. Accordingly, the following exemplary primitives may be performed to modify the contents of an XML document using the change operation provided by the present invention: replace, replaceText, append, prepend, insert, remove, remove children, new, and delete. Those skilled in the art and others will recognize that these supplied primitives may be used and combined to perform all of the necessary modifications to the data model. As described in further detail below, any change operation affecting the data model will cause a transaction to be created within the transaction manager 910, that describes the exact update that will be made.

At block 1906 of the change handling routine 1900, the change operation handler is called by the appropriate process object. When block 1906 is reached, the process object executing the current process is able to pass the previously evaluated XBind as well as the appropriate instance and process objects to the change operation handler. As described in further detail below, the change operation handler utilizes the received arguments to modify the contents of an XML document.

At decision block 1908 of the change handling routine 1900, a determination is made regarding whether the change operation being executed defines a data transform. The value attribute defined in the change operation 624 identifies the document that is the subject of the change operation (e.g., "data/tasks.xml"). Within the store element 626, the select attribute may contain an XPath expression (e.g., tasks/task/@description) referencing a location within the specified XML document where the data modification will be performed. Moreover, the select attribute may include an expression (e.g., "{#MyTasks#input4}") that evaluates content that will be appended, replaced, or included in the XML document. In one embodiment, aspects of the present invention allow data to be transformed within the change operation before being appended, replaced, or added to the data model. For example, the store element 626 could include a transform attribute that references an XSLT (Extensible Stylesheet Language Transformation) for performing a particular data transform. When this type of data transform is defined, the result of the test performed at block 1908 is "yes" and the routine 1900 proceeds to block 1910. However, the change operation 624 in the exemplary MyTasks application does not include a transform attribute. In this instance, the result of the test performed at block 1908 would be "no," and the routine 1900 would proceed to block 1912, described in further detail below.

At block 1910, a data transform is applied based on logic defined within a change operation. In an actual embodiment, the store element in a change operation may include a transform attribute that references an XSLT document. Logic within the XSLT document may be applied to transform data from a source format into a destination format at block 1910.

Traditionally, XSLT has been used to transform data to support the dynamic creation and modifications of Web pages. In addition, XSLT is also used to transform between XML business format languages and their corresponding structures as part of Electronic Data Interchange (EDI) integration servers. However, these examples are merely exemplary and XSLT is utilized in other instances. Moreover, other transform languages could be used in conjunction with the present invention and the use of XSLT should not be construed as limiting. In any event, those skilled in the art and others will recognize that XSLT is an XML-based language for defining transforms between various markup languages (XML, HTML, XHTML, etc.) as well as between XML schemas and XML documents implementing different XML schemas or DTDs (Document Type Definition). In this regard, an XSLT processor may be used by the change operation handler to apply the data transform, at block 1910. By supporting the dynamic application of transforms in this way, an enhanced development platform is provided in which applications are better equipped to exchange data, interact, and integrate/re-use functionality.

A computer user will typically employ multiple applications such as e-mail, Web browsers, calendar applications, word processors, media players, and the like. However, the data formats and logic used by different applications are seldom compatible using existing systems. For example, an e-mail program may allow users to define a "contact" that is used to store and access information related to another user. On the other hand, a calendaring application allows users to create and track meetings and appointments involving other users, groups, etc. In response to reviewing a message from a contact defined in the e-mail program, a user may want to automatically create a new meeting in the calendaring application. However, supporting functionality that allows different applications to interact in this way is not readily performed using existing systems.

The data transform applied at block 1910 occurs before the raw data manipulation of the change operation is performed. By supporting this type of dynamic application of data transforms, aspects of the present invention provide application developers better opportunities to leverage functionality and data available from other applications. In the example provided above, a data transform may be performed that readily allows an e-mail and calendaring application to interact. For example, an XSLT transform may be defined for converting a received e-mail and/or contact into a data item describing a new appointment. In this regard, the transform may utilize the contact information, the content of an e-mail message, and/or input from the user to establish the attributes of the meeting. Within the change operation, this type of XSLT transform may be applied that allows different applications to communicate even though different underlying schemas and XML structures are used.

At block 1912 of the change handling routine 1900, a call to perform the specific data update represented in the change operation is made to the appropriate URL object. As described in further detail below, a URL object provided by the present invention serves as a lightweight pointer that exposes methods for performing each of the different types of data modification primitives (described above) that are supported by the change operation handler. Accordingly, the change operation handler utilizes the received XBind and logic within the change operation 626 to identify the appropriate URL object to call. It should be well understood that the utilization of a URL object is merely implemented to obstruct the details of interaction with documents and the invention could readily be implemented in other ways. Once the call to the URL object is made, flow of execution proceeds to the data update routine 2000 described below with reference to FIG. 20. Then, the change handling routine 1900 proceeds to block 1914, where it terminates.

Figure 20C:
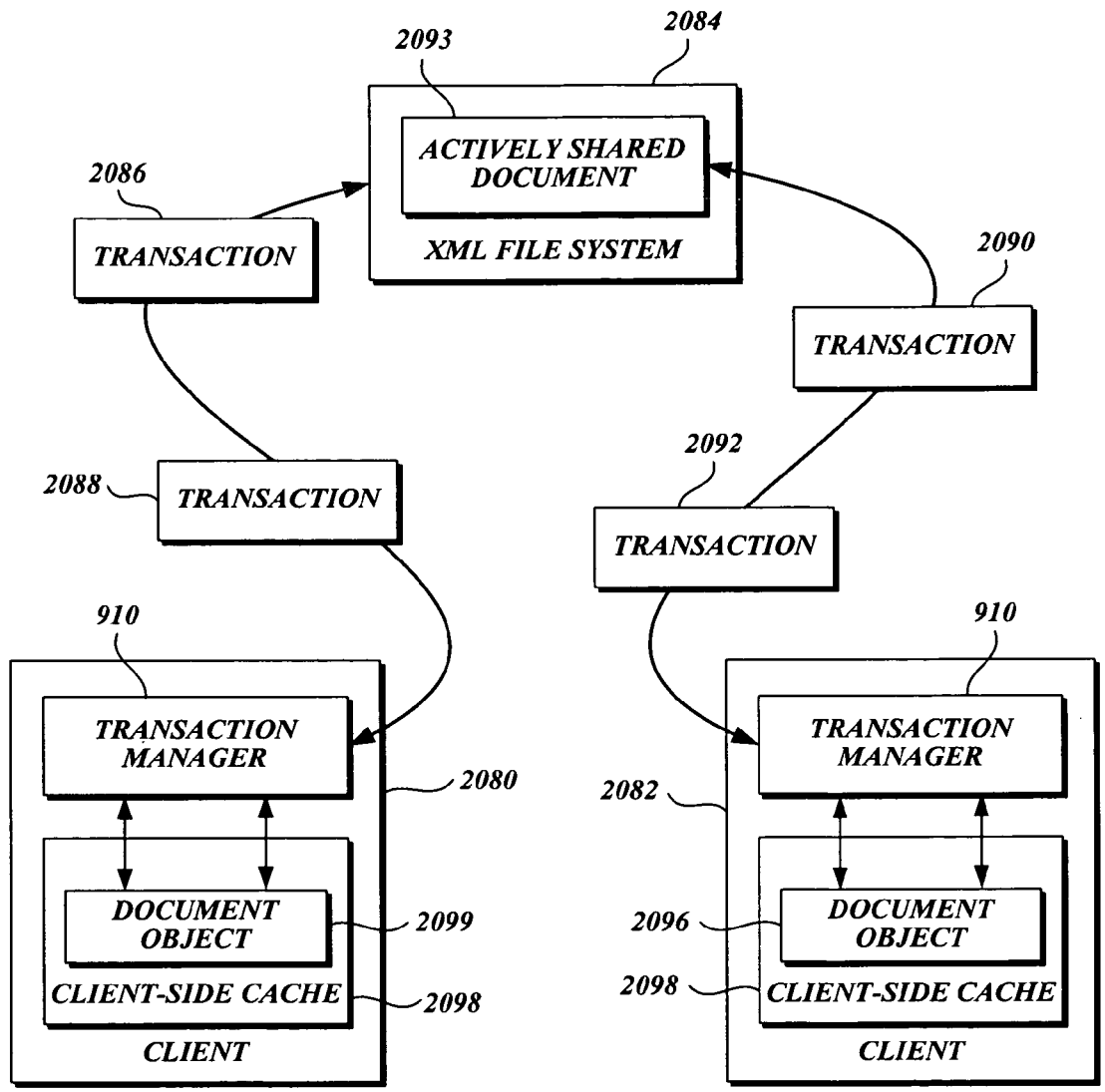

Now with reference to FIGS. 20A-C, a data update routine 2000 and the interaction between objects used by the routine 2000 will be described. The data update routine 2000 depicted in FIG. 20 illustrates two instances beginning at blocks 2002 or 2004 where a data update is performed. In the embodiment when the data update routine 2000 begins at block 2002, a URL object receives a call to perform a data update within the context of a change operation handler 1250. As described above, an application may include a change operation for modifying the contents of an XML document. Accordingly, the change handling routine 1900 (FIG. 19) may generate a call to perform a data update on the specified URL object 1253 that is received at block 2002.

When the routine 2000 begins at block 2004, a call to perform a data update on the specified URL object 1253 originates from a user interface component. When a binding is defined, a component becomes aware of the URL and XML document associated with the binding. For example, the Input3 component in the MyTasks application would receive a URL object corresponding to the "data/tasks.xml" document when the Bind operation 616 is executed. As described in further detail below and in accordance with one embodiment, a Web browser that utilizes the HTML DOM may be employed to render a user interface. In this embodiment, component objects created in the context of a corresponding view object cause various event listeners to be registered on the HTML DOM utilized by the Web browser. A component may listen for events affecting the HTML DOM that occur when, for example, a user provides input or otherwise interacts with the user interface displayed by the Web Browser. With specific reference to FIG. 20B, the component 1252 interprets the received data and generates a call to its URL object 1253 to cause a data update event to be implemented. For example, when the "Update Presentation" task is deleted in the exemplary MyTasks application, a URL object that corresponds to the "data/tasks.xml" document is created and called to delete the task description from the data model. As described in further detail below, the URL object 1253 will then communicate the data update to the transaction manager 910. In turn, the transaction manager 910 will propagate the data update to the underlying XML document object that actually causes the data update to be implemented. In addition to implementing the data update, the document object 1254 will cause the data update to be propagated to all the appropriate listening data update objects. These listening objects are frequently components but may be other types of objects. An XML document may be shared across remote computers that listen for changes that occur to the XML document object. However, the data update to the local document object 1254 maintained in client-side cache is implemented before the data update is propagated to any remote listeners. In other words, the full network update is performed subsequent to the data update being implemented locally.

At block 2006 of the data update routine 2000, the URL object 1253 corresponding to the document object 1254 that will be updated causes a new transaction to be generated. In this regard, the transaction manager 910 is called, at block 2006, which creates a new "transaction" or XML fragment that represents a relative change to an XML document. In one embodiment, the transaction manager 910 includes information in the XML fragment for both implementing and reversing the relative change. Moreover, regardless of whether the data update originates from the context of a component or the change operation handler, an XBind serialized into XML is included with the transaction created at block 2006. As described in further detail below, the transaction manager 910 causes the data update to be implemented both locally and propagated to any remote listeners. In either instance, an XBind is supplied that identifies the location in the data model where the data update will be performed and XML formatted data that contains logic for reverting the requested data manipulation operation, referred to herein as performing a "rollback."

At block 2008, the transaction manager 910 causes the data update to be implemented locally. A transaction may represent a session that consists of multiple and potentially different types of modifications to the data model. Accordingly, in a data notification event, one or more update event objects are created that represent a unit in which modifications to the data model are described. On the other hand, a transaction fully describes one or more changes being made to the data model and logic for reverting these changes. Moreover, in addition to sending out data notification events, document objects provide methods for modifying the actual contents of an underlying XML document as represented in update event objects. Specifically, each data manipulation primitive that may be performed on an XML document (replace, append, prepend, insert, etc.) is implemented in corresponding methods provided by the URL object 1253, the transaction manager 910, and the document object 1254.

As further illustrated in FIG. 20 at block 2012, the transaction manager 910 calls the communication manager 1256 to propagate the transaction to any remote listeners. In this regard, the communication manager 1256 allows applications to instantiate channels that abstract communications with remote network services. Based on the received XBind, the communication manager 1256 will identify the appropriate communication channel for transmitting the transaction over the network, if any. As described in further detail below, communication channels operate under different protocols as defined by the URL standard. For example, the appropriate communication channel may be identified in the protocol identified in the URL such as "http://," "xios://," or "database://." Using logic obtained according to communicator APIs, the data received from the transaction manager 910 is translated into a format understood by a remote network service. In this regard, systems and methods for performing network communications using communication channels will be described in further detail below. Significantly, logic for notifying and updating local data listeners is performed before, and independently from, a corresponding transaction being transmitted over the network. In one embodiment, the present invention is configured to propagate transactions over the network asynchronously. As a result, execution of application logic locally is not hindered by network latency or other delays that are inherent in network communications. Then, once the transaction is provided to the appropriate channel, the data update routine 2000 proceeds to block 2014, where it terminates.

Now with reference to FIG. 20C, an exemplary networking environment suitable for illustrating how transactions are propagated between remote clients will be described. As mentioned previously, the transaction manager 910 causes transactions or data fragments that represent a relative change to documents stored locally to be propagated to any remote listeners. In the example depicted in FIG. 20C, transactions originating with clients 2080 and 2082 are continuously transmitted to the XML file system 2084 maintained at a server-side data center. Specifically, each of the clients 2080 and 2082 propagate the transactions 2086-2088 and 2090-2092 to the actively shared document 2093. Any data updates to the document objects 2094 or 2096 performed locally in the client-side cache 2098 are identified and propagated to the XML file system 2084 so that the clients 2080 and 2082 are able to share data in real time.

Now with reference to FIG. 21, an additional description regarding how rules are applied to provide more-intelligent components will be described. When bound to data, any rules associated with a component are applied and allocated a unique namespace in the data model. Generally described, rules allow generic components to interpret, learn, and take appropriate action depending on the content in the data model. In other words, a rule using component does not need to be created for specific data models. In this regard, the bind handling routine 1600 described above (FIG. 16) may determine that a particular component utilizes rules. In this instance, the set rule routine 2100 described with reference to FIG. 21 may be called to apply and merge rules associated with the data binding of a new component. In one embodiment, the unique XML namespace of a component's rules are merged into the data model and readily available to the components that are bound to the data model. In an alternative embodiment, the rules associated with the component may be stored remotely and accessible through Web services or additional XML documents.

Figure 21:
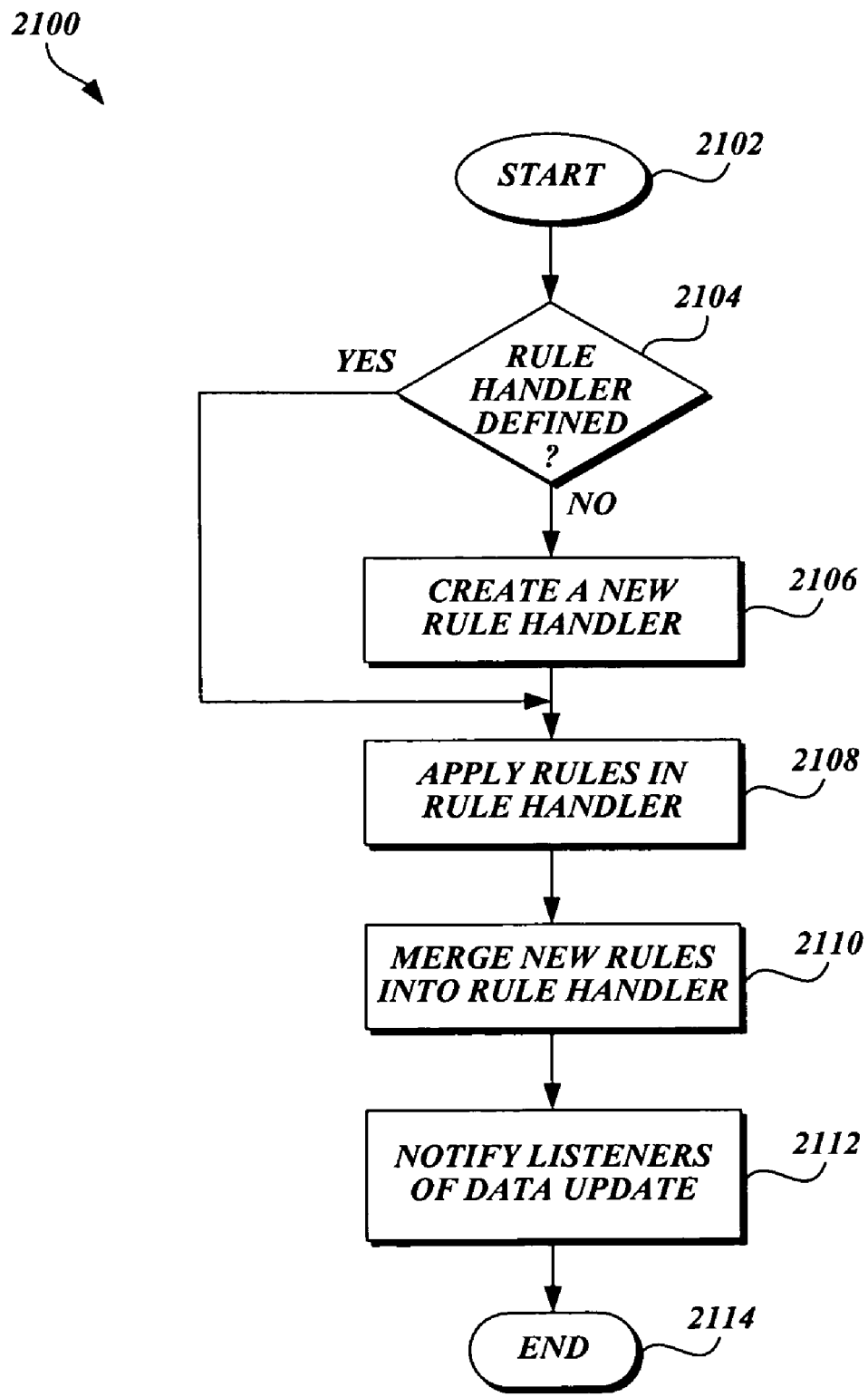
FIG. 21 is a diagram of a set rule routine that depicts the logic for setting a component's rules in the data model in accordance with one embodiment of the present invention.

As illustrated in FIG. 21, the set rule routine 2100 begins at block 2102, and at decision block 2104, a determination is made regarding whether a rule handler for the appropriate document is defined. In this regard, rule handlers allow rules associated with different components to be executed relative to the same data. Each rule-using component bound to an XML document will provide logic (e.g., "rules") to a corresponding rule handler maintained in the data model. Accordingly, if a component that utilizes rules was previously bound to the relevant document, then a corresponding rule handler will exist, and the routine 2100 proceeds to block 2108, described in further detail below. In this regard, if multiple rule-using components are bound to the same document, the same rule handler is used for all of these components. Conversely, if a rule-using component was not previously bound to the relevant document, then the routine 2100 proceeds to block 2106. As further illustrated in FIG. 21 at block 2106, a new rule handler is created for holding the rules of each component bound to the same underlying data.

As mentioned previously, a set of generic components of the type used by modern graphically-based applications is provided. By defining rules, generic components provided by the present invention do not need to understand anything about the underlying data model. In this regard, FIG. 8A illustrates a tree component 800 that visually depicts the hierarchy of folders in a file system and includes folder names, icons, and the like. Rules may be defined that provide logic for populating a generic tree component with content that is maintained in the data model. For example, aspects of the present invention may describe the contents of a file system in a folders.xml document in which each element in the document represents a different folder. Data associated with particular folders such as an identifier, icon, and the like may be identified according to attributes within a folder element. By way of example only, the following rules may be defined to interpret content in the folders.xml document for display in the tree component 800 depicted in FIG. 8A.

```
<tree name = "folder tree">
    <rule match="folder" display="@id"/>
```

-continued

```
<rule match="folder [@id ='email']" display="@id" icon=
    "icons/mailicon.png"/>
</tree>
```

In this regard, the first rule element with the match attribute of "folder" and the display attribute of "@id" would cause the contents of the "id" attribute in the folders.xml document to be displayed as the folder name. Accordingly, the names allocated to folders in the tree component 800 depicted in FIG. 8A may be defined utilizing a rule. The second rule element with the match attribute of "folder [@id='email' ]" would cause the folder that has the name attribute of "email" to be allocated a particular icon associated with e-mail messages, as depicted in FIG. 8A. It should be well understood that the rules provided above are merely exemplary and only include a subset of the logic that would actually be used to populate the content of the tree component 800. In the event that the structure of the folders.xml document is modified, a component's rules may be readily updated to account for the change. Moreover, rule-using components will be notified of the changes in the same way as other data updates. Specifically, an event update object may be created and used to notify the component of the changes utilizing the notify listeners routine 2200 of the data update event notification bus described in further detail below.

With reference again to FIG. 21, the rules of the component being bound to the data model are applied at block 2108. Once a rule handler is created, a component that is the subject of the bind operation provides its rules to the appropriate rule handler. In this regard, a rule handler serves as an extension to the data model and manages the rules of different data binding components that are bound to the same document. In one embodiment, namespaces may be allocated in the data model that separate the vocabularies of different rule using components or objects. By allocating and managing component rules utilizing namespaces, the rule handler is able to execute all component rules in a way that prevents collisions within the data model.

In applying new rules at block 2108, the rule handler is invoked and causes the rules of each component bound to the relevant document to be executed. In other words, the rules associated with potentially multiple data binding components are executed relative to the current version of the data model. Then, once all of the rules have been executed, the component that is the subject of the bind operation is made aware of its corresponding assigned namespace by the rule handler. Specifically, the rule handler passes a reference to the component associated with the new data binding that identifies the namespace in the data model allocated to the components' rules.

At block 2110 of the set rule routine 2100, rules associated with a component that is the subject of the bind operation are merged with the rules of other components. Developers may define the semantic logic of a component's rules utilizing the XML-based languages provided by the present invention. By way of example, a rule may include XPath expressions, UI XML logic references, elements that describe other components, variables, aliases and other references to data outside the container of a rule namespace. In this regard, data bindings of different components may have transitive relationships by virtue of their associated application and rule logic. Accordingly, the rules of different components working on the same underlying data are also maintained in the data model. Once a component is made aware of its namespace, a call is generated to set new data on the component. In this case, the call to set new data on the component will cause the semantic logic of a component's rules to be included in the data model in a namespace that is separate from the rules associated with other components.

At block 2112, a call is generated that causes a data update as reflected in the data model to be propagated to any data update listeners. As mentioned previously, document objects maintain a list of listeners that are notified in response to a data update. When new rules are added to the data model, as occurs at block 2110, the corresponding listeners will be notified of the data update. In this regard, the logic for notifying listeners of an update is described in further detail below with reference to FIG. 22. Then, the set rule routine 2100 proceeds to block 2114, where it terminates.

In the examples above, bindings were defined that caused a component to automatically display content maintained in the data model. By using bindings in this way, developers are freed from having to provide logic in application code for setting and updating data on user interface components. However, the examples above are highly simplified and only reflect one exemplary aspect of the present invention. In this regard, bindings and their corresponding XBinds enable the implementation of more sophisticated functionality.

In one embodiment, the present invention provides a standardized means for objects to describe, store, and communicate their current state. By way of example, FIG. 8A illustrates a tree component 800 that allows a user to navigate and select folders from a file system. A user selection may be described in an XBind, which provides a standardized variable format in the network operating system environment. In the example depicted in FIG. 8A, the user made a series of selections to navigate to the folder entitled "video_encoding." The state of the tree component 800 with regard to the selection of this particular folder may be described in the following XBind:

URL: folders.xml
    XPath: /
    Selection: /folders/research/work/video_encoding/

The example provided above is simplified and used for illustrative purposes only. In an actual embodiment, the XBind that describe the state of the tree component 800 would actually be:

URL: folders.xml
    XPath: /
    Selection: /fs:folder/fs:folder[@name='research' ]/fs:folder[@name='work' ]/fs:folder[@name='videoencoding]

All of the XBinds described herein may be used to reference data regardless of where the data is stored. Accordingly if the underlying data was maintained at a network location, the above selection could be described in the following XBind:

URL: http://www.networkdomain.com.folders.xml
    Base path: /
    Selection: /folders/research/work/video_encoding/

In any event, other objects will frequently use an XBind describing a user selection as the basis for performing actions or otherwise implementing application functionality. As illustrated in FIG. 8B, the list component 850 displays file system data that may be based on a user selection made from the tree component 800. For example, the list component 850 could be configured to display documents (e.g., "whitepaper.txt," "testresults.xml," and "blog.html") based on the folder selected in the tree component 800. The XBind describing the selection is output to the shared data model by the tree component 800. In turn, this XBind may be provided as input into other listening objects (e.g., the list component 850). Accordingly, the input provided to one object (i.e., the list component 850) is interleaved with output previously persisted to the data model from a different object (i.e., the tree component 800). The implementation of an XBind provides a generic variable format that enables this interleaving of I/O in which values accessed from the data model depend on the values of previous I/O. In this regard, the internal computational logic of objects that implement the XML virtual machine is decoupled from their interactions with other objects and systems. In one aspect, XBinds provide a standardized variable format that is used to model interactions and allow this decoupling. XBinds provided by the present invention does not contain values to requested data. Instead, XBinds reference locations where data can be obtained thereby allowing different objects and systems to work with the same underlying data. In addition, XBinds may also be transformed, merged, serialized for use an XML-based system. As the description herein illustrates, XBinds serve as a carrier of object state information utilizing the selection aspect of the XBind. Significantly, since XBinds reference locations where object state information may be obtained, the state information is communicated without altering or changing any of the referenced information or objects.

As a user navigates the file system, the tree component 800 may utilize all dimensions of an XBind to describe a selection. For example, if the user were to select both the "whitepaper.txt" and "testresults.xml" documents in the tree component 800, the selection may be described in the following XBind.

```
URL:        folders.xml
Base path:  /folders/research/work/video_encoding/
Selection:  /folders/research/work/video_encoding/document[@name =
'testresults.xml']
            /folders/research/work/video_encoding//document[@name =
'whitepaper.txt']
```

Again, the example above is used for illustrative purposes and does not represent an actual embodiment of the present invention. The URL of this XBind references the underlying XML document describing the file system, and the base path limits the binding to the "video_encoding" folder. Moreover, the selection of this XBind includes an array of XPath expressions that identify each document selected by the user. Similar to the description provided above, this XBind may serve as the basis for other objects to perform actions. By way of example, a user could generate an event to delete the selected documents. The above XBind that describes the selection state of the tree component 800 would be provided as input into systems that implement the file deletion.

As indicated previously, components and other objects may be notified in response to changes in the data model. Aspects of the present invention allow components to register as listeners for data updates performed on a particular document. When a data update occurs, each listener registered with the document object is notified of the data update and may update their user interface accordingly. Now with reference to FIG. 22, a notify listeners routine 2200 that propagates data updates to listening components will be described. While the notify listeners routine 2200 is described with reference to listening component objects, this is merely exemplary as other objects may be data update listeners.

Figure 22:
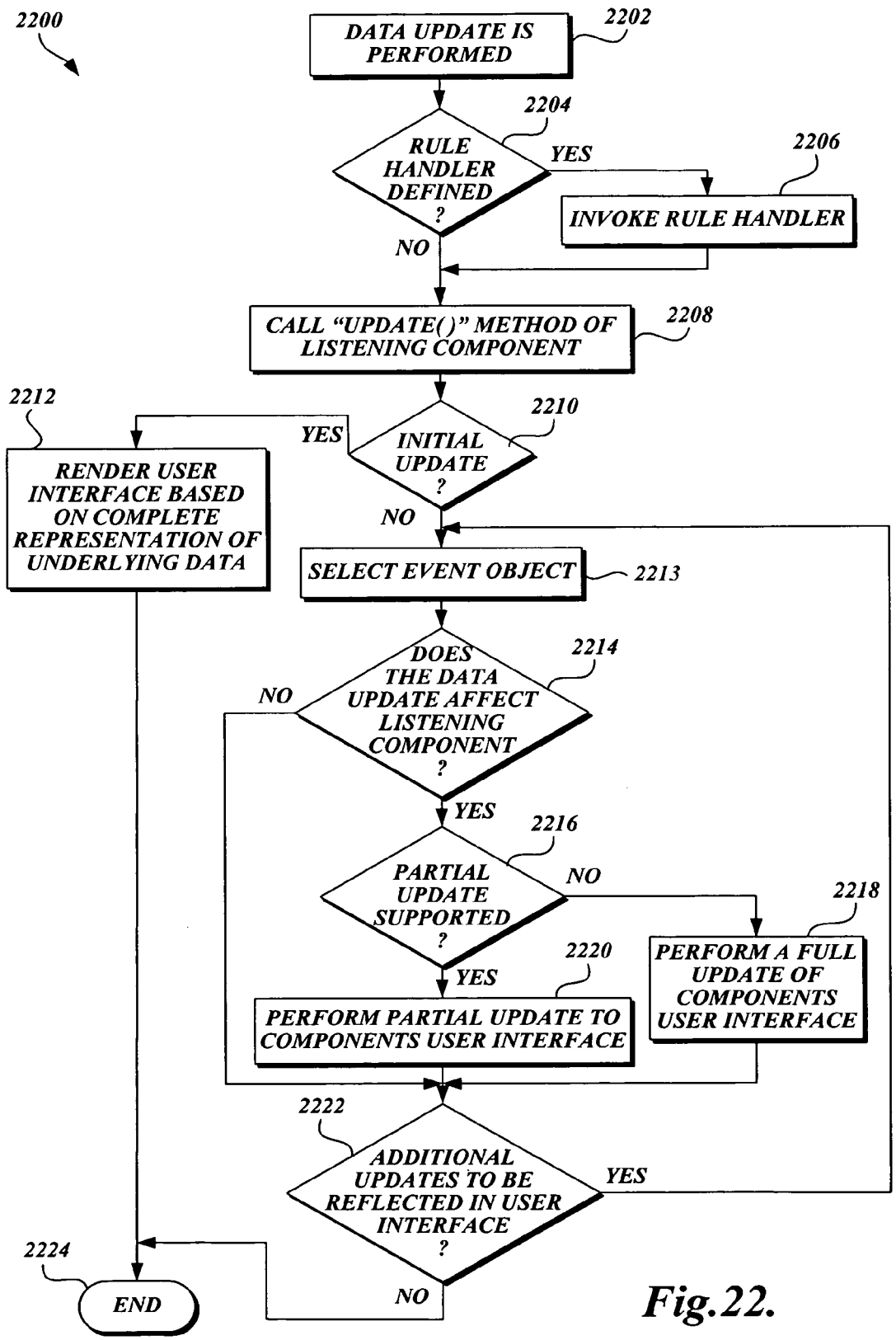
FIG. 22 is a diagram of a notify listeners routine that notifies objects of a data update in accordance with one embodiment of the present invention.

As illustrated in FIG. 22, the notify listeners routine 2200 begins at block 2202 where a data update is performed on an XML document. As the examples above illustrate, data updates to the data model may be performed in different circumstances. When interacting with a data binding component, a user may generate input that is automatically persisted to the data model by the component. On the other hand, a data update may be performed as a result of executing application logic defined in a change operation. Moreover, objects that implement the XML virtual machine perform data updates when using the shared data model and bindings as a communication interface. For example, the semantic description of a component's rules are persisted to the data model which allows different components to interpret the same underlying data.

At decision block 2204, a determination is made regarding whether the data update was performed on a document with a corresponding rule handler. If a rule handler is not defined because a rule-using component was not previously bound to the document, the result of the test performed at block 2204 is "no" and the notify listeners routine 2200 proceeds to block 2208, described in further detail below. Conversely, if the relevant document has a corresponding rule handler, the notify listeners routine 2200 proceeds to block 2206.

At block 2206, the rule handler associated with the document that experienced a data update is invoked. By invoking the rule handler, logic is implemented to ensure that the rule namespace as understood by each data binding component is current and to preserve the integrity of the data model. In this regard, the data update performed at block 2002 may involve adding or otherwise modifying the logic in the rule handler. For example, when a new data binding is defined, the set rule routine 2100 (FIG. 21) causes the rules of a new component associated with the data binding to be merged in the data model with the rules of other components. Any listening component bound to the same underlying document is notified within the notify listeners routine 2200 about the data update to the rule handler.

In the set rule routine 2100 described above (FIG. 21), the rule handler causes all rules as reflected in the current version of the data model to be executed. Then, the component associated with the new data binding is provided with current namespace information regarding the component's corresponding rules in the data model. However, since the addition of new rules may affect the bindings of other rule-using components, an update notification is also provided to these rule-using components. Accordingly, when invoked at block 2206, the rule handler causes all of the rules as reflected in the current version of the data model to be executed. As a result, the rule handler is able to provide current namespace information and up-to-date rules to any listening component that is a rule user. In turn, this new data is set on the component, thereby causing the data update of the new rules to be reflected in the listening component's data binding.

Once the rule handler completes, the "Update( )" method associated with a listening component is called at block 2208. Since components are defined in accordance with a set of component APIs, the logic performed within the "Update( )" method is configurable. In other words, each component will not implement the same logic within its "Update( )" method. Instead, developers may adopt this logic and create new components that effectively extend the capabilities of the XML virtual machine. Accordingly, the description provided below is made with reference to components provided by the present invention and is merely representative of the logic that may be implemented within the "Update( )" method.

At decision block 2210, a determination is made regarding whether an initial data update was performed at block 2202. In one embodiment, data updates are directed through the transaction manager 910. One or more event update objects that represent an atomic unit for implementing the data update may be created and subsequently supplied in the call to the listening component's "Update( )" method (received at block 2208). In one embodiment, if an event update object is received in the call to the "Update( )" method, the data update is not an initial update, and the notify listeners routine 2200 proceeds to block 2214, described in further detail below. If an event update object is not received in the call to the "Update( )" method, then the routine 2200 determines that an initial data update is being performed and proceeds to block 2212.

At block 2212, the user interface of the component is visually rendered using a complete representation of the underlying data bound to the component. If block 2212 is reached, an initial data update is being performed, and all of the data set on the component should be reflected in the component's user interface. In this regard, a routine that causes XML formatted data to be rendered in a component's user interface is described in further detail below with reference to FIG. 23. However, it should be well understood that how the rendering is performed is at the discretion of the developer and not dictated by the component APIs. As described in further detail below, rendering may be performed using various technologies including, but not limited to, XSLT, JavaScript, HTML, VML/SVG or Adobe™ Flash.

As mentioned previously, one or more event update objects may be provided when a listening component's "Update( )" method is called. As illustrated in FIG. 22, a received event update object that represents an atomic unit of describing a data update is selected for processing at block 2212. In one embodiment, logic is implemented that causes the data update, as represented in one or more event update objects, to be reflected in a listening component's user interface.

At decision block 2214, a determination is made regarding whether the selected event update object represents a data update that affects the listening component. As described previously, the component or operation where the data update originated supplies an XBind that references the location in the data model affected by the data update. This variable that describes the change being performed to the data model is included in the event update objects that are propagated to each listening component. In this regard, an XBind is also used to describe the binding of data to a listening component's user interface. In one embodiment, the XBind describing the data binding of the listening component may be compared to the supplied XBind describing the data update. Utilization of a common variable format (e.g., XBind) allows a listening component to perform a comparison and determine whether the user interface of the component is affected by the data update. If the results of this comparison indicates that the listening component is not affected by the data update, then the notify listeners routine 2200 proceeds to block 2222, described in further detail below. Conversely, if the data binding of the listening component's user interface is affected by the data update, then the notify listeners routine 2200 proceeds to block 2216.

In one aspect, the present invention supports partial updates to the visual display of a component's user interface. At decision block 2216, a determination is made regarding whether a partial update may be performed by a listening component. In this regard, if logic is provided within the listening component's "Update( )" method that supports partial updates, then the notify listeners routine 2200 proceeds to block 2220, described in further detail below. Conversely, if the listening component does not support partial updates, then the notify listeners routine 2200 proceeds to block 2218, where the "Update( )" method causes the component's user interface to be rendered based on all of the data reflected in the components data binding. In this regard, a routine that causes XML formatted to be rendered on a component's user interface is described in further detail below with reference to FIG. 23.

At block 2220 of the notify listeners routine 2200, a partial update to a component's user interface is performed. When partial updates are supported, only the data in the components data binding that is affected by the data update is utilized to perform the partial update. Using the supplied XBind this data may be identified and set on the component, at block 2220. The "Update( )" method of the component causes the component's user interface to be rendered based on the partial update now reflected in the components data binding.

At decision block 2222, a determination is made regarding whether any additional updates will be reflected in the component's user interface. Accordingly, if any event objects received in the call to the "Update( )" method have not been previously selected, the routine 2200 proceeds back to block 2212, and blocks 2212-2220 repeat until each event update object has been selected and processed. Then, once all of the changes represented in the data update are reflected in the components' user interface, the routine 2200 proceeds to block 2224, where it terminates.

As mentioned previously with reference to FIGS. 4A-B, the network operating system may be implemented on a client computer within the context of a Web browser, as a stand-alone application or as a machine operating system. In this regard, a rendering routine 2300 will be described with reference to FIG. 23 that performs processing to graphically render and initialize the components and dialogs of an application. While specific reference is made below to specific Web browser technologies, it should be well understood that the present invention may be implemented without utilizing a Web browser. Moreover, in alternative embodiments, the rendering routine 2300 may be implemented differently to account for browser-specific variations. Accordingly, the description provided below with reference to FIG. 23 is merely exemplary and may be performed differently on various platforms.

Figure 23:
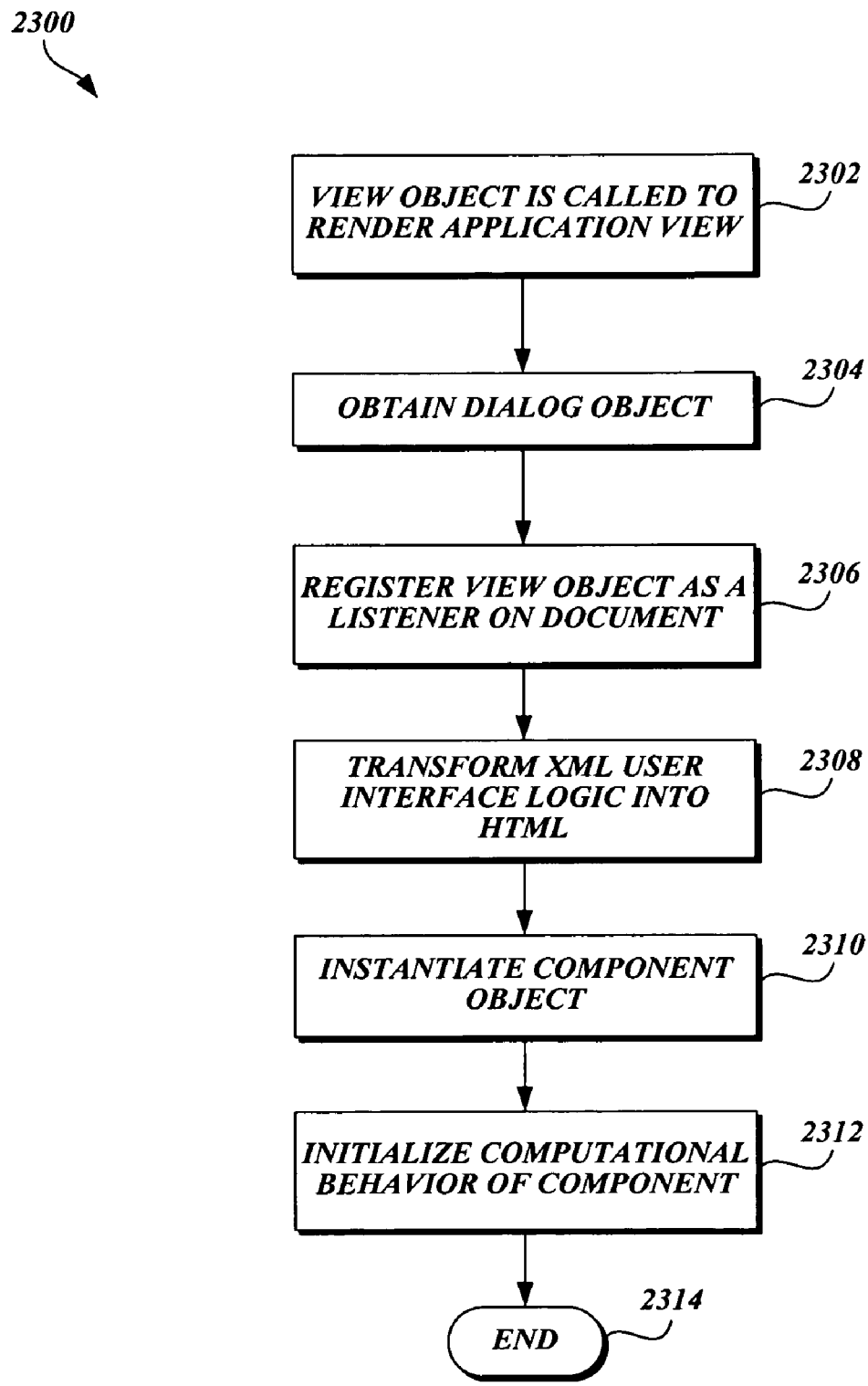
FIG. 23 is a diagram of a rendering routine that causes an application's view to be rendered in accordance with one embodiment of the present invention.

As illustrated in FIG. 23, the rendering routine 2300 begins at block 2302, where a view object is instantiated and called to render a new application view. As mentioned previously, the data type recognizer provided by the present invention may cause a new view object to be instantiated when an UI XML document is opened. Then, the view object generates a request to obtain a new dialog object at block 2304. Generally described, a dialog serves as a frame for an application's components and includes controls for minimizing, expanding, and manipulating the visual representation of an application's view. In one embodiment, a dialog manager is provided that is configured to recycle dialog objects, thereby reducing the amount of memory consumed. Accordingly, if a previously created dialog object is no longer being utilized but still maintained in memory, then an existing dialog object will be reassigned to the new application view.

At block 2306 of the rendering routine 2300, the view object is registered as a listener on a corresponding view.xml document. Similar to user interface components, a view object may register as a listener for data updates performed to the data model that describes the view. As described in further detail below, the view.xml document in which the view object registers as a listener will be updated when specified events that originate from the Web browser occur. Typically, the events will be user generated when input is provided or a user otherwise interacts with the system.

At block 2308 of the rendering routine 2300, an XML-based description of an application's user interface is transformed or converted into an HTML-based representation. As mentioned previously, the present invention allows developers to semantically describe the visual representation of an application's view using the UI XML programming language. In this regard, the UI XML programming language does not have developers provide any computational or scripting logic. Instead, only abstract descriptions of graphical elements and their relations are provided in an application's UI XML document. In instances when a Web browser is utilized, an XSLT may be defined for transforming UI XML logic into HTML or other markup formats suitable for rendering by a Web browser. Significantly, when the UI XML logic is transformed at block 2308, unique identifiers associated with an application's components are included in the resulting HTML DOM document that is rendered by the Web browser. Once the transformation is performed, a Web browser will cause the graphical elements associated with an application's view to be rendered.

At block 2310, an object that contains the computational logic of a component is instantiated and associated with a corresponding view object. In one embodiment, the UI XML document that describes an application user interface logic is traversed. Each component represented in the UI XML document is selected and a corresponding component object is instantiated. In one embodiment, the present invention provides a separation between the computational logic of a component and its graphical representation. In other words, the UI XML description of the component's visual representation does not include any computational logic and may be transformed in various ways and for different platforms without impacting the component's behavior. In this regard, the component object instantiated at block 2310 encodes the component's computational logic, which may be represented in a scripting programming language such as JavaScript, SilverLight, or Adobe™ Flash. However, developers do not define the component's behavior using the scripting language. Instead, developers define the desired behavior of the component using the UI XML language. If new components are needed, developers may create the new component in accordance with the component APIs. In this regard, each component object implements certain methods that are based on information received in accordance with the component APIs. These methods include an "Initialize( )" method for setting data on the component and an "Update( )" method for performing updates to the component's user interface. Numerous methods not discussed herein may be implemented by within components such as an "Unload( )" for removing the component when an application view is closed. However, so long as a basic methods defined by the component APIs exist, a components can be implemented using any available rendering technology. In other words, components are not required to render their user interface using XSLT to HTML, even though that is the embodiment principally described herein. Also, the rendering logic can be described with the component using traditional programming logic.

At block 2312, the computational behavior of the component object instantiated at block 2310 is initialized. When the UI XML logic of the application's view is transformed, identifiers associated one or more components are included in the resulting HTML DOM document rendered by the Web browser. In initializing a component's behavior at block 2312, the appropriate references related to the component in the HTML DOM are identified by the view object using its view.xml document. By interpreting the view.xml document, the view object is able to instantiate the component objects corresponding to the generated HTML DOM and connect each component object to a corresponding user interface. In this way, a component's computational behavior and logic is invoked on the component's user interface. Once a component has been associated with its respective user interface, the default states and/or values of the component are set in accordance with the "Initialize( )" method implemented in each component utilizing the component APIs. When all the components represented in an application's UI XML document have been initialized, the rendering routine 2300 proceeds to block 2314, where it terminates.

Generally described, the functionality performed by the rendering routine 2300 allows a view object to facilitate communications between XML-based applications and the HTML DOM utilized by a Web browser. In response to the occurrence of an event in the Web browser, the affected component and the view object may be notified and, after processing, propagate the event to the appropriate event listeners (e.g., triggers in a process XML document or event listening objects). Once a binding is defined, the graphical representation of a component in the Web browser may be changed when a components corresponding "Update( )" method is called, in a full or partial update, as described above.

Significantly, the component APIs only require a component to implement a basic set of computational logic. As a result, components may readily be configured to use rendering technologies other than HTML and still be aware of data updates and able to bind to data. In alternative embodiments, components may be initialized and rendered using Adobe® Flash, Microsoft® SilverLight, Java® Applet, or any other rendering technology capable of being called within the computational logic of the XML virtual machine that executes each client-side components computational logic. Moreover, the rendering routine 2300 described above may be performed in different ways when implementing the present invention on different types of computing devices. When a Web browser is not utilized, the user interface logic of an application may be rendered without performing a transform between XML and HTML at block 2308. Instead, graphical primitives may be provided that are suitable for being implemented and called to render a component's user interface within the "Initialize( )" and/or "Update( )" methods and built using traditional programming language like C, C++, Java or Microsoft® SilverLight.

XIOS Communication Overview

XIOS applications, which are written for the network operating system, use the model-view-controller (MVC) model. To this end, XIOS applications interact primarily with a data model, which is an abstraction of the contents of a data source. This layer of abstraction between a XIOS application and the data source allows the XIOS application to be insulated from changes made in the data source. In other words, changes in the data source do not necessarily require changes in the XIOS application.

Figure 24:
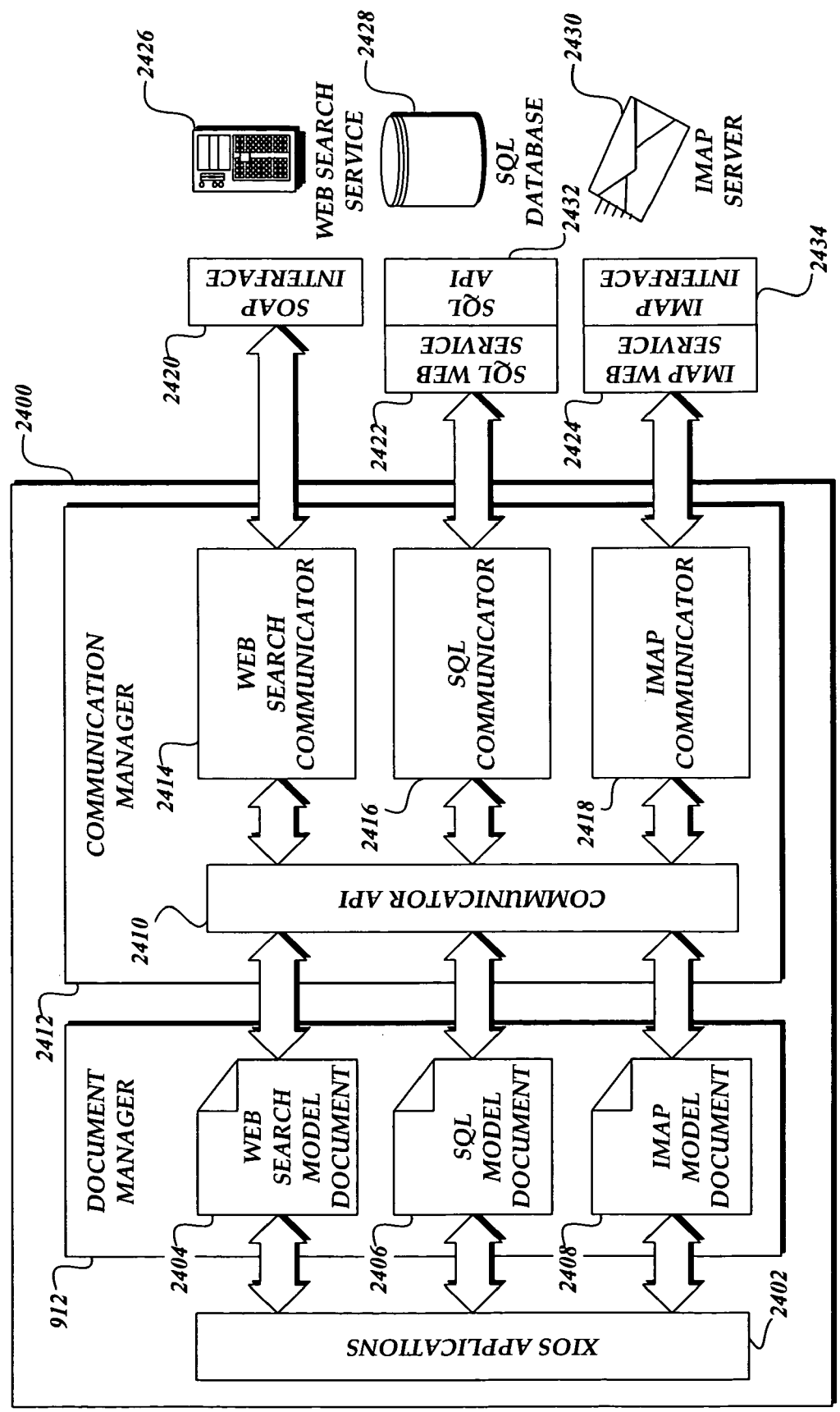
FIG. 24 illustrates a block diagram suitable for describing the ways in which applications interact with a variety of exemplary data sources in accordance with one embodiment of the present invention.

FIG. 24 illustrates an overview of one embodiment of how XIOS applications 2402 interact with a variety of exemplary data sources within this framework. In MVC terms, the XIOS applications 2402 interact primarily with a data model. In one embodiment of this architecture, the XIOS applications 2402 interact with data models for a variety of data sources by interacting with XML documents that represent a data model of each data source. In another embodiment, XIOS applications 2402 interact directly with a programming object exposing the data model as described above. The description below primarily relates to an embodiment in which XIOS applications 2402 interact with XML documents, but one skilled in the art will recognize that other implementations of the MVC paradigm may be substituted.

The communication with a given data source is handled by the communication manager 2412, which may be embedded in the system context object 902 (FIG. 9) at runtime. The communication manager 2412 manages a set of communicator instances, each of which implements a communicator API 2410. The communicator API 2410 exposes generic operations applicable to any given data source. For example, the communicator API 2410 allows a XIOS application 2402 to load, modify, create, or delete a document that represents connecting to a data source, modifying data stored in the data source, creating new data in the data source, query or removing data from the data source, and the like.

The communicator API 2410 is built around the idea that any data source can be accessed using just a URL. A communicator implementing the communicator API 2410 enables access to its data via URLs, and returns XML documents that the XIOS applications 2402 can manipulate as a data model. Using this simple methodology, a XIOS application 2402 using the returned XML document does not require any knowledge of a channel from which the document arrived, or the kind of underlying data source from which it is created. Having a unified way of using, manipulating, and creating data simplifies application development and implementation of the data abstraction solution. XIOS applications 2402 may also easily change from one data source to another and/or transform a data source.

The communication manager 2412 instantiates a given communicator, thereby creating a channel, in response to receiving a request for a URL from a XIOS application 2402. The name or type of the channel is provided as a URL protocol, and the rest of the URL provides information to the channel. The channel then handles the information in a channel-specific manner. For example, a web search channel may accept a URL such as "websearch://example+search+terms". The protocol "websearch" can instruct the communication manager 2412 to pass the URL to the web search channel, and the location "example+search+terms" can be used by the web search channel to build a search query to be submitted to a web search engine. As an example of another channel, a message in an inbox of an IMAP folder store may be accessed in a similar way via an IMAP channel when passed a URL such as "imap://servername/user1/inbox/message1".

In some cases, a simple URL will be passed to a function of the communicator API 2410 as implemented by a particular communicator, such as a load function or a save function. In other cases, an action URL may be passed to a communicator. Action URLs may be used in a communicator when there is a need to provide additional functionality apart from standard data reading/editing/writing/appending operations provided by the communicator API 2410. The action URL can provide communicator-specific functions that use either the underlying data model, other resources, or the underlying data model along with other resources. One example could be an action URL that causes the communicator to perform complicated processing of an underlying data model, thus relieving the programmer from having to do this processing in program code. Another example could be offering functionality based on data or functions outside of the underlying data source. The format of an action URL is similar to that of any other URL passed to the communicator API 2410: "channel_name://function(param1, param2, . . . param n)," where "channel_name" determines the communicator to handle the action URL, "function" is used by the communicator to determine what processing to perform, and "param1, param2, . . . param n" is a list of parameters to be passed to the function. In one embodiment, a request for an action URL returns an XML document.

Three examples of data model documents, communicators, and data sources are shown in FIG. 24. One example is a data model document 2404 and communicator 2414 used for communicating with a web search service 2426, such as Google, Yahoo!, MSN Live Search, and the like. A XIOS application 2402 requests from the document manager 912 a web search model document 2404, which abstracts the communication with the web search service 2426. The document manager 912 uses the communicator API 2410 to communicate with the web search communicator 2414 as the XIOS application 2402 interacts with the web search model document 2404. In turn, the web search communicator 2414 translates requests submitted through the communicator API 2410 into a format understood by a SOAP interface 2420 that exposes the functionality of the web search service 2426. Thus, when a XIOS application 2402 requests a URL such as "websearch://example+search+terms" from the document manager 912, an XML document such as web search model document 2404 is returned that represents the search results.

Another example shown in FIG. 24 is an SQL model document 2406. As with the web search model document 2404, the XIOS application 2402 manipulates an SQL model document 2406. Changes to this document cause the document manager 912 to make calls through the communicator API 2410 to an SQL communicator 2416. The SQL communicator 2416 translates the calls from the communicator API 2410 into a format understood by an SQL web service 2422. The SQL web service 2422 is a front end for an SQL API 2432, which allows access to an SQL database 2428.

As yet another example shown in FIG. 24, XIOS applications 2402 may request a document such as IMAP model document 2408. As a XIOS application 2402 manipulates the IMAP model document 2408, the document manager 912 communicates with an IMAP communicator 2418 through the communicator API 2410. The IMAP communicator 2418 translates requests from the communicator API 2410 to a format understood by an IMAP web service 2424. The IMAP web service 2424 is a front end for a standard IMAP interface 2434 on an IMAP server 2430.

Each communicator instance, such as web search communicator 2414, SQL communicator 2416, and IMAP communicator 2418, is hosted by the communication manager 2412 of the client-side component 2400. The communication manager 2412 is responsible for receiving requests from the document manager 912 that contain URLs, and for instantiating the necessary communicator to form a channel in response to each requests. For example, if the communication manager 2412 receives a request for a URL beginning with imap://, the communication manager 2412 will instantiate an IMAP communicator 2418 (if one is not currently instantiated) and pass the request to the IMAP communicator 2418.

As depicted in FIG. 24, each of the data sources—web service 2426, SQL database 2428, and IMAP server 2430—is accessible through a web-based front end, such as SOAP interface 2420, SQL web service 2422, and IMAP web service 2424. When the client-side component 2400 communicates only with data sources accessible through HTTP, the client-side component 2400 receives the benefit of being able to reuse much existing communication functionality, such as functionality contained in standard web browsers, proxy servers, firewalls, and the like. However, it may also be possible to create a communicator that would not require an HTTP-enabled data source as a back end. For example, with an appropriate communicator, the IMAP web service 2424 or the SQL web service 2422 could be removed, and the IMAP communicator 2418 and the SQL communicator 2416 could then communicate directly with the IMAP interface 2434 or the SQL API 2432, respectively.

XIOS File System—Server-Side Component

Figure 25:
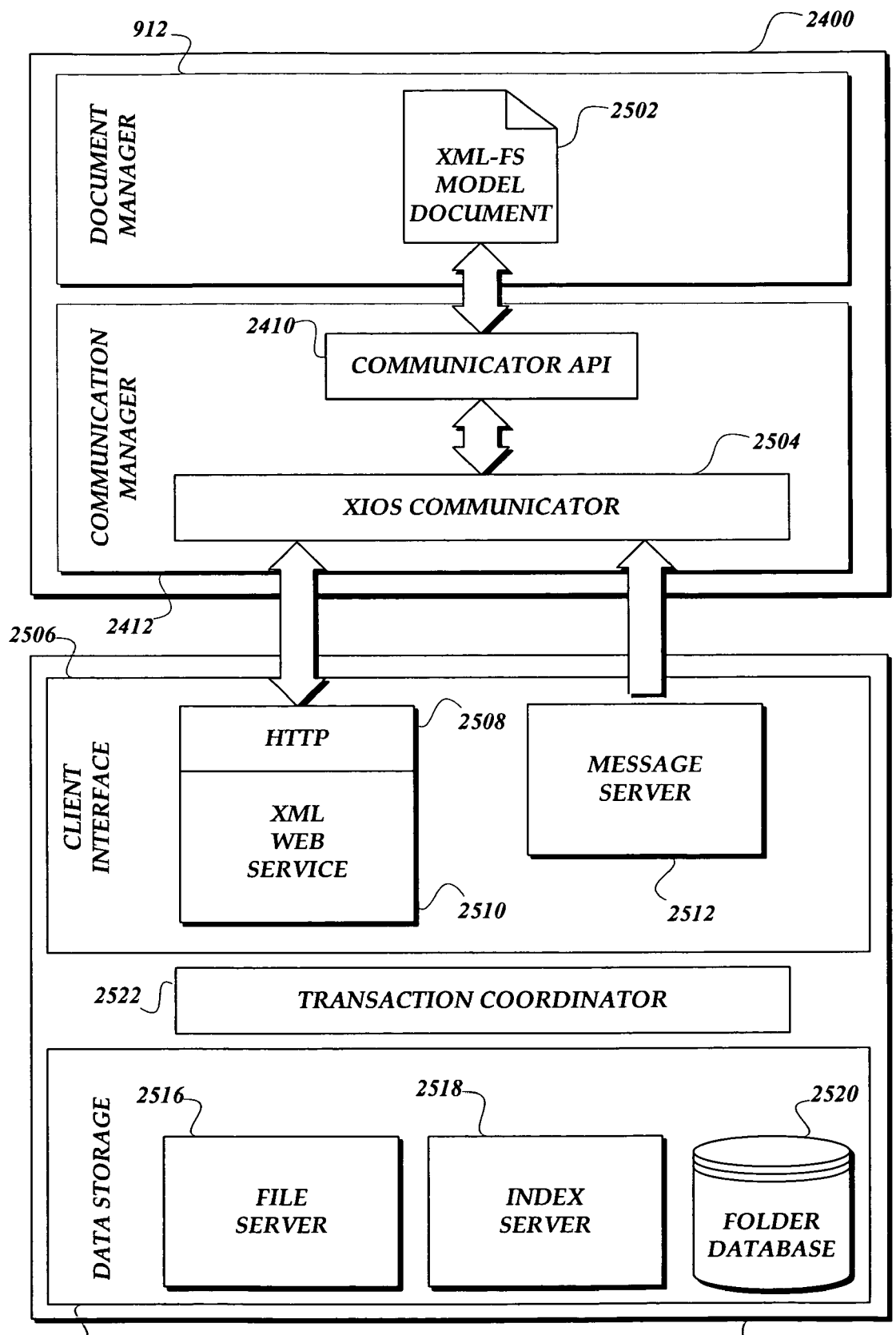
FIG. 25 illustrates a block diagram suitable for describing an XML file system provided by the present invention.

FIG. 25 illustrates an overview of one embodiment of the XML file system server-side component 2500. As in FIG. 24, the client-side component 2400 comprises a data model, embodied in an XML-FS model document 2502, made available to XIOS applications 2402 by the document manager 912. The document manager 912 communicates through the communicator API 2410 with a XIOS communicator 2504 hosted by the communication manager 2412 as XIOS applications 2402 interact with the XML-FS model document 2502. The XIOS communicator 2504, in turn, communicates with the server-side component 2500. The server-side component 2500 comprises client interface components 2506 and data storage components 2514.

The client interface components 2506 are the primary components with which the XIOS communicator 2504 communicates. The XML web service 2510 (along with its web-based HTTP front end 2508) and the transaction coordinator 2522 are the primary ways the XIOS communicator 2504 communicates with the server-side component 2500. The XML web service 2510 exposes functionality within the XML file system such as file creation, file retrieval, file deletion, file search, and the like. The transaction coordinator 2522, which will be discussed in more detail below, helps to coordinate changes to files in the data storage 2514 when more than one client is currently accessing the same file, and acts as a caching mechanism. The message server 2512, which will also be discussed in more detail below, is used to notify the client-side component 2400, via the XIOS communicator 2504, of changes in objects in the XML file system 2500 to which the XIOS communicator 2504 has subscribed.

As shown in the diagram, communication between the XIOS communicator 2504 and the XML web service 2510 is bidirectional. In other words, the XIOS communicator 2504 both sends information to, and receives information from, the XML web service 2510. In contrast, the message server 2512 primarily pushes information to the XIOS communicator 2504.

The data storage components 2514 comprise a file server 2516, an index server 2518, and a folder database 2520. In one embodiment, the XML file system stores file data in three separate parts. The raw data contained within the file is stored as a file on the file server 2516. The filename, author, modification date, access control list (ACL), and other common file information associated with each file is stored within the folder database 2520. The folder database 2520 also stores the folder hierarchy within which the files are organized, including ACLs for each folder and additional folder metadata such as related icons, folder rendering type (for example, indicating the folder contains pictures, and should therefore be rendered with picture thumbnails), and the like. The index server 2518 stores additional metadata used to identify and locate files, such as by searching the metadata using a full-text search.

While each of these components has been depicted as a separate component on a single server in FIG. 25, one skilled in the art will recognize that one or more of these components may be hosted on separate physical hardware. Alternatively, one or more of these components may be split into multiple components, be duplicated within a server-side component 2500, or have their functionality combined into a single component. For example, the XML web service 2510, the message server 2512, the transaction coordinator 2522, the index server 2518, the file server 2516, and the folder database 2520 may all be hosted on the same physical machine. As another example, the folder database 2520 may be separated from the rest of the components as a stand-alone SQL-based data store, or the file server 2516 may be located on a specialized high-capacity file storage system. Also, the XML file system may include only one server-side component 2500, or may include many.

In one embodiment, the XIOS communicator 2504 may always communicate with the same server-side component 2500. The server-side component 2500 will then use information contained within the URL requested by the XIOS communicator 2504 to determine the appropriate XML web service 2510, message server 2512, and so on to service the request. The server-side component 2500 contacted by the XIOS communicator 2504 may also forward the request to a more appropriate server-side component 2500 altogether. In this way, the client-side component 2400 is insulated from the complexity of any load balancing, redundancy, or scaling architecture implemented by the server-side component 2500.

Figure 26:
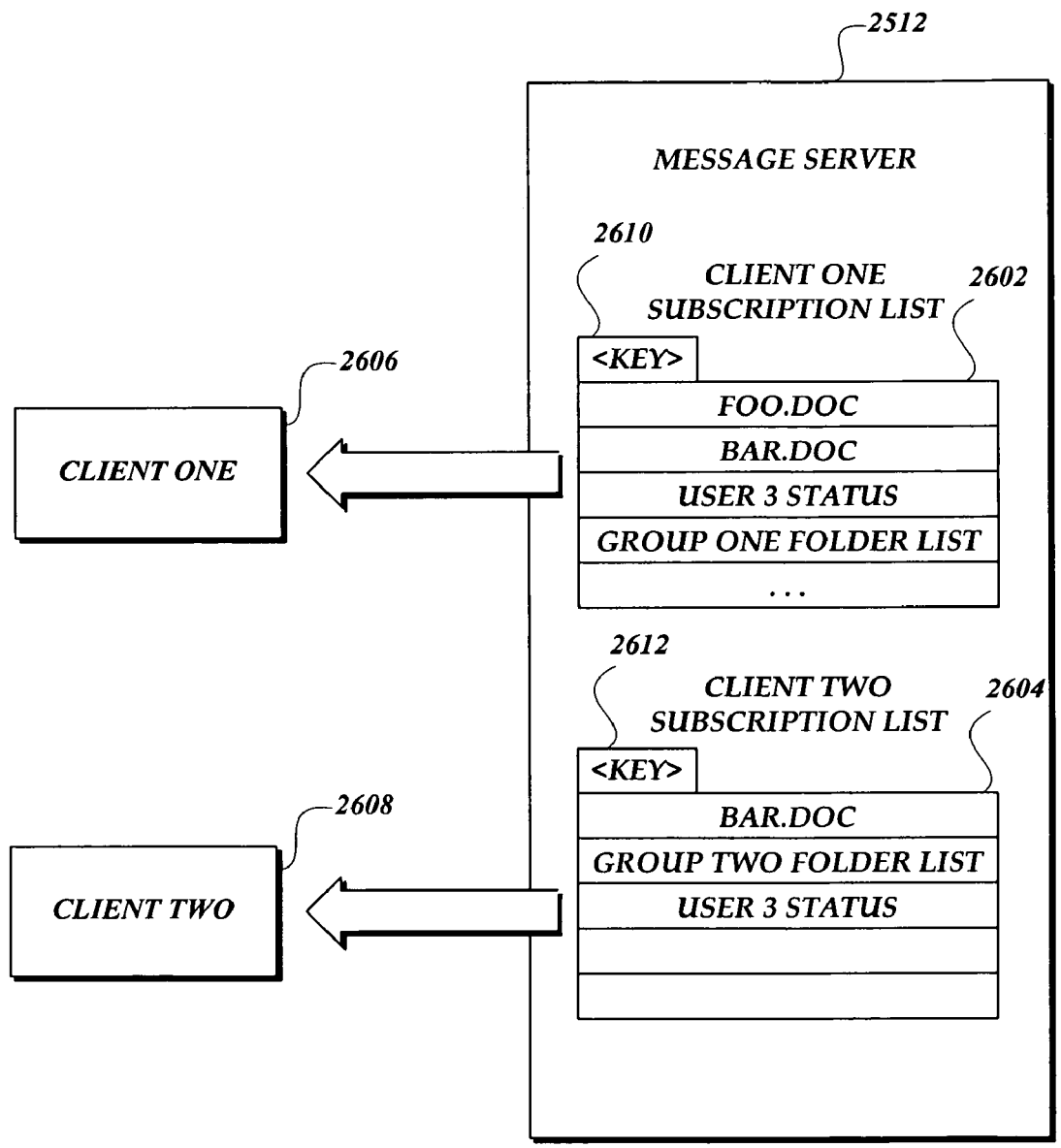
FIG. 26 illustrates a message server configured to enable synchronization of data across the network in accordance with one embodiment of the present invention.

FIG. 26 illustrates one embodiment of some of the details of the content of the message server 2512. The message server 2512 contains a subscription list for each client using the XML file system. For example, FIG. 26 illustrates two clients: client one 2606 and client two 2608. Client one 2606 is associated with a client one subscription list 2602, and client two 2608 is associated with a client two subscription list 2604.

Each subscription list contains a list of objects stored by the server-side components 2500 for which the client wishes to be notified when the object is updated. The client one subscription list 2602 indicates that client one 2606 wishes to be notified of changes to foo.doc (a file), bar.doc (also a file), changes to user 3's status, the group one folder list, as well as other objects and information stored by the server-side components 2500. The subscriptions to foo.doc and bar.doc will cause the message server 2512 to update client one 2606 when either of these files are updated, deleted, renamed, opened by another client, or changed in some other way. The entry concerning user 3's status will cause client one 2606 to be updated when the status of user 3 changes, such as user 3 going online or offline, user 3 indicating he is busy, user 3 entering an idle state, and the like. The entry concerning the group one folder list will cause client one 2606 to be updated when folders that belong to the group one are updated, deleted, have items added to them, or are changed in some other way. The entries in the client two subscription list 2604 are similar to the entries in the client one subscription list 2602 and would behave in a similar way, but would cause client two 2608 to be updated as opposed to client one 2606. In one embodiment, notifications are sent by the message server 2512 via long polling, but other suitable techniques for pushing information to clients could be used instead.

When a client such as client one 2606 initially connects to the server-side component 2500, client one 2606 may, through the XIOS communicator 2504, request to have an object added to a subscription list. In one embodiment, the XIOS communicator 2504 adds the document to its internal subscription list, and in response, the document manager 912 (or another sub-component of the client-side component 2400) issues the request to the XML web service 2510. The XIOS communicator 2504 communicates with the XML web service 2510, which instructs the message server 2512 to add the object to a subscription list for client one 2606. Since client one 2606 had not been connected before, the message server 2512 creates a new subscription list for client one, such as client one subscription list 2602. This list will be identified by a key 2610. The key 2610 comprises a unique identifier, which is preferably difficult to guess. This key 2610 is then transmitted back to client one 2606 via the XML web service 2510 and the XIOS communicator 2504 so that client one 2606 is aware of the key 2610. In one embodiment, the XML web service 2510 and the message server 2512 simply work together to generate the key 2610, which is then transmitted to client one 2606. In this embodiment, client one 2606 (as opposed to the XML web service 2510) instructs the message server 2512 to add the object to the subscription list for client one 2606.

As mentioned previously, a client such as client one 2606 will be authenticated by the XML file system upon login to provide security. In one embodiment, this authentication is not duplicated between the message server 2512 and client one 2606. The difficult-to-guess nature of the key 2610 in this embodiment, in addition to the previous authentication, should provide adequate security against third parties eavesdropping on the client one subscription list 2602. A further advantage of using the key 2610 to provide security for clients of the message server 2512, as opposed to a more resource intensive authentication technique, is that it reduces the load on the message server 2512.

Figure 27:
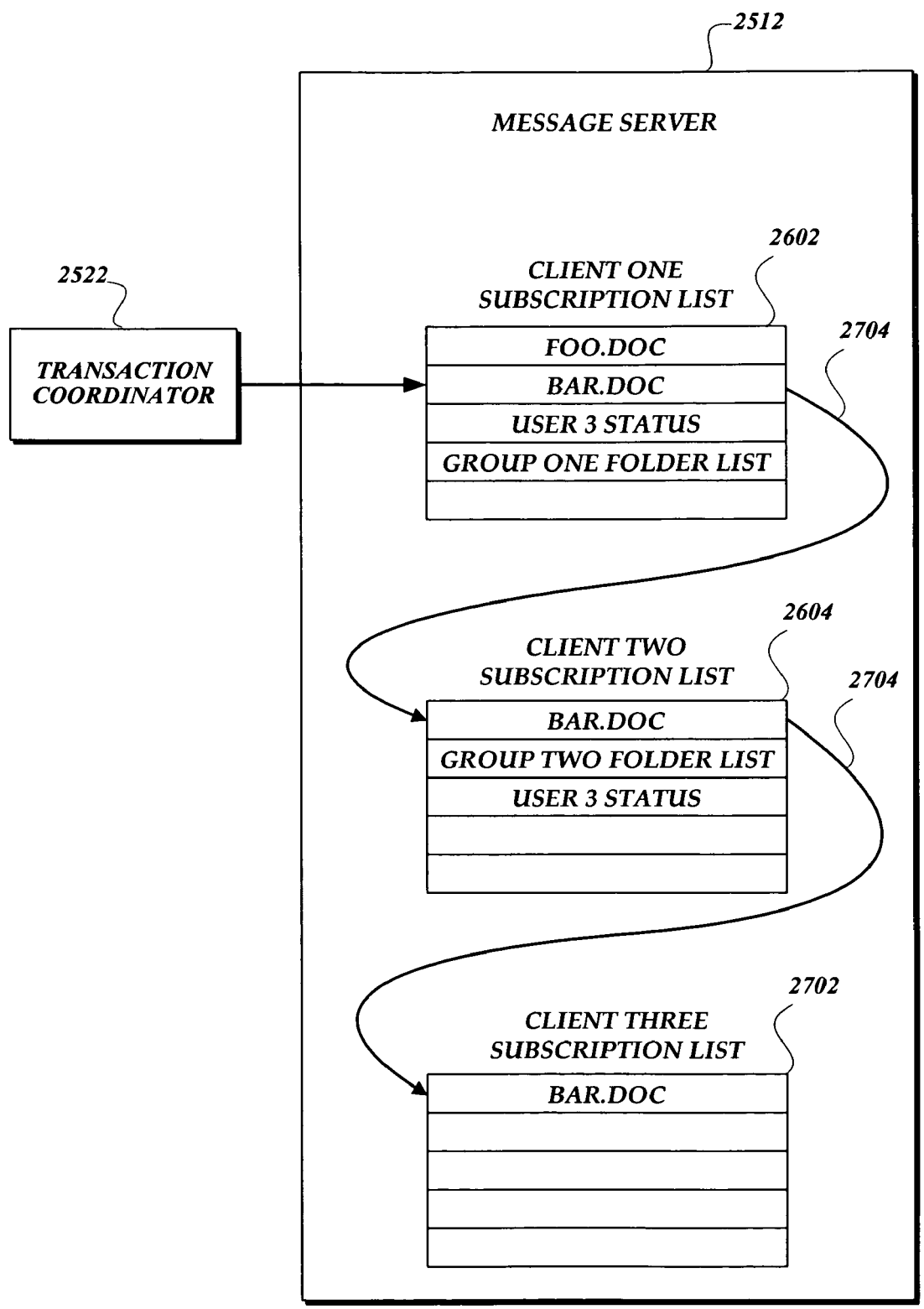
FIG. 27 illustrates additional aspects of the message server in accordance with another embodiment of the present invention.
Figure 28A:
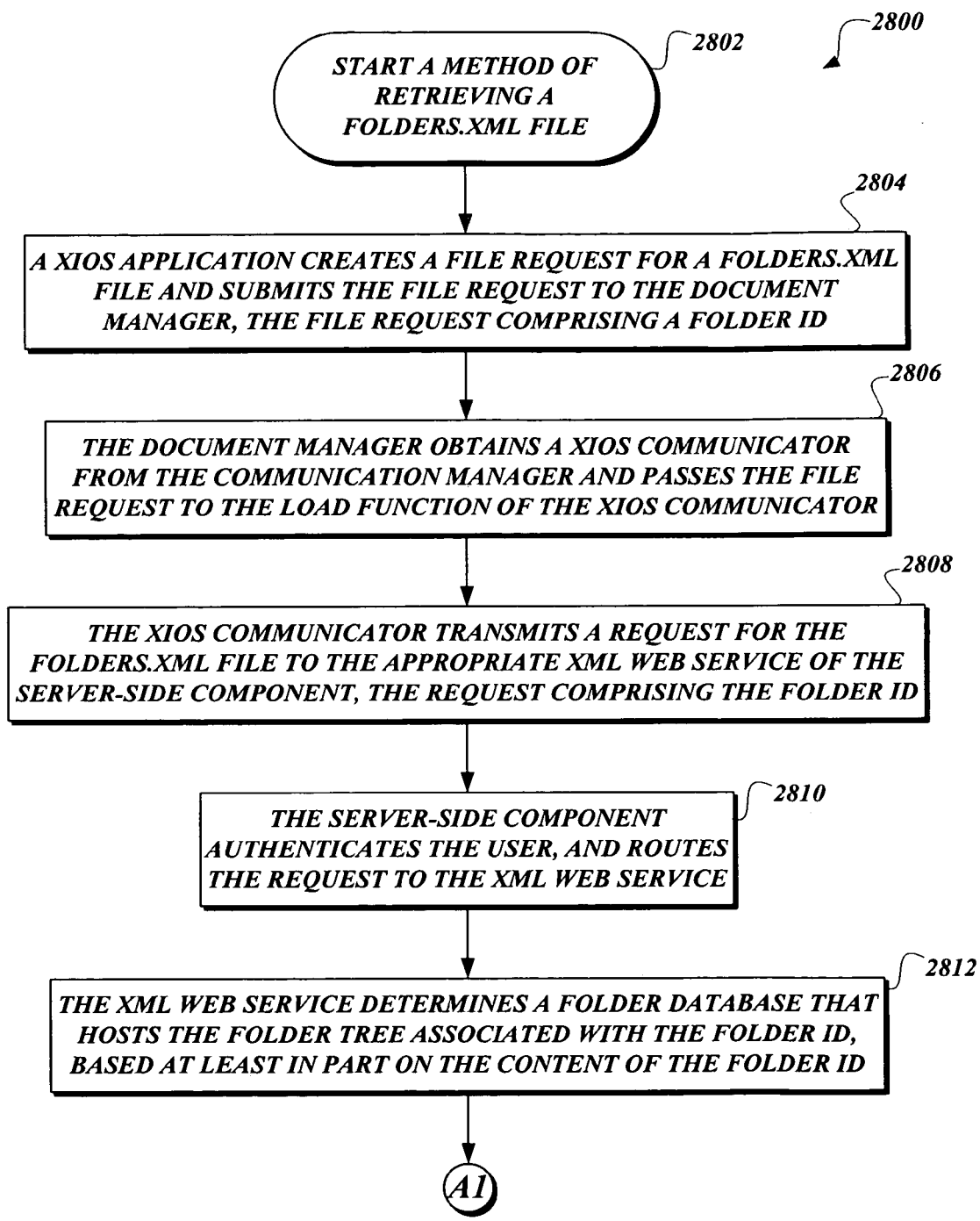
FIGS. 28A-28D illustrate an exemplary method for retrieving a file from a file system provided by the present invention.
Figure 28B:
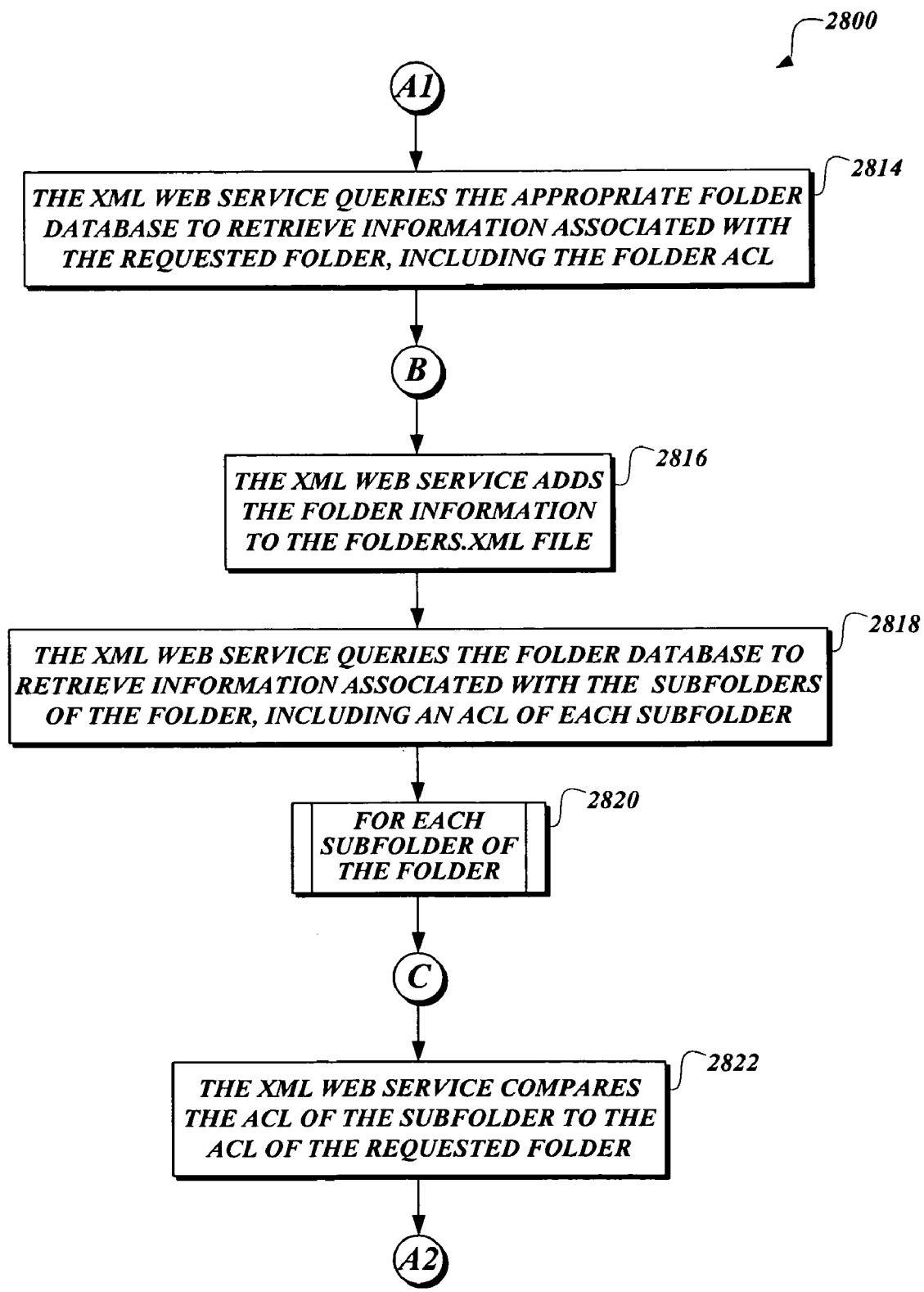
Figure 28C:
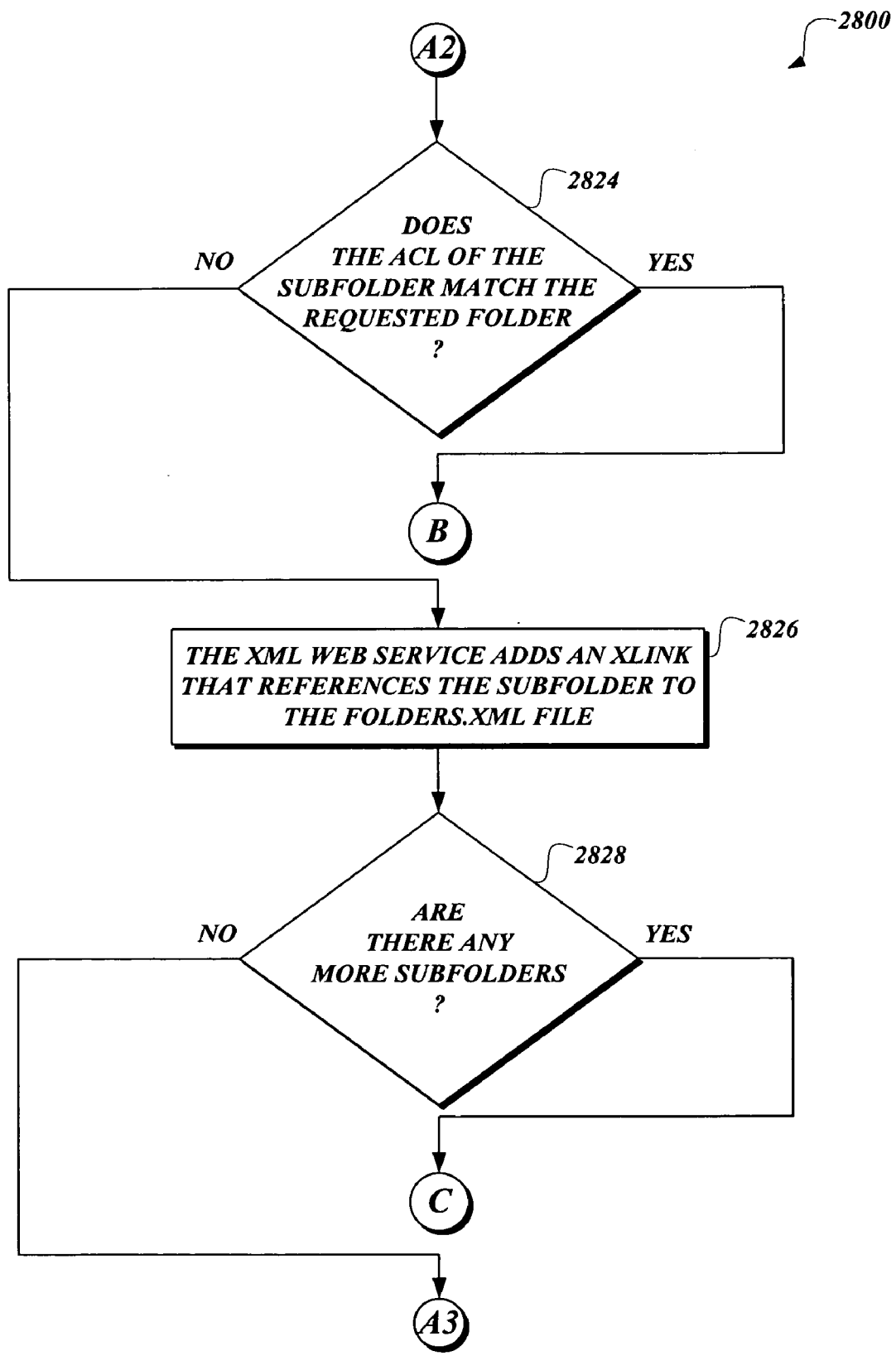
Figure 28D:
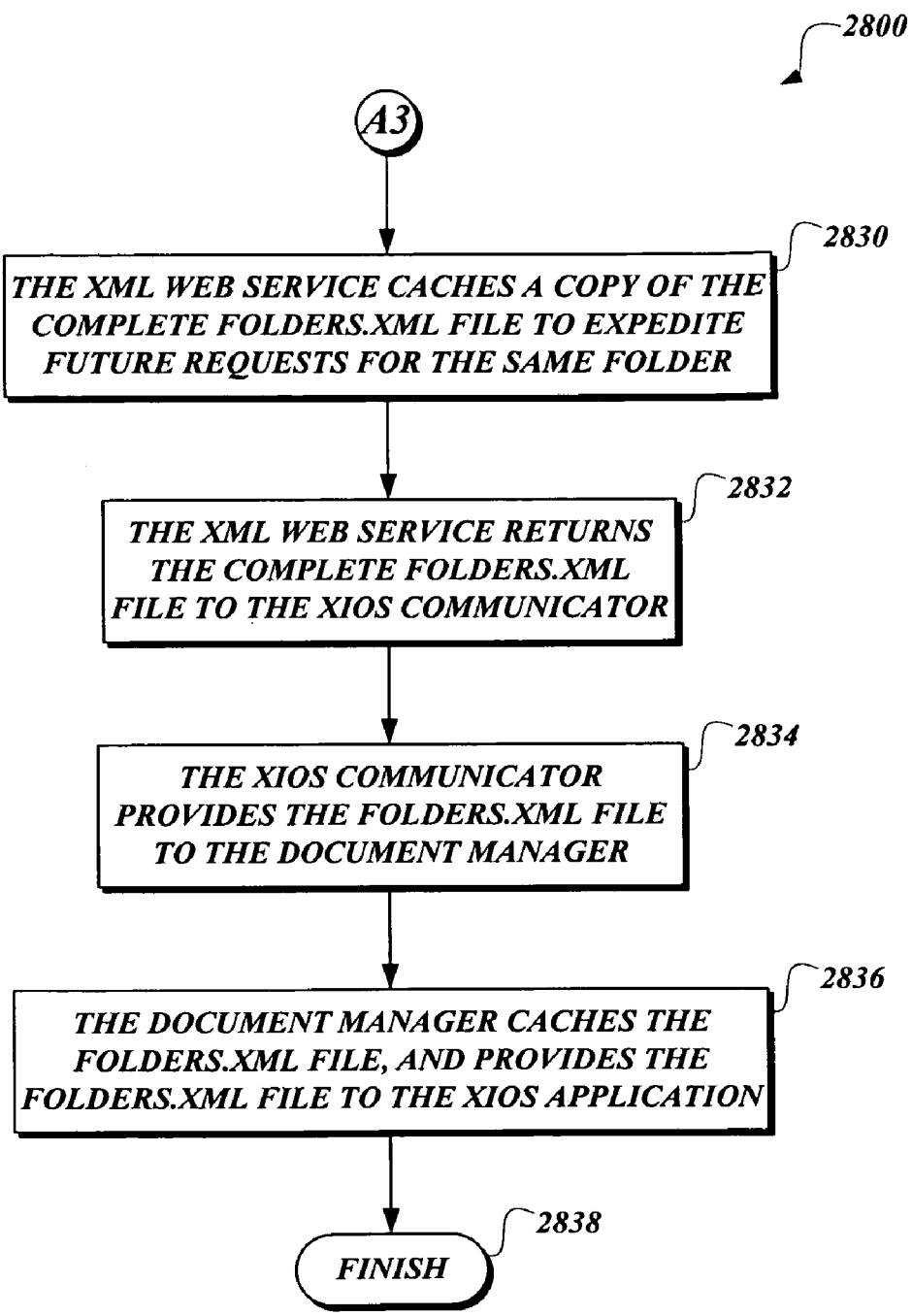

FIG. 27 illustrates another aspect of one embodiment of the operation of the message server 2512. In this figure, the message server 2512 is depicted with three subscription lists: client one subscription list 2602, client two subscription list 2604, and client three subscription list 2702. In the course of operation of the XML web service, the transaction coordinator 2522 is notified when changes occur to monitored objects. The transaction coordinator 2522 then notifies the message server 2512 that the notifications should be sent to all clients subscribed to that object.

One skilled in the art will recognize that, since the message server 2512 contains a subscription list for each client using the XML web service, and each subscription list contains an entry for each object that the associated client is listening to, the amount of data stored on the message server 2512 and the number of notifications that must be sent by the message server 2512 will grow very quickly with the number of clients connected to the XML web service. One way to reduce the amount of work needed by the message server 2512 is through the use of message chains 2704. A message chain 2704 is a linked list that associates each subscription list listening to a given object. For example, in FIG. 27, the message chain 2704 links each subscription list on the message server 2512 that is listening to the object bar.doc. Through the use of this message chain 2704, when the message server 2512 is notified that there is a change to bar.doc, the message server 2512 simply has to traverse the linked list of the message chain 2704 first by notifying client one, then by notifying client two, then by notifying client three. This removes the need for the message server 2512 to determine which of the multitude of subscription lists contain references to bar.doc, thereby saving processing time and increasing the efficiency of the message server 2512. While only one message chain 2704 is depicted in FIG. 27 for simplicity, it will be understood that there may be one message chain associated with each object in the XML file system that is currently being monitored by a client.

XIOS File System—File Operations

As discussed above, the XML file system stores the information representing the hierarchy of folders stored in the system in a folder database 2520. A XIOS application 2402 may interact with the folder hierarchy via a folders.xml file retrieved by the XIOS communicator 2504 from the XML web service 2510.

FIGS. 28A-28D illustrate one embodiment of an exemplary method 2800 for retrieving a folders.xml file. From a start block 2802, the method 2800 proceeds to block 2804, where a XIOS application 2402 creates a file request for a folders.xml file submits the file request to the document manager 912. In one embodiment, the request comprises a folder identifier ("folder ID") that both uniquely identifies a folder and provides information usable by the server-side component 2500 to indicate the location of a folder database 2520 in which the folder information is stored. The folders.xml file may contain information pertaining to the folder associated with the folder ID, and also information associated with subfolders within that folder. The folders.xml file may also contain additional metadata associated with each folder, as described above. In one embodiment, the request submitted by the XIOS application 2402 takes the form of a URL. In another embodiment, the XIOS application 2402 may simply request the folders.xml file from the document manager 912, which will form a URL representing the request.

In one embodiment, the document manager 912 may already have a cached copy of the folders.xml file, in which case the document manager 912 will simply provide the cached copy of the document to the XIOS application 2402. However, the remainder of this description assumes that no cached copy of the requested document exists within the document manager 912. The method 2800 continues to block 2806, where the document manager 912 obtains a XIOS communicator 2504 from the communication manager 2412 and passes the file request to the load function of the XIOS communicator 2504. The method 2800 then proceeds to block 2808, where the XIOS communicator 2504 transmits a request for the folders.xml file to the appropriate XML web service 2510 of the server-side component 2500, the request comprising the folder ID. Next, at block 2810, the server-side component authenticates the user, and routes the request to the XML web service 2510. The method 2800 then proceeds to block 2812, where the XML web service 2510 determines a folder database that hosts the folder tree associated with the folder ID, based at least in part on the content of the folder ID. The method 2800 then proceeds to a continuation terminal ("terminal A1").

From terminal A1 (FIG. 28B), the method 2800 proceeds to block 2814, where the XML web service 2510 queries the appropriate folder database 2520 to retrieve information associated with the requested folder. This retrieved information may include the folder access control list (ACL), and may also include additional folder metadata information. Next, the method 2800 proceeds to a continuation terminal ("terminal B") and then to block 2816, where the XML web service 2510 adds the folder information to the folders.xml file. In one embodiment, the folder information added to the folders.xml file does not include the folder ACL. Instead, the folders.xml implicitly indicates that the requesting user has at least read access to every folder in the folders.xml file. More detailed information concerning the ACLs of the folders may be obtained in this embodiment via a separate request. Examples of some of the advantages of this technique are that the size of the folders.xml file and the complexity of the processing performed by the server-side component 2500 are kept to a minimum.

At this point, the folders.xml file being constructed by the XML web service 2510 contains information pertaining to only the folder identified by the folder ID. A request for the folders.xml file for a given folder will also return information pertaining to the subfolders of the requested folder. Since folder information for multiple folders—each of which might have different associated permissions (and therefore different ACLs)—will be returned to the client in a single folders.xml file, it is important that only information about folders having matching ACLs is included in a given folders.xml file. To that end, the method 2800 proceeds to block 2818, where the XML web service 2510 queries the folder database 2520 to retrieve information associated with the immediate subfolders of the folder identified by the folder ID, including a folder ID and an ACL of each subfolder. Then, using the results of that query, the method 2800 proceeds to a FOR loop, beginning with block 2820, and a continuation terminal ("terminal C") that indicates the start of the FOR loop. From terminal C, the method 2800 proceeds to block 2822, where the XML web service 2510 compares the ACL of the subfolder to the ACL of the requested folder. The method 2800 then proceeds to another continuation terminal ("terminal A2").

From terminal A2 (FIG. 28C), the method 2800 continues to a decision block 2824, where a test is performed to determine whether the ACL of the subfolder matches the ACL of the requested folder. If the answer to the test at decision block 2824 is YES, the method 2800 returns to terminal B, adds the current subfolder to the folders.xml file at block 2816, and the method 2800 recurses on any further subfolders of the current subfolder. Otherwise, if the answer to the test at decision block 2824 is NO, the method 2800 proceeds to block 2826, where the XML web service 2510 adds an XLINK that references the subfolder to the folders.xml file, as opposed to any further information concerning the subfolder. The method 2800 then proceeds to decision block 2828, where a test is performed to determine whether there are any more subfolders.

The use of an XLINK provides the client with enough information to request a new folders.xml file containing the subfolder having a different ACL without exposing information to the client that would require a separate permission check. This is important because, as discussed above, the folders.xml file contains an implicit assertion that the client has at least read access to each folder contained within it. If a subfolder has a different ACL from the requested folder (e.g., if the subfolder is owned by a different user, if the subfolder is shared in a different group, etc.), this implicit assertion may not be true for the subfolder. The use of an XLINK allows minimal information about the subfolder to be provided to the client while still maintaining the truth of this implicit assertion.

If the answer to the test at decision block 2828 is YES, the method 2800 proceeds to continuation terminal C, and the next subfolder is processed. Otherwise, if the answer to the test at decision block 2828 is NO, the method 2800 proceeds to another continuation terminal ("terminal A3").

From terminal A3 (FIG. 28D), the method 2800 proceeds to block 2830, where the XML web service 2510 caches a copy of the complete folders.xml file to expedite future requests for the same folder (assuming changes are not made to the folder hierarchy between client requests, in which case the cached folders.xml file would be regenerated). Next, at block 2832, the XML web service 2510 returns the complete folders.xml file to the XIOS communicator 2504. The method 2800 then proceeds to block 2834, where the XIOS communicator 2504 provides the folders.xml file to the document manager 912. Next, at block 2836, the document manager 912 caches the folders.xml file, and provides the folders.xml file to the XIOS application 2402. The method 2800 then proceeds to a finish block 2836 and terminates.

FIG. 28E illustrates one example of a folders.xml file 2840 produced by an embodiment of the above-described method 2800. For the purposes of FIG. 28E, it is assumed that the XML file system 2500 stores a folder hierarchy, such as the folder hierarchy depicted in the tree component 800 of FIG. 8A, and a user has requested a folders.xml file for the folder "RESEARCH." Also depicted in FIG. 28E is a set of line numbers 2842, included for ease of discussion.

As shown in FIG. 28E, the method 2800 has created the folders.xml file 2840 in response to the request. Lines 1-4 of the file 2840 contain header information used to identify an XML version and schema for the remainder of the document. The method 2800 created an entry for the requested folder "RESEARCH" (at line 6), and then enumerated the subfolders of the requested folder to add any further folders with a matching ACL. In this case, the folders "PERSONAL," "WORK," and "LETTERS," shown in FIG. 8A and at lines 7, 8, and 12 of the file 2840, respectively, were found to have matching ACLs. The method also proceeded to add any subfolders of those folders that also have matching ACLs. In this case, the folders "PERSONAL" and "LETTERS" did not have any subfolders, but the folder "WORK" had two subfolders with matching ACLs, "BROWSERS" and "VIDEO ENCODING," found at lines 9 and 10. For each folder, the method 2800 added limited metadata information to the file 2840. In the embodiment illustrated here, the method 2800 added metadata including a "name", an "id", and a "type" for each folder, but in other embodiments, either more or less metadata may be added. Further, although the "id" elements are shown as integer values for the sake of simplicity, the "id" values may contain more complex information, as discussed above, to indicate the folder database 2520 storing the folder information. Alternatively, simple values such as the integer values may be used for the "id" elements, and a lookup may be performed to determine the folder database 2520 storing the folder information.

The method 2800 also created an entry for the folder "EMAIL," which does not have an ACL that matches the ACL of the "RESEARCH" folder. The entry for the "EMAIL" folder, shown from lines 13-19, contains minimal information about the folder, only showing its "name" element. It also contains an XLINK that may be traversed by the user to generate a new folders.xml file that contains the information for the "EMAIL" folder (as well as any subfolders having an ACL matching the "EMAIL" folder ACL).

Figure 29:
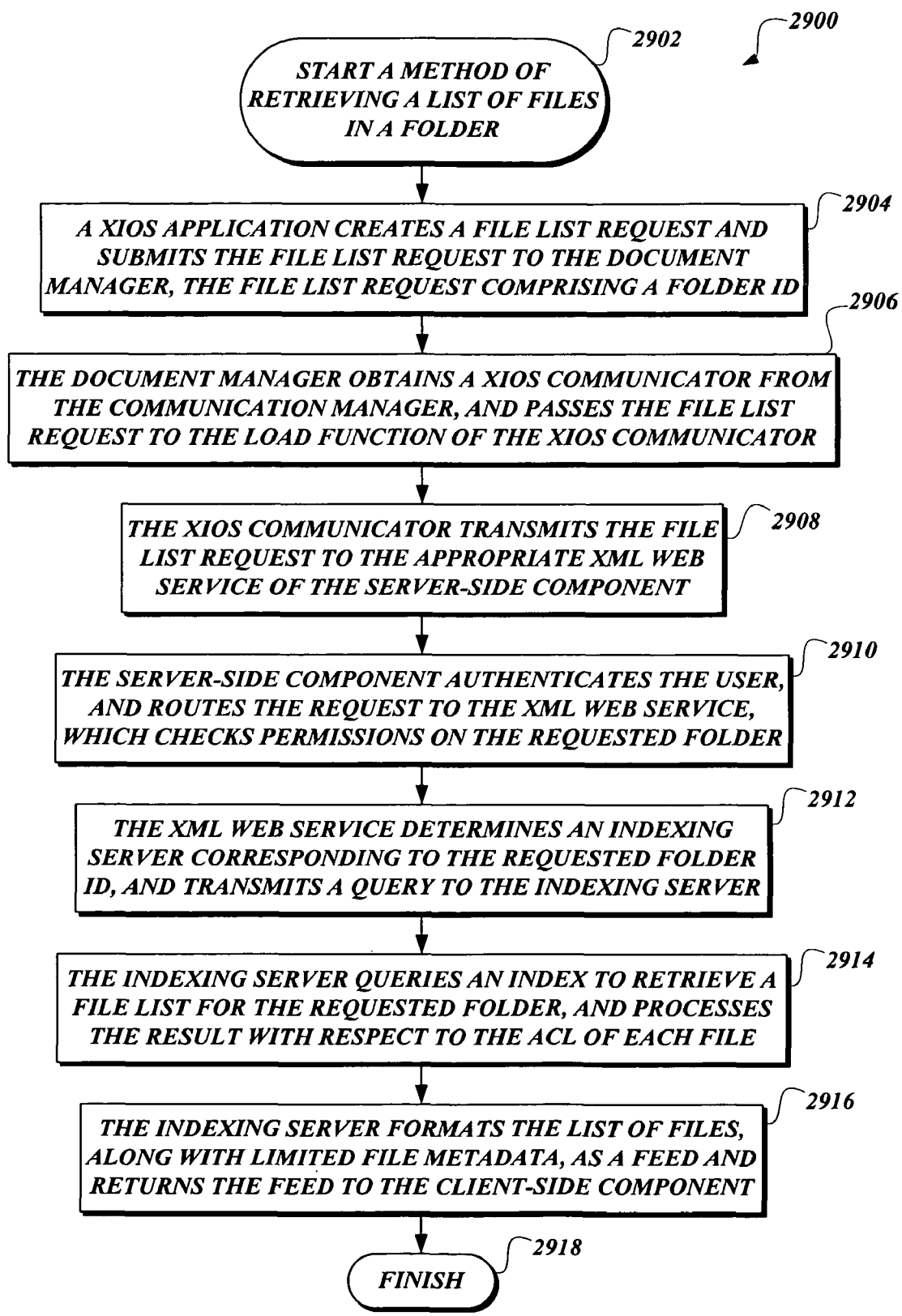
FIG. 29 illustrates a method configured to retrieve a list of files in accordance with one embodiment of the present invention.

In one embodiment, the folders.xml file contains information concerning the folder hierarchy, but not information about the individual files within the folders. FIG. 29 illustrates one embodiment of a method 2900 for retrieving a list of files in a given folder when the folders.xml file does not contain file list information. From a start block 2902, the method 2900 continues to block 2904, where a XIOS application 2402 creates a file list request and submits the file list request to the document manager 912, the file list request comprising a folder ID of a specified folder. As described above, the folder ID contains information indicating a folder database 2520 that stores information about the contents of the specified folder. The file list request may also comprise further options, such as filters for desired file types, sorting preferences, date range filters, and the like. Next, the method 2900 continues to block 2906, where the document manager 912 obtains a XIOS communicator 2504 from the communication manager 2412, and passes the file list request to the XIOS communicator 2504. Next, at block 2908, the XIOS communicator 2504 transmits the query to the appropriate XML web service 2510 of the server-side component 2500. The method 2900 then continues to block 2910, where the server-side component 2500 authenticates the user and routes the request to the XML web service 2510, which checks the permissions on the requested folder 2910. To check the permissions on the requested folder, the XML web service 2510 may query the folder database 2520 to retrieve the ACL for the given parent folder, and determine whether the ACL grants access to the authenticated user.

Once the user has been authenticated and the permissions have been verified, the method 2900 proceeds to block 2912, where the XML web service 2510 determines an indexing server 2518 corresponding to the requested folder ID, and transmits a query to the indexing server 2518. As discussed above, information contained within the folder ID may be used by the XML web service 2510 to determine the corresponding indexing server 2518. Next, at block 2914, the indexing server 2518 queries an index to retrieve a file list for the requested folder, and processes the result with respect to the ACL of each file in the list. In one embodiment, the index of the indexing server 2518 is a full-text index of file information, and one of the indexed fields for each file contains the folder ID of the parent folder. The processing of the result with respect to the ACL of each file in the list ensures that only files for which the authenticated user has access are added to the folder list. In one embodiment, this processing is omitted in order to conserve processing time, and instead the user permissions are enforced when the user attempts to access one of the files.

Next, at block 2916, the indexing server 2518 formats the list of files returned by the index, along with limited file metadata retrieved from the index, as a feed in a suitable format (e.g., ATOM, RSS, or other suitable format), and returns it to the client-side component 2400. The limited file metadata may include such items as the last modified date, the author, the file type, and the like. The method 2900 then continues to an end block 2918 and terminates.

Figure 30A:
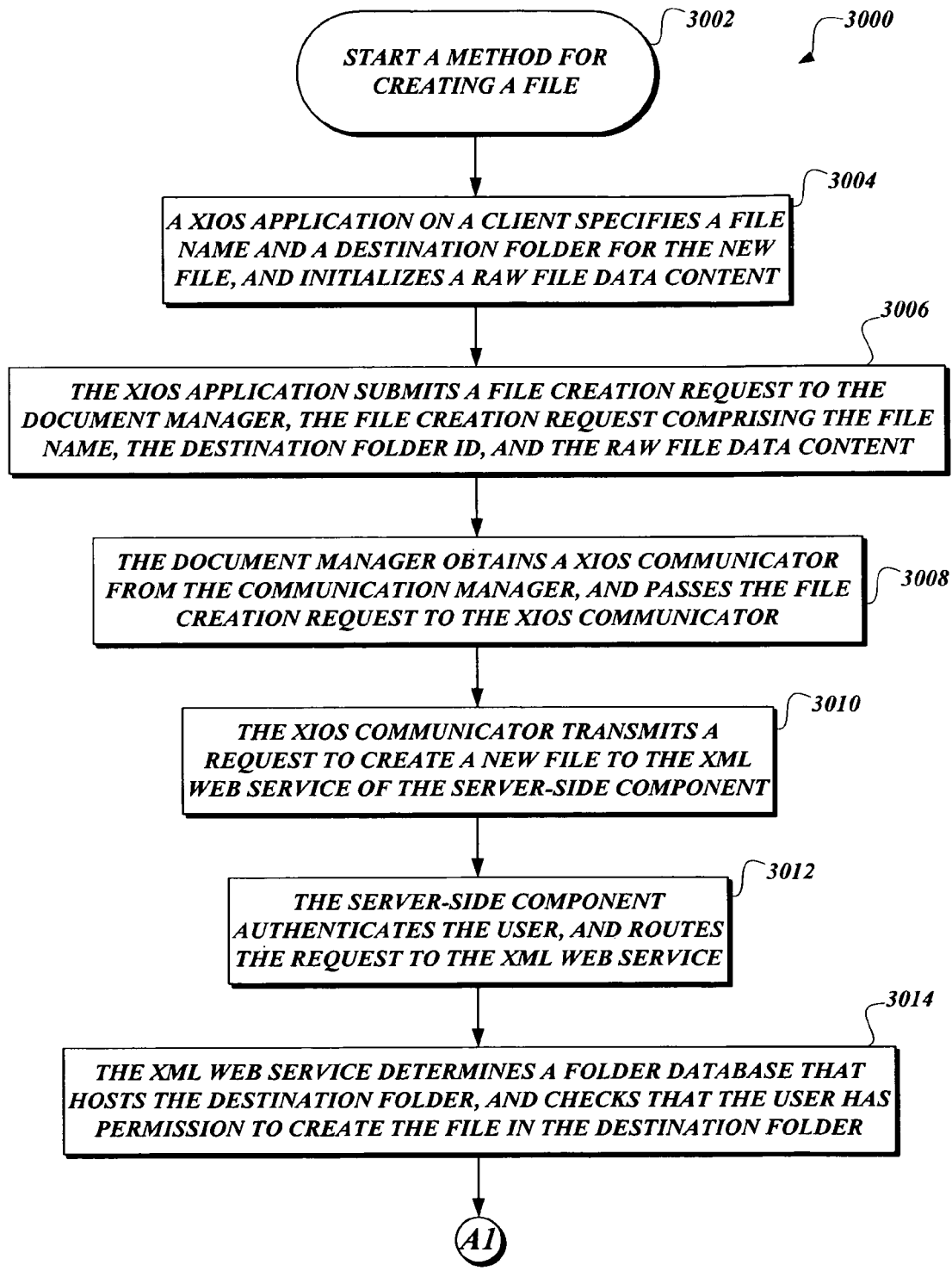
FIGS. 30A-30C illustrate a method that creates a file within the XML file system in accordance with another embodiment of the present invention.
Figure 30B:
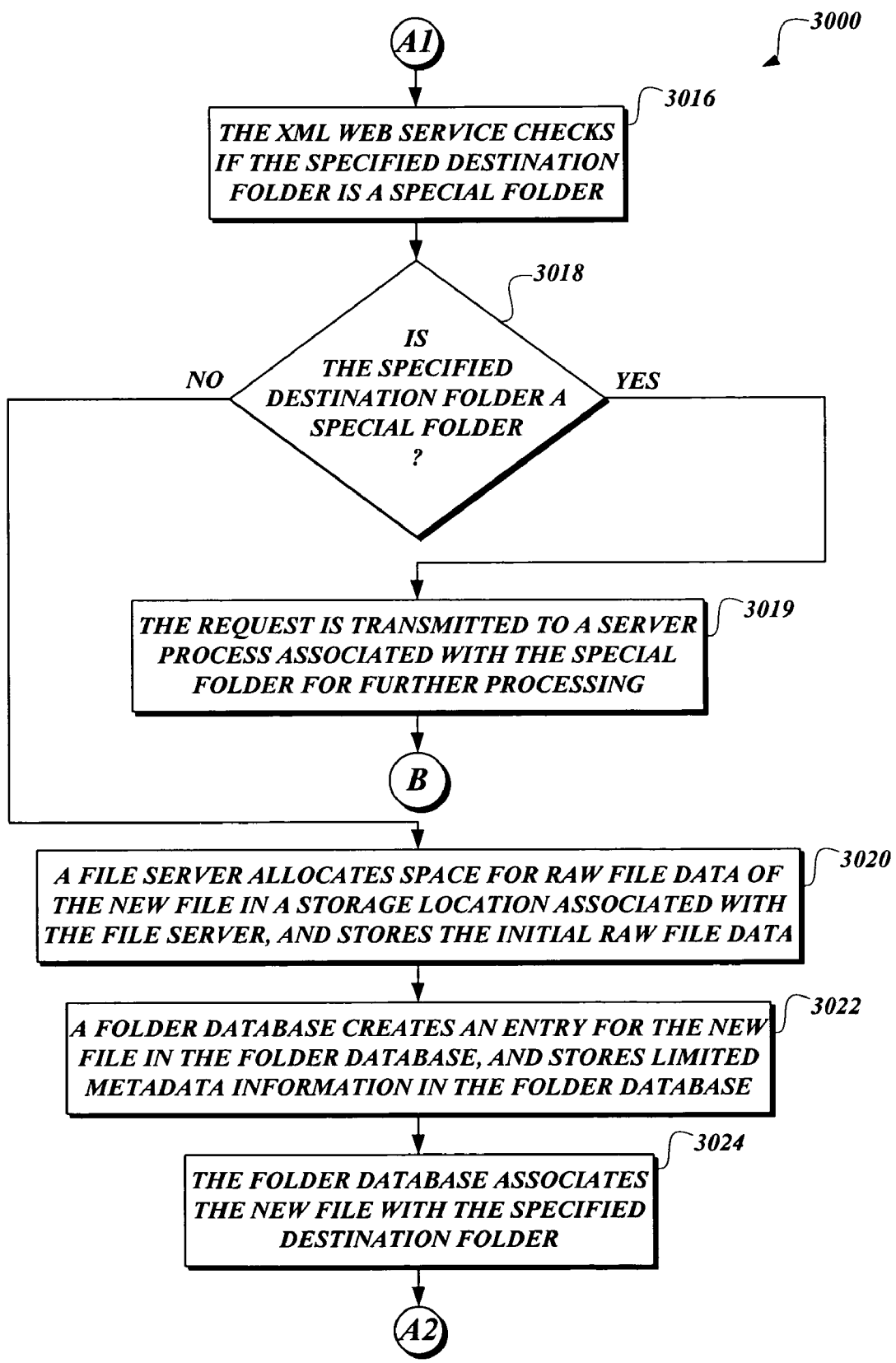
Figure 30C:
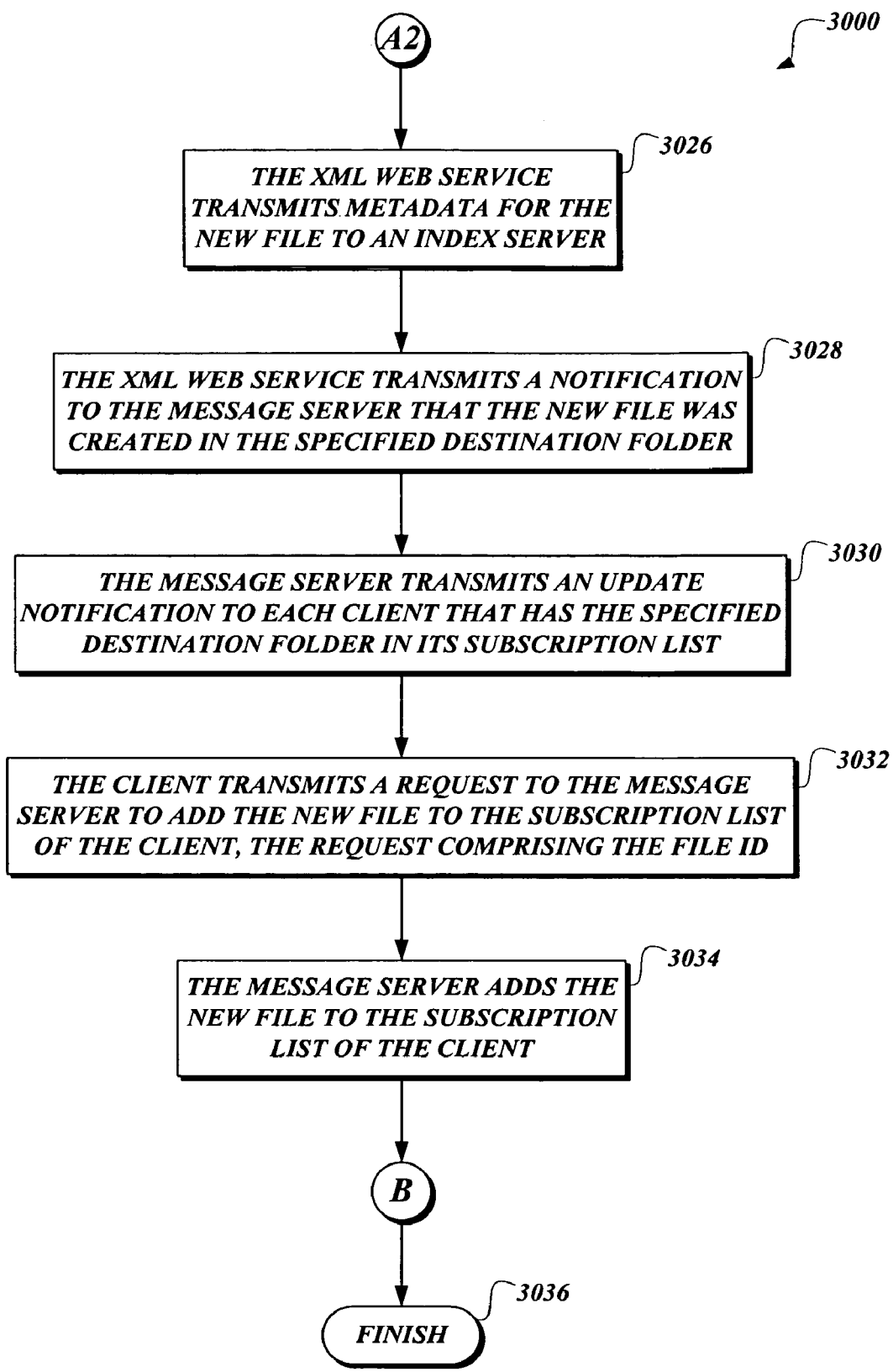
Figure 31A:
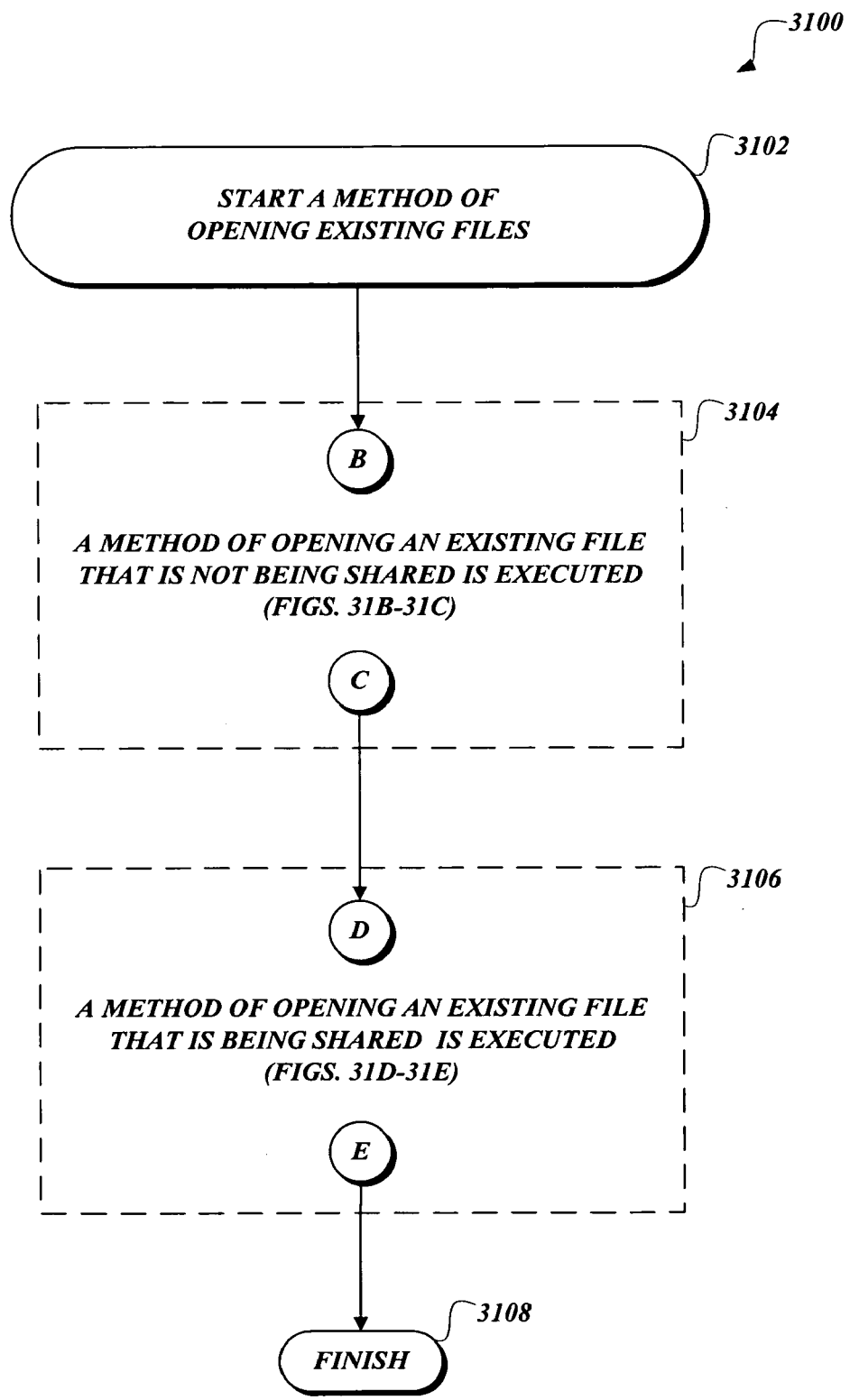
FIGS. 31A-31E illustrate a method that opens an existing file within the XML file system in accordance with another embodiment of the present invention.
Figure 31B:
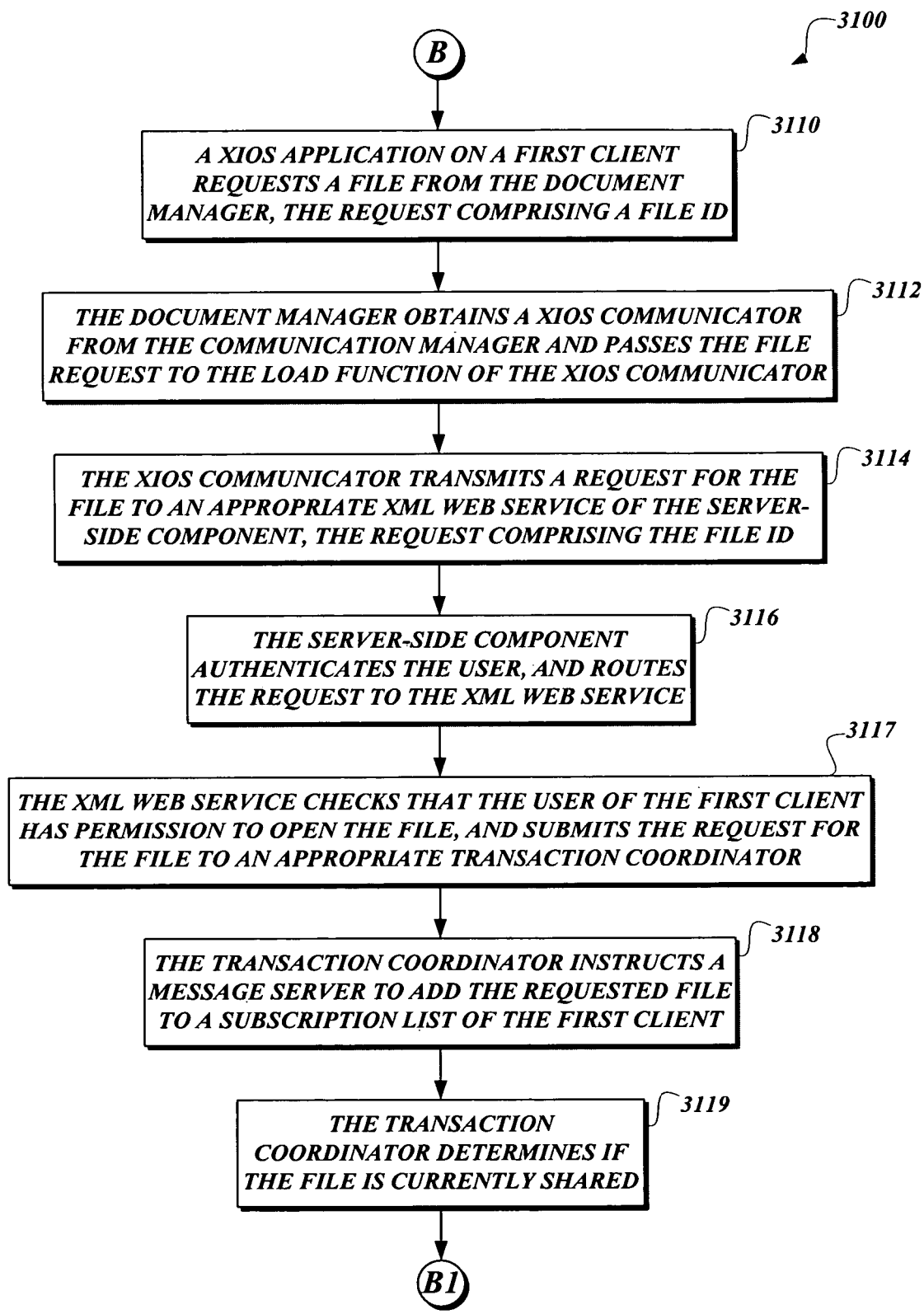
Figure 31C:
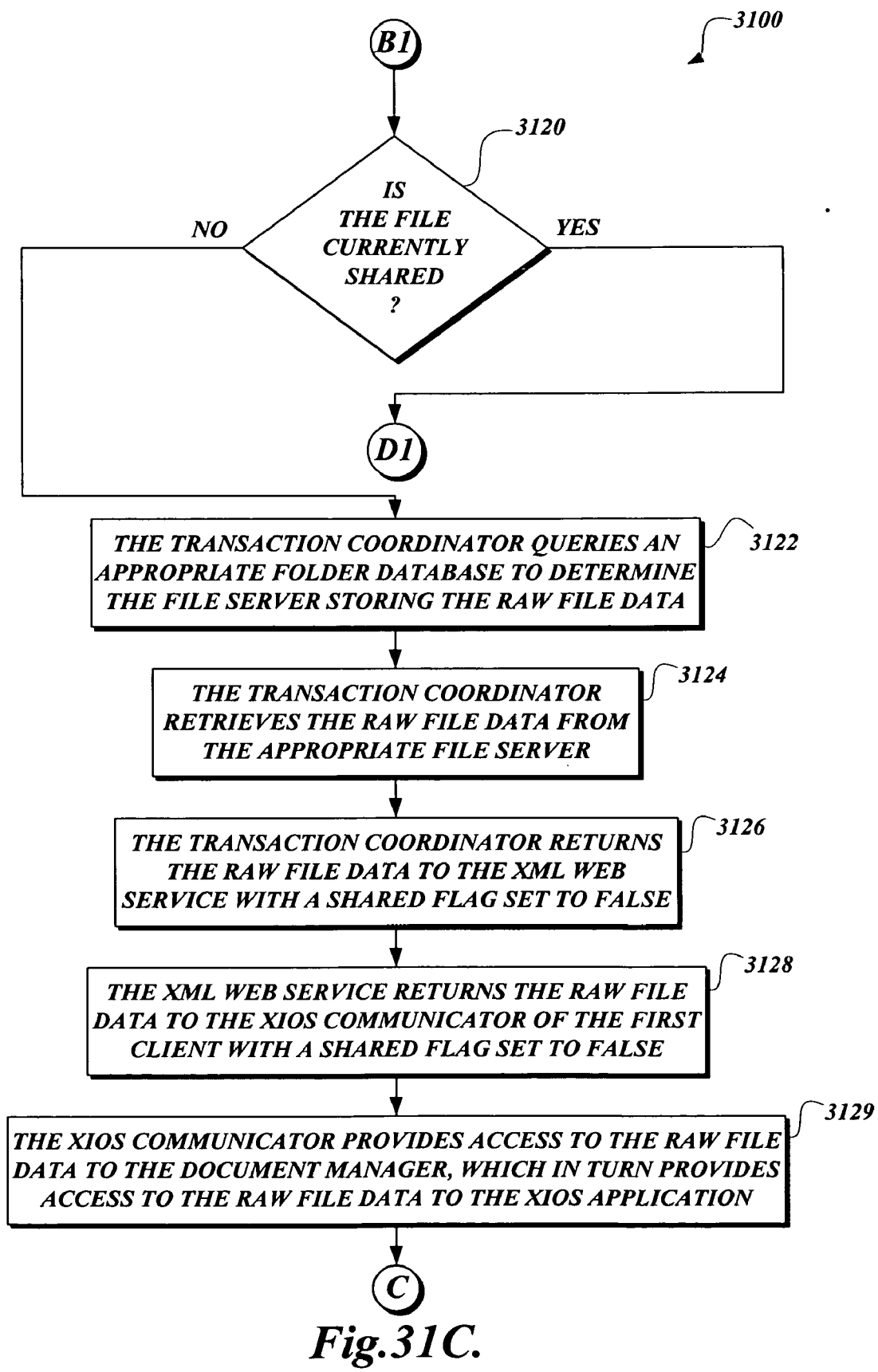
Figure 31D:
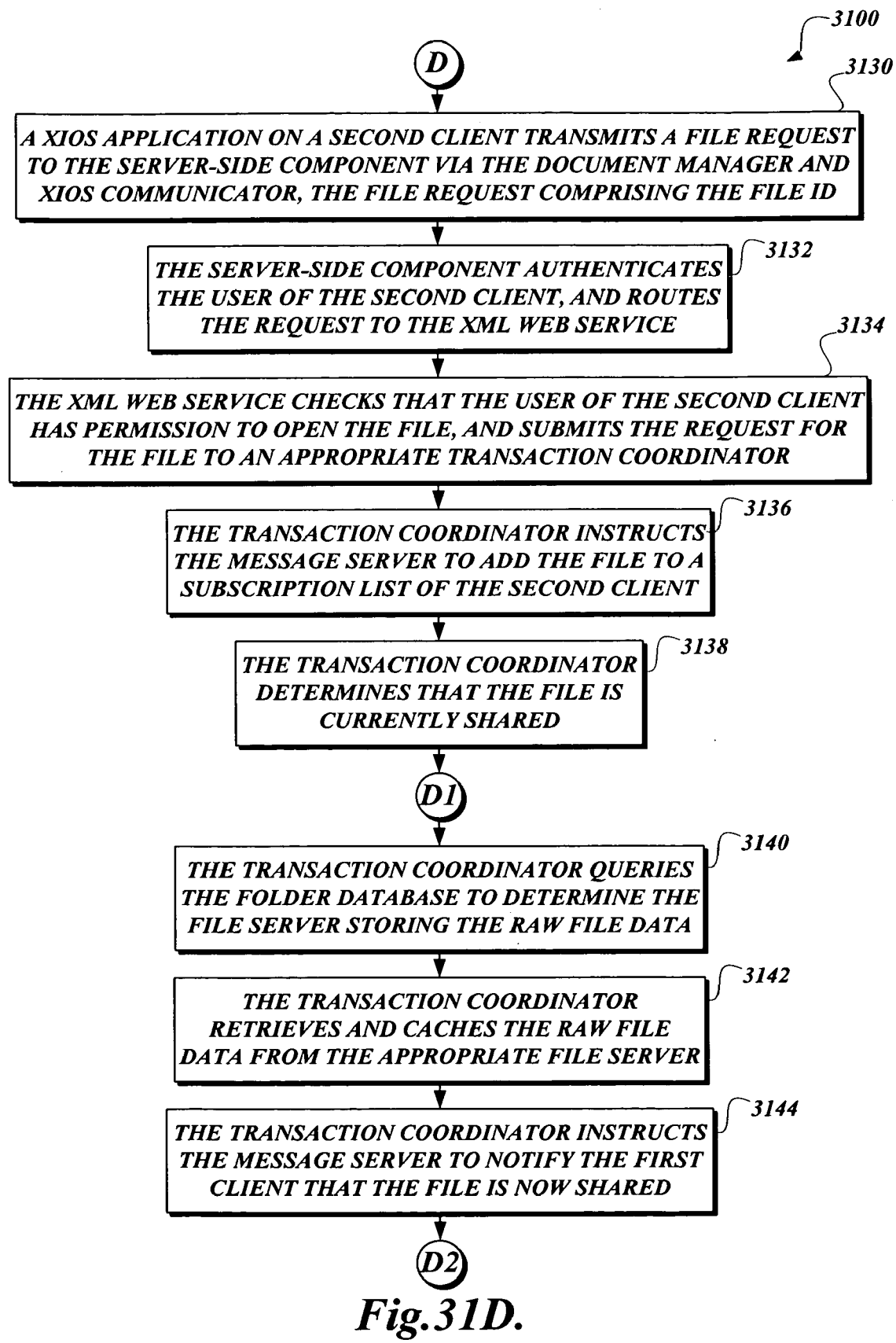
Figure 31E:
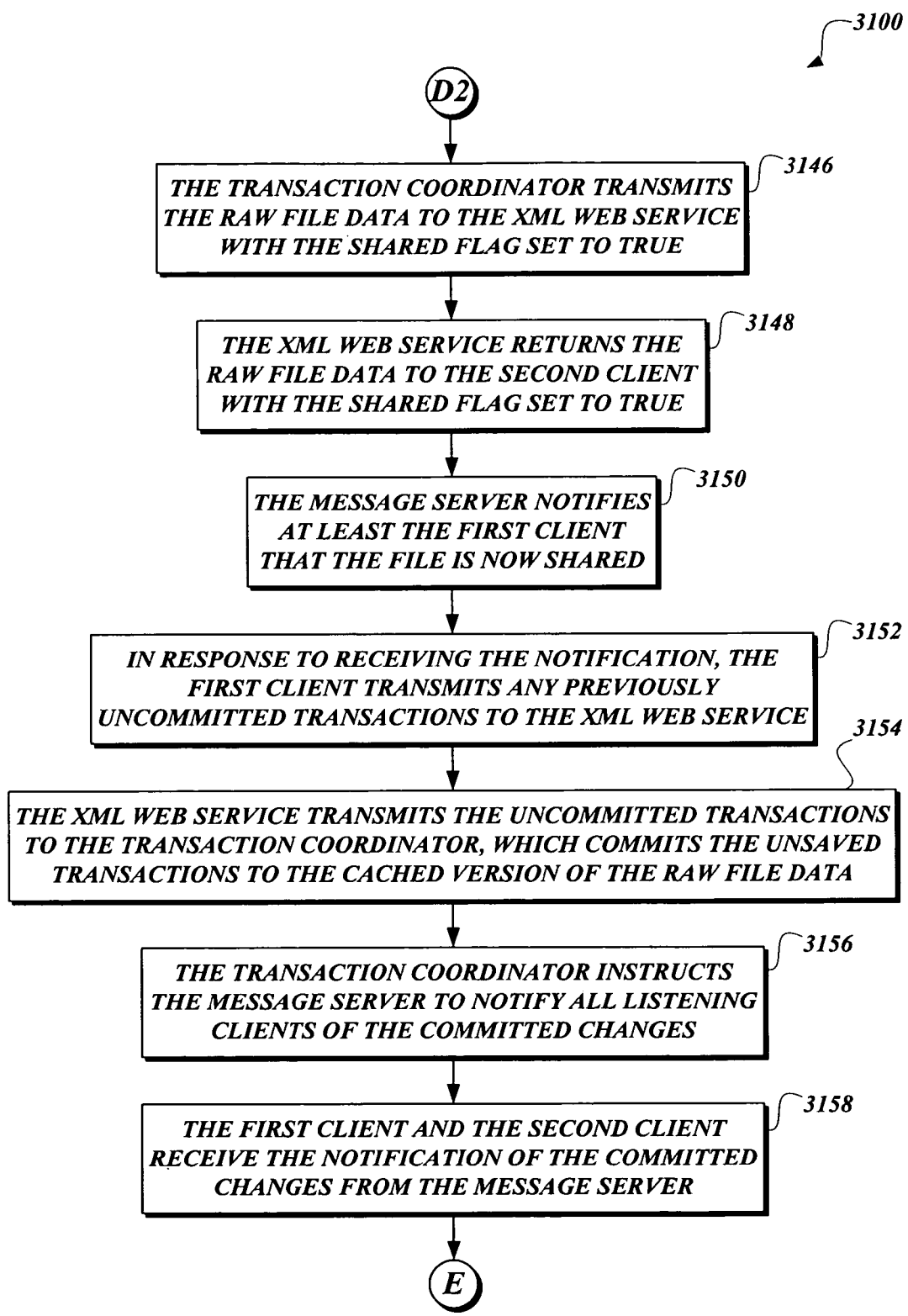

Since data is stored collaboratively in the XML file system and multiple clients may be updating a given parent folder or creating the same file, the simple creation of a file in the XML file system in some embodiments may include coordination between the file-creating client and aspects of the server-side component 2500. FIGS. 30A-30C illustrate one embodiment of a method 3000 for creating a file within the XML file system. From a start block 3002, the method 3000 proceeds to block 3004, where a XIOS application 2402 specifies a file name and a destination folder for the new file, and initializes a raw file data content. Initializing the raw file data content may create a new, empty file, or may insert existing content into the raw file data (such as when a user first saves content which she has already started to create). Next, at block 3006, the XIOS application 2402 submits a file creation request to the document manager 912, the file creation request comprising the file name, the destination folder ID, and the raw file data content. In one embodiment, at least part of this request is formatted as a URL. The method 3000 then proceeds to block 3008, where the document manager 912 obtains a XIOS communicator 2504 from the communication manager 2412, and passes the file creation request to the XIOS communicator 2504. Next, at block 3010, the XIOS communicator 2504 transmits a request to create a new file to the XML web service 2510 of the server-side component 2500. The method 3000 then proceeds to block 3012, where the server-side component 2500 authenticates the user, and routes the request to the XML web service 2510.

Next, the method 3000 then proceeds to block 3014, where the XML web service 2510 determines a folder database that hosts the destination folder, and checks that the user has permission to create the file in the destination folder. As discussed above, the folder ID of the destination folder contains information that allows the XML web service 2510 to determine a folder database that contains information associated with the destination folder. As also discussed above, the XML web service 2510 may ensure that the user has permission to create the file by querying the folder database 2520 to retrieve the ACL for the destination folder, and determining whether the ACL grants the appropriate rights to the authenticated user. The method 3000 then proceeds to a continuation terminal ("terminal A1").

From terminal A1 (FIG. 30B), the method 3000 proceeds to block 3016, where the XML web service 2510 checks if the specified destination folder is a special folder. In one embodiment, there are two types of folders in the XML file system: storage folders and special folders. A storage folder is much like a folder in a conventional file system, in that it is primarily used to store files and other folders. A special folder, in contrast, is used by the XML file system to abstract another form of communication. This allows a XIOS application 2402 to interact with this other form of communication in the same way it would interact with a file in storage, thus simplifying application development. For example, a special folder may be designated as an e-mail special folder, and creating a new file in the e-mail special folder would cause a piece of e-mail to be sent. In one embodiment, there are two special folders for each user: an incoming special folder, or "inbox," and an outgoing special folder, or "outbox." In other embodiments, more or fewer special folders exist.

The method 3000 continues to a decision block 3018, where a test is performed to determine whether the specified destination folder is a special folder. If the answer to the test at decision block 3018 is YES, the method 3000 proceeds to block 3019, where the request is transmitted to a server process associated with the special folder for further processing. One example of an embodiment of such processing is discussed below with relation to the method 3600 illustrated in FIG. 36, and the accompanying text. The method 3000 then proceeds to a continuation terminal ("terminal B").

Although FIG. 30B illustrates that a method such as method 3600 occurs before the new file is created in the special folder, this need not necessarily be the case. In one embodiment, the test performed at decision block 3018 may instead be performed after the file has been created, such as after terminal B (FIG. 30C). In such an embodiment, a server process that monitors the special folder would operate on the file created in the special folder, as opposed to operating directly on the request from the client. The server process could be notified of the creation of the file by polling the contents of the special folder. Alternatively, the server process could be notified of the creation of the file by creating a subscription list associated with the process on the message server, adding the special folder to the subscription list, and thereby receiving a notification from the message server about the creation of the file, for example at block 3030 of the method 3000.

If the answer to the test at decision block 3018 is NO, the method 3000 proceeds to block 3020, where a file server 2516 allocates space for raw file data of the new file in a storage location associated with the file server, and stores the initial raw file data at that storage location. Next, at block 3022, a folder database 2520 creates an entry for the new file in the folder database, the entry containing limited metadata associated with the file, including the file name, date created, unique file ID, storage location, and the like. In one embodiment, a file may have more than one file stream associated with a single file ID. In that case, the file server 2516 allocates a separate space in the storage location for each stream, and the metadata stored in the folder database 2520 associates the file ID with all of the storage locations. The XML file system exposes all of the streams associated with the file to the client through the available metadata of the file.

The method 3000 then proceeds to block 3024, where the folder database 2520 associates the new file with the specified destination folder. The association created between the parent folder and the new file will allow the XML web service 2510 to query the folder database 2520 and the index server 2518 using the folder ID to find the file when searching for the files contained within the folder. The method 3000 then continues to another continuation terminal ("terminal A2").

From terminal A2, (FIG. 30C), the method 3000 continues to block 3026, where the XML web service 2510 transmits metadata for the new file to an index server 2518. This metadata may be the same metadata stored by the folder database, which is copied to the index server 2518 to facilitate fast full-text searching of the metadata. The metadata transmitted to the index server 2518 may also include further information beyond that stored in the folder database for which full-text indexing would be beneficial, such as user- or application-specified properties, author information, user comments, and the like. The metadata transmitted to the index server 2518 may also include information extracted directly from one or more file streams associated with the file.

Next, at block 3028, the XML web service 2510 transmits a notification to the message server 2512 that the new file was created in the specified destination folder. Alternatively, this notification may be sent by the folder database 2520 or the index server 2518 upon detecting the association of the new file with the parent folder. The method 3000 then proceeds to block 3030, where the message server 2512 transmits an update notification to each client that has the specified destination folder in its subscription list. Next, at block 3032, the client transmits a request to the message server 2512 through the XML web service 2510 to add the new file to the subscription list of the client, the request comprising the file ID. Next, at block 3034, the message server 2512 adds the new file to the subscription list of the client. Then, the method 3000 proceeds to terminal B, and then to an end block 3036, where the method 3000 terminates.

FIGS. 31A-31E illustrate one embodiment of a method 3100 for opening existing files within the XML file system. From a start block 3102, the method 3100 continues to a set of method steps 3104, defined between a continuation terminal ("terminal B") and an exit terminal ("terminal C"). The set of method steps 3104 describes a method of opening an existing file that is not being shared (in other words, a file that is not currently opened by another client). From terminal B (FIG. 31B), the method 3100 proceeds to block 3110, where a XIOS application 2402 on a first client requests a file from the document manager 912, the request comprising a file ID. In one embodiment, the request is in the form of a URL. The request may comprise a file ID that is incorporated into a newly generated URL, or the first client may already have obtained a URL capable of addressing the file, such as a file URL included within a file list. In one embodiment, the URL may not contain the file ID itself, but instead comprises information from which the file ID may be derived.

Next, at block 3112, the document manager 912 obtains a XIOS communicator 2504 from the communication manager 2412 and passes the file request to the XIOS communicator 2504. The method 3100 then proceeds to block 3114, where the XIOS communicator 2504 transmits a request for the file to an appropriate XML web service 2510 of the server-side component 2506, the request comprising the file ID. As described above, the request may be in the form of a URL which comprises the file ID, or may instead comprise information from which the file ID may be derived. Next, at block 3116, the server-side component 2506 authenticates the user, and routes the request to the XML web service 2510.

In one embodiment, the file ID or the file URL contained within the request also contains information indicating a file server 2516 on which the file resides, to help the XML web service 2510 to determine an appropriate folder database 2520, file server 2516, or transaction coordinator 2522 for obtaining the file. In another embodiment, the request may also include the folder ID of the parent folder, and the XML web service 2510 may determine the appropriate data storage servers for obtaining the file based on information contained within in the folder ID. The number of different servers that must be contacted for a single file request, and accordingly the amount of information provided in the file ID or file URL, depends on how the database is partitioned, and thereby the amount of scalability provided by the particular embodiment.

Next, at block 3117, the XML web service 2510 checks that the user of the first client has permission to open the file, and submits the request for the file to an appropriate transaction coordinator 2522. In one embodiment, the XML web service 2510 checks the client permissions by retrieving the ACL for the file from an appropriate folder database 2520, and by checking if the ACL allows the authenticated user to access the file. Next, at block 3118, the transaction coordinator 2522 instructs a message server 2512 to add the requested file to a subscription list of the first client. The method 3100 then proceeds to block 3119, where the transaction coordinator 2522 determines if the file is currently shared. The method 3100 then proceeds to a continuation terminal ("terminal B1").

From terminal B1 (FIG. 31C) the method 3100 proceeds to decision block 3120, where a test is performed to determine whether the file is currently shared. If the answer to the test at decision block 3120 is YES, the method proceeds to a continuation terminal ("terminal D1"). Otherwise, if the answer to the test at decision block 3120 is NO, the method 3100 proceeds to block 3122, where the transaction coordinator 2522 queries an appropriate folder database 2520 to determine the file server 2516 storing the raw file data. Next, at block 3124, the transaction coordinator 2522 retrieves the raw file data from the appropriate file server 2516. Then, at block 3126, the transaction coordinator 2522 returns the raw file data to the XML web service 2510 with the shared flag set to FALSE. Next, at block 3128, the XML web service 2510 returns the raw file data to the XIOS communicator 2504 of the first client with a shared flag set to FALSE. The method 3100 then proceeds to block 3129, where the XIOS communicator 2504 provides access to the raw file data to the document manager 912, which in turn provides access to the raw file data to the XIOS application 2402. The method 3100 then proceeds to another continuation terminal ("terminal C").

From terminal C (FIG. 31A), the method 3100 proceeds to a set of method steps 3106 defined between terminal D and terminal E, which describes a method of opening an existing file that is being shared by another client. For the purposes of this description, this set of method steps 3106 assumes that the set of method steps 3104 has already been executed by the first client, and hence the requested file has already been opened by the first client.

From terminal D (FIG. 31D), the method 3100 proceeds to block 3130, where a XIOS application 2402 on a second client transmits a file request to the server-side component 2514 via the document manager 912 and XIOS communicator 2504, the file request comprising the file ID. As discussed above, the request may be in the form of a URL comprising the file ID, or may be in the form of a URL comprising information from which the file ID may be derived. Since the individual actions that comprise the actions at block 3130 were described in detail above, those more detailed descriptions have been omitted here for brevity. Next, at block 3132, the server-side component 2514 authenticates the user of the second client, and routes the request to the XML web service 2510. The method 3100 then proceeds to block 3134, where the XML web service 2510 checks that the user of the second client has permission to open the file, and submits the request for the file to an appropriate transaction coordinator 2522. The method 3100 then proceeds to block 3136, where the transaction coordinator 2522 instructs the message server 2512 to add the file to a subscription list of the second client. One skilled in the art will recognize the similarities between the method defined between blocks 3110-3116, and the corresponding blocks 3130-3136, as up to this point, there is little difference between the method for opening a file that is shared and opening a file that is not shared.

Next, at block 3138, the transaction coordinator 2522 determines that the requested file is currently shared. At this point, the method for opening a file that is shared diverges from the method for opening a file that is not shared. The method 3100 proceeds to terminal D1, and then to block 3140, where the transaction coordinator 2522 queries the folder database 2520 to determine the file server 2516 storing the raw file data. Next, at block 3142, the transaction coordinator 2522 retrieves and caches a copy of the raw file data from the appropriate file server 2516. Next, at block 3144, the transaction coordinator 2522 instructs the message server 2512 to notify the first client that the file is now shared. The method 3100 then proceeds to another continuation terminal ("terminal D2").

From terminal D2 (FIG. 31E), the method 3100 proceeds to block 3146, where the transaction coordinator 2522 transmits the raw file data to the XML web service 2510 with the shared flag set to TRUE. This will notify the XML web service 2510 and the XIOS communicator 2504 to treat the raw file data differently than if the file was not shared. Next, at block 3148, the XML web service 2510 returns the raw file data to the second client with the shared flag set to TRUE. The method 3100 then proceeds to block 3150, where the message server 2512 notifies at least the first client that the file is now shared. The method 3100 then proceeds to block 3152 where, in response to receiving the notification that the file is now shared, the first client transmits any previously uncommitted transactions to the XML web service 2510.

As discussed below, as changes are made to the file data model on the first client, the transaction manager 910 of the first client may gather these changes without immediately transmitting them to the XML web service 2510 for storage. This is especially likely if the first client was operating in an offline mode, but it may also occur due to high network latency, high processor load, and the like. When the first client receives the notification that the file is now shared, the transaction manager 910 takes any uncommitted transactions and transmits them to the XML web service 2510.

At block 3154 of the method 3100, the XML web service 2510, after receiving these transactions, transmits the uncommitted transactions to the transaction coordinator 2522, which commits the unsaved transactions to the cached version of the raw file data that is stored by the transaction coordinator 2522. These transactions will eventually be committed to the raw file data on the file server 2516. In one embodiment, the transactions will be committed when a client holding the file executes a save command. In another embodiment, the changes will be committed after a certain time period. In yet another embodiment, the changes will be committed after all client users of the document have disconnected. Next, at block 3156, the transaction coordinator 2522 instructs the message server 2512 to notify all listening clients of the committed changes. The method 3100 then proceeds to block 3158, where the first client and the second client receive the notification of the committed changes from the message server. Next, the method 3100 proceeds to terminal E and terminates.

Network Operating System Client Component Startup

Figure 32A:
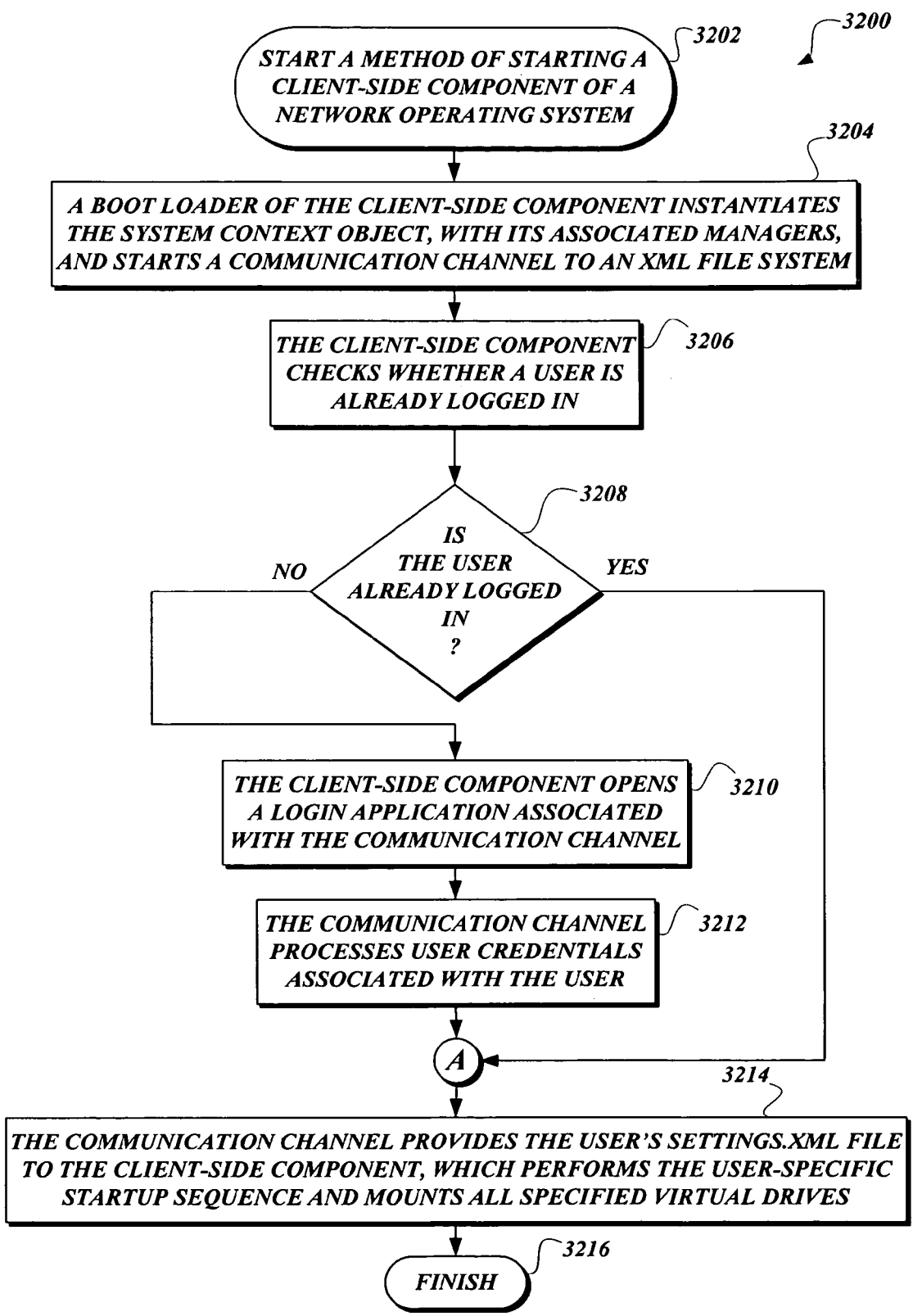
FIGS. 32A-B illustrate logic used to initiate startup of the network operating system on a client computer in accordance with one embodiment of the present invention.

FIG. 32A illustrates one embodiment of a method 3200 of starting a client-side component 2400 of a network operating system. From a start block 3202, the method 3200 proceeds to block 3204, where a boot loader of the client-side component 2400 instantiates the system context object 902 (FIG. 9) with its associated managers and starts a communication channel to an XML file system 2500. In some embodiments, the use of a boot loader is not required, since the XML virtual machine is already contained in the client-side component 2400. For example, this would be the case in embodiments where the client-side component 2400 is implemented outside a Web browser as a stand-alone application, such as within a mobile device, on a set-top box or thin client component. This would also be the case for embodiments implemented as a machine operating system that does not require a host operating system for execution. The network operating system can work by retrieving files, including the files that define the startup process, over any network connection, including but not limited to using the HTTP protocol over the Internet. Even without the startup process described in method 3200, the network operating system will operate, but any initial configuration will be driven by a user executing the configuration steps manually.

Unlike traditional operating systems, some embodiments of the client-side component 2400 may be hosted within another program, such as within an existing Web browser. For those embodiments, particular settings concerning the startup sequence, including which particular XML file system(s) 2500 to connect to or the communication channel to start, may be determined by a location URL navigated to using the host program, HTTP query parameters, HTTP cookies, or other configuration parameters associated with the client (such as IP, location, machine, browser ID, etc.). For example, directing a Web browser to http://os1.icloud.com may cause the client-side component 2400 to connect to a first XML file system 2500, and directing a Web browser to http://os2.icloud.com may cause the client-side component 2400 to connect to a second XML file system 2500 hosted in a different location from the first XML file system 2500.

Figure 32B:
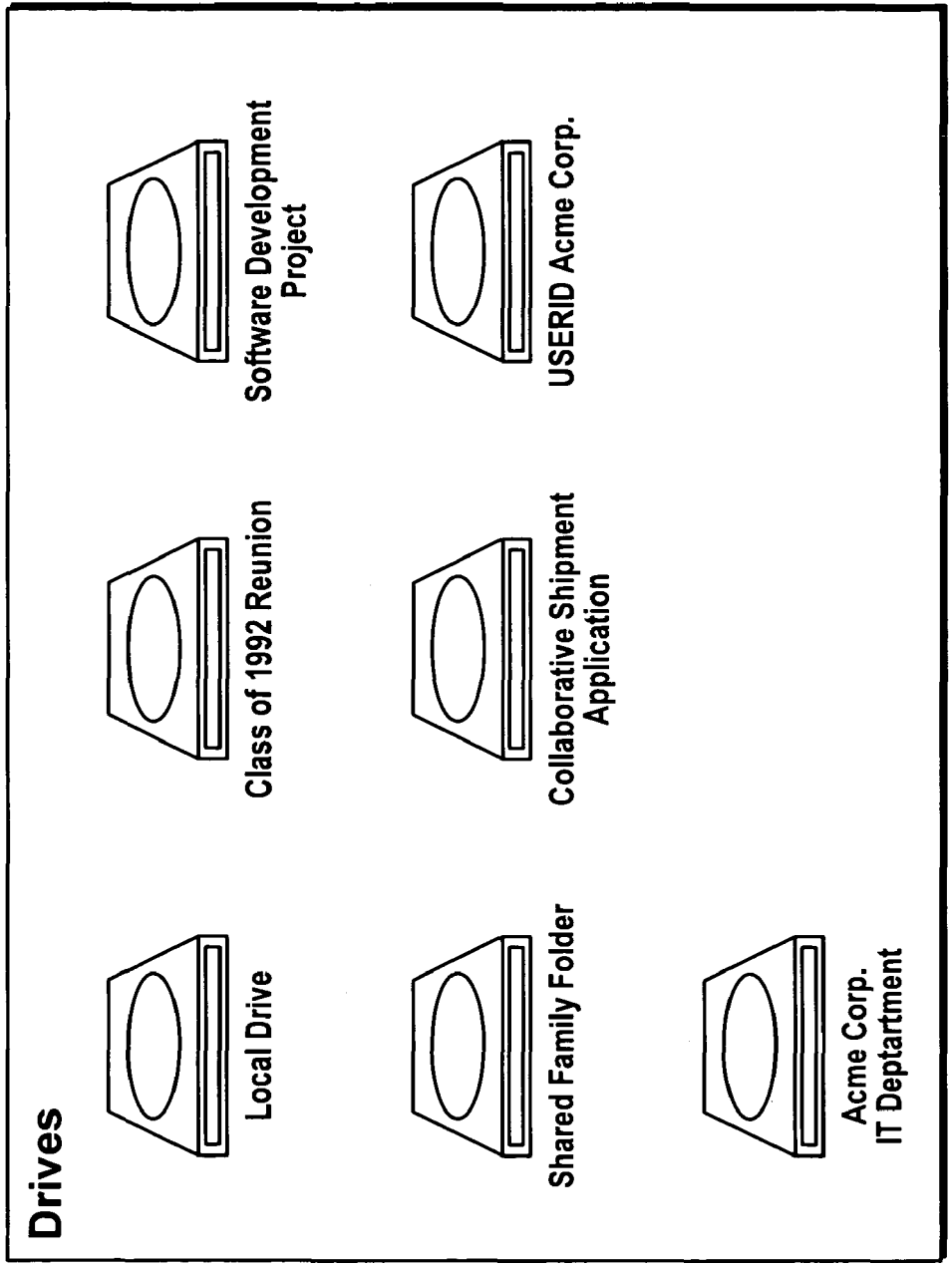

In one embodiment, the client-side component 2400 may start a communication channel to a data source other than (or in addition to) an XML file system 2500 during the startup sequence, and may either connect to a remote data source or may access a local data source. For example, one file system may be a global XIOS file system provided through a service provider data center. Another file system connected to during the startup sequence may be installed locally on an enterprise network. A third file system connected to during the startup sequence may give access to a user's local hard drive. FIG. 32B illustrates several examples of data sources bound by the client-side component 2400 during startup as drives. For instance, a drive of the local machine has been bound as "Local Drive." Also, a folder in an XML file system 2500 has been bound as "Shared Family Folder." As yet another example, the root folder for a group has been bound as "Class of 1992 Reunion." Importantly, while each of these data sources is stored in a different place and is accessed via differing techniques, the differences are hidden from XIOS applications 2402, which would see each data source simply as an accessible drive. While these examples are not exhaustive, they are intended to show that the startup sequence may connect to one or more than one file system. Once a user is authenticated the startup sequence may be continued with a user-specific startup sequence that may include connections to additional file systems and the initialization of additional channels.

Another difference between embodiments of the network operating system hosted within another program and a traditional operating system is that operations performed with respect to the host program may interrupt the execution of the client-side component 2400. For example, after a user has successfully completed the startup sequence and is logged in to the network operating system, the host program may perform an operation to reload the client-side component 2400. In some embodiments, the client-side component 2400 handles this situation by making the logged-in state of the network operating system before reloading available to the client-side component 2400 after reloading to restore its state. To that end, at block 3206 (FIG. 32A), the client-side component 2400 checks whether a user is already logged in. The method 3200 continues to a decision block 3208, where a test is performed to determine whether the user is already logged in. If the answer to the test at decision block 3208 is YES, the method 3200 proceeds to a continuation terminal ("terminal A"), thereby skipping the login portion of the startup method.

If the answer to the test at decision block 3208 is NO, the method 3200 proceeds to block 3210, where the client-side component 2400 opens a login application associated with the communication channel. The particular login application to be launched may be determined by the communication channel, but typically, a login application will securely request credentials from the user, such as a user name and a password. Other embodiments of the login procedure exist where the login information is requested before the boot loading has started, and that login information is directly passed into the communication channel for authentication without further user interaction. In embodiments where there is no boot loader, the client-side component 2400 may pass the login information directly into the communication channel for authentication. Variations may also occur where the boot loader, after loading directly, will by itself ask for the login information, and then pass the information on to the communication channel without utilizing a separate login application. Next, at block 3212, the communication channel processes the user credentials. The communication channel may process the user credentials by transmitting them to an authentication service, or by processing them locally.

The method 3200 then proceeds to terminal A. From terminal A, the method 3200 proceeds to block 3214, where the communication channel provides the user's settings.xml file to the client-side component 2400, which uses the settings.xml file to perform a user-specific startup sequence and to mount all specified virtual drives. The communication channel may obtain the settings.xml file from a remote data source, obtain the settings.xml file from a local data source, or generate a default settings.xml file based on communication channel-specific defaults. The settings.xml file contains a collection of user-specific settings for configuration of the network operating system. These settings may include, but are not limited to: a user name, an email address, settings for various applications, a collection of virtual drives (communication channels) and associated root folder IDs to be mounted upon startup (including groups, as discussed below), a list of friends, and a startup sequence. The startup sequence contained in the settings.xml file specifies what programs the client-side component 2400 should launch after a successful login, including which desktop manager, console, or start application to open, if any. Next, the method proceeds to a finish block 3216 and terminates.

In some embodiments, the settings.xml file is more of a passive container of metadata representing various items in the network operating system, and the startup application plays a more central role in driving the startup sequence. For example, in one embodiment, the startup application is executed, and then executes a second application, such as a desktop application, to display a desktop to the user. Although this sequence would be executed by the startup application in this embodiment, the startup application may nevertheless determine which second application to execute by consulting the settings.xml file.

Network Operating System Groups and Friends

In the network operating system, groups are used to quickly and efficiently enable collaboration and file sharing between users. Unlike other systems, the creation of a new group and the enabling of collaboration and file sharing in the network operating system is very lightweight. For example, in one embodiment, a user need simply right-click to create a new group, which will automatically create a common storage folder and allow members of the group to exchange messages, create a new identity to interact with other members of the group, and collaborate with one another in real time.

A group, upon creation, stores a collection of group information. This group information includes a root folder ID, which acts as a reference to a storage location in an XML file system 2500, as described above. The folders and files located at this storage location will be accessible only to members of the group. As described above, upon starting the client-side component 2400, a settings.xml file is obtained for the logged-in user. This settings.xml file contains a collection of references to the groups of which the user is a member. Those references can then be used by the client-side component 2400 to mount the group as if it was any other storage location or file system by providing a reference to the desired group to the communication manager 2412 in order to launch the appropriate communicator and communication channel.

Figure 33:
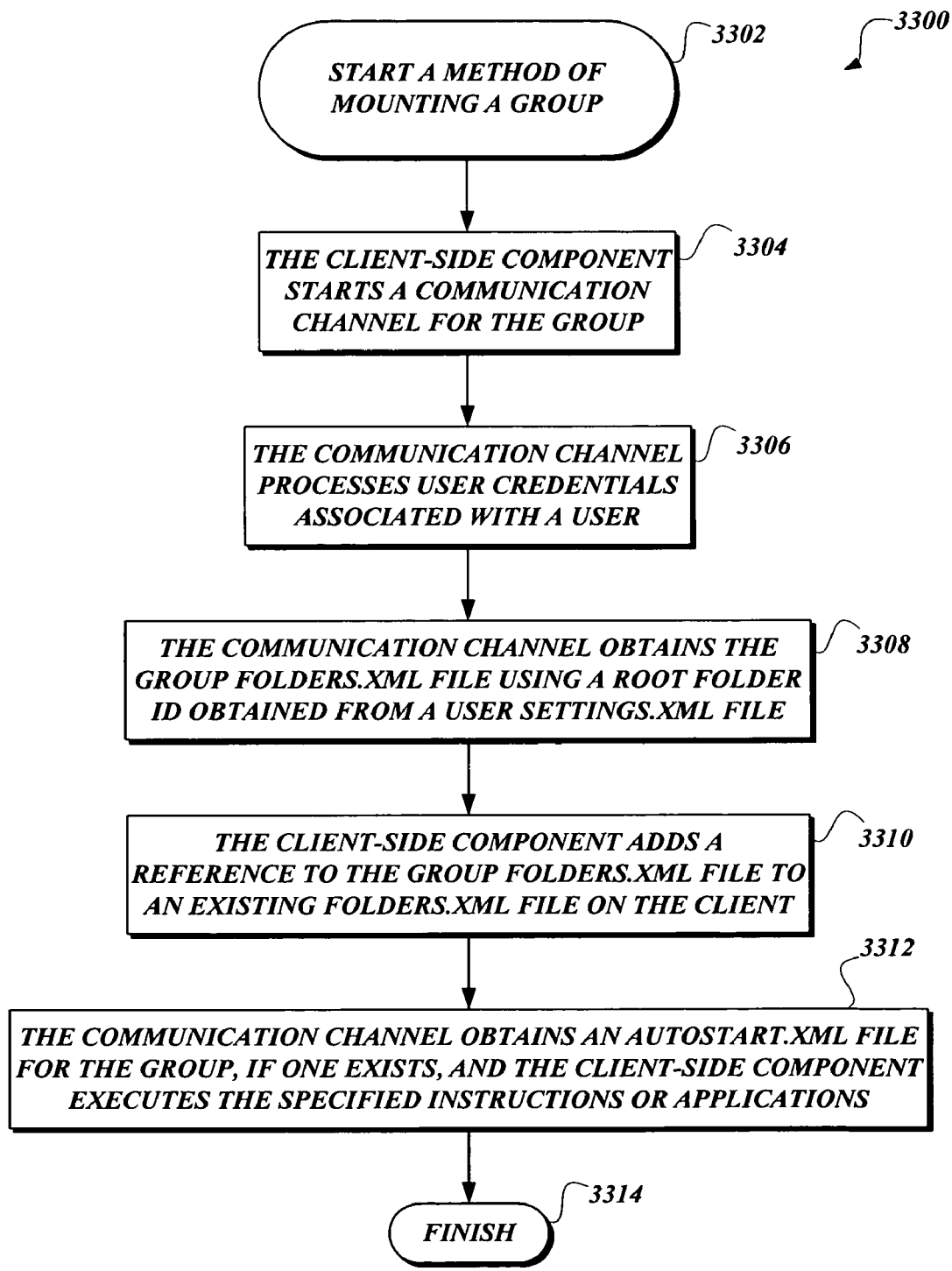
FIG. 33 illustrates a method for mounting a network operating system group in accordance with another embodiment of the present invention.

FIG. 33 illustrates one embodiment of a method 3300 for mounting a network operating system group. From a start block 3302, the method 3300 proceeds to block 3304, where the client-side component 2400 starts a communication channel for the group. Next, at block 3306, the communication channel processes user credentials associated with a user. The communication channel may prompt the user for any additional credentials specific to the group, such as a membership name and password, or it may reuse the user login credentials for an easy single sign-on. Assuming the communication channel was able to verify the user credentials, the method 3300 then proceeds to block 3308, where the communication channel obtains the group folders.xml file using a root folder ID obtained from a user settings.xml file. Next, at block 3310, the client-side component 2400 adds a reference to the group folders.xml file to an existing folders.xml file on the client. (The creation of the existing folders.xml file is discussed in further detail above in relation to FIGS. 28A-28D, and at least one folders.xml file is created via an embodiment of that process, or another process, during startup.) This reference may represent a virtual channel to the communication manager XML document, #CommunicationManager, which contains a list of all open communication channels on the client. Next, at block 3312, the communication channel obtains an autostart.xml file for the group, if one exists, and the client-side component 2400 executes the instructions or applications specified in the autostart.xml file. This autostart.xml file allows a group administrator to specify common programs that will always be executed by a group member upon logging in to the group, such as auditing programs, welcome screens, common desktop configurations, a community representing the group, and the like. Groups may also specify alternative startup sequences that users may choose to have as their user startup sequence upon login to the system. The method 3300 then proceeds to a finish block 3314 and terminates.

In some embodiments, the method 3300 may also be used to mount file storage locations, as file storage locations have most of the same features of groups. File storage locations lack the concept of having associations that are members of the file storage location (as described above for groups), but the process for mounting the file storage location and accessing the files within it are quite similar. File storage locations may even include an autostart.xml file, as described above.

Either group functionality or file storage locations may also be used to implement communities. A file storage location could be used for creating communities, with no specific membership required. In other words, all users would automatically be members of the community. Group functionality, on the other hand, could be used to create membership-only communities.

The group information described above may also include a collection of memberships. A membership is an association between a user and a group, and represents the fact that the user is a member of the group. Each membership may have an associated name, which will be shown to other members of the group, thus creating a new identity for the user when interacting within the group. Since the membership names may be created by a user when joining a group, users may be able to join groups with widely varying subject matter while keeping their privacy. For example, a group named "Group One" might have a collection of memberships indicating that a user with the username "Alice" and a user with the username "Bob" are both members of Group One. The first membership, indicating that Alice is a member of Group One, may be the same or similar to Alice's username, such as "AliceGroupOne." The second membership, indicating that Bob is a member of Group One, may be different from Bob's username, such as "AnonymousGroupMember." When Alice searches for other group members, she is given access to the list of membership names, but not the associated user names. Hence, she will see that "AnonymousGroupMember" is a member of the group, but she will not know that "AnonymousGroupMember" is actually associated with "Bob." Alternatively, members in a group may choose to make the associated user name public, in which case, Alice would be able to tell that "AnonymousGroupMember" is associated with "Bob."

The messaging services are capable of handling multiple identities of users in its inter-user communication. This is also true for the friends handling of the system, in that one user can have the same friend in his friends list as two different entries, without knowing that it is actually the same person. The user would also receive different instant messages from the two different entries without knowing that they are both sent by the same person.

Transitioning Between Online and Offline States

In some embodiments of the network operating system, the client-side component 2400 is capable of working in both a normal, online state, and in an offline state wherein the client-side component 2400 does not have access to any server-side resources. One advantage of providing this functionality in the client-side component 2400 is that it helps the client-side component 2400 seamlessly support a single application operating in both online and offline modes while minimizing the amount of work required of the application developer to support both modes.

Figure 34:
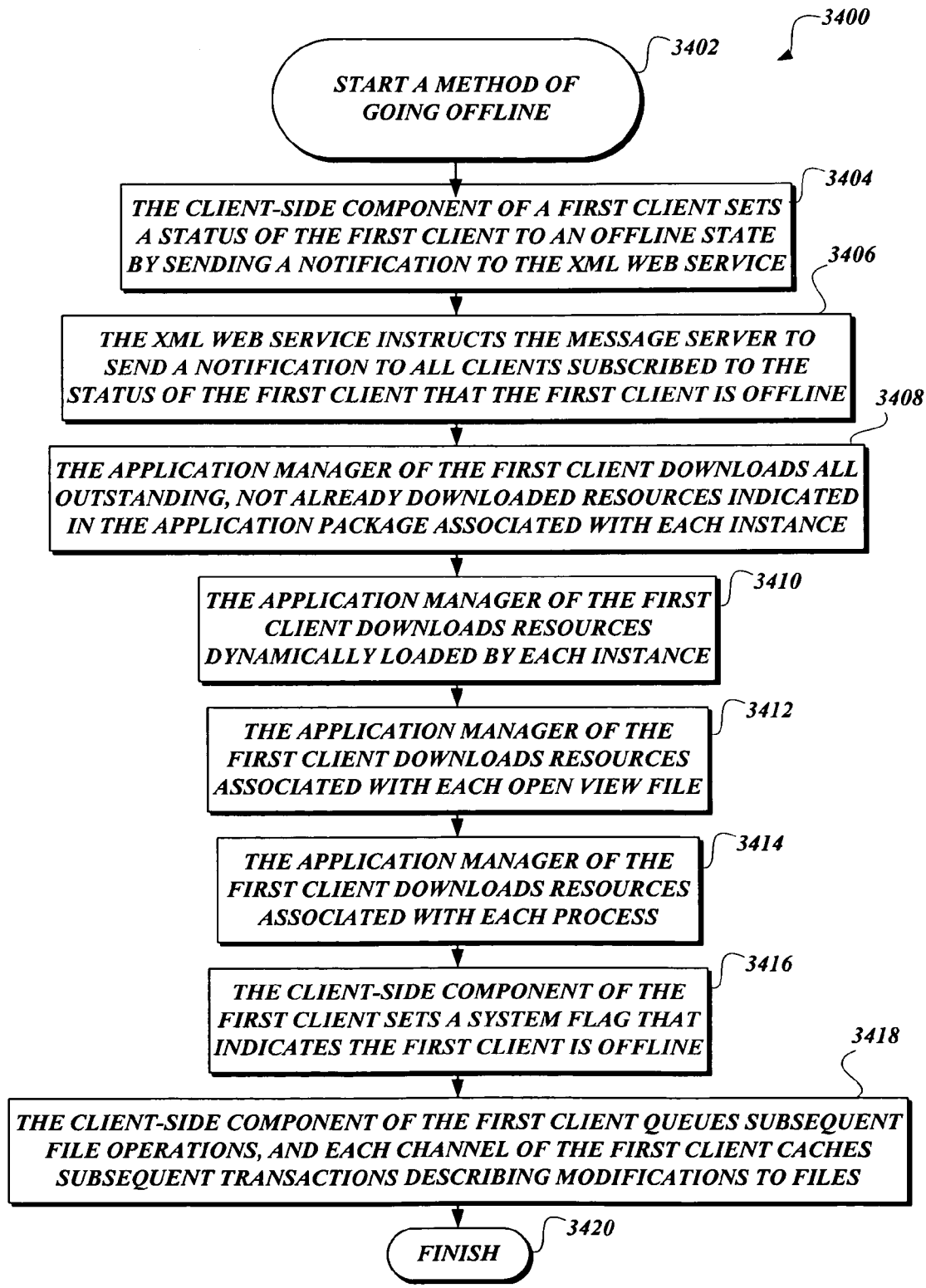
FIG. 34 illustrates a method that transitions a client computer from an online state to an offline state in accordance with one embodiment of the present invention.

FIG. 34 illustrates one embodiment of a method 3400 for transitioning the client-side component 2400 of a first client from an online state to an offline state. This method 3400 assumes that the client-side component 2400 of a first client has previously started up and connected to an XML file system 2500 via a method such as method 3200. From a start block 3402, the method 3400 proceeds to block 3404, where the client-side component 2400 of the first client sets a status of the first client to an offline state by sending a notification to the XML web service 2510 of the XML file system 2500. This status can then be checked by other clients using the same XML web services to determine that the first client is offline. Next, at block 3406, the XML web service 2510 instructs the message server 2512 to send a notification to all other clients subscribed to the status of the first client that the first client is offline. Typically, the other clients connected to the XML file system 2500 that are associated with the same group as the first client will have added the first client to their subscription list on the message server 2512. The notifications are sent out by the message server 2512 in essentially the same way as notifications concerning file updates, which are described in more detail above.

In order for the client-side component 2400 and the applications executed by the client component 2400 to continue to function without having access to the XML file system 2500, the client-side component 2400 must cache any necessary resources from the XML file system 2500 on the first client. To this end, the method 3400 proceeds to block 3408, where the application manager 904 of the first client downloads all outstanding, not already downloaded resources indicated in an application package associated with each instance currently being executed by the client-side component 2400. An application developer may indicate in the application package which resources should be cached by the client-side component 2400 to enable offline use of the application. Alternatively, the client-side component 2400 may automatically determine what resources should be cached by analyzing the references used by components of the application package.

In some embodiments, the application manager 904 may perform additional, optional steps for determining what resources should be cached on the first client. For example, the method 3400 may proceed to block 3410, where the application manager 904 of the first client downloads any resources dynamically loaded by each instance. These resources would not be referenced by the application package associated with the instance, but would instead be determined by the instance while executing. The method 3400 may then proceed to block 3412, where the application manager 904 of the first client downloads resources associated with each open view file. As with the dynamically loaded resources, each open view file may be associated with resources that are not referenced by the application package. The method 3400 may also proceed to block 3414, where the application manager 904 similarly downloads resources associated with each process. One skilled in the art will recognize that since blocks 3410-3414 are optional, one, more than one, or none of the blocks may be executed in embodiments of the method 3400.

After resources are downloaded at block 3408 and zero or more of blocks 3410-3414, the method 3400 then proceeds to block 3416, where the client-side component 2400 of the first client sets a system flag that indicates the first client is offline. This system flag may be used to change the behavior of both the client-side component 2400 and the applications executed on the first client. For example, in one embodiment, the method 3400 continues to block 3418, where the client-side component 2400 of the first client queues subsequent file operations, and each channel of the first client caches subsequent transactions describing modifications to files, instead of immediately transmitting file operations and transactions to the XML file system 2500. Since the client-side component 2400 queues file operations and caches transactions while offline, it can appear to a user of the network operating system that no change has taken place when the first client goes offline.

Applications executed by the client-side component 2400 may also change their behavior based on the system flag, such as by disabling functionality that requires network connectivity. The client-side component 2400 itself may change its behavior further, such as by displaying an error message if a user of the first client tries to perform an action that requires network connectivity. The method 3400 then proceeds to a finish block 3420 and terminates.

Figure 35:
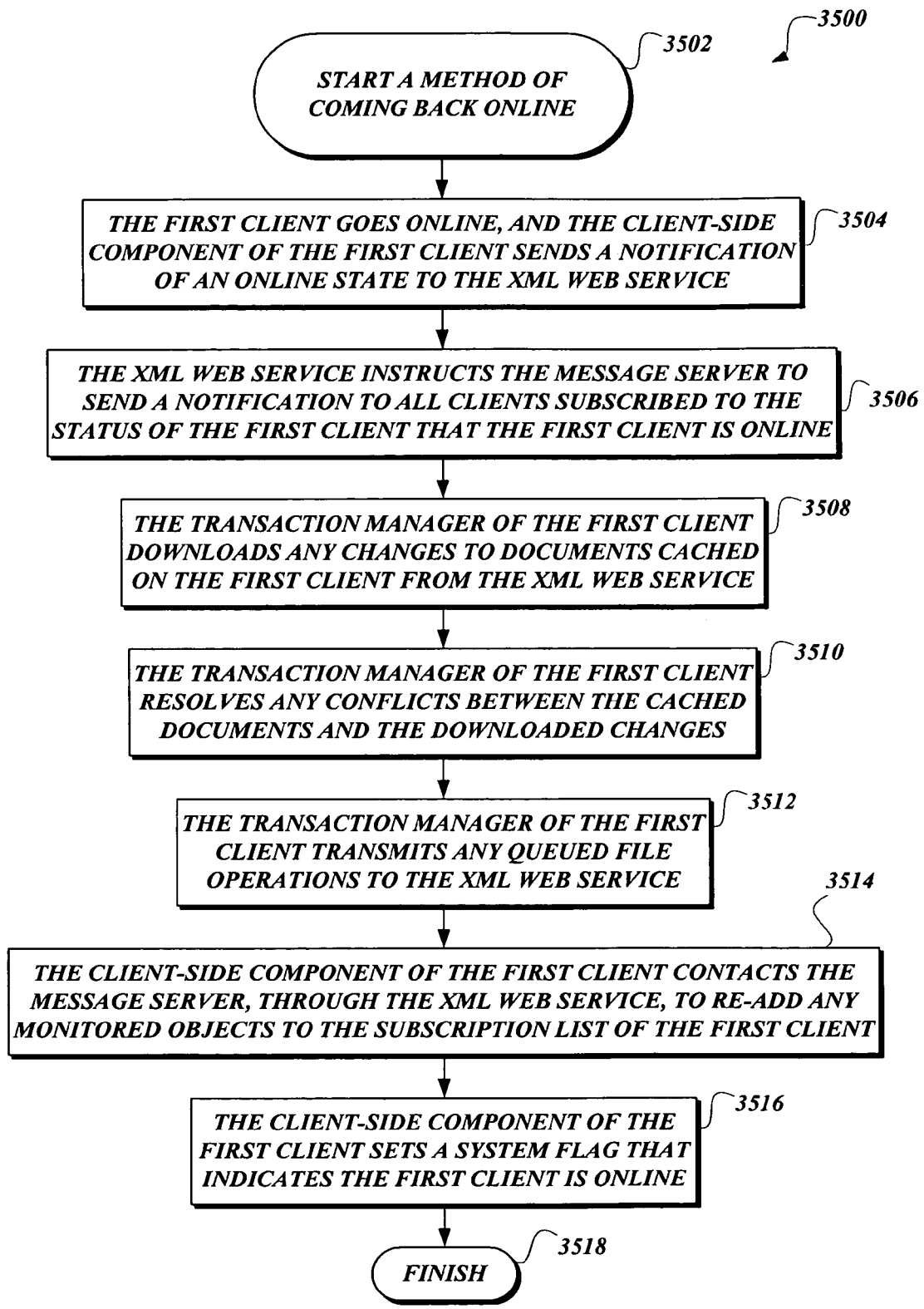
FIG. 35 illustrates a method of transitioning a client computer back to an online state when the client computer has been operating in an offline state in accordance with another embodiment of the present invention.

FIG. 35 illustrates one embodiment of a method 3500 of coming back online when a first client has already executed a method, such as method 3400, and has been operating in an offline state. From a start block 3502, the method 3500 proceeds to block 3504, where the first client goes online, and the client-side component 2400 of the first client sends a notification of an online state to the XML web service 2510. The first client may go online by establishing or re-establishing a connection to one of, but not limited to, a local-area network, a wireless network, a dial-up network, and the like. Alternatively, the first client may go online when a user indicates a desire to go online, when the network connection has already been established. Next, at block 3506, the XML web service 2510 instructs the message server 2512 to send a notification to all clients subscribed to the status of the first client that the first client is online.

The method 3500 then proceeds to block 3508, where the transaction manager 910 of the first client downloads any changes to documents cached on the first client from the XML web service 2510. In one embodiment, these downloaded changes are changes made to the documents in the XML file system 2500 by other clients while the first client was offline. Next, at block 3510, the transaction manager 910 of the first client resolves any conflicts between the cached documents and the downloaded changes. In one embodiment, the transaction manager 910 merely detects that a conflict exists, and prompts the user to manually resolve the conflict (by creating a new file to contain the cached changes, to cancel the cached changes in favor of the downloaded changes, etc.). In another embodiment, the transaction manager 910 executes an algorithm that decides which changes should be retained and which should be discarded.

Next, at block 3512, the transaction manager 910 of the first client transmits any queued file operations to the XML web service 2510. For example, if the user of the first client attempted to create, delete, or rename any files in the XML file system 2500 while offline, the file operations will be transmitted to the XML file system 2500 at this point. In one embodiment, the XML file system 2500 will detect any conflicts with changes made by other users (such as an attempt to rename a file that was previously deleted, etc.) and respond appropriately.

The method 3500 then proceeds to block 3514, where the client-side component 2400 of the first client contacts the message server 2512, through the XML web service 2510, to re-add any monitored objects to the subscription list of the first client. Next, at block 3516, the client-side component 2400 of the first client sets a system flag that indicates the first client is online. In one embodiment, setting this system flag returns the client-side component 2400 and the applications to their normal, network-connected state of operation. The method 3500 then proceeds to a finish block 3518 and terminates. At this point, the XML file system of the first client is then synchronized to the server-side component 2500 of the network operating system and is online.

XML File System Special Folders

As discussed above, certain folders in the XML file system 2500 may be designated as special folders. In one embodiment, an entry for a special folder is stored in the folder database 2520 in the same way as an entry for a regular folder, but with a flag set to indicate that the folder is a special folder. In one embodiment, the entry in the folder database 2520 for the special folder also contains an indication of one of many server process that handles requests to create files in the special folder. In another embodiment, one server process handles all requests to create files in the special folder, and determines how to handle the file based on the content of the file, such as a file type of the file.

These special folders, instead of providing file storage, may serve as an abstraction for some other data handling routine, such as asynchronous messaging between users. One example of such asynchronous messaging would be the use of an outbox folder for receiving and handling outgoing messages intended for other users. The use of special folders for inter-user communication provides many advantages. For example, it simplifies client application development. A XIOS application 2402 may utilize the messaging protocol associated with the special folder by simply using familiar file creation routines, and need not struggle with the underlying details of the communication protocol. As another example, the use of special folders for inter-user communication allows a XIOS application 2402 to leverage the group functionality included in the XML file system 2500, as described above. Hence, a XIOS application 2402 using special folders for messaging does not need to add extra code for implementing security, group membership, friend lists, addressing, anonymity, or the like, as it may simply rely on the underlying functionality of the XML file system 2500 for such features.

Figure 36:
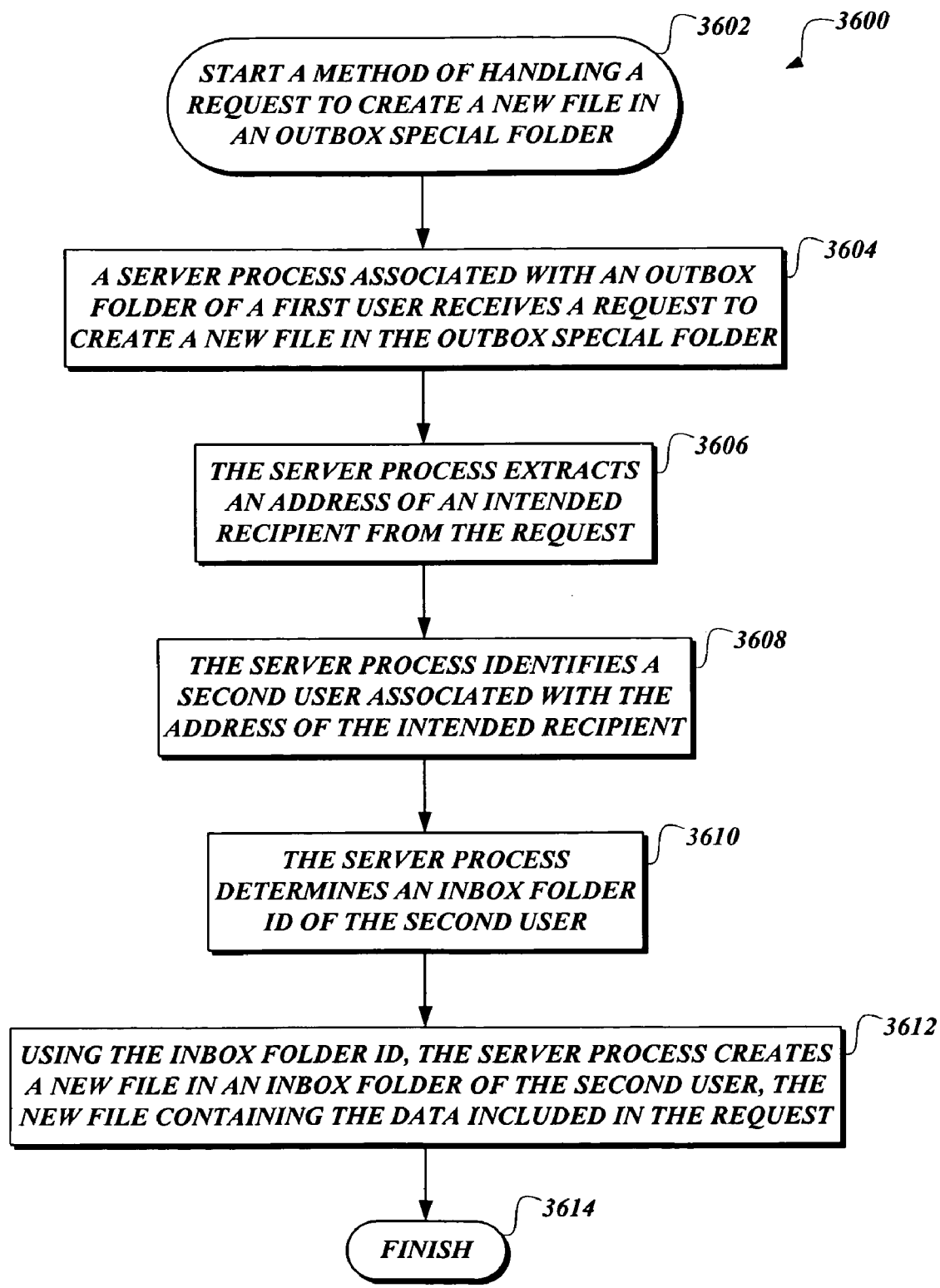
FIG. 36 illustrates a method of handling a request to create a new file in a way that facilitates enhanced network communications in accordance with another embodiment of the present invention.

FIG. 36 illustrates one embodiment of a method 3600 of handling a request to create a new file in an outbox special folder. While such a request would look to a XIOS application 2402 executing on a client as if it were a request to create a file, the server will treat the request as a request to send a message to a second user. From a start block 3602, the method 3600 proceeds to block 3604, where a server process associated with an outbox folder of a first user receives a request to create a new file in the outbox special folder. Next, at block 3606, the server process extracts an address of an intended recipient from the request. The method 3600 then proceeds to block 3608, where the server process identifies a second user associated with the address of the intended recipient.

The group and friend list functionality of the XML file system 2500 described above allows multiple different types of addressing to identify the second user. For example, the first user may address the message directly to a user name of the second user. As another example, the first user may address the message to a membership name that is associated with the second user. In this case, the anonymity of the second user would be protected, but the first user would still be able to address messages to the second user. As yet another example, the first user may address the message to an address stored in the metadata associated with the second user, such as a phone number. The server process will determine which type of addressing has been used, and will identify the second user accordingly.

Next, at block 3610, the server process determines an inbox folder ID of the second user. In one embodiment, this simply involves searching the folder database 2520 for an inbox folder associated with the second user. The method 3600 then proceeds to block 3612, where, using the inbox folder ID, the server process creates a new file in an inbox folder of the second user, the new file containing the data included in the request. In embodiments where the file has been created in the special folder (as opposed to the server process directly handling the file creation request), the server process simply moves the new file from the outbox folder of the first user to the inbox folder of the second user. Next, the method 3600 proceeds to an end block 3614 and terminates.

Example Application

Chat

As outlined above, one advantage of the network operating system is that the features embedded in the network operating system make it possible to rapidly develop reusable, scaleable, cross-platform, collaboration components that contain rich security and anonymity functionality. One embodiment of an exemplary application that takes advantage of many of these features is a chat application, described below.

Figure 37:
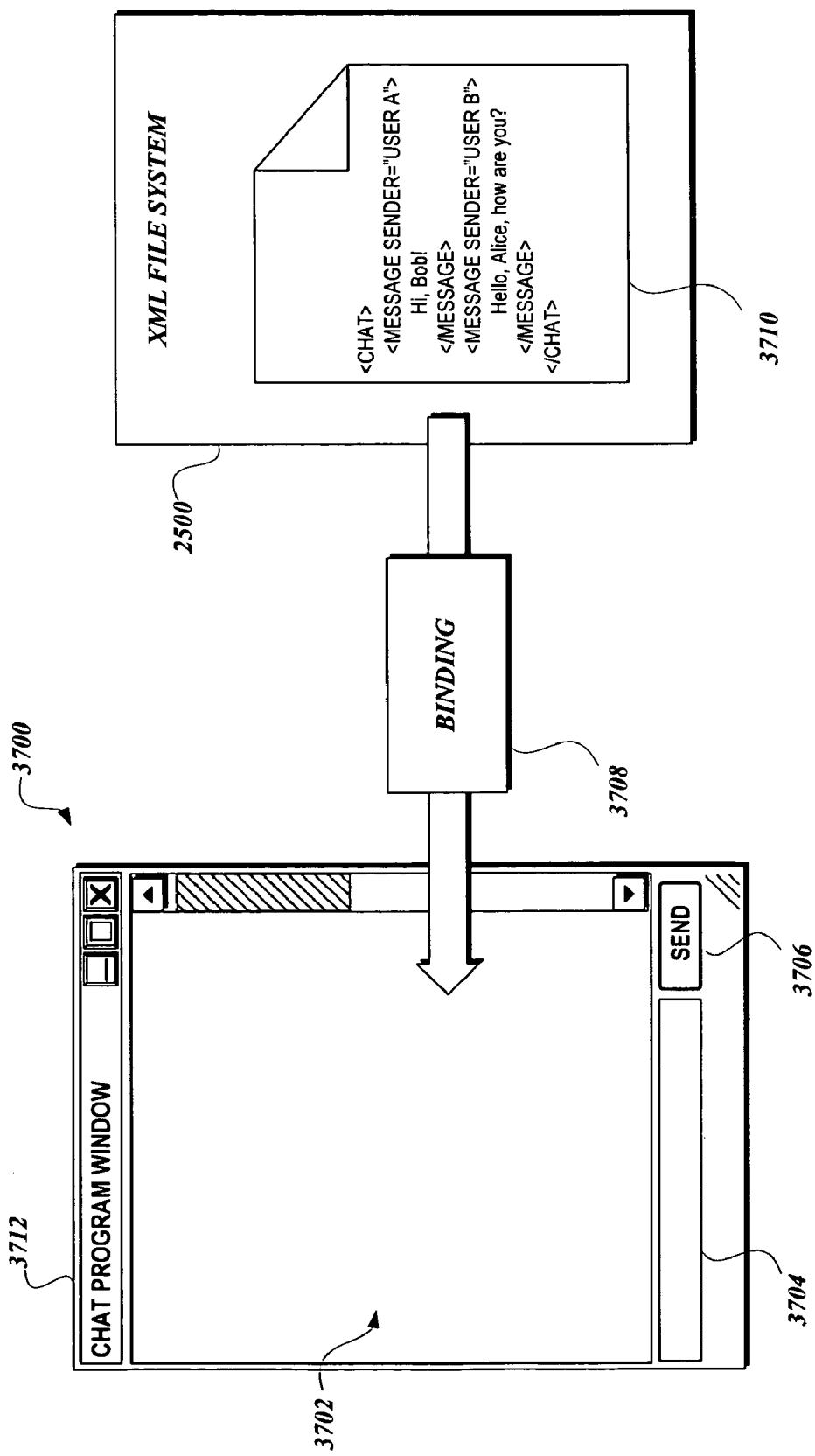
FIG. 37 illustrates a shared data file utilized with a chat application that is suitable for describing additional aspects of the present invention.

FIG. 37 illustrates, at a high level, one embodiment of a chat application 3700 and its corresponding shared data file 3710. Instead of devising and coding new communication protocols and authentication schemes, the chat application 3700 performs communication between participants in a chat conversation through the use of a shared data file 3710 residing in the XML file system 2500. The interface of the chat application 3700 comprises four primary components: a host window component 3712, a text display component 3702, a text entry component 3704, and a button component 3706. Upon the start of a chat conversation, the text display component 3702 is bound to the shared data file 3710 via a binding 3708, such that changes made to the shared data file 3710 by any participant in the chat conversation will be reflected in the text display component 3710 (this text is omitted from FIG. 37 for clarity).

Figure 38:
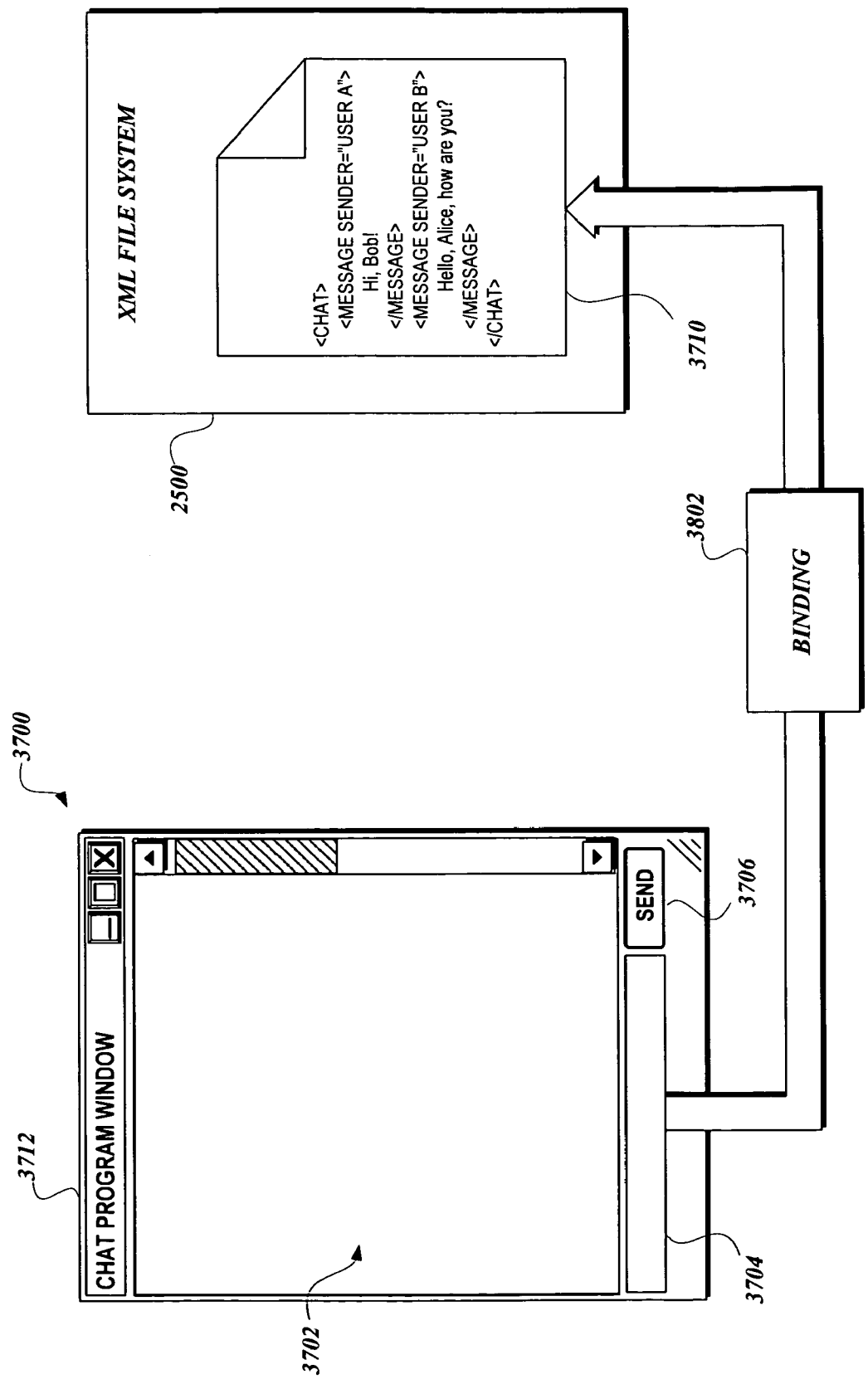
FIG. 38 illustrates the relationships between components and the data model utilized by a chat application in accordance with another embodiment of the present invention.

FIG. 38 illustrates, at a high level, that the text display component 3702 and the button component 3706 of one embodiment of a chat application 3700 are also bound to the shared data file 3710. When a user inputs text into the text entry component 3704 and clicks the button component 3706, the change is made in the shared data file 3710. This change will then be propagated to all components bound to the shared data file 3710, including text display component 3702.

Figure 39:
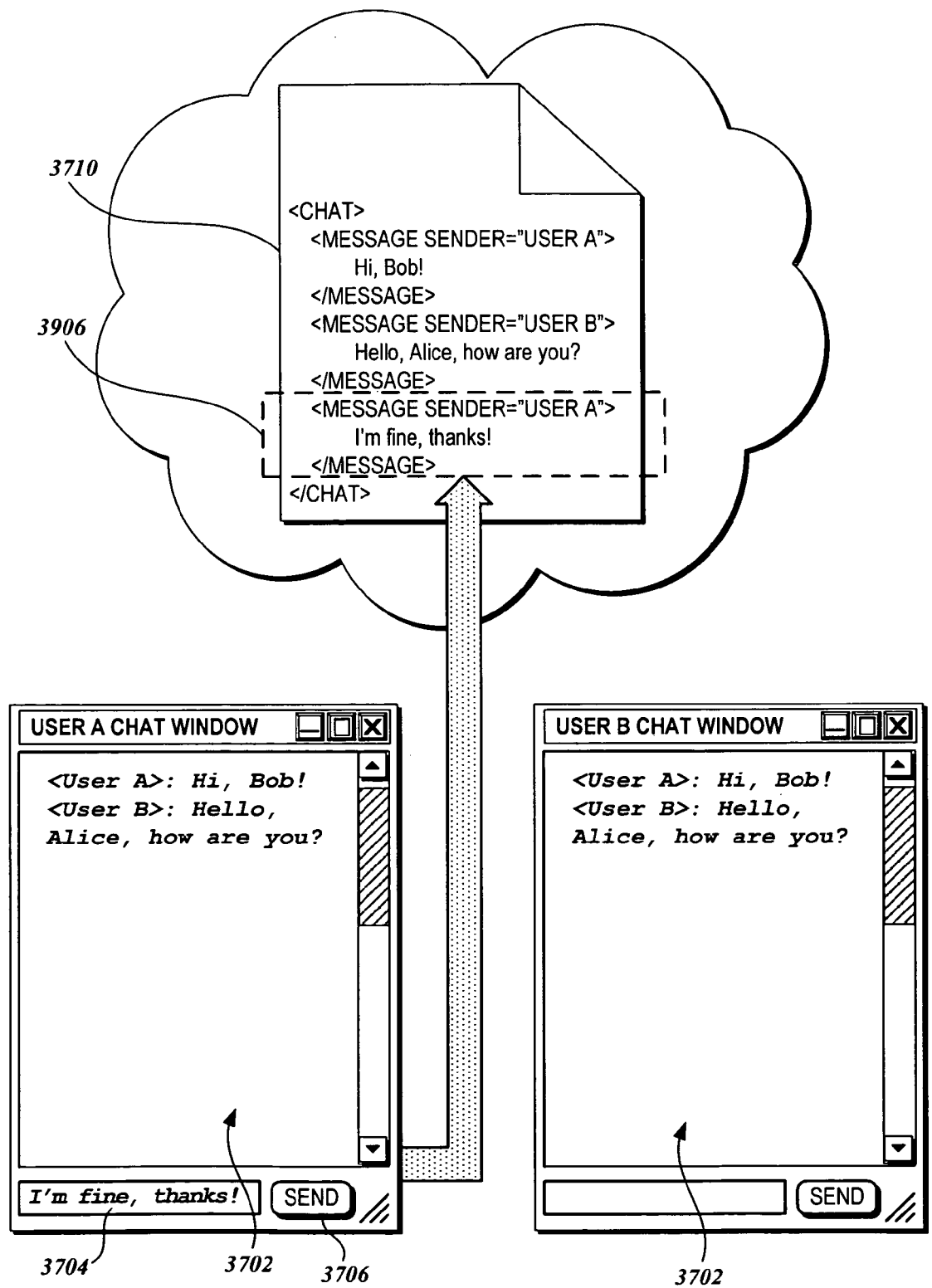
FIG. 39 illustrates the updating of a shared data file used to facilitate a chat conversation in accordance with another embodiment of the present invention.

FIG. 39 illustrates, at a high level, the updating of the shared data file 3710 in a chat conversation between a chat application of a first user 3902 and a chat application of a second user 3904. In this figure, the text display component 3702 of the chat application of the first user 3902 and the text display component 3702 of the chat application of the second user 3904 are bound to the shared data file 3710, and therefore display the contents of the shared data file 3710. The first user has input text into the text input component 3704, and has clicked the button component 3706. The button component 3706 is associated with a trigger which, when the button component is clicked, causes steps to execute that read the text from the text entry component 3704, append the text 3906 to the shared data file 3710, and clear the text from the text entry component 3704.

This procedure for updating the shared data file 3710 helps to show at least one advantage of the network operating system, in that a developer must merely associate the four components described above, and create the rule bound to the text entry component, to enable this functionality. Behind the scenes, the network operating system will handle numerous details of updating the shared data file 3710. For example, in one embodiment, a cached copy of the shared data file 3710 is stored in the client-side cache maintained by the document manager 912. A corresponding URL object receives the request to update the shared data file 3710, which causes the transaction manager 910 to create a transaction representing the changes. The transaction manager 910 propagates the transaction to remote listeners by causing the transaction to be submitted to the XML web service 2510 via the XIOS communicator 2504 and the XIOS channel. The XML web service 2510 notes that the file is shared, and forwards the submitted transaction to the transaction coordinator 2522. The transaction coordinator 2522 then commits the transaction, updating the shared data file 3710 within the XML file system 2500.

Figure 40:
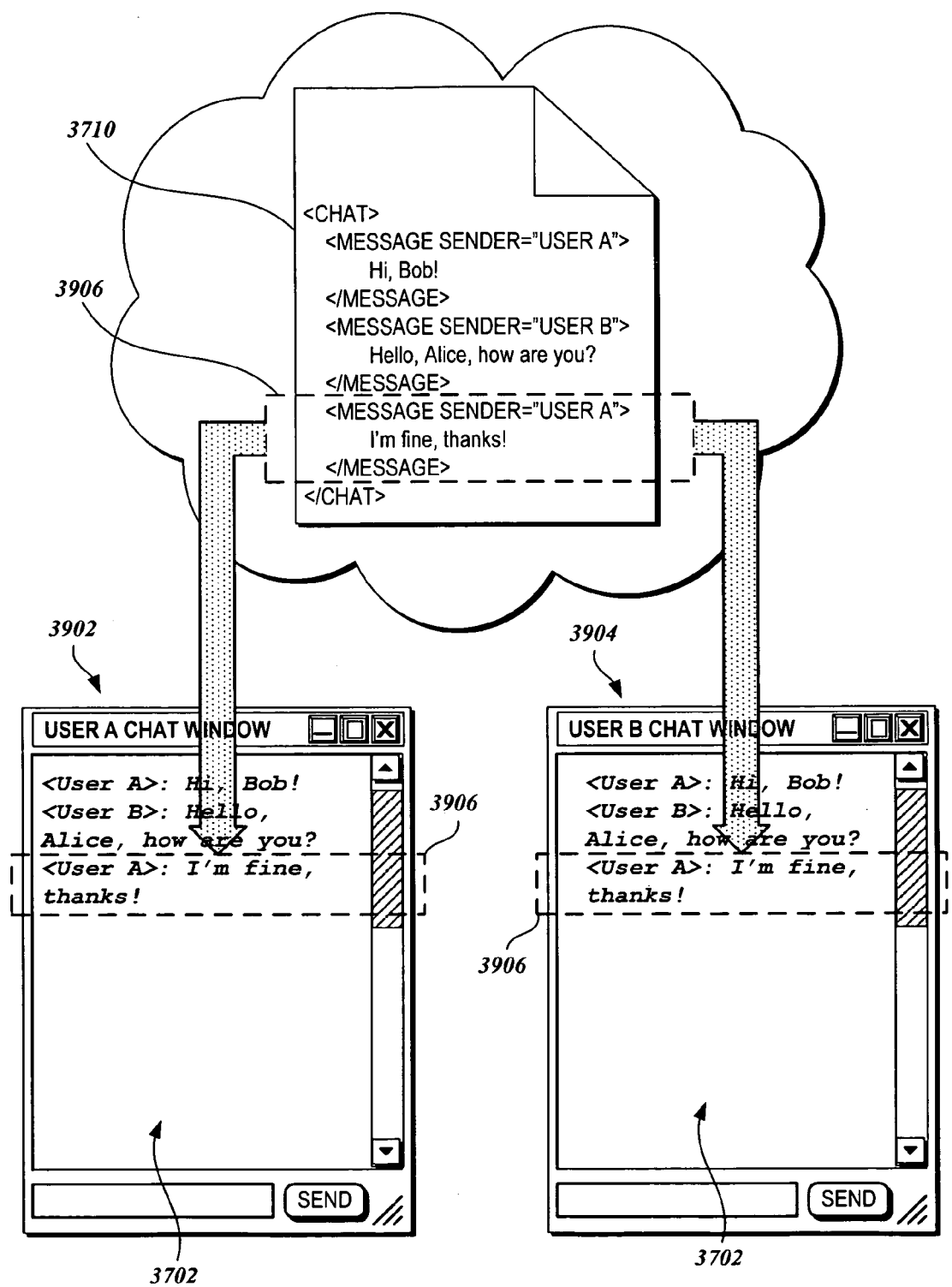
FIG. 40 illustrates an exemplary set of communications performed in a chat conversation in accordance with another embodiment of the present invention.

FIG. 40 illustrates, at a high level, the transmission of the chat messages via propagation of changes to the shared data file 3710 in one embodiment of the chat application 3700. As described above, the text display component 3702 of both the chat application of the first client 3902 and the chat application of the second client 3904 are bound to the shared data file 3710. Hence, when the XML file system 2500 updates the shared data file 3710, each of the bound components is notified of the changes and is updated accordingly.

Advantageously, this allows the developer to have UI components that automatically, through data update event propagation, always display the correct information synchronized with the shared data file 3710, and thereby complete the chat communication without writing any code, but instead by simply binding the component to the shared data file 3710. As with the update of the shared data file 3710, the network operating system handles numerous details of this transaction. For example, in one embodiment, when the transaction coordinator 2522 commits the transaction, it instructs the message server 2512 to notify each client that is subscribed to changes in the shared data file 3710 that the shared data file 3710 has been updated. The message server 2512 sends those notifications to each client, which either extracts the updated information from the notification or contacts the XML file system 2500 to obtain the latest version of the file. In this regard, the transaction manager 910 of the first client will recognize that the changes were submitted by the first client, and will not repetitively update its cached version of the shared data file 3710. The transaction manager 910 of other clients will cause the changes to be incorporated into their respective cached versions of the shared data file 3710. As occurs with other data updates, any listening components will then be notified that the file has been updated, including the text display components 3702 of the chat application of the first client 3902 and the chat application of the second client 3904. The text display components 3702 will then automatically be updated accordingly with the added content 3906.

Figure 41:
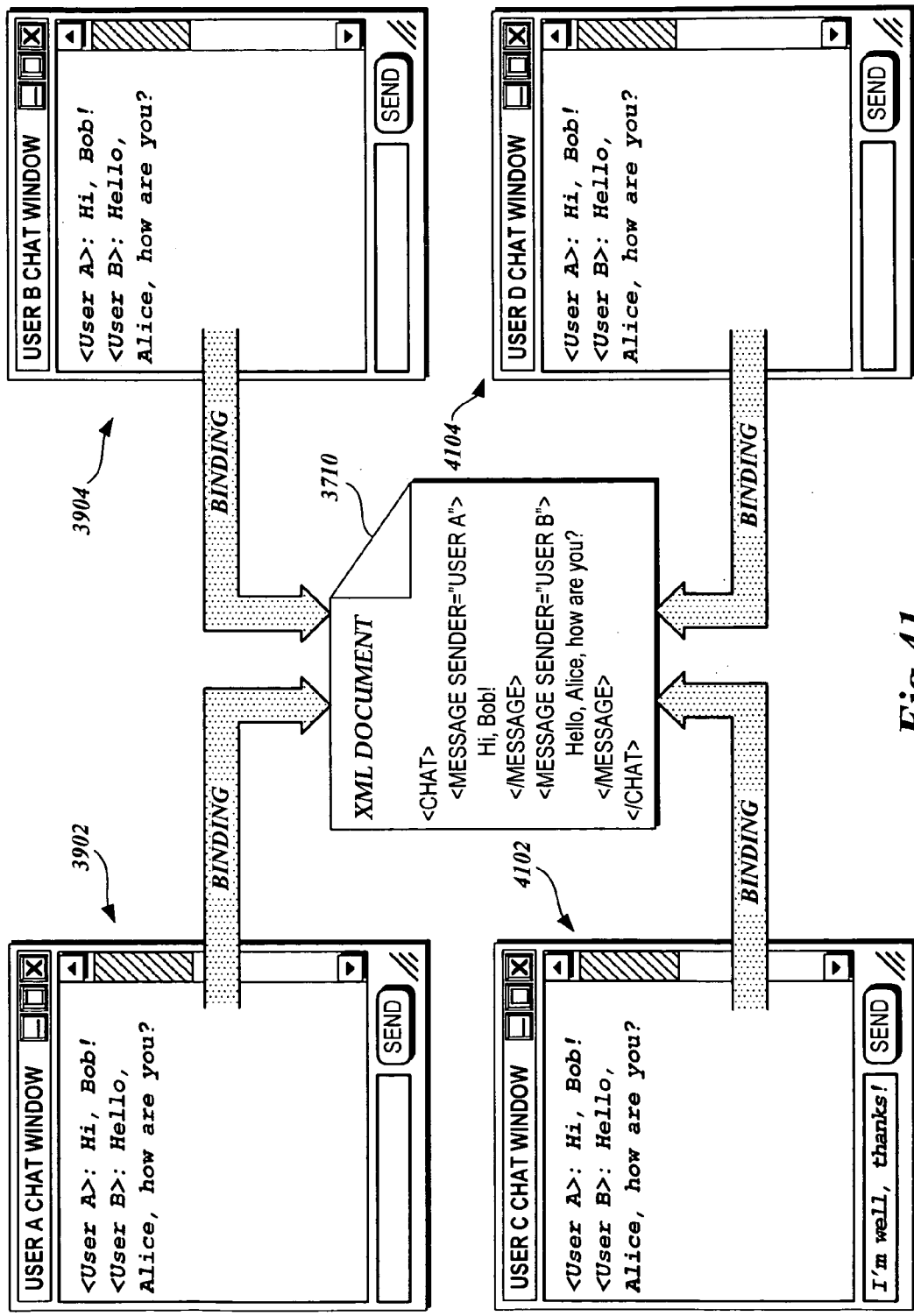
FIG. 41 illustrates the use of a shared data file in performing collaborative communications between multiple clients.

FIG. 41 illustrates an additional feature enabled by using a shared data file 3710 for collaborative communication between clients. That is, as updates to a given shared data file 3710 are propagated to any number of clients subscribing to the shared data file 3710, no extra work is required to enable collaborative communication between more than two participants. As illustrated in FIG. 41, the conversation between the first client 3902 and the second client 3904 can be joined by any number of other clients, such as a third client 4102 and a fourth client 4104, without any further design changes. Each client will bind to the shared data file 3710 and receive updates as described above.

The addition of contacts to a given user's chat friend list and the establishing of individual chat sessions may also illustrate many features contained within the network operating system. In one embodiment, a first user may only send or receive chat messages from a second user who is a member of a friend list of the first user and who has consented to chat communication with the first user. The friend list of the first user may be stored in a document in the XML file system 2500, or may be stored and transmitted as part of the settings.xml file. To add a second user to the friend list, the first user must first search for the user. In one embodiment, to preserve anonymity of users when belonging to a group, the first user will only be able to search membership names, each of which is associated with a user and a group to which the first user belongs. In one embodiment, the first user will also be able to search a global group, in which there is an indication of the actual name of the user, but no connection to names found in groups.

In either case, the search will return to the first user an address associated with the second user. The first user will then send a request to the address of the second user to add the second user to the first user's friend list. In one embodiment, this is done using a method similar to the method 3600 described above, wherein the first user creates a file in the first user's outbox folder that constitutes the friend list request, which is then routed and transferred to the second user's inbox folder by a server process. On the client of the second user, the request is retrieved from the inbox of the second user, and a dialog is displayed asking the second user whether or not she wishes to allow the first user to add her to his friend list. When the second user responds, a message is sent back to the first user in similar fashion to complete the addition of the second user to the friend list of the first user, and the first user will then be able to start chat conversations with the second user.

For a first user to start a chat session with a second user, a similar process occurs. The chat application of the first user creates a shared data file 3710, binds its text display component 3702 to the shared data file 3710, and sends a request to the address of the second user to begin a chat session. The request is delivered as described above. If the second user accepts the request, a notification is sent to the chat application of the first user, which then sends the document ID of the shared data file 3710 to the chat application of the second user. The chat application of the second user binds its text display component 3702 to the shared data file 3710, and the chat conversation may proceed as described above.

Although these features are described with relation to chat, one skilled in the art will recognize that other forms of server-mediated communication, such as message boards, email, and the like, could be implemented utilizing shared data files. Also, shared data files could be used to coordinate other forms of communication that do not require a server for mediation. For example, a first user and a second user could use a shared data file to negotiate bandwidth settings, encryption settings, and the like for peer-to-peer communication, such as VOIP or video conferencing.

Further, although the description of chat above assumes that the chat application is handling all messages that arrive in the inbox folder for the sake of simplicity, it is possible that an additional component on the client manages incoming messages. In one embodiment, a component on the client analyzes each message that appears in the inbox folder, and determines an appropriate application for handling the message. The component then launches the application and passes the message to the application for further processing. In this way, incoming chat requests or buddy list requests could be handled without having the chat application already running.

Figure 42:
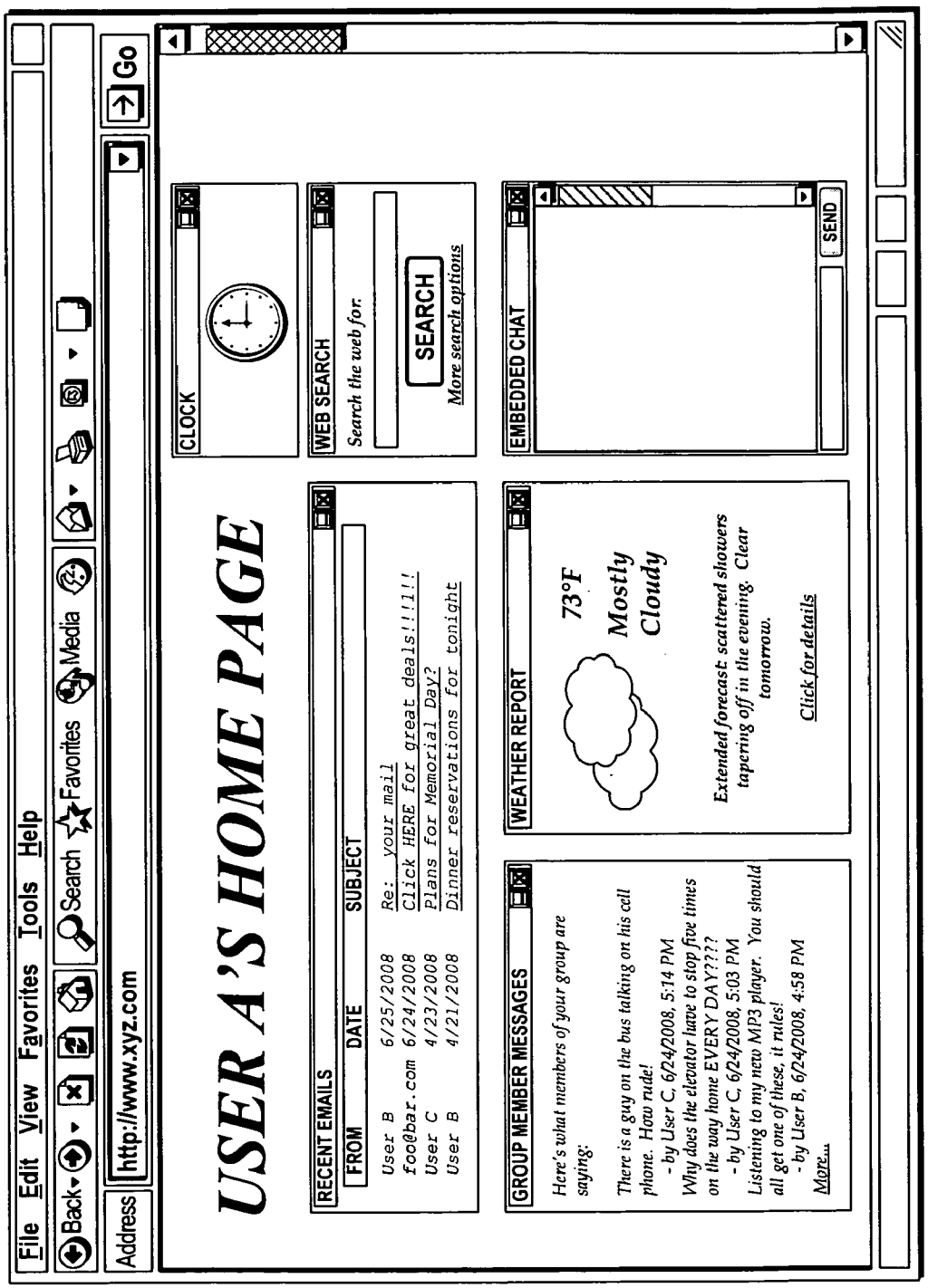
FIG. 42 depicts the user interface of an exemplary application suitable for illustrating additional aspects of the present invention.

FIG. 42 illustrates another advantage of the use of reusable components in creating XIOS applications. The figure illustrates one embodiment of the network operating system hosted within a web browser, and may also be representative of how the network operating system may look in other embodiments, such as a stand-alone application or a machine operating system implementation of the client-side component 2400. Each of the boxes within the web browser represents a XIOS application 2402 created with reusable components, such as an email component, a clock component, a web search component, a group message component, and a weather report component. The box in the lower right shows the reuse of the chat application components within this web browser, as opposed to merely within a stand-alone chat application. The use of reusable components allows rapid development of such composite applications, as the components need not be rewritten to work within a different context. Another advantage of being able to create composite applications is that underlying data that feed the applications from data models may be merged from multiple disparate sources, and hence enable applications to work from a composite of a multitude of data sources.

Example Application

Reunion

FIG. 43 illustrates an example collaboration application easily created using embodiments of the system. The Class of 1992 Reunion application is one example of functionality that could be presented to members of a group. As described above with respect to FIG. 42, FIG. 43 illustrates a collection of components that refer to multiple data sources. What is illustrated by the Class of 1992 Reunion application is a collection of components that could be launched as part of an autostart.xml file loaded when binding a group folder. As shown above in FIG. 32B, the Class of 1992 Reunion group folder may be bound by a client as a data source, in which case it would be displayed as a drive within the user interface. When a user thereafter opens that data source (or when the user first binds the data source), an autostart.xml document associated with the group folder will cause the collection of components, such as the Schedule of Events, the Map to Reunion Events, the Countdown to Reunion, etc., to be displayed.

Along with the automatic display of these components, the group functionality will also provide security. For example, only members of the group will be able to view entries in the Photo Album, which may simply be a view of a folder stored within the group folder hierarchy. The group functionality will also provide easy collaboration with other members of the group, as shown in the Chat component of FIG. 43, which shows other online members of the group without first requiring the user to add the other group members to a friend list.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method implemented in computer-executable instructions that, when executed by a computer processor, produces a document for transmission to a client computing device that describes a folder tree, the method comprising:

in response to receiving a request from the client computing device to access a root folder, querying a folder database for information associated with the root folder describing a user's access rights with regard to the root folder;

authenticating that the user has rights to access the root folder and creating the document that describes the folder tree;

adding metadata associated with the root folder to the document that describes the folder tree;

for each subfolder within the hierarchy of the root folder that has the same permissions with respect to the user as the root folder:

obtaining metadata of the subfolder from the folder database;

adding metadata associated with the subfolder to the document that describes the folder tree; and for at least one subfolder within the hierarchy of the root folder that has different permissions with respect to the user as the root folder, inserting an XLink corresponding to the subfolder into the document, the XLink allowing the user to access the subfolder once the user's right to access the subfolder is authenticated.

2. The method as recited in claim 1, further comprising:
   querying an index server for information describing each file in the root folder;
   adding metadata associated with each file in the root folder to the document that describes the folder tree; and
   wherein at least one file in the root folder is of a file type that initiates execution of an application upon the root folder being mounted as a virtual drive on the client computing device.

3. The method as recited in claim 1, further comprising:
   accepting a request from a client computing device to perform a search for a file associated with specified content; and
   identifying one or more files from an index having content that matches data provided in the request.

4. The method as recited in claim 1, wherein adding metadata associated with the root folder to the document that describes the folder tree, includes:
   obtaining an identifier of the root folder in the request from the client computing device to access the root folder; and
   querying an index server to retrieve a list of files associated with the root folder.

5. The method as recited in claim 4, further comprising:
   searching the list of files for one or more restricted files, each restricted file having associated data that indicates that the user does not have access rights to the file;
   removing the one or more restricted files from the list;
   returning the list from the index server in the format of an atom feed; and
   adding the list to the document that describes the folder tree.

* * * * *

UNITED STATES PATENT AND TRADEMARK OFFICE
CERTIFICATE OF CORRECTION

| | | |
|---|---|---|
| PATENT NO. | : 8,156,146 B2 | Page 1 of 1 |
| APPLICATION NO. | : 12/240884 | |
| DATED | : April 10, 2012 | |
| INVENTOR(S) | : D. Arthursson | |

It is certified that error appears in the above-identified patent and that said Letters Patent is hereby corrected as shown below:

| COLUMN | LINK | ERROR |
|---|---|---|
| (75)<br>Pg. 1, col. 1 | Inventor | "Linkoeping," should read --Linköping,-- |
| 90<br>(Claim 4, line 3) | 17 | after "folder tree" delete "," |

Signed and Sealed this
Eighth Day of January, 2013

David J. Kappos
*Director of the United States Patent and Trademark Office*